(12) United States Patent
Huebner

(10) Patent No.: US 12,357,905 B2
(45) Date of Patent: Jul. 15, 2025

(54) PLAY SYSTEMS FOR AMBIENT SPACES WITH VIDEO CONTROLLERS

(71) Applicant: Kenneth J. Huebner, Milwaukee, WI (US)

(72) Inventor: Kenneth J. Huebner, Milwaukee, WI (US)

(*) Notice: Subject to any disclaimer, the term of this patent is extended or adjusted under 35 U.S.C. 154(b) by 327 days.

(21) Appl. No.: 18/180,470

(22) Filed: Mar. 8, 2023

(65) Prior Publication Data

US 2024/0299840 A1 Sep. 12, 2024

(51) Int. Cl.
*A63F 13/24* (2014.01)
*A63F 13/211* (2014.01)
*G06F 3/01* (2006.01)

(52) U.S. Cl.
CPC ............ *A63F 13/211* (2014.09); *A63F 13/24* (2014.09); *G06F 3/017* (2013.01)

(58) Field of Classification Search
CPC ...... A63F 13/428; A63F 13/211; A63F 13/24; G06F 3/011; G06F 3/017; G06F 3/01
See application file for complete search history.

(56) References Cited

U.S. PATENT DOCUMENTS

| | | | |
|---|---|---|---|
| 8,939,840 B2 | 1/2015 | Heatherly et al. | |
| 9,339,729 B2 | 5/2016 | Heatherly et al. | |
| 9,539,506 B2 | 1/2017 | Heatherly et al. | |
| 10,293,247 B2 | 5/2019 | Heatherly et al. | |
| 10,471,343 B2* | 11/2019 | Hirata | A63F 13/98 |
| 10,627,909 B2 | 4/2020 | Arana et al. | |
| 10,799,802 B2* | 10/2020 | Nielsen | A63F 13/65 |
| 11,099,634 B2* | 8/2021 | Germer | G06F 3/011 |
| 11,132,067 B2 | 9/2021 | Arana et al. | |
| 11,154,777 B2 | 10/2021 | Yeung et al. | |
| 11,239,899 B2 | 2/2022 | Nocon et al. | |
| 11,779,846 B2* | 10/2023 | Walker | A63F 13/65 463/31 |
| 2011/0028219 A1 | 2/2011 | Heatherly et al. | |
| 2012/0280988 A1 | 11/2012 | Lampotang et al. | |
| 2014/0306866 A1 | 10/2014 | Miller et al. | |
| 2015/0235429 A1 | 8/2015 | Miller et al. | |

(Continued)

*Primary Examiner* — David L Lewis
*Assistant Examiner* — Shauna-Kay Hall

(57) ABSTRACT

Apparatuses, methods, and computer readable medium for play systems with controller devices configured to be arbitrarily relocatable and attached to or at least partially contained in arbitrary physical objects in a 3D ambient space—detecting orientations, locations, distances, movements, gesture movements, imaginary objects, and collisions of arbitrary physical objects, and responding accordingly—such as at least in part controlling one or more virtual objects, sound effects, and mechanical effects on a display appliance—based at least in part on the detected orientations, locations, distances, movements, gesture movements, imaginary objects, and collisions of arbitrary physical objects. Further, remote play systems in a computer network may use arbitrary physical objects with controller devices of display appliances. Whereby kids and adults around the world may interact together using ordinary and arbitrary physical objects, toys, and props from their 3D ambient spaces—for remote multiplayer, video gaming combined with physical play.

29 Claims, 78 Drawing Sheets

(56) References Cited

U.S. PATENT DOCUMENTS

| | | | |
|---|---|---|---|
| 2015/0297986 A1* | 10/2015 | Dal Mutto | A63F 13/42 463/31 |
| 2016/0220896 A1 | 8/2016 | Heatherly et al. | |
| 2016/0243443 A1* | 8/2016 | Chuaypradit | A63F 13/577 |
| 2018/0196523 A1 | 7/2018 | Arana et al. | |
| 2020/0118337 A1 | 4/2020 | Yeung et al. | |
| 2020/0209979 A1 | 7/2020 | Arana et al. | |
| 2020/0269130 A1* | 8/2020 | Provancher | A63F 13/24 |
| 2020/0368616 A1* | 11/2020 | Delamont | H04N 13/239 |
| 2021/0049361 A1 | 2/2021 | Drake et al. | |
| 2021/0134065 A1 | 5/2021 | Ramani et al. | |
| 2021/0178272 A1 | 6/2021 | Nocon et al. | |
| 2021/0184756 A1 | 6/2021 | Nocon et al. | |
| 2021/0197096 A1 | 7/2021 | Donaldson et al. | |
| 2021/0260485 A1 | 8/2021 | Elbert et al. | |
| 2021/0271883 A1 | 9/2021 | Agrawal et al. | |
| 2021/0291052 A1 | 9/2021 | Yeung et al. | |
| 2021/0311271 A1 | 10/2021 | Xie et al. | |
| 2021/0312716 A1* | 10/2021 | Xie | G06T 19/20 |
| 2022/0023757 A1 | 1/2022 | Yeung et al. | |
| 2022/0147141 A1 | 5/2022 | Gustafsson et al. | |

\* cited by examiner

| VIRTUAL OBJECT DESCRIPTION DATA D300 | |
|---|---|
| | |
| VIRTUAL OBJECT IDENTITY DATA D310 | |
| VIRTUAL OBJECT IDENTIFIER = E.G., "260" | D311 |
| VIRTUAL OBJECT TYPE= E.G., SUPERHERO HUMAN | D312 |
| VIRTUAL OBJECT BRAND= E.G., SUPERHEROES | D313 |
| DEVICE IDENTIFIER = E.G., "100" | D314 |
| SUPPORT VIRTUAL OBJECT IDENTIFIERS = E.G., "360B", ETC. | D315 |
| | |
| VIRTUAL OBJECT STATE DATA D320 | |
| LOCATION = E.G., (10,10,3) UNITS | D321 |
| ORIENTATION = E.G., (0,3,90) DEGREES | D322 |
| RANK= E.G., 10 - COMMANDER | D323 |
| HIT POINTS= E.G., 1000 HIT POINTS | D324 |
| INTELLIGENCE= E.G., 10 – CLEVER | D325 |
| STRENGTH = E.G., 6 – MODERATE | D326 |
| WEALTH = E.G., 5 UNITS OR COINS COLLECTED | D327 |
| WEAPONS = E.G., LASER BEAM, MISSILE LAUNCHER | D328 |
| SHIELDS = E.G., PLASMA SHIELD | D329 |
| EMOTION = E.G., HAPPY, EXCITED, ANGRY, OR SAD | D330 |
| PURCHASE COST = E.G., 1.50 US DOLLARS | D331 |
| INVENTORY = E.G., FISHING POLE, COIN, KEY, ETC. | D332 |
| | |
| VIRTUAL OBJECT BEHAVIOR DATA D340 | |
| DOUBLE TAP GESTURE BEHAVIOR: E.G., A PROJECTILE IMAGINARY OBJECT IS GENERATED UPON DETECTING A DOUBLE TAP GESTURE. | D341 |
| | |
| VIRTUAL OBJECT CONTENT DATA D350 | |
| 3D MODEL = E.G., SUPERHERO HUMAN WITH RED CAPE | D351 |
| AUDIO DATA = E.G., WHISTLING AIR AUDIO WHEN FLYING | D352 |
| MECHANICAL DATA = E.G., SINGLE VIBRATION WHEN LANDING | D353 |
| | |

FIG. 9A

| CONTROL DATA D100 | |
|---|---|
| DEVICE DESCRIPTION DATA D110 | |
| DEVICE IDENTIFIER = E.G. 100 | D111 |
| | |
| VIRTUAL OBJECT DESCRIPTION DATA D120 | |
| VIRTUAL OBJECT IDENTIFIER = E.G., "260" | D121 |
| VIRTUAL OBJECT TYPE= E.G., SUPERHERO HUMAN | D122 |
| VIRTUAL OBJECT BRAND= E.G., SUPERHEROES | D123 |
| SUPPORT VIRTUAL OBJECT IDENTIFIERS= E.G., "360B",ETC. | D124 |
| | |
| COMMAND DATA D130 | |
| COMMAND TYPE = E.G., NORMAL, CALIBRATE, ETC. | D131 |
| | |
| MOTION DATA D140 | |
| ORIENTATION = E.G., (10,10,5) DEGREES | D141 |
| TRANSLATIONAL MOVEMENT = E.G., (-10,-5,0) UNITS/SEC | D142 |
| ROTATIONAL MOVEMENT = E.G., (0,2,0) DEGREES/SEC | D143 |
| TRANSLATIONAL VELOCITY = E.G. (-20,-5,0) UNITS/SEC | D144 |
| ROTATIONAL VELOCITY = E.G., (0,2,0) DEGREES/SEC | D145 |
| ALTITUDE = E.G. (10) UNITS | D146 |
| | |
| SIGNAL DATA D150 | |
| RSSI DEVICE IDENTIFIER = E.G., "100" | D151 |
| RSSI VALUE = E.G., -100 UNITS | D152 |
| | |
| GESTURE DATA D160 | |
| GESTURE TYPE = E.G., DOUBLE TAP GESTURE | D161 |
| INPUT TYPE = E.G., PUSHBUTTON PRESSED | D162 |
| | |
| COLLISION DATA D170 | |
| PHYSICAL OBJECT COLLISION EVENT = E.G., FALSE | D171 |
| PHYSICAL OBJECT CLOSE PROXIMITY EVENT = E.G., FALSE | D172 |
| | |
| IMAGINARY OBJECT DATA D180 | |
| IMAGINARY OBJECT LAUNCH EVENT = E.G., FALSE | D181 |
| IMAGINARY OBJECT COLLISION EVENT = E.G., FALSE | D182 |
| IMAGINARY OBJECT CLOSE PROXIMITY EVENT = E.G., FALSE | D183 |

| CONTROL DATA D200 | |
|---|---|
| DEVICE DESCRIPTION DATA D210 | |
| DEVICE IDENTIFIER = E.G. "200" | D211 |
| VIRTUAL OBJECT DESCRIPTION DATA D220 | |
| VIRTUAL OBJECT IDENTIFIER = E.G., "260" | D221 |
| VIRTUAL OBJECT TYPE= E.G., SUPERHERO HUMAN | D222 |
| VIRTUAL OBJECT BRAND= E.G., SUPERHEROES | D223 |
| SUPPORT VIRTUAL OBJECT IDENTIFIERS= E.G., "360B", ETC. | D224 |
| COMMAND DATA D230 | |
| COMMAND TYPE = E.G., NORMAL, CALIBRATE, ETC. | D231 |
| SIGNAL DATA D240 | |
| RSSI DEVICE IDENTIFIER = E.G., "200" | D241 |
| RSSI VALUE = E.G., -100 UNITS | D242 |

FIG. 9D

| RELOCATABLE DATASET D400 | |
|---|---|
| HOME REFERENCE DATA D410 | |
| CONTROLLER DEVICE IDENTIFIER = E.G., "100" | D411 |
| VIRTUAL OBJECT IDENTIFIER = E.G., "260" | D412 |
| HOME REFERENCE LOCATION = E.G., (10,10,5) UNITS | D413 |
| HOME REFERENCE ORIENTATION = E.G., (0,0,90) DEGREES | D414 |

FIG. 9E

| RELOCATABLE DATASET D450 | |
|---|---|
| HOME REFERENCE DATA D460 | |
| CONTROLLER DEVICE IDENTIFIER = E.G., "100" | D461 |
| VIRTUAL OBJECT IDENTIFIER = E.G., "260" | D462 |
| HOME REFERENCE LOCATION = E.G., (10,10,5) UNITS | D463 |
| HOME REFERENCE ORIENTATION = E.G., (0,0,90) DEGREES | D464 |
| HOME REFERENCE DATA D470 | |
| CONTROLLER DEVICE IDENTIFIER = E.G., "101" | D471 |
| VIRTUAL OBJECT IDENTIFIER = E.G., "261" | D472 |
| HOME REFERENCE LOCATION = E.G., (20,20,5) UNITS | D473 |
| HOME REFERENCE ORIENTATION = E.G., (0,90,70) DEGREES | D474 |

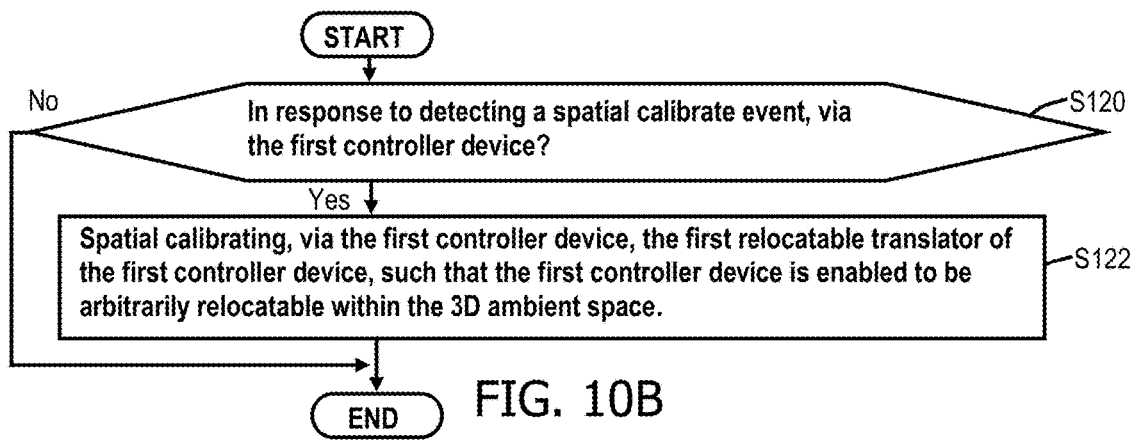

FIG. 10B

In response to detecting a spatial calibrate event, via the first relocatable translator of the first controller device, based at least in part on the first controller device is located at a spatial distance, from the display appliance, that is less than or equal to a calibrate threshold distance within the 3D ambient space. —S130

FIG. 10C

In response to detecting a spatial calibrate event, via the first input interface of the first controller device, based at least in part on user input to the first controller device within the 3D ambient space. —S131

FIG. 10D

In response to detecting a spatial calibrate event, via the first motion module of the first controller device, based on at least in part on a gesture movement of the first controller device within the 3D ambient space. —S132

FIG. 10E

Spatial calibrating, via the first controller device, the first relocatable translator of the first controller device, such that the first controller device is enabled to be arbitrarily relocatable within the 3D ambient space, wherein at least once a first orientation (and/or a first location), of the first controller device in the 3D ambient space, is independently and arbitrarily adjustable in respect to a second orientation (and/or a second location) of the first virtual object, in a 3D virtual space, on the display appliance. —S133

FIG. 10F

Spatial calibrating, via the first controller device, the first relocatable translator of the first controller device, such that the first controller device is enabled to be arbitrarily relocatable within the 3D ambient space, wherein at least once, associating the first controller device with a second virtual object, such that the first controller device is enabled to be at least in part controlling the second virtual object on the display appliance. —S134

FIG. 10G

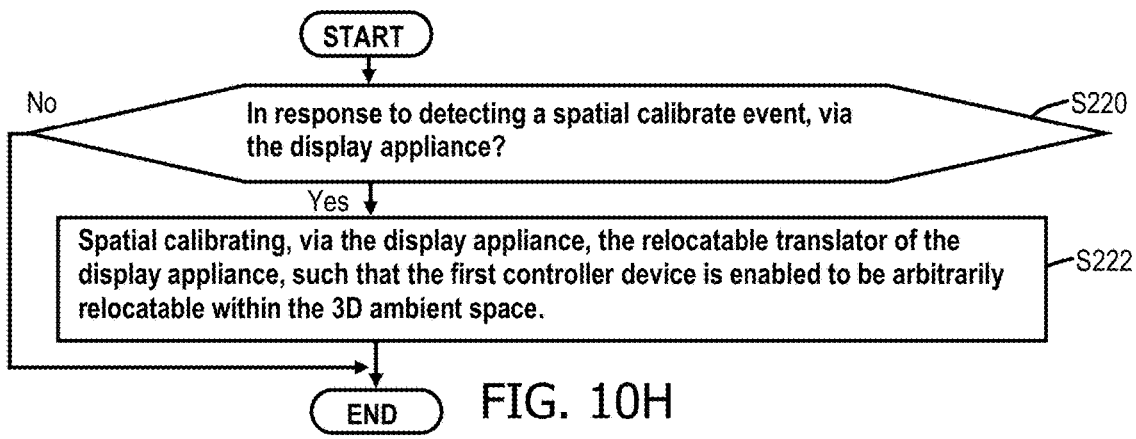

FIG. 10H

In response to detecting a spatial calibrate event, via the relocatable translator of the display appliance, based at least in part on the first controller device is located at a spatial distance, from the display appliance, that is less than or equal to a calibrate threshold distance within the 3D ambient space. — S230

FIG. 10I

In response to detecting a spatial calibrate event, via the input interface of the display appliance, based at least in part on user input to the display appliance within the 3D ambient space. — S231

FIG. 10J

In response to detecting a spatial calibrate event, via the motion module of the display appliance, based at least in part on a gesture movement of the display appliance within the 3D ambient space. — S232

FIG. 10K

Spatial calibrating, via the display appliance, the relocatable translator of the display appliance, such that the first controller device is enabled to be arbitrarily relocatable within the 3D ambient space, wherein at least once a first orientation (and/or a first location), of the first controller device in the 3D ambient space, is independently and arbitrarily adjustable in respect to a second orientation (and/or a second location) of the first virtual object, in a 3D virtual space, on the display appliance. — S233

FIG. 10L

Spatial calibrating, via the display appliance, the relocatable translator of the display appliance, such that the first controller device is enabled to be arbitrarily relocatable within the 3D ambient space, wherein at least once, associating the first controller device with a second virtual object, such that the first controller device is enabled to be at least in part controlling the second virtual object on the display appliance. — S234

FIG. 10M

Operating, via a first relocatable translator of the first controller device and/or a second relocatable translator of the display appliance, such that the first controller device is enabled to be arbitrarily relocatable in a 3D ambient space in the play system, wherein the first controller device is enabled to be attached to or at least partially contained in a first arbitrary physical object at an arbitrary location, and an arbitrary orientation, relative to the first arbitrary physical object that is an unlimited type of physical object in the 3D ambient space, and the first controller device is enabled to be arbitrarily located and arbitrarily oriented in the full extent of the 3D ambient space in a 3D real-world space. —S170

FIG. 12C

Operating, via a first relocatable translator of the first controller device and/or a second relocatable translator of the display appliance, such that the first controller device is enabled to be arbitrarily relocatable in a 3D ambient space in the play system, wherein the first controller device is enabled to be attached to or at least partially contained in a first arbitrary physical object at an arbitrary location, and an arbitrary orientation, relative to the first arbitrary physical object in the 3D ambient space, and the first controller device is enabled to be moved in limitless direction and/or limitless distance such that the 3D ambient space is movable in a 3D real-world space. —S171

FIG. 12D

Operating, via a first relocatable translator of the first controller device and/or a second relocatable translator of the display appliance, such that the first controller device is enabled to be arbitrarily relocatable in a 3D ambient space in the play system, wherein the first controller device is enabled to be attached to or at least partially contained in a first arbitrary physical object at an arbitrary location, and an arbitrary orientation, relative to the first arbitrary physical object in the 3D ambient space, and the first controller device is enabled to be arbitrarily located and arbitrarily oriented and capable of being wholly occluded from view (e.g. from all users) within the 3D ambient space in a 3D real-world space. —S172

FIG. 12E

Operating, via a first relocatable translator of the first controller device and/or a second relocatable translator of the display appliance, such that the first controller device is enabled to be arbitrarily relocatable in a 3D ambient space in the play system, wherein the first controller device is enabled to be attached to or at least partially contained in a first arbitrary physical object at an arbitrary location, and an arbitrary orientation, relative to the first arbitrary physical object in the 3D ambient space, and the first controller device is enabled to be arbitrarily located and arbitrarily oriented relative to one or more display appliances within the 3D ambient space in a 3D real-world space. —S173

FIG. 12F

Operating, via a first relocatable translator of the first controller device and/or a second relocatable translator of the display appliance, such that the first controller device is enabled to be arbitrarily relocatable in a 3D ambient space in the play system, wherein the first controller device is enabled to be attached to or at least partially contained in a first arbitrary physical object at an arbitrary location, and an arbitrary orientation, relative to the first arbitrary physical object in the 3D ambient space, and at least once a first orientation (and/or a first location), of the first controller device in the 3D ambient space, is independently and arbitrarily adjustable in respect to a second orientation (and/or a second location) of a first virtual object, in a 3D virtual space, on the display appliance. —S174

FIG. 12G

Operating, via a first relocatable translator of the first controller device and/or a second relocatable translator of the display appliance, such that the first controller device is enabled to be arbitrarily relocatable in a 3D ambient space in the play system, wherein the first controller device is enabled to be attached to or at least partially contained in a first arbitrary physical object at an arbitrary location, and an arbitrary orientation, relative to the first arbitrary physical object that is arbitrary and unspecified to the first controller device, display appliance, and/or play system. —S175

FIG. 12H

Operating, via a first relocatable translator of the first controller device and/or a second relocatable translator of the display appliance, such that the first controller device is enabled to be arbitrarily relocatable in a 3D ambient space in the play system, wherein the first controller device is enabled to be attached to or at least partially contained in a first arbitrary physical object at an arbitrary location, and an arbitrary orientation, relative to the first arbitrary physical object in the 3D ambient space, and the first controller device is enabled to be arbitrarily located and arbitrarily oriented within the 3D ambient space such that the 3D ambient space is movable in a 3D real-world space while the play system is operating multimedia effects in real-time. —S176

FIG. 12I

Operating, via a first relocatable translator of the first controller device and/or a second relocatable translator of the display appliance, such that the first controller device is enabled to be arbitrarily relocatable in a 3D ambient space in the play system, wherein the first controller device is enabled to be attached to or at least partially contained in a first arbitrary physical object at an arbitrary location, and an arbitrary orientation, relative to the first arbitrary physical object that is arbitrarily selected (e.g., by a user) from a plurality of physical objects present within the 3D ambient space in a 3D real-world space. —S177

FIG. 12J

A second orientation, of the first virtual object within a 3D virtual space on the display appliance, is based at least in part on a first orientation of the first controller device within the 3D ambient space. —S274

FIG. 12K

A second location, of the first virtual object within a 3D virtual space on the display appliance, is based at least in part on a first location of the first controller device within the 3D ambient space. —S275

FIG. 12L

A second translational movement, of the first virtual object within a 3D virtual space on the display appliance, is based at least in part on a first translational movement of the first controller device within the 3D ambient space. —S276

FIG. 12M

A second rotational movement, of the first virtual object within a 3D virtual space on the display appliance, is based at least in part on a first rotational movement of the first controller device within the 3D ambient space. —S277

FIG. 12N

A movement, of the first virtual object within a 3D virtual space on the display appliance, is not based on or not necessarily based on the type of the first arbitrary physical object within the 3D ambient space. —S278

FIG. 12O

At least once a second orientation (and/or a second location), of the first virtual object within a 3D virtual space on the display appliance, is independently and arbitrarily adjustable in respect to a first orientation (and/or a first location) of the first controller device within the 3D ambient space. —S279

FIG. 12P

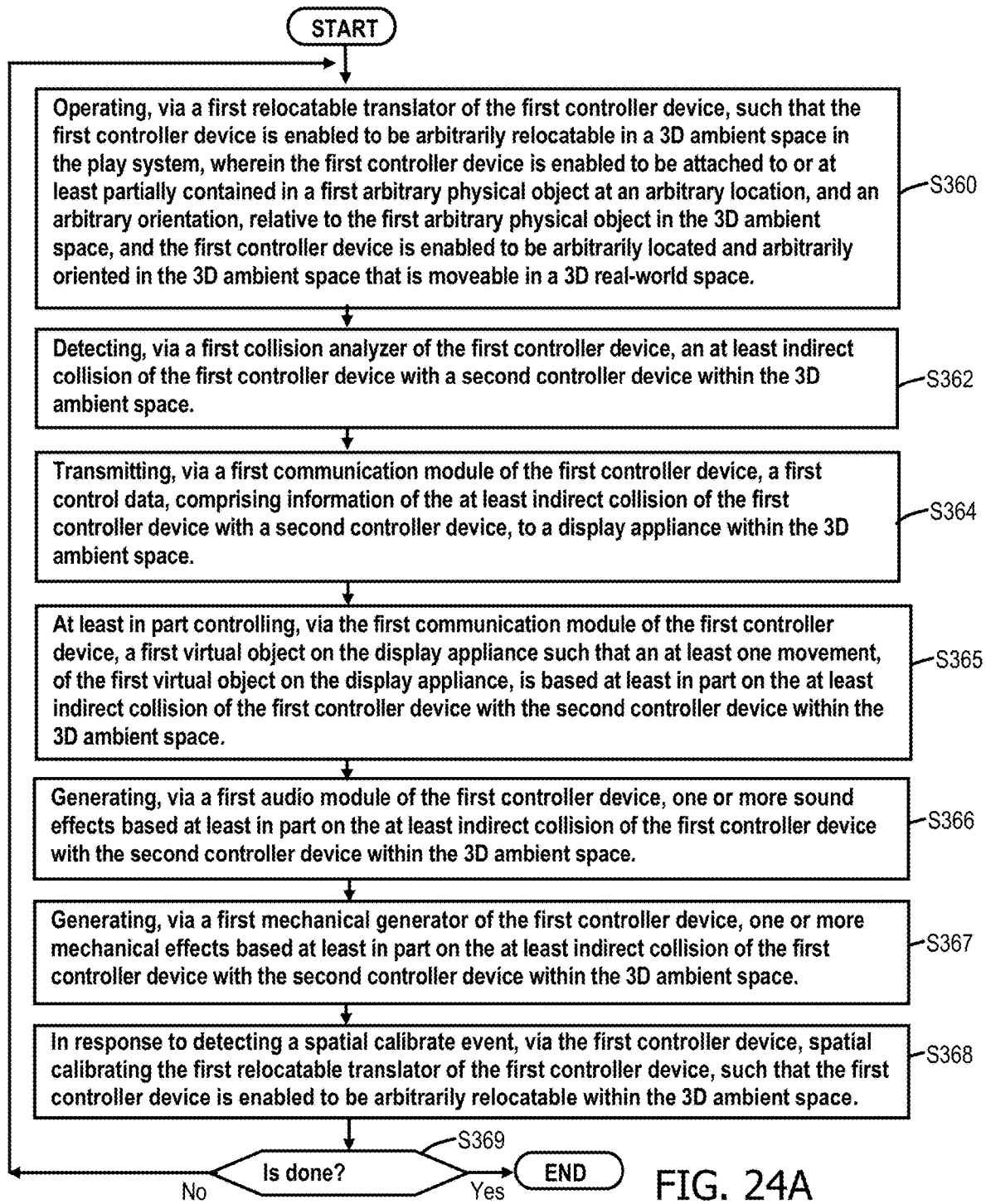

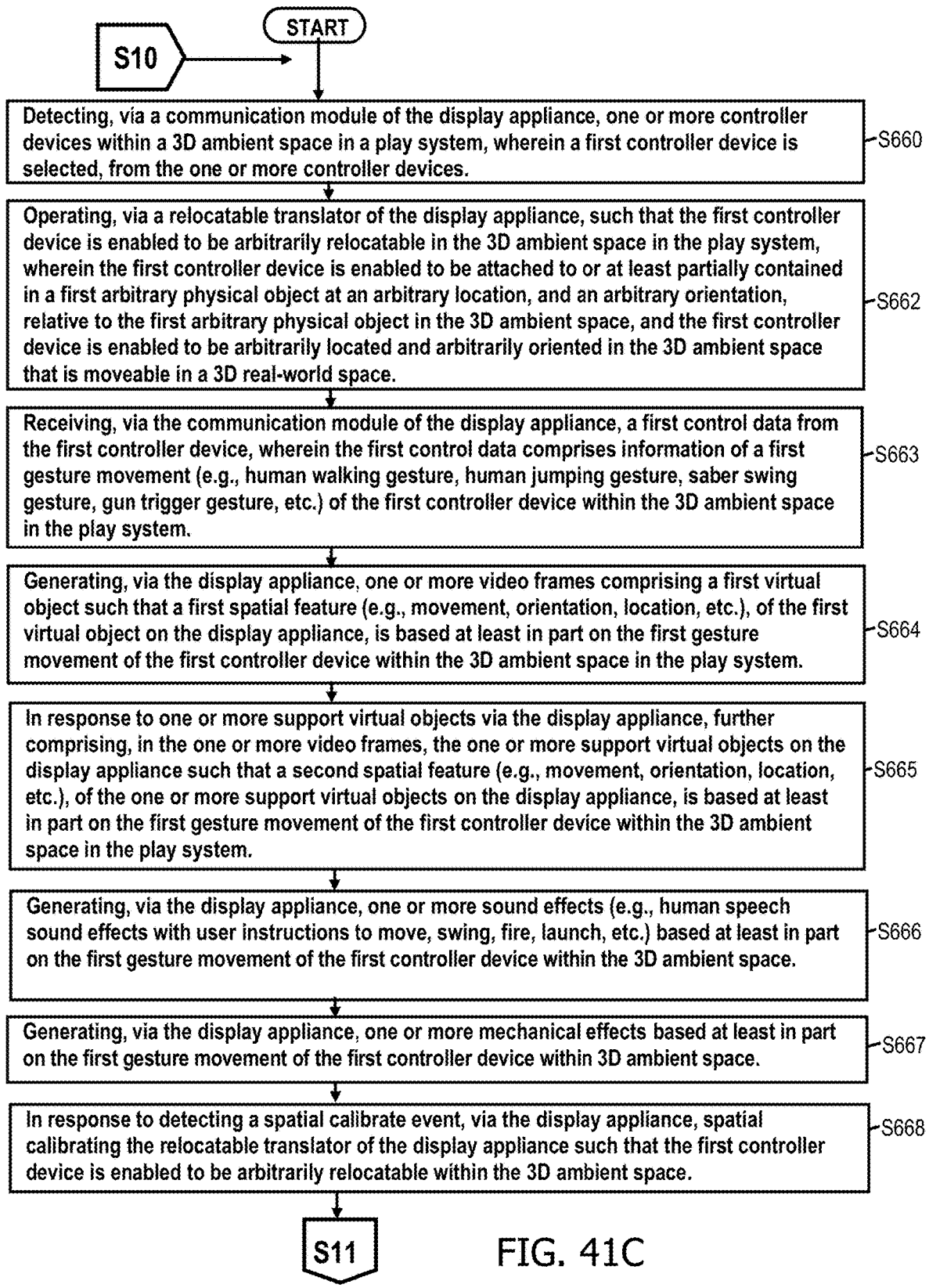

PLAY SYSTEMS FOR AMBIENT SPACES WITH VIDEO CONTROLLERS

BACKGROUND

The ambient spaces around game players are extremely varied in our home, school, work, and outdoor environments, which may include a living room, bedroom, classroom, office space, or playground—where such spaces are filled with arbitrary and commonplace objects—including books, children's toys, soft pillows, writing paper, ink pens, old shoes, edible fruit, broken twigs, tree leaves, and so on. Yet our video game systems and electronic play environments tend to ignore the "run-of-the-mill," unknown, or arbitrary physical objects located in a game player's surroundings.

For throughout the world, video games are often enjoyed by people with handheld game controllers or touchscreens to control a video display appliance. But such devices seem focused on interactivity with a player, while neglecting arbitrary physical objects within a player's surroundings. The limitations of play systems for ambient spaces are disheartening—as there are ever growing demands for digital entertainment to be combined with the real-world. Game players want more freedom and less restraint—when interacting with their 3D physical surroundings using a video display.

So there is an unexplored play experience. For surrounding the billions of digital game players in the world are three-dimensional (3D) ambient spaces—which are inherently arbitrary—with multiple billions of types of arbitrary physical objects that are randomly located and oriented having a variety of types, sizes, and shapes—all in 360 degrees of freedom on the vertical and horizontal planes of 3D ambient space.

SUMMARY

Accordingly, the reader will appreciate this disclosure presents apparatuses, methods, and computer readable media for embodiments of play systems that allow players and gamers across the globe to combine video entertainment with arbitrary physical objects, found in surrounding 3D ambient spaces, present around every player and gamer. Wherein many embodiments of a play system may allow one and more players to interact with multiple billions of types or unlimited types of arbitrary physical objects present on earth, in the 3D ambient spaces that naturally surround video gamers, toy challenged players, and thrill seeking explorers. Well knowing, these ambient spaces are extremely varied in our home, school, work, and outdoor environments, such as a living room, bedroom, classroom, office space, or playground. Where such spaces are randomly filled with commonplace and arbitrary physical objects—including books, children's toys, soft pillows, pens, paper, trading cards, edible fruit, candy, buttons, T-shirts, sneakers, play dough, cuddly dolls, footballs, tokens, twigs, leaves, and even a goldfish bowl, pet dog, and so on. The commonplace, ordinary, and arbitrary physical objects—which have been ignored too long—may be now used as props, characters, and scenery backdrops—with a role in video game entertainment.

Overview of Some Play Systems

In an innovative aspect, various embodiments of a play system may comprise one or more electronic controller devices configured to be arbitrarily relocatable and attached to or at least partially contained in one or more arbitrary physical objects from a 3D ambient space—capable of detecting orientations, locations, distances, movements, gesture movements, imaginary objects, and collisions of the one or more controller devices and arbitrary physical objects, and responding accordingly—such as at least in part controlling one or more virtual objects, sound effects, and mechanical effects on a video display appliance—based at least in part on the detected orientations, locations, distances, movements, gesture movements, imaginary objects, and collisions of the one or more controller devices and arbitrary physical objects within the 3D ambient space.

Moreover, in some embodiments, a plurality of local and remote play systems may use "the cloud" or a computer network such that the controller devices and arbitrary physical objects, located anywhere in the world, at least in part control a plurality of local and remote video display appliances, including smart phones, tablet computers, and virtual reality (VR) headsets.

Kids and adults, from around the world, may then interact together using ordinary and arbitrary physical objects, toys, and props from their 3D ambient spaces—for remote multiplayer, video gaming combined with physical play.

Arbitrary Physical Objects for Play Systems

In another innovative aspect, many embodiments of a play system may utilize arbitrary physical objects that comprise all types of physical objects located in a 3D ambient space—including, for example, arbitrarily selected physical objects, known types, indefinite types, unknown types of physical objects—and manufactured, determined, predetermined, and preselected physical objects. There are surely billions of types of arbitrary physical objects on earth, from a rock to an automobile, from a tree leaf to an elephant. And in many embodiments, the type of arbitrary physical object may be determined, indefinite, or undetermined by a play system, such that the play system may be aware, indefinitely aware, or unaware of the type of arbitrary physical object. The result being, many embodiments of a play system may utilize unlimited types of arbitrary physical objects—while controlling and generating video graphics, audio, and mechanical effects on one or more display appliances based on, for example, the movements of arbitrary physical objects.

Such abilities are ground breaking, for many embodiments of a play system may now utilize arbitrary physical objects from a 3D ambient space—where such arbitrary physical objects may be unlimited types of physical objects arbitrarily selected from the 3D ambient space—for improved fun, excitement, and playability. There is then greater storytelling versatility, increased breadth of interactivity, enlivened player imagination, and new gaming and exploratory experiences. Such embodiments enable players to use their imagination to "transform" one or more arbitrary physical objects—found in their 3D surroundings—into potentially something else within a play system. Whereby, many embodiments of play systems are not "rigidly tied" to a specific type, size, or shape of an arbitrary physical object that may cause a specific and limited response based on the physical object selected. But rather many embodiments of play systems allow play that is transformative, enabling a player/user to transform the real-world comprising arbitrary physical objects of limited possibility into a world of make-believe, a virtual world comprising virtual objects of unlimited possibility. Wherein any virtual object on a video display may be allowed—championed and supported—and associated with any type of arbitrary physical object in the 3D ambient space.

A World of Arbitrary Physical Objects

In another innovative aspect, arbitrary physical objects allow many play system embodiments to be mobile and carried in a pocket, purse, or backpack of a player/gamer. Yet wherever a user travels in the world, there is likely an abundance of arbitrary physical objects (e.g., apple, pen, or tree leaf) found in a 3D ambient space of a play system that supports unlimited types of arbitrary physical objects. Thus, substantially most or all of the physical objects within a play system are not required to be carried by a user to a destination. Rather a user's destination can provide the material for play.

Such capabilities are incredibly user friendly, as many embodiments of a play system may now be, but not limited to, lighter in weight, stream-lined in complexity, lower in cost, more compact in size, more flexible in use, and ever mobile for stay-at-home play or travel play.

Realistic Virtual Objects using Arbitrary Physical Objects

In another innovative aspect, many play system embodiments may be configured to control and generate visual, sound, and mechanical effects—on one or more display appliances and controller devices—based at least in part on movements of controller devices and arbitrary physical objects in 3D ambient space. For example, many embodiments of a play system may control and generate one or more virtual objects on a video display appliance for viewing by users. Wherein, a virtual object (such as a character, vehicle, or projectile) may represent a two-dimensional (2D) or simulated 3D object that appears in an image or video on a display appliance.

So in another innovative aspect, various embodiments of a play system may include one or more "virtual object descriptions" that include data and/or computer instructions related to one or more virtual objects that may be communicated and shared among one or more controller devices and display appliances. A virtual object description may comprise, but not limited to, a virtual object identifier (e.g., "101"), virtual object type (e.g., "superhero character"), and virtual object state (e.g., strength=250, hit points=1000). Wherein, a virtual object comprising a virtual object definition may be selected by a user (e.g., via a touchscreen) or device (e.g., via a camera with computer vision) and communicated to one or more controller devices. Thus some play system embodiments have controller devices that are aware of the type of one or more virtual objects being controlled on a display appliance—while being unaware of the type of arbitrary physical objects being moved in 3D ambient space that cause the virtual objects to move on the display appliance.

Such capabilities are exciting and uplifting, as many play system embodiments may now support an independence from the type of arbitrary physical object from a 3D ambient space and, thereby, able to present realistic behavior of a virtual object, based at least in part on the type of virtual object on a display appliance. For example, a play system may present graphic animation of a "turtle" virtual object that realistically moves more slowly than a "racecar" virtual object on a display appliance—irrespective of the types of arbitrary physical objects being moved in 3D ambient space.

Transportable Virtual Objects with Arbitrary Physical Objects and Controller Devices In another innovative aspect, various embodiments of a play system may store one or more virtual object descriptions in a "virtual object description database" in one or more controller devices and display appliances. Whereby, virtual objects (e.g. fire breathing dragon) may be shared, exchanged, or transported—by sharing, exchanging, or transporting their associated arbitrary physical objects and controller devices in the real-world. For example, a player may have a "king" virtual object (of high ranking) associated with a controller device and arbitrary physical object that can be moved and transported—from a first location, such as one's own house—to a second location, such as a friend's house, where play can continue with the "king" virtual object on another display appliance.

Such abilities are startling, as some play system embodiments can have virtual objects that are portable by transporting the arbitrary physical objects and/or controller devices from location to location. Such play systems of arbitrary physical objects can have, but not limited to, less weight, smaller size, and ease of mobility in traveling to a remote location without carrying a local display system—further promoting long play time with favorite physical objects from location to location. For controller devices, coupled to arbitrary physical objects, may retain the current state of virtual objects from location to location—advancing missions, weapons (e.g., rocket, blaster), inventory (e.g., virtual coins, keys), and emotional state (e.g., happy, sad, or frightened) of the virtual objects, as exemplary features.

Arbitrarily Relocatable Controllers for Arbitrary Physical Objects

So in another innovative aspect, many embodiments of a play system may comprise one or more controller devices that are "arbitrarily relocatable" in a 3D ambient space, providing support for arbitrary physical objects of different types, sizes, and shapes. In some embodiments, a controller device may comprise, but not limited to, a control unit, memory, data storage, motion module for detecting spatial movement, communication module for wireless communication, relocatable translator for spatial transformation, and object connector for attaching to an arbitrary physical object by one or more means.

Whereby, in many embodiments, a controller device may be configured to be arbitrarily relocatable within a 3D ambient space of a play system: wherein the controller device may be configured to be attached to or at least partially contained in an arbitrary physical object at an arbitrary location, and an arbitrary orientation, relative to the arbitrary physical object within the 3D ambient space, and the controller device may be configured to be arbitrarily located and arbitrarily oriented in the 3D ambient space that is movable in a 3D real-world space. The controller device may be further configured to detect a first movement of the controller device within the 3D ambient space of the play system. And the controller device may be configured to transmit a control data comprising information of the first movement to a display appliance and, thereby, at least in part control a virtual object, on the display appliance, such that a second movement, of the virtual object, is based at least in part on the first movement of the controller device and the arbitrary physical object within the 3D ambient space.

The result being, a controller device that is arbitrarily relocatable may be readily connected, and then unconnected from a first arbitrary physical object—and moved and re-connected to a second arbitrary physical object (of a different type, size, and shape)—with reduced or eliminated adverse control effects of a virtual object on the video display appliance based on the movement of the controller device.

Such abilities provide wonderful utility, as various play system embodiments with arbitrarily relocatable controllers may have, but not limited to, richer storytelling that uses unlimited types, shapes, and sizes of arbitrary physical objects, fewer or no adverse video effects when disconnecting and connecting to different types, shapes, and sizes of arbitrary physical objects, and allowing "all-purpose," low cost controller device design and manufacturing.

"Travel in the Round" for Arbitrary Physical Objects

So in another innovative aspect, many embodiments of a play system may enable users, controller devices, and arbitrary physical objects to "travel in the round" in 3D ambient space—while the play system is operating multimedia effects in real-time with play activity for one or more users. Some embodiments of one or more controller devices, coupled to arbitrary physical objects, may be moved in limitless direction (e.g., from 0 and to 360 degrees inclusive) on a horizontal plane and/or a vertical plane in a 3D ambient space while the play system is operating multimedia effects in real-time—and may further be arbitrarily located and arbitrarily oriented in the 3D ambient space that is movable in a 3D real-world space. That is, users, controller devices, and arbitrary physical objects may not be limited to a confined region—but users may have the joy and freedom of a wall to wall play experience, multi-room play experience, or across an outdoor playground with arbitrary physical objects.

Such capabilities are quite open-ended, as some embodiments of a play system support, but not limited to, greater breadth of storytelling applications, extended use of occluded locations in 3D ambient space, limitless movement of arbitrary physical objects within a 3D ambient space, and limitless random arrangement of users and arbitrary physical objects in 3D ambient space—without hindrance of occlusion by users and physical objects while controlling a display appliance.

Movable 3D Ambient Space in 3D Real-World Space

So in another innovative aspect, many embodiments of a play system may have a 3D ambient space (e.g., a play region) that is movable in unlimited direction (e.g., from 0 and to 360 degrees inclusive) on a horizontal plane and/or a vertical plane in a 3D real-world space. For example, one or more controller devices (with connected arbitrarily objects) and display appliances may be moved in a 3D ambient space—causing the 3D ambient space to move in a 3D real-world space, while the play system is operating multimedia effects in real-time.

Such capabilities provide great versatility, as many embodiments of play systems enable, but not limited to, applications with greater spatial range, increased user movement beyond wireless communication limits of devices, limitless range of travel for users from room to room in a household or place to place outdoors, and usage in sports venues like boating, hiking, cycling, skiing, etc. where users travel across wide expanses.

Automatic Association and Spatial Calibration of Controller Devices

So in another innovative aspect, in many embodiments of a play system, one or more controller devices may be automatically sensed, identified, selected, associated, and spatial calibrated with arbitrary physical objects and virtual objects at any time and location in a 3D ambient space—while operating multimedia effects in real-time. Whereby, a user's efforts and involvement are minimized.

Such capabilities are far-reaching, as some play system embodiments may have, but not limited to, reduced input interface complexity, lowered user frustration, reduced or eliminated button presses, fewer screen taps, shortened game setup times, speedier switching among different arbitrary physical objects by players, and increased user demographics to nearly everyone, including two year old kids to adults.

Collision of Arbitrary Physical Objects

In another innovative aspect, many embodiments of a play system may comprise a first controller device configured to be attached to or at least partially contained in a first arbitrary physical object—wherein, the first controller device is configured to detect an at least indirect collision of the first controller device and the first arbitrary physical object with a second controller device and a second arbitrary physical object in a 3D ambient space—and respond accordingly, such as at least in part controlling one or more virtual objects and sound effects, on a display appliance, based at least in part on the at least indirect collision of the first controller device and the first arbitrary physical object with the second controller device and the second arbitrary physical object in the 3D ambient space.

Such ability to detect collisions is fantastic, as some play system embodiments may now have, but not limited to, enriched games with arbitrary physical objects that physically battle together or crash together, and triggered story events based on collisions of arbitrary physical objects, invoking visual, audio, and mechanical effects.

Collision of an Imaginary Object and Arbitrary Physical Object

In another innovative aspect, many embodiments of a play system may comprise of imaginary objects that are hidden in the real-world by the play system. With remarkable fun and excitement, an "imaginary object" is an invisible and non-physical object (e.g., character, avatar, vehicle, path, etc.). For example, a token imaginary object (e.g., energy bar, spaceship, or treasure chest) may be generated at a random location and orientation within a 3D ambient space of a play system, such as near a city park bench or a living room couch. Wherein, many embodiments of a play system may comprise a controller device enabled to be attached to or at least partially contained in an arbitrary physical object—wherein, the controller device is enabled to detect an at least indirect collision of the controller device and the arbitrary physical object with an imaginary object in a 3D ambient space—and respond accordingly, such as at least in part controlling one or more virtual objects and sound effects on a display appliance.

Abilities to detect collisions of imaginary objects with arbitrary physical objects are remarkable, as some play system embodiments may have, but not limited to, hide-and-seek games, treasure hunting games, and search and rescue missions that enable users to interact with imaginary objects (e.g., characters, friends, and foes) that may be computer generated in 3D ambient space, or have remote multiplayer games where remote users and remote arbitrary physical objects, from around the world, may be represented as imaginary objects that interact with arbitrary physical objects in the 3D ambient space in a play system.

Gesture Movement of an Arbitrary Physical Object with an Imaginary Object

In another innovative aspect, many embodiments of a play system may comprise one or more controller devices, coupled to arbitrary physical objects—enabled to, but not limited to, detect gesture movements—and respond accordingly, such as at least in part controlling one or more virtual objects and sound effects, on a display appliance, and one or more imaginary objects in a 3D ambient space.

For example, in at least one embodiment, a play system may detect a double tap gesture movement—when a user's finger double taps the side of an arbitrary physical object connected to a controller device to trigger a multimedia response from the play system. Gesture types may include, but not limited to, a double tap gesture, spin gesture, shake gesture, bump gesture, toy walking gesture, gun trigger gesture, and user walking gesture.

Such ability to detect gesture movements is very powerful, as some play system embodiments may support, but not limited to, an elegant input interface that users access anywhere in 3D ambient space using arbitrary physical objects, ease of use having no buttons or esoteric commands to remember, speedy gesture detection with rapid multimedia response, and allowing teams of people to make gestures with arbitrary physical objects—for storytelling and play-acting.

Launching/Detecting a Projectile Imaginary Object with an Arbitrary Physical Object In another innovative aspect, a "projectile imaginary object" may be an invisible and non-physical object that launches, travels for a distance, and lands within a 3D ambient space of a play system. Whereby, a projectile imaginary object may simulate the movement a real-world physical projectile. In some play system embodiments, a projectile imaginary object may be implemented as a modulated (infrared, visible, or ultraviolet) light that is emitted and detected between two or more controller devices coupled to arbitrary physical objects.

For example, in at least one embodiment of a play system, a player may aim a robot toy arbitrary physical object at a doll physical object located four meters away. The player's finger double taps the back of the robot toy. Whereupon, a tablet computer presents video of a superhero virtual object launching a rocket virtual object with fiery graphics and a "blast" sound effect. At the same time, the system launches a projectile imaginary object that "flies" across the 3D ambient space—between the robot toy physical object and the doll physical object—enabling the real-world and virtual world to interact. The tablet computer presents the rocket virtual object flying—and landing—destroying a dragon virtual object with sparks and "howling" sounds. Simultaneously in the real-world, the doll physical object is electromechanically flipped upside down by the play system, as if destroyed.

Such capabilities are highly imaginative, as a projectile imaginary object when launched and detected by a play system during play, has the ability to provide excitement, speed, and directionality similar to a physical projectile being launched across a room. Yet an imaginary object is non-physical—providing safe and friendly entertainment—without physically harming players or damaging the 3D surroundings, including a dining room filled with delicate glassware. So parents and kids remain happy. Such effects are mind bending, as games that use "projectile imaginary objects" may include, but not limited to, fast-action shooting games, "space and time altering" games that propel virtual characters through space and time, and magical spell casting games.

Third Person Applications for Arbitrary Physical Objects

In another innovative aspect, many application embodiments may provide a "third person" augmented reality or mixed-reality play experience that operates similar to a playset, but exceeds a traditional playset—as there exists no physical boundaries of movement. Whereby, some embodiments of a play system may be similar to a playset that is movable during play through 3D ambient space, such as an adventure story playacted by users with arbitrary physical objects picked up along an exploratory trail. Players may traverse the real-world from room to room in a household—or block to block in a city—or from tree to tree in a city park. For players can now explore their own real-world, picking up arbitrary physical objects found indoors (like a cup, paper plate, or doll) or outdoors (like a twig, apple, or tree leaf).

In an exemplary embodiment of a play system, an ordinary paperback book, in the real-world, can become a large stone castle in a forest presented on a tablet video display, with skeletons and scary music. And nearby, in the real-world, a five year old child may pick up an action figure robot toy along with the paperback book from a living room floor, lifting the items high above the floor. At the same time, the video display shows an animated superhero virtual object pick up the large stone castle out of the forest, lifting the castle high into a cloud filled sky. The movement of arbitrary physical objects, in the real-world, generates a movie experience of superheroes on the video display. What happens next? The five year old child may drop the paperback book on a villainous toy character, located across the living room floor of the real-world. Wherein the child may see the large stone castle fall on top of an animated villain on the tablet video display with a fiery explosion and "crash" sound.

First Person Applications for Arbitrary Physical Objects

In another innovative aspect, many application embodiments may provide a "first person" virtual reality (VR), augmented reality (AR), or mixed reality (MR) experience—which enables a player to haphazardly pick up arbitrary physical objects, found in a 3D ambient space that surrounds a player, to include in a play system. Some application embodiments of a play system may play like a building construction set, while others like a hide-and-seek game, while others like an exploratory journey similar to hiking, where players may search for arbitrary physical objects, found in a 3D ambient space, and include in a game or adventure story.

In an exemplary embodiment, an arbitrary physical object may be a deflated football, found in an old garage in the real-world, such that a play system includes the deflated football (connected to a controller device) in a VR/AR/mixed-reality simulation. Whereupon, the deflated football may be turned into a full sized, haunted house virtual object graphically rendered on a video display or head mounted display (HMD), with effervescent ghosts and eerie music. Moving the real-world football across the garage floor causes the generated video of the full-sized haunted house to move across the head mounted display within the play system, along with a generated "howling" sound.

Worldwide Remote Interactivity with Arbitrary Physical Objects

In another innovative aspect, game players around the world may interact together using arbitrary physical objects from their 3D ambient spaces worldwide. For example, some embodiments of a play system may use a computer network, such as the world-wide web. Whereby at numerous locations in the world, a plurality of remote play systems may enable a plurality of arbitrary physical objects with controller devices for controlling multiple display appliances—creating a remote tactile, play experience. Such capabilities can involve many people, as embodiments of play systems may support kids and adults, from around the world, to interact together using ordinary and arbitrary physical objects, toys, and props from their 3D ambient spaces—for remote multiplayer, video gaming combined with physical play.

In an exemplary embodiment of a plurality of play systems using a computer network, a local player (located in the USA) can interact with a remote player (located in France) using arbitrary physical objects. The local player may transform a "writing pen" arbitrary physical object into a "pirate saber" virtual object, which appears on her smartphone display. Similarly, the remote player may transform an "edible banana fruit" arbitrary physical object into a "pirate gun" virtual object, which appears on his smartphone display. Whereupon, both players may engage in a battle of seafaring pirates. Spoken language audio instructions presented by the play systems include: "Walk Forward," which guides the local player to physically walk towards her opponent, even though the opposing player is not physically present in the room. And the remote player, located thousands of kilometers away, is given spoken audio instructions: "Enemy Approaching." Whereupon, the remote player taps the banana fruit physical object causing the pirate gun virtual object to fire, "Blam!" on his smartphone display. Wherein, the opposing pirate virtual object falls dead on the smartphone displays, thus ending the game.

Apparatuses, Systems, Computer Readable Media, and Methods of Some Play Systems

Finally, some exemplary embodiments of apparatuses, computer readable media, and methods for play systems are discussed in more detail below, while other sections of this disclosure will provide more embodiments and details.

Apparatuses of Some Play Systems

In another innovative aspect, in at least one embodiment of a first controller device for a play system, the first controller device comprising: a first housing comprising a first object connector disposed on the first housing such that the first controller device is configured to be attached to or at least partially contained in a first arbitrary physical object within a 3D ambient space of the play system; a first control unit coupled to the first housing, wherein the first control unit is configured to execute computer instructions; a first motion module operatively coupled to the first control unit; a first communication module operatively coupled to the first control unit; a first memory operatively coupled to the first control unit, comprising: a first relocatable translator, wherein the first memory is configured with computer instructions that, when executed by the first control unit, cause the first controller device to perform first operations comprising: operating, via the first relocatable translator, such that the first controller device is enabled to be arbitrarily relocatable in the 3D ambient space of the play system, wherein the first controller device is enabled to be attached to or at least partially contained in the first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in a 3D real-world space of the play system; detecting, via the first motion module, a first orientation of the first controller device within the 3D ambient space; transmitting, via the first communication module, a first control data, comprising information of the first orientation, to a display appliance within the 3D ambient space; and at least in part controlling, via the first communication module of the first controller device, a first virtual object on the display appliance such that a second orientation, of the first virtual object on the display appliance, is based at least in part on the first orientation of the first controller device within the 3D ambient space of the play system.

In some embodiments, the first controller device with the first operations further comprising: in response to detecting a spatial calibrate event, via the first controller device, based at least in part on the first controller device is located at a spatial distance, from the display appliance, that is less than or equal to a spatial calibrate threshold distance within the 3D ambient space, the response comprising: spatial calibrating the first relocatable translator of the first controller device such that the first controller device is enabled to be arbitrarily relocatable within the 3D ambient space, wherein the first controller device is enabled to be attached to or at least partially contained in the first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in the 3D real-world space of the play system.

In some embodiments, the first controller device with the first memory further comprising: a first gesture analyzer; and the first operations further comprising: detecting, via the first gesture analyzer, a first gesture movement of the first controller device within the 3D ambient space; transmitting, via the first communication module, the first control data, further comprising information of the first gesture movement of the first controller device, to the display appliance within the 3D ambient space; and at least in part controlling, via the first communication module of the first controller device, the first virtual object, on the display appliance, such that an at least one movement, of the first virtual object on the display appliance, is based at least in part on the first gesture movement of the first controller device within the 3D ambient space.

In some embodiments, the first controller device with the first memory further comprising: a collision analyzer; and the first operations further comprising: detecting, via the collision analyzer, an at least indirect collision of the first controller device with a second arbitrary physical object within the 3D ambient space; transmitting, via the first communication module, a first control data, further comprising information of the at least indirect collision of the first controller device with the second arbitrary physical object, to the display appliance within the 3D ambient space; and at least in part controlling, via the first communication module of the first controller device, the first virtual object on the display appliance such that an at least one movement, of the first virtual object on the display appliance, is based at least in part on the at least indirect collision of the first controller device with the second arbitrary physical object within the 3D ambient space.

In some embodiments, the first controller device with the first memory further comprising: a collision analyzer; and the first operations further comprising: detecting, via the collision analyzer, an at least indirect collision of the first controller device with a second controller device within the 3D ambient space; transmitting, via the first communication module, the first control data, further comprising information of the at least indirect collision of the first controller device with the second controller device, to the display appliance within the 3D ambient space; and at least in part controlling, via the first communication module of the first controller device, the first virtual object on the display appliance such that an at least one movement, of the first virtual object on the display appliance, is based at least in part on the at least indirect collision of the first controller device with the second controller device within the 3D ambient space.

In some embodiments, the first controller device further comprising: an at least one light sensor operatively coupled to the first control unit; the first memory further comprising: an imaginary object analyzer; and the first operations further comprising: detecting, via the at least one light sensor, a modulated light within the 3D ambient space; transmitting, via the first communication module, the first control data to the display appliance within the 3D ambient space, wherein the first control data further comprises information of the modulated light detected by the first controller device; and at least in part controlling, via the first communication module of the first controller device, a second virtual object, on the display appliance, based at least in part on the modulated light detected by the first controller device within the 3D ambient space.

In some embodiments, the first controller device further comprising: an at least one light emitter operatively coupled to the first control unit; the first memory further comprising: a first gesture analyzer; and the first operations further comprising: detecting, via the first gesture analyzer, a first gesture movement of the first controller device within the 3D ambient space; and in response to detecting the first gesture movement, emitting a modulated light, via the at least one light emitter, into the 3D ambient space.

In some embodiments, the first controller device, wherein: the first arbitrary physical object is an unlimited type of physical object in the 3D ambient space. In various embodiments, the first controller device, wherein: the first arbitrary physical object is an unlimited type of physical object arbitrarily selected from the 3D ambient space. In some embodiments, the first controller device, wherein: the first arbitrary physical object is arbitrary and unspecified to the play system.

In some embodiments, the first controller device, wherein: the first object connector is a clip object connector that is substantially ring-shaped.

In some embodiments, the first controller device, wherein: the first object connector is an adhesive object connector comprising an adhesive material.

In some embodiments, the first controller device with the first housing further comprising: a plurality of object connectors such that the first controller device is configured to be attached to or at least partially contained in a plurality of arbitrary physical objects in the 3D ambient space of the play system.

In some embodiments, the first controller device, wherein: the first object connector is a peg object connector configured to connect to one or more arbitrary physical objects.

In some embodiments, the first controller device with the first object connector further comprising: a connector hinge, wherein the first object connector is configured to pivot between at least two positions in the 3D ambient space.

In some embodiments, the first controller device with the first housing further comprising: a plurality of object connectors, wherein at least two object connectors are different types of object connectors.

In some embodiments, the first controller device with the first operations of the at least in part controlling further comprising: at least once the first orientation, of the first controller device in the 3D ambient space, is independently and arbitrarily adjustable in respect to the second orientation of the first virtual object, in a 3D virtual space, on the display appliance.

In some embodiments, the first controller device with the first operations further comprising: detecting, via the first motion module, a first rotational movement of the first controller device within the 3D ambient space; transmitting, via the first communication module, the first control data, further comprising information of the first rotational movement of the first controller device, to the display appliance within the 3D ambient space; at least in part controlling, via the first communication module of the first controller device, the first virtual object on the display appliance such that a second rotational movement, of the first virtual object, is based at least in part on the first rotational movement of the first controller device within the 3D ambient space.

In some embodiments, the first controller device with the first operations further comprising: detecting, via the first motion module, a first translational movement of the first controller device within the 3D ambient space; transmitting, via the first communication module, the first control data further comprising information of the first translational movement of the first controller device, to the display appliance within the 3D ambient space; at least in part controlling, via the first communication module of the first controller device, the first virtual object on the display appliance such that a second translational movement, of the first virtual object, is based at least in part on the first translational movement of the first controller device within the 3D ambient space.

In some embodiments, the first controller device with the first operations further comprising: receiving, via the first communication module, a second control data from a second controller device within the 3D ambient space; detecting, via the first communication module, a RSSI value related to the second control data received by the first controller device; transmitting, via the first communication module, the first control data, further comprising the RSSI value, to the display appliance within the 3D ambient space; and at least in part controlling, via the first communication module of the first controller device, the first virtual object on the display appliance such that a first distance, between the first virtual object and a second virtual object on the display appliance, is based at least in part on a second distance between the first controller device and the second controller device within the 3D ambient space.

In some embodiments, the first controller device, wherein: the first memory comprises one or more non-transitory computer-readable storage media such that the first controller device can retain at least one datum of information.

In some embodiments, the first controller device with the first memory further comprising: a virtual object description database configured to provide storage for one or more virtual object descriptions.

In some embodiments, the first controller device with the first operations further comprising: at least once transmitting, via the first communication module, the first control data, further comprising a virtual object description data, to the display appliance within the 3D ambient space; and at least in part controlling, via the first communication module of the first controller device, the first virtual object on the display appliance such that the first virtual object is based at least in part on the virtual object description data.

In some embodiments, the first controller device with the first operations further comprising: transmitting across a computer network, via the first communication module, the first control data, comprising information of the first orientation of the first controller device within the 3D ambient space, to a remote display appliance in a remote play system; and at least in part controlling, via the first communication module of the first controller device, a remote virtual object on the remote display appliance such that a remote orientation, of the remote virtual object on the remote display appliance, is based at least in part on the first orientation of the first controller device within the 3D ambient space.

In some embodiments, the first controller device with the first memory further comprising: a first gesture analyzer; and the first operations further comprising: detecting, via the first gesture analyzer, a first gesture movement of the first controller device within the 3D ambient space; in a response to detecting the first gesture movement, the response comprising: transmitting across a computer network, via the first communication module, the first control data, further comprising information of the first gesture movement of the first controller device, to a remote display appliance in a remote play system; and at least in part controlling, via the first communication module of the first controller device, a remote virtual object on the remote display appliance such that an at least one movement, of the remote virtual object on the remote display appliance, is based at least in part on the first gesture movement of the first controller device within the 3D ambient space.

Computer Readable Storage Media of Some Play Systems

In another innovative aspect, in at least one embodiment of one or more non-transitory computer-readable storage media storing computer instructions that, when processed by one or more control units, perform operations of a first controller device for a play system, the operations comprising: operating, via a first relocatable translator of the first controller device, such that the first controller device is enabled to be arbitrarily relocatable in a 3D ambient space of the play system, wherein the first controller device is enabled to be attached to or at least partially contained in a first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in a 3D real-world space; detecting, via a first motion module of the first controller device, a first orientation of the first controller device within the 3D ambient space; transmitting, via a first communication module of the first controller device, a first control data, comprising information of the first orientation of the first controller device, to a display appliance within the 3D ambient space; and at least in part controlling, via the first communication module of the first controller device, a first virtual object on the display appliance such that a second orientation, of the first virtual object on the display appliance, is based at least in part on the first orientation of the first controller device within the 3D ambient space of the play system.

In some embodiments, the one or more non-transitory computer-readable storage media further comprising: in response to detecting a spatial calibrate event, via the first controller device, based at least in part on the first controller device is located at a spatial distance, from the display appliance, that is less than or equal to a spatial calibrate threshold distance within the 3D ambient space, the response comprising: spatial calibrating the first relocatable translator of the first controller device such that the first controller device is enabled to be arbitrarily relocatable within the 3D ambient space, wherein the first controller device is enabled to be attached to or at least partially contained in the first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in the 3D real-world space of the play system.

In some embodiments, the one or more non-transitory computer-readable storage media further comprising: transmitting, across a computer network via the first communication module of the first controller device, at least the first control data to a remote display appliance in a remote play system, wherein the first control data comprises information of the first orientation of the first controller device in the 3D ambient space; and at least in part controlling, via the first communication module of the first controller device, a remote virtual object on the remote display appliance such that a remote orientation, of the remote virtual object on the remote display appliance, is based at least in part on the first orientation of the first controller device within the 3D ambient space of the play system.

In some embodiments, the one or more non-transitory computer-readable storage media, further comprising: detecting, via a first gesture analyzer of the first controller device, a first gesture movement of the first controller device within the 3D ambient space; and in response to detecting the first gesture movement, emitting a modulated light, via an at least one light emitter of the first controller device, within the 3D ambient space of the play system.

In some embodiments, the one or more non-transitory computer-readable storage media, wherein: the first arbitrary physical object is an unlimited type of physical object in the 3D ambient space. In various embodiments, the one or more non-transitory computer-readable storage media, wherein: the first arbitrary physical object is an unlimited type of physical object arbitrarily selected from the 3D ambient space. Further, in some embodiments, the one or more non-transitory computer-readable storage media, wherein: the first arbitrary physical object is arbitrary and unspecified to the play system.

Methods of Some Play Systems

In another innovative aspect, in at least one embodiment of a computer-implemented method, comprising: at a display appliance, with one or more control units and memory, for a play system: detecting, via a communication module of the display appliance, one or more controller devices within a 3D ambient space of the play system, wherein a first controller device is selected, from the one or more controller devices; operating, via a relocatable translator of the display appliance, such that the first controller device is enabled to be arbitrarily relocatable in the 3D ambient space of the play system, wherein the first controller device is enabled to be attached to or at least partially contained in a first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in a 3D real-world space; receiving a first control data, via a communication module of the display appliance, from the first controller device, wherein the first control data comprises information of a first orientation of the first controller device within the 3D ambient space; and generating one or more video frames, on the display appliance, comprising a first virtual object such that a second orientation, of the first virtual object on the display appliance, is based at least in part on the first orientation of the first controller device within the 3D ambient space of the play system.

In some embodiments, the computer-implemented method, further comprising: receiving the first control data further comprising information of a first gesture movement of the first controller device in 3D ambient space; and wherein the generating one or more video frames, via the display appliance, comprising the first virtual object such that an at least one movement, of the first virtual object on the display appliance, is based at least in part on the first gesture movement of the first controller device within the 3D ambient space.

In some embodiments, the computer-implemented method, further comprising: in response to detecting a spatial calibrate event, via the display appliance, based at least in part on the first controller device is located at a spatial distance, from the display appliance, that is less than or equal to a spatial calibrate threshold distance within the 3D ambient space, the response comprising: spatial calibrating the relocatable translator of the display appliance such that the first controller device is enabled to be arbitrarily relocatable within the 3D ambient space, wherein the first controller device is enabled to be attached to or at least partially contained in the first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in the 3D real-world space.

In some embodiments, the computer-implemented method, further comprising: wherein the receiving the first control data, via the communication module of the display appliance, from the first controller device, wherein the first control data is further comprising a virtual object identifier from the first controller device; and wherein the generating one or more video frames, on the display appliance, that are comprising the first virtual object, wherein the first virtual object is further based at least in part on the virtual object identifier received from the first controller device.

In some embodiments, the computer-implemented method, wherein: the first arbitrary physical object is an unlimited type of physical object in the 3D ambient space. In various embodiments, the computer-implemented method, wherein: the first arbitrary physical object is an unlimited type of physical object arbitrarily selected from the 3D ambient space. In some embodiments, the computer-implemented method, wherein: the arbitrary physical object is arbitrary and unspecified to the play system.

BRIEF DESCRIPTION OF THE DRAWINGS

Various embodiments of the disclosure will now be described by way of example with reference to the accompanying drawings:

FIG. 9A is a table view for the play system of FIG. 1, of a virtual object description data related to a virtual object.

FIG. 9B is a table view for the play system of FIG. 1, of a control data, but not limited to, transmitted by a controller device to a display appliance.

FIG. 9C is a table view for the play system of FIG. 1, of a control data transmitted, but not limited to, by a display appliance to a controller device.

FIG. 9D is a table view for the play system of FIG. 1, of a relocatable dataset with spatial calibration data for a controller device.

FIG. 9E is a table view for the play system of FIG. 1, of a relocatable dataset with spatial calibration data for a plurality of controller devices.

FIG. 10B is a flowchart for the play system of FIG. 1, of a method of a first controller device, for detecting a spatial calibrate event and spatial calibrating the first controller device.

FIG. 10C is a flowchart for the play system of FIG. 1, of a method step of a first controller device, for detecting a spatial calibrate event based on a spatial distance.

FIG. 10D is a flowchart for the play system of FIG. 1, of a method step of a first controller device, for detecting a spatial calibrate event based on user input.

FIG. 10E is a flowchart for the play system of FIG. 1, of a method step of a first controller device, for detecting a spatial calibrate event based on a gesture movement.

FIG. 10F is a flowchart for the play system of FIG. 1, of a method step of a first controller device, for spatial calibrating the first controller device with a first orientation of the first controller device and a second orientation of the first virtual object.

FIG. 10G is a flowchart for the play system of FIG. 1, of a method step of a first controller device, for spatial calibrating and associating the first controller device with a second virtual object.

FIG. 10H is a flowchart for the play system of FIG. 1, of a method for a display appliance, for detecting a spatial calibrate event and spatial calibrating a first controller device.

FIG. 10I is a flowchart for the play system of FIG. 1, of a method step of the display appliance, for detecting a spatial calibrate event based on a spatial distance.

FIG. 10J is a flowchart for the play system of FIG. 1, of a method step of the display appliance, for detecting a spatial calibrate event based on user input.

FIG. 10K is a flowchart for the play system of FIG. 1, of a method step of the display appliance, for detecting a spatial calibrate event based on a gesture movement.

FIG. 10L is a flowchart for the play system of FIG. 1, of a method step of the display appliance, for spatial calibrating the first controller device in 3D ambient space using a first orientation of the first controller device and a second orientation of the first virtual object.

FIG. 10M is a flowchart for the play system of FIG. 1, of a method step of the display appliance, for spatial calibrating the first controller device in 3D ambient space and associate the first controller device with a second virtual object on the display appliance.

FIG. 12C is a flowchart for the play system of FIG. 1, of a method step of a first controller device and/or a display appliance, which enables the first controller device to be arbitrarily relocatable in 3D ambient space.

FIG. 12D is a flowchart for the play system of FIG. 1, of a method step of a first controller device and/or a display appliance, which enables the first controller device to be arbitrarily relocatable in 3D ambient space and moved in limitless direction.

FIG. 12E is a flowchart for the play system of FIG. 1, of a method step of a first controller device and/or a display appliance, which enables the first controller device to be arbitrarily relocatable in 3D ambient space and capable of being wholly occluded from view.

FIG. 12F is a flowchart for the play system of FIG. 1, of a method step of a first controller device and/or a display appliance, which enables the first controller device to be arbitrarily relocatable in 3D ambient space and arbitrarily located and arbitrarily oriented relative to one or more display appliances.

FIG. 12G is a flowchart for the play system of FIG. 1, of a method step of a display appliance and/or a display appliance, which enables a first orientation, of the first controller device, to be adjustable relative to a second orientation of a first virtual object on a display appliance.

FIG. 12H is a flowchart for the play system of FIG. 1, of a method step of a display appliance and/or a display appliance, which enables a first controller device to be arbitrarily relocatable in 3D ambient space wherein an arbitrary physical object is arbitrary and unspecified to the first controller device, display appliance, and or play system.

FIG. 12I is a flowchart for the play system of FIG. 1, of a method step of a display appliance and/or a display appliance, which enables a first controller device to be arbitrarily relocatable in 3D ambient space and arbitrarily oriented and arbitrarily located such that the 3D ambient space is movable.

FIG. 12J is a flowchart for the play system of FIG. 1, of a method step of a display appliance and/or a display appliance, which enables a first controller device to be arbitrarily relocatable in 3D ambient space and attached or contained in a first arbitrary physical object arbitrarily selected from the 3D ambient space.

FIG. 12K is a flowchart for the play system of FIG. 1, of a method step for a controller device or a display appliance, wherein a second orientation, of the first virtual object, is based at least in part on a first orientation of the first controller device.

FIG. 12L is a flowchart for the play system of FIG. 1, of a method step for a controller device or a display appliance, wherein a second location, of the first virtual object, is based at least in part on a first location of the first controller device.

FIG. 12M is a flowchart for the play system of FIG. 1, of a method step for a controller device or a display appliance, wherein a second translational movement, of the first virtual object, is based at least in part on a first translational movement of the first controller device.

FIG. 12N is a flowchart for the play system of FIG. 1, of a method step for a controller device or a display appliance, wherein a second rotational movement, of the first virtual object, is based at least in part on a first rotational movement of the first controller device.

FIG. 12O is a flowchart for the play system of FIG. 1, of a method step for a controller device or a display appliance, wherein a movement, of the first virtual object, is not based on or not necessarily based on the type of the first arbitrary physical object.

FIG. 12P is a flowchart for the play system of FIG. 1, of a method step for a controller device or a display appliance, wherein a second orientation, of the first virtual object, is independently and arbitrarily adjustable in respect to a first orientation of the first controller device.

FIG. 24A is a flowchart for the play system of FIG. 1, of a method for a controller device, which enables detecting an at least indirect collision of a first controller device, and first arbitrary physical object, with a second controller device.

FIG. 41C is a first portion of a flowchart for the local play system of FIG. 32 and the remote play system of FIG. 35, showing a method for a display appliance, for generating one or more video frames comprising a virtual object based on a gesture movement of a first controller device in the local play system.

DETAILED DESCRIPTION

Figure 1:
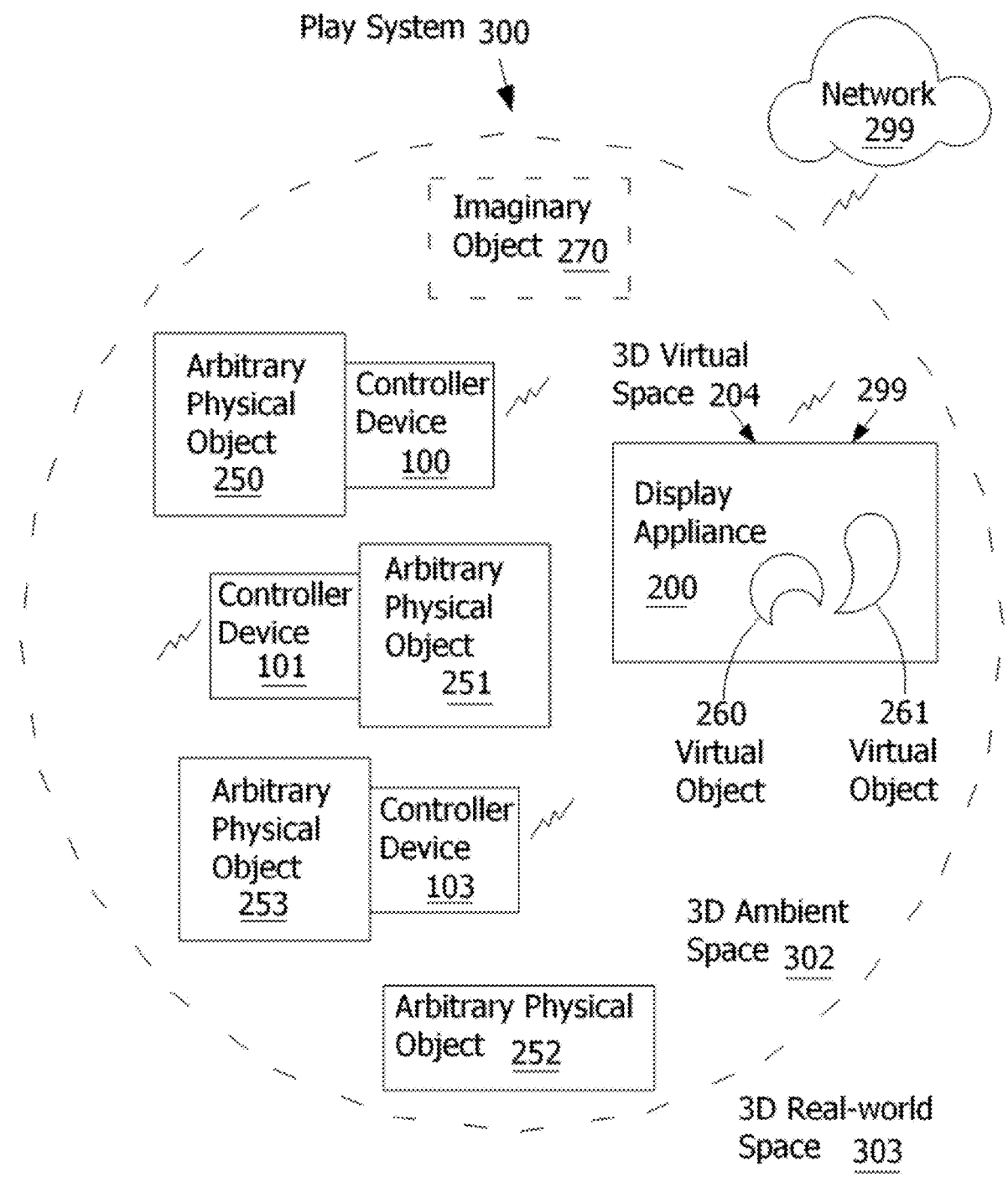
FIG. 1 is a block diagram of a first embodiment of a play system, which comprises controller devices, arbitrary physical objects, an imaginary object, and a display appliance within a 3D ambient space.

A plurality of embodiments will be discussed below. In an effort to provide a concise description of these embodiments, not all features of an actual implementation may be described in the description. Moreover, it should be appreciated that such a design effort could be quite labor intensive, but would nevertheless be a routine undertaking of design and construction for those of ordinary skill in the art having the benefit of this disclosure. Whereby, some helpful definitions of terms used throughout this disclosure are given:

The terms "a", "an", and "the" refers to one or more items. Where only one item is intended, the terms "one", "single", or similar language is used. The term "and/or" refers to any and all combinations of one or more of the associated listed items.

The terms "an embodiment," "one embodiment," "embodiments of a play system" and like terms do not necessarily refer to the same embodiment. Particular features, structures, or characteristics may be combined in any suitable manner consistent with this disclosure.

The terms "adapter", "analyzer", "application", "circuit", "component", "interface", "method", "module", "processor", "program", "translator", and like terms are intended to include hardware, firmware, and/or software.

The term "at least in part controlling" means in part controlling or wholly controlling. The usage of the singular term "controlling" without a conditional adverb means "at least in part controlling." For example, "is controlling a virtual object" means: "is at least in part controlling a virtual object."

The term "at least indirect collision" means that two or more objects have collided, bumped together, or made physical contact—or a combination of the two or more objects and one or more coupled objects have collided, bumped together, or made physical contact. For example, an at least indirect collision of a first controller device—attached to or at least partially contained in a first arbitrary physical object—with a second controller device, attached to or at least partially contained in a second arbitrary physical object—occurs when the following occurs: the first controller device and/or the first arbitrary physical object has collided, bumped together, or made physical contact with the second controller device and/or the second arbitrary physical object. The usage of the singular term "collision" without any conditional adverb means "at least indirect collision." For example, "a collision of a first object with a second object," means: "an at least indirect collision of a first object with a second object."

The term "at least partially contained" means partially contained or wholly contained.

The term "at least partially occluded from view" means partially occluded from view or wholly occluded from view. The term "occluded from view" as used herein means to be blocked or hidden from the view of unaided human eyes and unaided human eyesight in visible light, unless otherwise indicated.

The term "barcode" refers to any optical machine-readable representation of data, including one-dimensional (1D) or two-dimensional (2D) barcodes, QR codes, or symbols.

The term "based on" without a conditional adverb means "based at least in part on." For example, "is based on movement" means: "is based at least in part on movement." Thus, a feature that is described as based on a stimulus is based on the stimulus or a combination of some stimuli including the stimulus.

The term "close proximity" refers to the condition when two or more objects are located substantially nearby each other in space (e.g., 3D ambient space). For detailed information about "close proximity," the reader may refer to the collision analyzer 238 (in FIG. 5) and elsewhere in this disclosure.

The terms "comprise," "comprised," "comprising," "include," "included," "including" and like terms are open-ended. Such terms do not foreclose additional structure or steps. Consider a claim that recites: "An apparatus comprising one or more control units . . . ." Such a claim does not foreclose the apparatus from including additional components (e.g., a communication module, a video display, etc.).

The term "configured to" means a broad recitation of structure generally meaning having a unit/circuitry/component that is able to perform a task or tasks during operation. Various units, circuits, or other components may be described as "configured to" perform a task or tasks. As such, the unit/circuit/component can be configured to perform the task even when the unit/circuit/component is not operational (currently not on). In general, the circuitry that forms the structure corresponding to "configured to" may include hardware circuits, such as circuits, memory storing program instructions executable to implement the operation, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. 112, paragraph six, interpretation for that unit/circuit/component.

The terms "connecting," "connected," "connect," "coupling," "coupled," "couple," "attaching," "attached," "attach," and like terms as used herein, refer to a coupling between items, wherein, for example, the items are directly attached or indirectly attached via an intervening item or items, or the items are partially or wholly contained, or the items are partially or wholly contained via an intervening item or items.

The term "example" refers to an exemplary embodiment.

The terms "first," "second," "third," etc. as used herein are meant as distinguishing labels for nouns, elements, actions, or steps that they precede, and do not imply any type of ordering (e.g., spatial, temporal, logical, etc.). For example, a control unit may be described herein as performing write operations for "first" and "second" values. The terms "first" and "second" do not necessarily imply that the first value must be written before the second value. Or in another example, a "first movement" and a "second" movement" may be described in multiple steps of a method. Similarly, the terms "first" and "second" do not necessarily imply that the first movement must occur before the second movement.

The terms "key", "keypad", "key press", and like terms are meant to broadly include all types of user input interfaces and their respective action, including, but not limited to, a gesture-sensitive camera, a touch pad, a keypad, a control button, a control mouse, and/or a touch sensitive display.

The term "light emitting viewing angle" is defined by the full angle range where a light emitter (e.g., infrared light emitting diode, visible light emitting diode, etc.) has a brightness of 50% or more of the maximum brightness.

The term "light sensing viewing angle" is defined by the full angle range where a light sensor (e.g., infrared receiver, infrared light sensor, visible light phototransistor, etc.) has light sensitivity of 50% or more of the maximum sensitivity.

The terms "local" and "remote" as used herein are meant as distinguishing labels for nouns, elements, actions, or steps that they precede, and do not necessarily imply spatial proximity or other spatial characteristics, unless otherwise indicated.

The term "operatively coupled" refers to a wireless and/or a wired means of communication between items, unless otherwise indicated. Moreover, the term "operatively coupled" may refer to a direct coupling between items and/or an indirect coupling between items via an intervening item or items (e.g., an item includes, but not limited to, a component, a circuit, a module, and/or a device). The term "wired" refers to any type of physical communication conduit (e.g., electronic wire, trace, or optical fiber).

The terms "may" and "can" are used in a permissive sense (i.e., meaning having the potential to), rather than the mandatory sense (i.e., meaning must).

The term "multimedia" refers to media content and its respective sensory action and effects, including, but not limited to, video, graphics, text, audio, human speech audio, visual effects (e.g., virtual objects), sound effects, mechanical effects, user input events, and/or computer-controlled input events.

The term "optical" refers to any type of light or usage of light, including visible light (e.g., white light) and/or invisible light (e.g., infrared light, ultraviolet light, etc.), unless specifically indicated.

The term "received signal strength indicator," "RSSI," or like terms refer to any data or signal related to at least in part the amount of power present in a received wireless radio frequency signal, data, or message.

The term "timestamp" refers to time clock data or timer related data stored in a memory, data storage, or control unit of an electronic device or appliance. Whereby, for example, an electronic device or appliance may retain one or more timestamps of detected events and, subsequently, analyze and respond to a sequence of events occurring over a time period.

The term "video" refers to a collection of animated images for viewing, typically a sequence of still images or video frames that represent moving visual images.

The term "video frame" refers to a single still image.

The terms "3D ambient space," "3D surroundings," and like terms refer to the three-dimensional, physical geometric space that represents a three-dimensional play region (e.g., containing one or more controller devices, arbitrary physical objects, imaginary objects, display appliances, etc.) of a play system at a single site or location. In some embodiments of a play system, the 3D ambient space is a finite size with a finite extent and exists within a 3D real-world space.

The terms "3D real-world space" and like terms refer to the three-dimensional, physical geometrical space in the real-world that is presumed to be unbounded and of infinite extent.

The term "3D virtual space" refers to the three-dimensional, abstract geometric space (e.g., which may contain one or more virtual objects on a video display) that is represented and simulated by, but not limited to, a program or computer-readable instructions that perform operations on an electronic device (e.g., a display appliance) within a play system.

The present disclosure further illustrates examples of operations in processes used by the various embodiments described. Those of ordinary skill in the art will readily recognize that certain steps, blocks, elements, or operations described herein may be eliminated, taken in an alternate order, and/or performed concurrently. Moreover, in some embodiments, the operations for one or more processes may be implemented as one or more software programs for a computer system and encoded in non-transitory computer-readable storage media as instructions executable on one or more control units or processors. The software programs may also be carried in a communications medium conveying signals encoding the instructions. Separate instances of these programs may be executed on separate computer systems or a single computer system. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function. Thus, although certain steps have been described as being performed by certain devices, software programs, processes, or entities, this need not be the case and a variety of alternative implementations will be understood by those having ordinary skill in the art.

The following detailed description refers to the accompanying drawings. The same reference numbers in different drawings may identify the same or similar elements.

Play System with Third Person Game Application

So turning first to FIG. 1, a block diagram is presented of a first embodiment of a play system 300, within this disclosure. As shown, the play system 300 may comprise one or more controller devices, such as a first controller device 100, second controller device 101, and third controller device 103. The first controller device 100 may be configured to connect to a first arbitrary physical object 250 within a three-dimensional (3D) ambient space 302 by a player or user (not shown). The second controller device 101 may be configured to connect to a second arbitrary physical object 251 within the ambient space 302 by a player or user (not shown). The third controller device 103 may be configured to connect to a third arbitrary physical object 253 within the ambient space 302 by a player or user (not shown). And a fourth arbitrary physical object 252 is not connected to any controller device.

The play system 300 may also include one more display appliances, such as a display appliance 200. In addition, one or more virtual objects may appear on a video display, such as a first virtual object 260 and a second virtual object 261 on the display appliance 200 in the play system 300.

In some embodiments, the play system 300 may be optionally configured, with apparatus and functionality, such that the play system 300 may communicate with a computer network 299 (e.g., wideband communication, cloud network, etc.). The computer network 299 may comprise, for example, one or more remote computer systems and/or local devices, such as the display appliance 200 configured to wirelessly communicate with the computer network 299. Whereby, the play system 300 may be operable to communicate and interact with one or more remote play systems (not shown), which may be located at the same location or separated by a spatial distance (e.g., one meter to thousands of kilometers) in a real-world space 303 anywhere in the world.

Ambient Space of the Play System

Continuing with FIG. 1, the 3D ambient space 302 (as outlined by a circular dashed line in FIG. 1) may be considered the play region existing in a 3D real-world space 303, that naturally surrounds the users of the play system 300 at a single site or location. In many embodiments, the perimeter of the ambient space 302 may not be a physical or visible barrier. As a result, the 3D ambient space 302 may contain, but not limited to, players/users, controller devices, arbitrary physical objects, and display appliances of the play system 300 at a single site. The 3D ambient space 302 of the play system 300 may exist anywhere within the 3D real-world space 303 including, for example, a home, school, work, and outdoor environment, such as a living room, bedroom, classroom, office space, outdoor park, or playground.

Now the size and shape of a 3D ambient space may vary depending on implementation of a play system. For example, many embodiments may define the size and shape of a 3D ambient space by one or more computer programs operating on one or more display appliances and/or controller devices of a play system. Wherein the 3D ambient space 302 may be based at least in part on a computational transformation of spatial coordinates between a 3D virtual space 204—which may be graphically rendered on the display appliance 200—and the 3D ambient space 302— which may be the play region geometrically defined in the 3D real-world space 303 by the play system 300. Moreover, a 3D ambient space may be of finite size, predetermined size, variable size, or unlimited size, depending on a play system embodiment and the type of computational transformation implemented. In the current play system 300, the 3D ambient space 302 may be at most 30 meters in diameter such that the controller devices 100 and 101 and the display appliance 200, of the play system 300 at a local site, remain in wireless communication. Alternative embodiments may comprise a 3D ambient space with a limited size, for example, such as at most 6 meters, 10 meters, or 15 meters in diameter. While other large scale, play system embodiments may have a 3D ambient space of variable size (e.g., 3 to 50 meters in diameter) or unlimited size at a single site.

Further, an ambient space may be implemented in a variety of one-dimensional (1D), two dimensional (2D), or 3D shapes within 3D real-world space, such as a 2D circular shape, 2D rectangular shape, 3D spherical shape, 3D hemispherical shape, 3D cylindrical shape, 3D rectilinear shape, variable shape, and/or any type of shape—depending on a play system embodiment and the type of computational transformation implemented. In the current play system 300, the 3D ambient space 302 may be a substantially 3D cylindrical shape that is at most 30 meters in diameter and at most three meters high. Understandably, alternative shapes and sizes of an ambient space may be considered as well.

Virtual Objects in Virtual Space of the Play System

Continuing with FIG. 1, depicted are virtual objects 260 and 261 on the display appliance 200. A virtual object, such as virtual object 260 or 261, may be a non-physical object (e.g., character, avatar, vehicle, path, etc.) that exists in a 3D virtual space 204 and may be graphically represented within an image, animated sequence of images, or video frames on the display appliance 200. As can be seen in FIG. 1, only a portion of the 3D virtual space 204 may be visually represented (e.g., within a compact 2D video display) on the display appliance 200. Well knowing the 3D virtual space 204 may be a three-dimensional, abstract geometric space (e.g., containing virtual objects 260 and 261) that is defined and simulated by, but not limited to, one or more computer programs operating on one or more display appliances 200, controller devices 100 and 101, and/or other devices of the play system 300. Further, the virtual objects 260 and 261 may represent simulated 1D objects, 2D objects, or 3D objects that may appear within an image, animated sequence of images, or video on the display appliance 200 viewable by users—or may exist "off-screen" and be non-viewable by users. Such virtual objects 260 or 261 may represent, but not limited to, a character, vehicle, projectile, tree, mountain, lake, smoke, rain, or any type of object or combination of objects that may be graphically presented on the display appliance 200.

Arbitrary Physical Objects in Ambient Space of the Play System

Continuing with FIG. 1, the play system 300 may comprise the controller device 100 configured to be attached to or at least partially contained in the arbitrary physical object 250 in the 3D ambient space 302 of the play system 300. And similarly, the controller device 101 may be configured to be attached to or at least partially contained in the arbitrary physical object 251 in the 3D ambient space 302. And similarly, the controller device 103 may be configured to be attached to or at least partially contained in the arbitrary physical object 253 in the 3D ambient space 302.

An arbitrary physical object may be any type or an unlimited type of physical object in the 3D ambient space 302 of the play system 300. Whereby, an arbitrary physical object may be arbitrarily selected (or if so desired, randomly selected) from the 3D ambient space 302 by a player or by the play system 300 for usage in the play system 300. Examples of arbitrary physical objects may include, but not limited to, a book, child's toy, soft pillow, piece of paper, play dough, edible fruit, color marker, pencil, eraser, button, trading card, hanging picture, cloth shirt, action figure, doll, game token, and even a chair, table, rug, bicycle, potted plant, computer, goldfish bowl, pet dog, and human. In some embodiments, an arbitrary physical object may be a non-human physical object. In various embodiments, an arbitrary physical object may be a non-electronic physical object. In a broader sense, many embodiments of play systems may utilize arbitrary physical objects that comprise all types of physical objects—including, for example, arbitrarily selected physical objects, known types, indefinite types, and unknown types of physical objects—and manufactured, determined, predetermined, and preselected physical objects. As a result, some play system embodiments may allow the type of arbitrary physical object to be determined, indefinite, or undetermined by a play system, such that the play system may be aware, indefinitely aware, or unaware of the type of arbitrary physical object.

In fact, some play system embodiments may be configured to not necessarily specify a type of a physical object or characteristics of a physical object within a play system, such as a type, size, shape, weight, color, material, and/or other characteristics of the arbitrary physical object. In various embodiments, the type of arbitrary physical object may be arbitrary and undetermined by the controller device 100, display appliance 200, and play system 300, such that the play system 300, controller device 100, and display appliance 200 are unaware of the type of arbitrary physical object 250. Moreover, the play system 300, controller device 100, and display appliance 200 may be unaware of characteristics (e.g., type, weight, color, size, etc.) of the arbitrary physical object 250.

In some embodiments, the play system 300, controller device 100, and display appliance 200 may utilize an arbitrary physical object that is an unlimited type of physical object, or an arbitrary type of physical object, in the 3D ambient space 302 of the play system 300. For example, the controller device 100 may be configured to be attached to or at least partially contained in an arbitrary physical object 250 that is an unlimited type of physical object in a 3D ambient space 302. That is, the arbitrary physical object 250 may be arbitrarily selected (e.g., by a user or by a play system) from the 3D ambient space 302. In some embodiments, the type of the arbitrary physical object is arbitrary and unspecified, undetermined, and/or unknown to the controller device 100, display appliance 200, and play system 300. Further, the characteristics (e.g., type, weight, color, size, etc.) of the arbitrary physical object 250 may be arbitrary and unspecified, undetermined, and/or unknown to the controller device 100, display appliance 200, and play system 300.

So in various embodiments, the controller device 100 may be configured to be attached to or at least partially contained in an arbitrary physical object 250 that is an unlimited type of physical object arbitrarily selected from a 3D ambient space 302, and detect a first movement of the controller device 100 and the arbitrary physical object 250 within the 3D ambient space 302, and respond accordingly, wherein the controller device 100 may be configured to be at least in part controlling one or more virtual objects 260, sound effects, and mechanical effects, on the display appliance 200, based at least in part on the first movement of the controller device 100 and the arbitrary physical object 250 within the 3D ambient space 302.

Imaginary Objects in Ambient Space of the Play System

Continuing with FIG. 1, the play system 300 may comprise one or more "imaginary objects," such as an imaginary object 270 (shown with a dashed outline) in the ambient space 302 by the play system 300. With remarkable fun and excitement, an "imaginary object" is an invisible and non-physical object (e.g., character, avatar, vehicle, path, etc.) that exists somewhere in a 3D ambient space of a play system. For example, a "token imaginary object" (e.g., energy bar, enemy spaceship, or treasure chest) may be generated at a random location and orientation within a 3D ambient space of a play system, such as hidden near a city park bench or a living room couch. Yet a user with the controller device 100 and arbitrary physical object 250, in the play system 300, may detect the presence of the imaginary object 270. Moreover, the play system 300 may present graphic effects (e.g., a virtual object of a treasure chest), sound effects (e.g., a twinkling sound), and mechanical effects on the display appliance 200 based at least in part on the generation, collision, or detection of the imaginary object 270 within the 3D ambient space 302.

In another innovative aspect, a "projectile imaginary object" may be an invisible and non-physical object that launches, travels for a distance, and lands within a 3D ambient space of a play system. Whereby, a projectile imaginary object may simulate the movement of a real-world physical projectile. In the current play system 300, a projectile imaginary object, such as imaginary object 270, may be implemented as, but not limited to, a modulated (infrared, visible, or ultraviolet) light that is emitted and detected by two or more controller devices 100 and 101 connected to arbitrary physical objects 250 and 251, respectively. Moreover, the play system 300 may present visual effects (e.g., a virtual object of a rocket), sound effects (e.g., a rocket explosion), and mechanical effects on the display appliance 200 based at least in part on the launching, movement, collision, or detection of modulated light and/or the imaginary object 270 within the 3D ambient space 302.

One or more imaginary objects 270 may be implemented in various ways in the play system 300. In some embodiments of a play system, an imaginary object (e.g. having a spatial location, orientation, size, and/or velocity, etc.) may be implemented within one or more applications comprising computer instructions executed by one or more control units. Whereby, in some embodiments, one or more imaginary objects 270 (in FIGS. 1, 25A, 25B, 27) may be defined and exist in the 3D ambient space 302. In various alternative embodiments, one or more imaginary objects 270A (in FIG. 25A) may be defined and exist in the 3D virtual space 204, or a combination of 3D virtual space 204 and 3D ambient space 302, and/or other geometrical spaces defined in a play system, which are acceptable.

The imaginary object 270 may also have spatial features including, but not limited to, size (e.g., width, height, depth), location, orientation, movement, translational velocity, rotational velocity, direction, and/or speed, etc. within the 3D ambient space 302 (and/or virtual space 204). In various embodiments, the size and shape, of the imaginary object 270, may be, but not limited to, a spherical shape of 1 meter in diameter, or cube shaped of 0.1 meter on each side, as well as any other shape and/or size may be considered. In some embodiments, the imaginary object 270 may not move and be fixed in location in the 3D ambient space 302 (and/or 3D virtual space 204). In some embodiments, the imaginary object 270 may move at an intermittent, variable, and/or predetermined speed across the 3D ambient space 302 (and/or virtual space 204), depending on its implementation in a game application for the play system 300. For example, the imaginary object 270 may move at a speed less than one meter per second across the 3D ambient 302, at "a snail's pace." Or the imaginary object 270 may move at a speed between one meter and five meters per second across the 3D ambient space 302 at "a race car's pace," traveling almost instantaneously between two locations within the 3D ambient space 302, as well as other speeds may be considered.

Such capabilities are highly imaginative and useful, as an imaginary object when launched and detected by a play system, has the ability to provide the excitement, speed, and directionality similar to a physical projectile being launched across a room or play environment. Yet an imaginary object is non-physical—providing safe and friendly entertainment without physically harming players or damaging the 3D surroundings, such as a dining room filled with delicate glassware. So parents and kids remain happy.

Controller Device in the Play System

So turning now to FIGS. 2A-2D while referencing FIG. 1, there presented are perspective views of an embodiment of the controller device 100 for the play system 300. The reader may appreciate the controller device 100 may be configured to be arbitrarily relocatable within the 3D ambient space of the play system. Wherein one or more mechanisms may facilitate the controller device 100 to be arbitrarily relocatable. Such mechanisms may include various apparatuses, methods, and/or computer readable storage media in the play system. Whereby, an introductory description is given here, followed by more detailed descriptions in other sections of this disclosure.

Figure 2A:
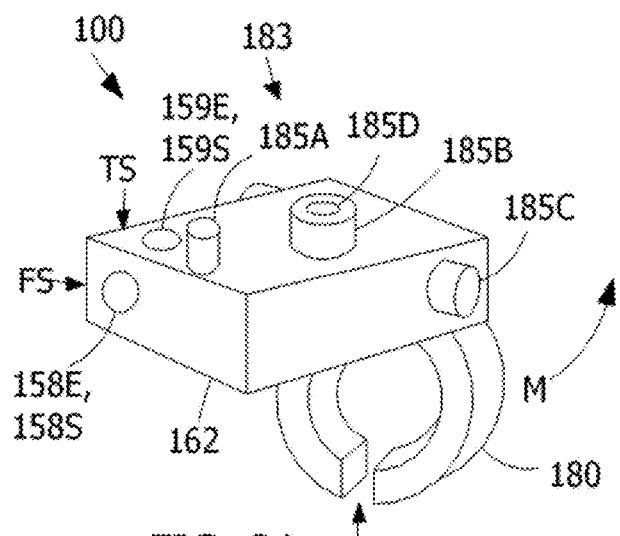
FIG. 2A is a perspective view for the play system of FIG. 1, of the top of a controller device.

So turning first to FIG. 2A, there shown is a perspective view of the top side of the controller device 100. As depicted, device 100 may be substantially shaped as, but not limited to, a gun or handheld blaster. The controller device 100 may be of compact size (e.g., 20 mm W×35 mm L×30 mm H) making the device 100 versatile in its usage. In some alternate embodiments, the controller device may constructed of any size, larger or smaller in size, and be designed in arbitrary types of shapes (e.g., rectangular, spherical, cylindrical, etc.), including deformable shapes that transform in shape with multiple functions. In the current embodiment, the controller device 100 may comprise a housing 162 constructed of flexible plastic or rubber, although alternative materials are acceptable as well. For example, in some embodiments, housing 162 may be constructed of, but not limited to, rigid plastic, flexible plastic, rubber, cloth, metal, paper, and/or wood, although an alternative material or a combination of materials may also be considered. To assist the reader in understanding orientation of the housing 162 in FIGS. 2A-2D, the sides have been labeled as a front side FS, a top side TS, a bottom side BS, and a rear side RS of housing 162.

In some embodiments, the controller device 100 may be configured to couple to different types of arbitrary physical objects within the 3D ambient space. For example, the controller device 100 may comprise one or more object connectors 183 that enable the controller device to be attached to or at least partially contained in an arbitrary physical object (such as object 250 in FIG. 1) at an arbitrary location, and an arbitrary orientation, relative to the arbitrary physical object that is in the 3D ambient space 302 of the play system 300. Object connectors 183 may be constructed in various ways with different functionality. In the current embodiment, the controller device 100 may comprise a plurality of object connectors 183. In some embodiments, the controller device 100 may comprise a plurality of object connectors 183, wherein at least two object connectors are different types of object connectors that differ in structure and/or functionality.

For example, the object connector 183 may be a clip object connector 180 constructed of flexible material, including plastic or rubber material, although alternative materials may also be considered. In some embodiments, the clip object connector 180 may be substantially shaped as, but not limited to, a loop, bracelet, collar, strap, lasso, or ring. Wherein, for example, the first controller device 100 may be configured to be optionally worn, via the clip object connector 180, on one or more fingers of a user, a wrist of the user, the hair of the user, a shoe of the user, or the clothing of the user. Further, in some embodiments, an object connector 180 may comprise a connector gap GP such that an object connector, including the clip object connector 180 may flex apart and fit around, clip, snap, or grab various sized arbitrary physical objects (not shown) from the 3D ambient space. The connector gap GP may be a spatial separation, discontinuity, or split within an object connector, such that the controller device 100 may attach or couple to various types and/or sizes of arbitrary physical objects. For example, the clip object connector 180 may attach to an arbitrary physical object including, but not limited to, a pencil, pen, marker, crayon, collar, toy character, toy doll, play toy, stuffed animal, plush toy, bicycle, or backpack.

Figure 2B:
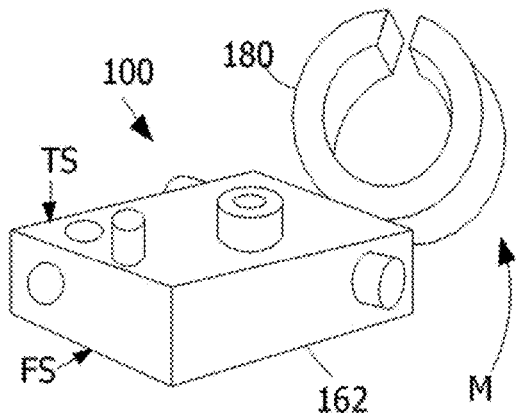
FIG. 2B is a perspective view for the play system of FIG. 1, of the top of a controller device, with a clip object connector rotated upwards.
Figure 2C:
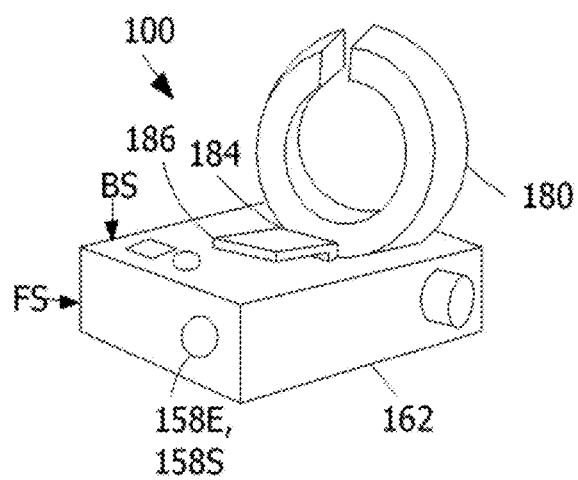
FIG. 2C is a perspective view for the play system of FIG. 1, of the bottom of a controller device, with a connector latch.
Figure 2D:
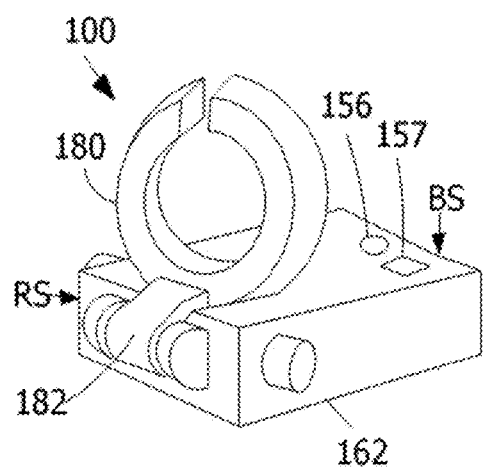
FIG. 2D is a perspective view for the play system of FIG. 1, of the bottom of a controller device, with a connector hinge.

In some embodiments, the controller device 100 may be configured to transform or be deformable between a plurality of physical shapes and/or functional modes. For example, as shown in FIGS. 2A, 2C, and 2D, the clip object connector 180 may be in a latched position, wherein the clip object connector 180 may be substantially positioned against or near the housing 162. In the current embodiment, the clip object connector 180 may be in a perpendicular orientation to the housing 162 using a connector latch 184, as shown in FIG. 2C, which snugly holds the clip object connector 180 firmly in position against the housing 162. In some embodiments, as shown in FIG. 2D, the object connector 180 may further comprise a connector hinge 182, which allows the clip object connector 180 to be detached (e.g., unsnapped or unclipped) from the connector latch 184 (in FIG. 2C) and housing 162 and pivoted or rotated away from the housing 162 of the controller device 100 such that the clip object connector 180 may pivot between at least two positions within 3D ambient space. For example, FIG. 2A shows the clip object connector 180 in a lower position, such that the controller device 100 and connector 180 may be configured to be substantially shaped as, but not limited to, a ring, lasso, strap, collar, or loop. Wherein the controller device 100 may be coupled to an arbitrary physical object in a substantially vertical orientation in 3D ambient space, or coupled to a substantially vertical surface or cylindrical surface (e.g., a writing pen, a character toy body), or coupled to and wearable by a user (e.g., on a finger, wrist, neck, or ankle). Then FIG. 2B shows the clip object connector 180 in an upper position, wherein the clip object connector 180 may be pivoted away in a direction M from the housing 162, such that the controller device 100 and connector 180 may be configured to be substantially shaped as, but not limited to, a brick, cube, block, hockey puck, or wedge. Wherein the controller device 100 may be coupled to an arbitrary physical object in a substantially horizontal orientation in 3D ambient space, or placed on a substantially horizontal surface (e.g., a tabletop, chair seat, or floor surface) in 3D ambient space.

In FIG. 2C, there presented is another clip object connector 186 that may be constructed of flexible material, including plastic, rubber, or metal material, although alternative materials may be considered as well. The clip object connector 186 may be substantially U-shaped, wherein the first controller device 100 the clip object connector 186 may be configured to attach or couple to, but not limited to, a wrist bracelet of the user, the hair of the user, a shoe of the user, or the clothing of the user. The clip object connector 186 may flex apart and fit around, clip, snap, or grab various sized arbitrary physical objects (not shown) from the 3D ambient space. In addition, the clip object connector 186 may attach or couple to an arbitrary physical object such as, but not limited to, pages of a book, shirt pocket, 2D picture, collar, toy character, doll, play toy, stuffed animal, plush toy, bicycle, or a backpack.

Another type of object connector is presented in FIG. 2A, where the controller device 100 may comprise one or more peg object connectors 185A, 185B, and 185C, such as male peg object connectors, which are peg-shaped or protrusions. The controller device 100 may also comprise at least one peg hole object connector 185D, such as a female peg hole object connector, which is a female socket or hole. Whereby an arbitrary physical object, with an alternate peg object connector that is peg-shaped, may be plugged into and attached to the controller device 100. Such capability is quite useful as many manufactured arbitrary physical objects and toys, have built-in peg holes or pegs, such as action figures, fashion dolls, vehicles, construction blocks, and play accessories such that the controller device 100 may plug into and attach to various types of arbitrary physical objects.

Some embodiments of a controller device may be configured to attach to or at least partially contained in an arbitrary physical object. For example, the controller device 100 may attach to an arbitrary physical object such as, but not limited to, a pencil, pen, hat, twig, leaf, flying drone, play toy, construction block, character toy, action figure, doll, stuffed animal, plush toy, bat, toy saber, toy handheld gun, toy handheld blaster, flashlight, chair, travel case, backpack, suitcase, or luggage. In another example, the controller device 100 may be partially contained in an arbitrary physical object such as, but not limited to, a wristwatch, sock, hat, pillow, flying drone, play toy, character toy, stuffed animal, plush toy, toy blaster, toy saber, bat, container, travel case, backpack, suitcase, or luggage. In another example, the controller device 100 may be wholly contained in an arbitrary physical object such as, but not limited to, a wristwatch, sock, hat, flying drone, pillow, play dough, sand, putty, goop, play toy, construction block, character toy, stuffed animal, plush toy, toy blaster, toy saber, bat, sports ball, baseball, golf ball, football, soccer ball, container, travel case, backpack, suitcase, or luggage. Various embodiments of a controller device may comprise an object connector that enables the controller device to connect to a user and is wearable by the user, wherein the controller device may be constructed as and/or function as a finger ring, wrist bracelet, neck collar strap, ankle bracelet, head crown, hair pin, pendant, shirt pin, tie clip, and/or necklace. Moreover, in some embodiments, a controller device may comprise an object connector that connects to an animal or pet (such as a dog, cat, horse, etc.) and is wearable by the animal or pet, wherein the object connector may be constructed as and/or function as a collar strap, saddle, foot bracelet, harness, crown, and/or hair pin. In various embodiments, an object connector may be ring shaped, U-shaped, or S-shaped for connecting to an arbitrary physical object. In some embodiments, an object connector may be integrated with a housing of a controller device such as, but not limited to, a controller device with a molded housing comprising one or more object connectors, such as housing 162 that is integrated with object connectors 185A, 185B, and 185C in FIG. 2A.

In some embodiments, the controller device 100 may further comprise one or more light emitters 158E and 159E and/or one or more light sensors 158S and 159S that may be used for, but not limited to, creating imaginary objects, remote optical communication, and signaling using light, such as modulated light, among a plurality of controller devices 100 and 101 within the ambient space 302 of the play system 300 (of FIG. 1). In the current embodiment of the controller device 100 shown in FIG. 2A, there exists a forward light emitter 158E and a forward light sensor 158S allowing emitting and sensing of light, respectively, in a forward direction. In addition, there exists a side light emitter 159E and a side light sensor 159S allowing emitting and sensing of light, respectively, in a side direction. Thus, controller device 100 may be configured to emit and sense a plurality of modulated lights in a plurality of directions. In some embodiments, alternative light emitters and light sensors, of different type, number, and light frequency (e.g., ultraviolet or visible light) may be considered as well.

In some embodiments, the controller device 100 may further comprise an indicator light 156, shown in FIG. 2D, that may provide one or more visual light signals to a user during play, such as, for example, in response to user input or to convey the state of the play system. In the current embodiment, the indicator light 156 may comprise one or more red-blue-green (RGB) light emitting diodes, although alternative light emitting elements may be considered as well.

Finally, in some embodiments, the controller device 100 may further comprise an indicator sensor 157, shown in FIG. 2D, which may detect, for example, user input or user input signals from a user in response to a system query. In the current embodiment, the indicator sensor 157 may comprise a touch sensor actuated by a user's finger touching sensor 157, although alternative sensing elements may be considered as well.

Controller Device Including Components

Figure 3:
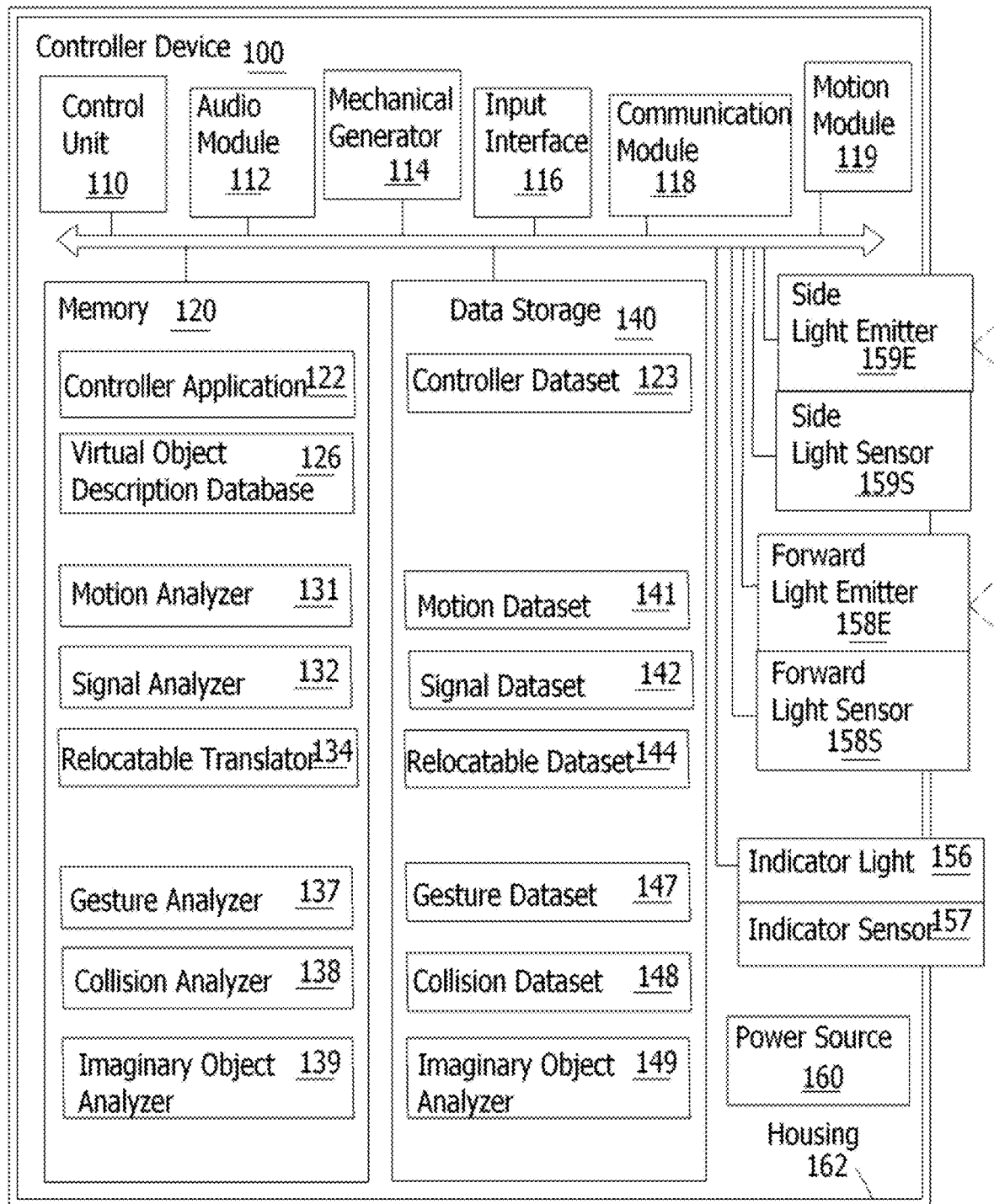
FIG. 3 is a block diagram for the play system of FIG. 1, of a controller device, with components of the controller device.

Turning now to FIG. 3, a detailed block diagram is presented with various components of the controller device 100, which may comprise, but not limited to, a housing 162, a control unit 110, an audio module 112, a mechanical generator 114, a input interface 116, a communication module 118, a motion module 119, a forward light emitter 158E, a forward light sensor 158S, a side light emitter 159E, a side light sensor 159S, an indicator light 156, an indicator sensor 157, a memory 120, a data storage 140, and a power source 160.

The control unit 110, shown in FIG. 3 while referencing FIG. 1, may provide, but not limited to, computing capability for device 100. Wherein the control unit 110 may comprise, for example, at least one or more processors having appreciable processing speed (e.g., 25 MHz, or 1 GHz and faster) to execute computer instructions. In some embodiments, a controller device 100 may comprise one or more control units 110 configured to execute computer instructions. Control unit 110 may include one or more processors that are general-purpose and/or special purpose (e.g., microprocessor, microcontroller, System-on-a-Chip module, Bluetooth Low Energy module, Bluetooth module, Bluetooth Low Energy transceiver, Bluetooth transceiver, Wi-Fi module, Wi-Fi transceiver, ZigBee transceiver, and/or graphic processors) supported by one or more executable programs contained in a computer readable storage media, such as memory 120. The control unit 110 may be operatively coupled to, but not limited to, an audio module 112, mechanical generator 114, input interface 116, communication module 118, motion sensor 119, forward light emitter 158E, forward light sensor 158S, side light emitter 159E, side light sensor 159S, indicator light 156, indicator sensor 157, memory 120, and data storage 140.

The memory 120, shown in FIG. 3 while referencing FIG. 1, may comprise one or more computer readable media configured with computer instructions and/or data. For example, the computer instructions may be configured such that controller device 100 may be arbitrarily relocatable within the 3D ambient space of a play system. Memory 120 may be operatively coupled to the control unit 110 such that the controller device 100 and the control unit 110 may be configured to execute the computer instructions. In the some embodiments, memory 120 may comprise one or more non-transitory computer-readable storage media configured with computer instructions and/or data. Further, memory 120 may comprise RAM, ROM, Flash, Secure Digital (SD) card, and/or hard drive, although other types of memory in whole, part, or combination may be used, including fixed and/or removable memory, volatile and/or nonvolatile memory.

Data storage 140, shown in FIG. 3 while referencing FIG. 1, may comprise one or more computer readable media, which may contain, but not limited to, computer related data. Data storage 140 may be operatively coupled to control unit 110 such that control unit 110, for example, may read data from and/or write data to data storage 140. Storage 140 may comprise RAM, ROM, Flash, Secure Digital (SD) card, and/or hard drive, although other types of memory in whole, part, or combination may be used, including fixed and/or removable, volatile and/or nonvolatile memory. Although memory 120 and data storage 140 are presented as separate components, some embodiments may use an integrated memory architecture, where memory 120 and data storage 140 may be wholly or partially integrated. In some embodiments, memory 120 and/or data storage 140 may be wholly or partially integrated with control unit 110.

Although an architecture to connect components of device 100 has been presented, alternative embodiments may rely on alternative bus, network, and/or hardware architectures. For example, although control unit 110 and communication module 118 are presented as separate components, some embodiments of a controller device may use an integrated "System on a Chip" architecture, where, for example, control unit 110, communication module 118, memory 120, data storage 140, and other components are wholly or partially integrated. Whereby in some embodiments, a controller device may have control unit 110, communication module 118, memory 120, and data storage 140 wholly integrated into a Bluetooth Low Energy module, Bluetooth Low Energy transceiver, Bluetooth module, Bluetooth transceiver, RF module, Wi-Fi module, and/or Wi-Fi transceiver.

In some embodiments, device 100 may comprise the communication module 118. Communication module 118, shown in FIG. 3 while referencing FIG. 1, may provide, but not limited to, wireless and/or wired communication abilities for device 100. Whereby, communication module 118 may be operatively coupled to control unit 110 such that the device 100, control unit 110, and communication module 118, for example, may detect, receive, and/or transmit communication signals and/or data with one or more controller devices 101 (of FIG. 1), display appliances 200 (in FIG. 1), other types of devices within the play system, and/or one or more computer networks 299 (in FIG. 1). For example, a plurality of play systems may communicate, via the controller device 100 and the communication module 118, using the computer network 299 comprised of, but not limited to, an intranet, an extranet, a portion of the Internet, a cellular network, a data network, a satellite network, a virtual private network (VPN), a local area network (LAN), a wireless LAN (WLAN), a wide area network (WAN), a personal area network (PAN), a portion of the Public Switched Telephone Network (PSTN), or any combination thereof.

Wherein, the communication module 118 may comprise, but not limited to, a wireless transceiver, data transceivers, processors, codecs, and/or antennae, as illustrative examples. For wireless communication, communication module 118 may comprise one or more wireless data or signal transceivers, such as, but not limited to, a Bluetooth Low Energy transceiver, a Bluetooth Low Energy communication module, a Bluetooth transceiver, a Wi-Fi transceiver, Wi-Fi communication module, a Radio Frequency Identification (RFID) transceiver, a RFID receiver, a IrDA infrared light transceiver, optical light transceiver, and/or any other type of wireless communication devices. In some embodiments, controller device 100 and communication module 118 may be configured to wirelessly communicate with, but not limited to, other controller devices, display appliances, arbitrary physical objects, electronic toys, and/or mobile appliances capable of receiving and/or transmitting wireless signals or data in the play system. Further, in some embodiments, the controller device 100 and communication module 118 may be capable of receiving and/or transmitting signals with the computer network 299 (in FIG. 1, e.g., wideband network, cloud network, etc.), which may comprise one or more remote play systems comprising, but not limited to, remote controller devices, remote display appliances, and other remote devices. During wireless communication, module 118 may use modulated electromagnetic waves of one or more frequencies (e.g., RF, infrared, etc.) and/or modulated audio waves of one or more frequencies (e.g., ultrasonic, etc.). In some embodiments, module 118 may transmit and receive encrypted signals or data. In some embodiments, for wired communication, module 118 may provide one or more wired interface ports (e.g., universal serial bus (USB) port, a video port, a serial connection port, an IEEE-1394 port, an Ethernet or modem port, and/or an AC/DC power connection port). Module 118 may, for example, use one or more wired and/or wireless communication protocols (e.g., TCP/IP, Wi-Fi, ZigBee, Bluetooth Low Energy, Bluetooth, Wireless USB, Ethernet, Wireless Home Digital Interface (WHDI), Near Field Communication, and/or cellular telephone protocol).

In various embodiments, shown in FIG. 3 while referencing FIG. 1 and FIGS. 9B and 9C, the controller device 100, control unit 110, and communication module 118 may be configured to transmit a control data, such as control data D100 (shown in FIG. 9B) comprising information or data, to another controller device 101, display appliance 200, and/or other type of device in the play system 300. And similarly, the controller device 100, control unit 110, and communication module 118 may be configured to receive one or more control data, such as control data D200 (shown in FIG. 9C) from another controller device 101, display appliance 200, and/or other type of device in the play system 300. For details related to a control data, the reader may refer to sections "Control Data transmitted by Controller Device to Display Appliance," "Control Data transmitted by Display Appliance to Controller Device," and other sections disclosed herein.

In some embodiments, the controller device 100, control unit 110 and communication module 118 may receive or detect a control data D200 (in FIG. 9C) comprising a device identifier D111, which may identify a controller device (such as device 101 of FIG. 1), a display appliance (such as appliance 200), or other device within the play system 300. In various embodiments, a received control data D200 (in FIG. 9C) may comprise a virtual object identifier data D221, which may identify a virtual object in the play system. In some embodiments, the received control data D200 (in FIG. 9C) may comprise a plurality of virtual object identifiers, such as virtual object identifier D221 and one or more support virtual object identifiers D224, which identify a plurality of virtual objects in the play system.

In some embodiments, the controller device 100, control unit 110 and communication module 118 may transmit a control data D100 (in FIG. 9B) comprising a device identifier D111, which may identify a display appliance (such as appliance 200 of FIG. 1), controller device (such as device 100 of FIG. 1), or other device within the play system 300. In various embodiments, a transmitted control data D100 (in FIG. 9B) may comprise a virtual object identifier data D121, which may identify a virtual object in the play system. In some embodiments, a transmitted control data D100 (in FIG. 9B) may comprise a plurality of virtual object identifiers, such as virtual object identifier D121 and one or more support virtual object identifiers D124, which identify a plurality of virtual objects in the play system.

In various embodiments, the device 100, communication module 118, and control unit 110 may detect or receive a Received Signal Strength Indicator (RSSI) value, Time of Flight (TOF) value, and/or Time of Arrival (TOA) value upon receiving a wireless signal or data from another controller device, a display appliance, or other appliance or device within the play system. The functionality for detecting an a RSSI value, TOS value, and/or TOA value may be built into or retrieved from one or more wireless transceivers, such as a Bluetooth Low Energy module, Bluetooth Low Energy transceiver, or RF transceiver, as examples. For sake of discussion, the RSSI value typically represents, but not limited to, a numerical quantity (e.g., where RSSI value=−250 to 0) that is related to the signal strength of a received signal or data from another device or appliance. Whereby, the play system 300 (of FIG. 1) may be configured to communicate and utilize a plurality of detected RSSI values from a plurality of controller devices (such as between devices 100 and 101), and between one or more devices and display appliances (such as between device 100 and appliance 200), and between one or more display appliances (such as between display appliance 200 and another display appliance) within the 3D ambient space of the play system. Further, in some embodiments, wireless transceivers, such as a Bluetooth transceiver or Wi-Fi transceiver, may provide angle of arrival (AoA) information, such that spatial angles, of received wireless signals, may be determined by the communication module 118 and control unit 110 of device 100. In various embodiments, wireless transceivers, such as a Bluetooth transceiver or Wi-Fi transceiver, may provide Time of Flight (TOF) or Time of Arrival (AoA) information, of received wireless signals, such that time durations and time events may be determined by the communication module 118 and control unit 110 of device 100.

In some embodiments, device 100 may comprise the motion module 119. The motion module 119, shown in FIG.

3 while referencing FIG. 1, may provide, but not limited to, movement, inertial, and/or spatial feature detection functionality for the controller device 100. Wherein, motion module 119 may comprise one or more of, but not limited to, accelerometers, tilt sensors, reed switches, vibration sensors, proximity sensors, magnetometers (e.g., electronic compass), angular rate sensors, gyroscopes, radar sensors, radar transceivers, geolocation sensors, global positioning system (GPS) receivers, altitude sensors, audio sensors, microphones, pressure sensors, barometric sensors, spatial distance sensors, speed sensors, temperature sensors, light detect sensors, cameras, image sensors, tracking sensors, electric field sensors, magnetic field sensors, Wi-Fi transceivers with received signal strength indicator sensing, Bluetooth Low Energy transceivers with received signal strength indicator sensing, Radio Frequency Identification (RFID) receiver, RFID transceiver, and/or any other device that receives or detects inertial, motion, or spatial related information.

Moreover, the motion module 119 may be operatively coupled to control unit 110 such that the play system 300, device 100, control unit 110, and motion module 119 may be configured to detect one or more spatial features of the controller device 100 and/or an arbitrary physical object 250 within the 3D ambient space 302 of the play system 300. For example, the play system 300, device 100, control unit 110, and motion module 119 may be configured to detect a spatial feature (e.g., movement, orientation, location, altitude, direction, and/or speed, etc.) of the controller device 100 and/or arbitrary physical object 250 within the 3D ambient space 302 of the play system 300.

Wherein, as discussed throughout this disclosure, a spatial feature may comprise one or more of, or a combination of, a movement (e.g., comprising any type of movement on at least one dimension or in three dimensions), a translational movement (e.g., comprising a translational movement on at least one dimension, or comprising a 3D translational movement), a translational velocity (e.g., comprising a translational velocity on at least one dimension, or comprising a 3D translational velocity), a translational speed (e.g., comprising a translational speed on at least one dimension, or comprising a 3D translational speed), a translational direction (e.g., comprising a translational direction on at least one dimension, or comprising a 3D translational direction), a rotational movement (e.g., comprising a rotational movement on at least one axis, or comprising a 3D rotational movement), a rotational velocity (e.g., comprising rotational velocity on at least one axis, or comprising a 3D rotation velocity), a rotational direction (e.g., comprising a rotational direction on at least one axis, or comprising a 3D rotational direction), a rotational speed (e.g., comprising a rotational speed on at least one axis, or comprising a 3D rotational speed), an acceleration (e.g., comprising an acceleration on at least one dimension, or comprising a 3D acceleration), a direction (e.g., comprising a direction on at least one dimension, or comprising a 3D direction), an altitude (e.g., comprising an altitude on at least one dimension, or comprising a 3D altitude), a distance (e.g., comprising a distance in at least one dimension of space or a distance in 3D space), a speed (e.g., comprising a speed on at least one dimension, or comprising a speed in 3D space), a location (e.g., comprising a location in at least one dimension, or a 3D location), an orientation (e.g., comprising an orientation on at least one axis, or comprising a 3D orientation), movement timestamp, gesture type (e.g., double tap gesture, human walking gesture, spin gesture, etc.), gesture movement (e.g., comprising any type of gesture or any type of gesture movement on at least one dimension or three dimensions), a gesture translational velocity (e.g., comprising gesture translational velocity on at least one dimension, or comprising a 3D gesture translational velocity), a gesture rotational velocity (e.g., comprising gesture rotational velocity on at least one axis, or comprising a 3D rotation velocity), a gesture direction (e.g., comprising a gesture direction on at least one dimension, or comprising a 3D direction), a gesture speed (e.g., comprising a gesture speed on at least one dimension, or comprising a gesture speed in 3D space), a collision translational velocity (e.g., comprising a collision translational velocity on at least one dimension or three dimensions), a collision rotational velocity (e.g., comprising a collision rotational velocity on at least one dimension or three dimensions), a collision direction (e.g., comprising a collision direction on at least one dimension, or comprising a 3D collision direction), a collision speed (e.g., comprising a collision speed on at least one dimension, or comprising a collision speed in 3D space), and/or any type of spatial or spatial-temporal related information.

Moreover, in various embodiments, the controller device 100, control unit 110, and motion module 119 may detect a spatial feature (e.g., movement, orientation, location, altitude, direction, and/or speed, etc.) of the controller device 100 and/or the arbitrary physical object 250, such as a movement of the controller device 100 and/or the arbitrary physical object 250 within 3D ambient space of the play system. For example, the controller device 100, control unit 110, and motion module 119 may detect a translational movement of the controller device 100 and/or the arbitrary physical object 250 within 3D ambient space 302 in the play system 300. Or in another example, the controller device 100, control unit 110, and motion module 119 may detect an orientation of the controller device 100 and/or the arbitrary physical object 250 within 3D ambient space 302 of the play system 300. Or in another example, the controller device 100, control unit 110, and motion module 119 may detect a rotational movement of the controller device 100 and/or the arbitrary physical object 250 within 3D ambient space 302 of the play system 300. Further, various embodiments of a control data may comprise information of a spatial feature (e.g., movement, orientation, location, velocity, altitude, direction, and/or speed, etc.) of the controller device 100 and/or the arbitrary physical object 250 within 3D ambient space 302 of the play system 300. For details related to a control data, the reader may refer to sections "Control Data transmitted by Controller Device to Display Appliance," "Control Data transmitted by Display Appliance to Controller Device," and other sections disclosed herein.

In some embodiments, device 100 may comprise the input interface 116. The input interface 116, shown in FIG. 3 while referencing FIG. 1, may provide a means of detecting user input (e.g., via a pushbutton) from a user, detecting computer-controlled input from the controller device 100, and/or provide a means to generate visual information (e.g., via a light emitter) to a user. Whereby, in some embodiments, the input interface 116 may comprise, but not limited to, one or more control buttons, keypads, touch pads, rotating dials, trackballs, touch-sensitive displays, optical gesture sensing devices, motion gesture sensing devices, temperature sensor, and/or audio microphones for user input. In various embodiments, the input interface 116 may also comprise one or more light emitting diodes, neon lamps, lasers, and/or other light emitting devices to convey visual information to a user. For example, controller device 100 and input interface 116 may be configured to detect one or more user input or user input signals when, for example, a user actuates (e.g., presses, touches, taps, or hand gestures) the input interface 116. The input interface 116 may be operatively coupled to control unit 110 such that the play system and device 100 and control unit 110 may respond. For example, the play system 300, controller device 100, and control unit 110 may be configured to receive one or more user input or user input signals from the input interface 116, and respond accordingly, such as at least in part controlling a virtual object 260, on a display appliance 200, based at least in part on the one or more user input or user input signals received from the input interface 116. Or in another example, controller device 100, control unit 110, and input interface 116 may enable one or more light emitting devices in the interface 116 when, for example, a user actuates (e.g., presses, touches, taps, or hand gestures) the input interface 116.

Further, in some alternate embodiments or in combination with the current embodiment, input interface 116 may comprise, but not limited to, one or more image sensors, optical cameras, RFID readers, electric field sensors, magnetic field sensors, and/or other types of sensing elements. Wherein, the input interface 116 and control unit 110 may be configured to generate one or more computer-controlled input signals when the controller device 100 and control unit 110 operate the input interface 116. For example, the input interface 116 may be operatively coupled to control unit 110 such that play system 300, controller device 100, and control unit 110 may receive one or more computer-controlled input signals from the input interface 116, and respond accordingly, such as automatically selecting one or more virtual objects 260 on a display appliance 200 of the play system 300 based at least in part on the computer-controlled input from the controller device 100. Computer-controlled input may be based at least in part, but not limited to, computer vision analysis, RFID detection, machine learning, artificial intelligence, signal detection, and/or other types of sensing and analysis of an arbitrary physical object or physical environment within a 3D ambient space of the play system 300.

In some embodiments, controller device 100 may comprise the audio module 112. The audio module 112, shown in FIG. 3 while referencing FIG. 1, may provide one or more audio inputs, audio outputs, audio stream analysis, and/or generated sound effects for the controller device 100. Wherein, audio module 112 may comprise, but not limited to, one or more audio processors, audio codecs, audio microphones, input audio sensors, speech natural language processors, automatic speech recognition processors, audio synthesizers, audio signal amplifiers, sound generating elements (e.g., loudspeakers), and/or any other audio related devices. Audio module 112 may be operatively coupled to control unit 110 such that the play system 300, device 100, memory 120, control unit 110, and audio module 112 may respond to an event within the play system 300. For example, in FIGS. 1 and 3, device 100, memory 120, and control unit 110 may be configured to detect, via a motion module 119, a movement of the controller device 100 and an arbitrary physical object 250 in a 3D ambient space 302, and respond accordingly, such that the controller device 100, via the audio module 112, generates one or more sound effects based at least in part on the movement of the controller device 100 and the arbitrary physical object within 3D ambient space 302. In some embodiments, the controller device 100 may comprise a speech natural language processor and audio microphone configured to input one or more human speech commands and/or human speech natural languages from a user or player. For example, in FIGS. 1 and 3, the device 100, memory 120, and control unit 110 may be configured for detecting the one or more human speech commands and/or human speech natural languages from a user, via the audio module 112, and respond accordingly, wherein the controller device 100, via the audio module 112, generates one or more sound effects based at least in part on the one or more human speech commands and/or human speech natural language spoken by the user. Sound effects may comprise, but not limited to, one or more audio pre-recorded sound effects, synthetically generated sound effects, human speech sound effects, human speech command sound effects, and/or human speech natural language sound effects.

In some embodiments, device 100 may comprise the mechanical generator 114. The mechanical generator 114, shown in FIG. 3 while referencing FIG. 1, may be configured to generate mechanical signals and/or mechanical effects for device 100. Wherein, mechanical generator 114 may comprise, but not limited to, one or more mechanical or vibratory processors, codecs, ultrasound transducers, eccentric rotating mass actuators, air vortices generators, electrostatic actuators, electric motors, electric fans, drone motors with propellers, electric gearboxes, electromagnets, electrically operated mechanical latches, electric solenoids, tactile actuators, linear actuators, vibrators, electro-mechanical vibrators, and/or any other mechanical effect producing devices. The controller device 100, via the mechanical generator 114, may generate one or more mechanical effects comprising, but not limited to, one or more vibratory movements, haptic movements, physical movements, mechanical movements, and/or mechanical rotations within a 3D ambient space in the play system 300. Mechanical generator 114 may be operatively coupled to control unit 110 such that the play system 300, control unit 110, and mechanical generator 114 may respond to an event within the play system. For example, while observing FIGS. 1 and 3, the play system 300, device 100, control unit 110, and motion module 119 may be configured to detect a movement of the controller device 100 and an arbitrary physical object 250, and respond accordingly, such as enabling a mechanical generator 114 to generate a mechanical effect based at least in part on the movement detected of the controller device 100 and the arbitrary physical object within the 3D ambient space 302.

In some embodiments, device 100 may comprise one or more light emitters and/or one or more light sensors. For example, device 100 may comprise a forward light emitter 158E, forward light sensor 158E, side light emitter 159E, and/or side light sensor 159S. The forward light emitter 158E, forward light sensor 158E, side light emitter 159E, and side light sensor 159S may provide device 100 with, but not limited to, an optical control system, and/or optical communication system, as shown in FIG. 3 while referencing FIG. 1. The light emitters 158E and 159E may comprise, but not limited to, at least one of a light emitting diode, a laser, laser diode, neon lamp, and/or any other type of light source. Wherein, emitters 158E and 159E may be configured to emit light and/or modulated light. Emitters 158E and 159E may be operatively coupled to control unit 110 such that control unit 110, for example, may be configured to transmit a modulated signal to the emitters 158E and 159E that generate or emit light and/or a modulated (infrared, visible, or ultraviolet) light. In the current embodiment, one or more emitters may be configured to emit modulated infrared light into 3D ambient space. In some embodiments, modulated light may be amplitude modulated (e.g., one or more light on and/or light off durations), frequency modulated (e.g., 32 kHz, 56 kHz light pulses, etc.), and/or phase modulated. In some embodiments, a light emitter may be configured to generate a modulated (infrared, visible, or ultraviolet) light having a light emitting viewing angle of less than 185 degrees, less than 65 degrees, less than 35 degrees, less than 25 degrees, or less than 15 degrees, although other light emitting viewing angles may be considered as well. In some embodiments, the controller device 100 and at least one light emitter 158E,159E may be configured to emit a modulated (infrared, visible, or ultraviolet) light into a 3D ambient space of a play system.

Further, the light sensors 158S and 159S may comprise, but not limited to, at least one of an infrared light receiver, infrared light diode, cadmium sulfide cell, phototransistor, photo resistor, image sensor, and/or any type of a light sensor capable of sensing light or electromagnetic radiation. Wherein, the light sensors 158S and 159S may be configured to detect or receive light and/or modulated light. The control unit 110 may be configured to detect a signal from the light sensors 158S and 159S upon receiving or detecting light and/or modulated light. In some embodiments, a light sensor may have a light sensing viewing angle of less than 185 degrees, less than 100 degrees, or less than 50 degrees, or less than 35 degrees, although other light sensing viewing angles may be considered as well. In some embodiments, the controller device 100 and at least one light sensor 158S,159S may be configured to detect a light and/or a modulated (infrared, visible, or ultraviolet) light within the 3D ambient space of the play system. In the current embodiment, one or more light sensors may be configured to detect modulated infrared light from a 3D ambient space. In some embodiments, at least one light transceiver, which is a combined light emitter and light sensor, may be used to replace the light emitter 158E and light sensor 158S, and/or light emitter 159E and light sensor 159S. In the current embodiment, modulated light may be emitted and detected at a specific modulation frequency (e.g., 36 kHz modulated light) and/or light wavelength (e.g. infrared light, visible light, ultraviolet light, etc.). Further, the controller device 100 and emitters 158E and 159E may be configured to emit a modulated (infrared, visible, or ultraviolet) light for wirelessly communicating different types of signals with other devices, wherein the modulated light may be emitted for one or more distinct durations of time (e.g., 0.1, 0.2, or 0.3 seconds) or be emitted as distinct pulsed patterns of modulated light.

Further, the play system 300 and controller device 100 may be configured to detect light and/or emit light. For example, while observing FIGS. 1 and 3, the play system 300, controller device 100, control unit 110, and motion module 119 may detect the movement of the device 100 and an arbitrary physical object 250, and respond accordingly, such as enabling the light emitter 158E and/or light emitter 159E to emit a modulated (infrared, visible, or ultraviolet) light based at least in part on the detected movement of the controller device 100 and the arbitrary physical object 250 within the 3D ambient space 302 of the play system 300. In another example, the play system 300, controller device 100, control unit 110, and light sensor 158S may be configured to detect a modulated (infrared, visible, or ultraviolet) light within a 3D ambient space 302, and respond accordingly, wherein the play system 300 and controller device 100 may at least in part be controlling a virtual object on a display appliance 200 based at least in part on the modulated light detected by the controller device 100 within the 3D ambient space 302 of the play system 300.

In some embodiments, device 100 may comprise the indicator light 156. Indicator light 156, shown in FIG. 3 while referencing FIG. 1, may be optionally included in device 100 and may generate, but not limited to, one or more indicating lights as visual signals to a user (not shown), depending on application embodiments. In some embodiments, the indicator light 156 may be integrated with the input interface 216. Indicator light 156 may be operatively coupled to control unit 110, such that the control unit 110 can enable or disable one or more indicating lights, controlled independently or in groups of light emitting elements. Wherein, the indicator light 156 may comprise one or more visible light emitters, visible light emitting diodes, red-green-blue (RGB) light emitting diodes, white-red-green-blue (WRGB) light emitting diodes, organic light emitting diodes, neon lamps, incandescent lamps, and/or any other number or type or combination of types of light emitting elements.

In the current embodiment, indicator light 156 may comprise one or more RGB light emitting diodes, such that the play system may convey visual information using color to a user, although alternative light emitters may be considered as well. For example, some application embodiments may enable the indicator light 156 (e.g. with yellow light) to indicate the play system is waiting for a user response, or enable the indicator light 156 (e.g. with red light) to indicate the play system has detected user input. Moreover, the indicator light 156, of the controller device 100, may provide a status indicator based at least in part on the state of a virtual object from a display appliance. That is, some application embodiments may enable the indicator light 156 to visually indicate a virtual object state related to a virtual object 260, presented on a display appliance 200, wherein the virtual object 260 may be associated with and at least in part controlled by the controller device 100. For example, some application embodiments may enable the indicator light 156 to indicate that a virtual object 260 (in FIG. 1) is in a "happy" emotional state (e.g., with green light), or a "sad" emotional state (e.g., with purple light), etc. Alternate application embodiments may enable the indicator light 156 to indicate that a virtual object 260 is "thirsty" (e.g., with blue light), "hungry" (e.g., with orange light), or "needs to go to the bathroom" (e.g., with yellow light), etc. And some application embodiments may enable the indicator light 156 to indicate that a virtual object 260 has "weapon rounds depleted" (e.g., with red light), or "shield depleted" (e.g., with blue light), etc.

The indicator sensor 157, shown in FIG. 3 while referencing FIG. 1, may be optionally included in device 100 and may provide the device 100 with, but not limited to, detecting user input from a user, depending on application embodiments. In some embodiments, the indicator sensor 157 may be integrated with the input interface 216. Indicator sensor 157 may be operatively coupled to control unit 110, such that the control unit 110 may be able to able to detect one or more user input or user input signals received from sensor 157. Wherein, the indicator sensor 157 may comprise one or more user input sensors, touch sensors, membrane switch sensors, capacitance sensors, electric field sensors, magnetic field sensors, touchpads, proximity sensors, pushbutton switches, audio microphones, temperature sensors, motion sensors, and/or any number or type or combination of types of user sensing apparatus elements. In the current embodiment, indicator sensor 157 may comprise a touch sensor, such that the controller device 100 and control 110 may detect user input upon detecting a user's finger touching the sensor 157, although alternative sensors may be considered as well. In operation, for example, the controller device 100 may detect user input in response to a play system query, such as starting a game, or changing a play mode, and respond accordingly.

Finally, in some embodiments, device 100 may comprise the power source 160. The power source 160, shown in FIG. 3 while referencing FIG. 1, may provide energy to one or more components of device 100. The power source 160 may comprise, for example, of a portable battery and/or a power cable coupled to an external power supply. In the current embodiment, power source 160 may be a coin cell battery such that device 100 may be mobile. In alternate embodiments, power source 160 may be a rechargeable battery.

Controller Device Including Computing Modules

FIG. 3 shows memory 120 may comprise various computing modules—which include computer instructions executable by one or more control units 110—comprising, but not limited to, a controller application 122, a motion analyzer 131, a signal analyzer 132, a relocatable translator 134, a gesture analyzer 137, a collision analyzer 138, an imaginary object analyzer 139, and a virtual object description database 126. Such modules may be implemented in software, firmware, and/or hardware. In the current embodiment, these modules may be implemented in memory 120 and executed by the control unit 110. In some embodiments, memory 120 may be further comprising computer readable/writable media for data storage. In some embodiments, memory 120 may comprise non-transitory computer-readable storage media.

In some embodiments, device 100 may comprise the controller application 122. The controller application 122, shown in FIG. 3 while referencing FIG. 1, may comprise one or more program applications, which may provide basic functions and services for the controller device 100. The application 122 may comprise computer instructions executable by the control unit 110. For example, the application 122 may support read/write operations of the control unit 110 with hardware components, such as, but not limited to, the audio module 112, mechanical generator 114, motion module 119, communication module 118, and input interface 116.

In some embodiments, device 100 may comprise the motion analyzer 131. The motion analyzer 131, shown in FIG. 3 while referencing FIG. 1, may provide motion and spatial feature analysis functionality for the controller device 100. The motion analyzer 131 may comprise computer instructions executable by the control unit 110. In some embodiments, the motion analyzer 131 may comprise, but not limited to, digital filters, Kalman filters, motion analysis, statistical functions, and/or signal processing algorithms. Whereby, motion, inertial, and/or temporal information may be aggregated, from one or more spatial sensors, and computationally transformed into a spatial feature of the controller device 100 and/or an arbitrary physical object 250 within the 3D ambient space 302 of the play system 300.

In some embodiments, the play system 300, device 100, control unit 110, and motion analyzer 131 (e.g., in cooperation with the motion module 119) may be enabled to detect, computationally transform, and/or analyze a spatial feature (e.g., movement, orientation, location, altitude, direction, and/or speed) of the controller device 100 and/or an arbitrary physical object 250 within the 3D ambient space 302 of the play system 300. For a description of a "spatial feature," the reader may refer to the motion module 119 in FIG. 3 and other sections of this disclosure.

In some embodiments, device 100 may comprise the signal analyzer 132, operable to analyze one or more wireless radio frequency (RF) signals and/or optical signals based on signal strength, time of flight (TOA), time of arrival (TOA), angle of arrival (AOA), and other means. The signal analyzer 132 may comprise computer instructions executable by the control unit 110. For example, the signal analyzer 132 may provide received signal strength indicator (RSSI) analysis of one or more RSSI values for the controller device 100. The received signal strength indicator value may be a numeric value or magnitude (e.g., where RSSI=−120 to −10) that is related to the signal strength of a wirelessly received signal or data from a transmitting controller device, display appliance, or appliance within the play system 300. Whereby, the play system 300, controller device 100, control unit 110, and signal analyzer 132 (e.g., in cooperation with the communication module 118) may be enabled to analyze one or more RSSI values communicatively received from and/or determined by, but not limited to, one or more controller devices 100 and 101, display appliances 200, and/or other devices within the 3D ambient space 302. For example, the play system 300, controller device 100, control unit 110, and signal analyzer 132 may be enabled to detect and compute one or more unprocessed RSSI values, median RSSI values, and/or arithmetic average RSSI values. In some alternative embodiments, signal analyzer 132 may utilize time of flight (TOF), time of arrival (TOA), angle of arrival (AOA) signal analysis, and/or other types of signal analysis. Whereby, the play system 300, controller device 100, control unit 110, and signal analyzer 132 (e.g., in cooperation with the communication module 118) may be enabled to analyze one or more time of flight signal values, time of arrival signal values, and/or angle of arrival values of the controller devices 100 and 101, display appliances 200, and/or other devices within the 3D ambient space 302 in the play system 300. In some embodiments, the signal analyzer 232 may comprise, but not limited to, digital filters and statistical functions to process RSSI values, TOF values, TOA values, and/or AOA values to optimize signal to noise ratios.

In some embodiments, device 100 may comprise the relocatable translator 134. The relocatable translator 134, shown in FIG. 3 while referencing FIG. 1, may provide spatial relocation functionality so the controller device 100 may be enabled to be arbitrarily relocatable in 3D ambient space 302. The relocatable translator 134 may comprise computer instructions executable by the control unit 110. In some embodiments, the controller device 100, control unit 110, and relocatable translator 134 may be operable such that the controller device 100 may be enabled to be arbitrarily relocatable within 3D ambient space 302 of the play system 300, wherein the controller device 100 may be enabled to be attached to or at least partially contained in an arbitrary physical object 250 at an arbitrary location, and an arbitrary orientation, relative to the arbitrary physical object 250 in the 3D ambient space 302, and the controller device 100 may be enabled to be arbitrarily located and arbitrarily oriented in the 3D ambient space 302 that is movable in a 3D real-world space 303.

In some embodiments, the controller device 100, control unit 110, and relocatable translator 134 (e.g., in cooperation with the motion module 119) may be enabled to computationally determine a relocatable dataset 144 during spatial calibration of the relocatable translator 134, based at least in part on detecting a spatial feature, or a control data comprising information of a spatial feature, of the controller device 100 within 3D ambient space 302 of the play system 300. Wherein, a spatial feature (e.g., movement, orientation, location, velocity, altitude, direction, and/or speed, etc.) of the controller device 100 may be, for example, an orientation of the controller device 100 within 3D ambient space 302. In various embodiments, operations of spatial calibration of the relocatable translator 134 may determine a home reference data that computationally acts as a template, defining the geometric spatial relationship (e.g., location and orientation) for the controller device 100, arbitrary physical object 250, and the virtual object 260 on the display appliance 200 within the 3D ambient space 302 and the 3D virtual space 204 (in FIG. 1). For example, FIG. 9D shows an exemplary embodiment of a relocatable dataset D400 that may comprise home reference data D410 that includes, but not limited to, a device identifier D411, a virtual object identifier D412, a home reference location D413, and a home reference orientation D414.

Subsequently, in various embodiments, as shown in FIG. 3 while referencing FIG. 1, the controller device 100, control unit 110, and relocatable translator 134 (e.g., in cooperation with the motion module 119) may utilize the relocatable dataset 144 during operations of play activity for the controller device 100 such that the controller device 100 may be enabled to be arbitrarily relocatable in 3D ambient space 302 of the play system 300. For example, the controller device 100, control unit 110, and relocatable translator 134 (e.g., in cooperation with the motion module 119) may be enabled to computationally transform one or more spatial features and/or control data comprising information of spatial features (e.g., movement, orientation, location, altitude, direction, and/or speed) of the controller device 100 and/or the arbitrary physical object 250 from 3D ambient space 302—from a local coordinate system of the controller device 100—to a system-wide coordinate system of the play system 300. That is, in various embodiments, spatial coordinates of the controller device 100 may be computationally transformed to a shared, system-wide coordinate system among a plurality of controller devices 100 and 101, display appliances 200, and other potential devices of the play system 300.

Further, in various embodiments, as shown in FIG. 3 while referencing FIG. 1, the controller device 100, control unit 110, and relocatable translator 134 may provide geometric and computational transformations of spatial-temporal coordinates between various ambient spaces and virtual spaces. As described earlier, such geometric spaces (e.g., 3D ambient space 302, 3D virtual space 204, etc.) may be of various shapes (e.g., rectangular, spherical, cylindrical, planar, linear, etc.) and of various size, such as finite (e.g., 20 meters in diameter), variable (10 to 50 meters in diameter), or of unlimited size, depending on the design choices for an embodiment of a play system. For example, the relocatable translator 134 may support a play region referred to as the 3D ambient space 302, in 3D real-world space 303, which contains the controller device 100 and connected to arbitrary physical object 250 in the play system 300. Further, the relocatable translator 134 may support the 3D virtual space 204, comprising virtual objects 260, on the display appliance 200 in the play system 300. Whereupon in some embodiments, the relocatable translator 134 may be configured and operative of computational transformation of first spatial-temporal coordinates, of the controller device 100 in the 3D ambient space 302, to second spatial-temporal coordinates of one or more virtual objects 260 in the 3D virtual space 204 on the display appliance 200—and vice versa. That is, in various embodiments, the relocatable translator 134 may be operative of computational transformation of first spatial-temporal coordinates, of one or more virtual objects 260 in the 3D virtual space 204 on the display appliance 200, to second spatial-temporal coordinates of imaginary objects 270 in the 3D ambient space 302, respectively. For example, in some embodiments, the relocatable translator 134 may provide computational transformation of first spatial-temporal coordinates of imaginary objects 270, in the 3D ambient space 302 and/or 3D virtual space, to second spatial-temporal coordinates in the 3D virtual space 204 and/or 3D ambient space 302—and vice versa. Whereby further supporting, in some embodiments, the relocatable translator 134 may be configured and be operable such that the controller device 100 may be enabled to be arbitrarily relocatable within 3D ambient space 302 of the play system 300.

Wherein, the relocatable translator 134 may comprise computer instructions that when executed by one or more control units 110 may perform, but not limited to, geometric transformation, mapping, and/or projective functions. In various embodiments, translational, projective, matrix, and vector data types and operations may be considered for geometric transformations related to spatial distances, proximities, and displacements in 1 D, 2D and/or 3D space, although alternative approaches may be considered as well. Further, in various embodiments, rotational, trigonometric, and quaternion data types and operations may be considered for geometric transformations related to angles, orientations, and/or rotations in 1 D, 2D and/or 3D space, although alternative approaches may be considered as well. For example, in some embodiments, a portion of computational transformation of a spatial feature comprising orientation or rotation, such that the controller device 100 may be relocatable in 3D space, may use quaternion matrix math:

$$p' = hph^{-1}$$

wherein
  $p = (p0, p1, p2, p3)$ is a detected orientation.
  $h = (h0, h1, h2, h3)$ is a home reference orientation.
  $p' = (p0', p1', p2', p3')$ is a transformed orientation.

Although various implementations and operations of the relocatable translator 134 of the controller device 100 have been disclosed, such apparatus and operations may not be wholly exclusive to the controller device 100. For in some embodiments, the operations that enable the controller device 100 to be arbitrarily relocatable in 3D ambient space 302 may be shared among multiple devices and appliances of the play system 300. For example, in some embodiments, the relocatable translator 134 of the controller device 100 (in FIG. 3)—and further—a relocatable translator 234 of the display appliance 200 (in FIG. 5) may share operations such that the controller device 100 may be enabled to be arbitrarily relocatable in 3D ambient space 302. Or alternatively, in some embodiments, the relocatable translator 134 of the controller device 100 may accomplish most or all of the operations such that the controller device 100 may be enabled to be arbitrarily relocatable in 3D ambient space 302. Or alternatively, in various embodiments, the relocatable translator 234 of the display appliance 200 may accomplish most or all of the operations such that the controller device 100 may be enabled to be arbitrarily relocatable in 3D ambient space 302. For further details, the reader may refer to the relocatable translator 234 of the display appliance 200 in FIG. 5 and other sections in this disclosure. Although various implementations and operations of the relocatable translator 134 have been disclosed, alternative implementations and operations of the relocatable translator 134 should be considered to be well within the scope of this disclosure.

In some embodiments, device 100 may comprise the gesture analyzer 137. The gesture analyzer 137 (e.g., in cooperation with the motion module 119), shown in FIG. 3 while referencing FIG. 1, may provide detection and analysis functionality of gesture movements of the controller device 100 within 3D ambient space 302. The gesture analyzer 137 may comprise computer instructions executable by the control unit 110. A gesture movement may be an identifiable pattern of movement of the controller device 100 and/or arbitrary physical object 250 within 3D ambient space. Whereby, in some embodiments of a play system, one or more gesture movements may be detected by a controller device, wherein the play system and controller device responds accordingly, such at least in part controlling one or more virtual objects, sound effects, and mechanical effects on a display appliance based at least in part on the one or more gesture movements.

In various embodiments, a gesture movement or gesture type may be, but not limited to, a double tap gesture (e.g., wherein the controller device 100 is double-tapped by a user finger or hand), a single tap gesture (e.g., wherein the controller device 100 is single tapped by a user finger or hand), a spin gesture (e.g., wherein the controller device 100 is rotated at least 180 degrees on a spatial axis by a user), a freefall gesture (e.g., wherein the controller device 100 is dropped, by a user, and is in freefall), a throw gesture (e.g., wherein the controller device 100 is thrown into the air by a user), a shake gesture (e.g., wherein the controller device 100 is shaken by a user), a pick up gesture (e.g., wherein the controller device 100 is picked up from a non-moving surface by a user), a putdown gesture (e.g., wherein the controller device 100 is placed on a non-moving surface), a bump gesture (e.g., wherein the controller device bumps or makes physical contact with a physical object), a human walking gesture (e.g., wherein a user is walking in place or across a surface), a human running gesture (e.g., wherein a user is running in place or running across a surface), a human jumping gesture (e.g., wherein a user jumps from a surface, into the air, and free-falls back to the surface), a toy walking gesture (e.g., wherein a toy character is moved up and down transverse to travel movement along a surface, simulating walking), a toy takeoff gesture (e.g., a toy plane is lifted above a surface), and/or a toy landing gesture (e.g., a toy play is moved and descends to a surface). Such gesture movements and gesture types will be discussed in greater detail throughout this disclosure.

In some embodiments, the gesture analyzer 137 may be configured with the functionality of a pedometer, enabled to detect one or more gesture movements of a user walking or user running. That is, the controller device 100, control unit 110, and gesture analyzer 137 may be enabled to detect a gesture movement, of a human walking gesture or human running gesture, based on the movement of a user that is holding or wearing the controller device 100 attached to or at least partially contained in the arbitrary physical object 250. Further, the controller device 100, control unit 110, and gesture analyzer 137 may determine, but not limited to, a speed, direction, number of steps, and/or spatial distance traveled by a user that is holding or wearing the controller device 100 attached to or at least partially contained in the arbitrary physical object 250 based on the gesture movement detected.

In some embodiments, the play system 300, device 100, control unit 110, and gesture analyzer 137 (e.g., in cooperation with the motion module 119) may be enabled to detect a combined gesture movement of a first controller device with a second controller device. Combined gesture movement may be based on, but not limited to, first and second spatial features, of the first and second controller devices, are similar and coincident in time, and/or in close proximity in 3D ambient space. For general information about "close proximity," the reader may refer to the collision analyzer 238 (in FIG. 5) and elsewhere in this disclosure.

In some embodiments, the play system 300, device 100, control unit 110, and gesture analyzer 137 (e.g., in cooperation with the motion module 119) may be enabled to detect a gesture movement, gesture type, gesture location, gesture orientation, gesture translational velocity, gesture direction, gesture translational speed, gesture rotational velocity, gesture rotational direction (e.g., counter clockwise or clockwise), gesture rotational speed, and/or gesture timestamp of the controller device 100 and/or an arbitrary physical object 250 in the 3D ambient space 302 of the play system. Gesture translational velocity refers to the translational velocity of a gesture movement in 3D ambient space. Gesture rotational velocity refers to the rotational velocity of a gesture movement in 3D ambient space.

In some embodiments, device 100 may comprise the collision analyzer 138. The collision analyzer 138, shown in FIG. 3 while referencing FIG. 1, may provide detection and analysis functionality for, but not limited to, an at least indirect collisions of the controller device 100 (connected to arbitrary physical object 250) with another controller device 101 or another arbitrary physical object 252 in 3D ambient space. Further, in some embodiments, the collision analyzer 138 may detect a close proximity of the controller device 100 (connected to arbitrary physical object 250) with another controller device 101 or another arbitrary physical object 252 in 3D ambient space. The collision analyzer 138 may comprise computer instructions executable by the control unit 110.

For example, in some embodiments, the play system 300, device 100, control unit 110, and collision analyzer 138 (e.g., in cooperation with the motion module 119) may be enabled to detect an at least indirect collision of a first controller device 100 and a first arbitrary physical object 250 with a second controller device 101 and a second arbitrary physical object 251 within 3D ambient space 302.

Further, in various embodiments, the play system 300, device 100, control unit 110, and collision analyzer 138 (e.g., in cooperation with the motion module 119) may be enabled to detect an at least indirect collision of a first controller device 100 and a first arbitrary physical object 250 with a second arbitrary physical object 252 (e.g., such as a floor or wall that is not connected to a controller device) or a third arbitrary physical object within 3D ambient space 302.

In some embodiments, the play system 300, device 100, control unit 110, and collision analyzer 138 (e.g., in cooperation with the motion module 119) may be enabled to detect an at least indirect collision of a first controller device with a second controller device, a second arbitrary physical object, or a third arbitrary physical object based at least in part on detecting a spatial feature of the first controller device. Such spatial feature may include, but not limited to, close proximity, movement, and/or acceleration in 3D ambient space.

For example, in some methods of operations, detecting an at least indirect collision between two controller devices may be based at least in part on, but not limited to: 1) a first movement (e.g., acceleration, translational movement) of a first controller device that substantially coincides in time a second movement (e.g., acceleration, translational movement) of a second controller device in 3D ambient space; 2) a collision of 3D meshes (e.g., 3D voxels, 3D models, or 3D point clouds based on associated virtual objects, etc.) of the first controller device and the second controller device in 3D ambient space; 3) and/or a close proximity of the first controller device with the second controller device in 3D ambient space, although alternative methods may be considered as well. Further, in some methods of operations, detecting an at least indirect collision between a controller device and an arbitrary physical object may be based at least in part on, but not limited to: 1) a first movement (e.g., acceleration, translational movement) of a first controller device followed in time by no movement (e.g., where there is no acceleration or velocity) of the first controller device in 3D ambient space, although alternative methods may be considered as well.

In some embodiments, the play system 300, device 100, control unit 110, and collision analyzer 138 may be enabled to detect a close proximity of a first controller device with a second controller device or a second arbitrary physical object based on detecting spatial features of the controller device(s). Such spatial features may include, but not limited to, close proximity, movement, and/or acceleration in 3D ambient space. For general information about "close proximity," the reader may refer to the collision analyzer 238 (in FIG. 5) and elsewhere in this disclosure.

In some embodiments, the play system 300, device 100, control unit 110, and collision analyzer 138 (e.g., in cooperation with the motion module 119) may be enabled to detect and analyze a close proximity event, collision event, collision orientation, collision location, collision velocity, collision speed, collision direction, collision acceleration, and/or collision timestamp of the first controller device 100 and the first arbitrary physical object 250 with the second controller device 101 and the second arbitrary physical object 251 within the 3D ambient space of the play system 300.

In some embodiments, device 100 may comprise the imaginary object analyzer 139. The imaginary object analyzer 139, shown in FIG. 3 while referencing FIG. 1, may provide imaginary object detection, launching, collision, and analysis functionality for the controller device 100. The imaginary object analyzer 139 may comprise computer instructions executable by the control unit 110. In some embodiments, the play system 300, device 100, control unit 110, and imaginary object analyzer 139 (e.g., in cooperation with the light emitters 158E and 159E, motion module 119, and communication module 118) may be enabled to launch one or more imaginary objects 270 from the controller device 100 and an arbitrary physical object 250 into the 3D ambient space 302, and/or emit one or more modulated lights into the 3D ambient space 302 of the play system 300.

Further, in some embodiments, the play system 300, device 100, control unity 110, and imaginary object analyzer 139 (e.g., in cooperation with the motion module 119, and communication module 118) may be enabled to detect a close proximity of the controller device 100 with an imaginary object within the 3D ambient space 302 (and/or virtual space 204). For general information about "close proximity," the reader may refer to the collision analyzer 238 (in FIG. 5) and elsewhere in this disclosure.

In various embodiments, the play system 300, device 100, control unit 110, and imaginary object analyzer 139 (e.g., in cooperation with the motion module 119, and communication module 118) may be enabled to detect an at least indirect collision of the controller device 100 and an arbitrary physical object 250 with an imaginary object 270 within the 3D ambient space 302 (and/or virtual space 204).

In various embodiments, the play system 300, device 100, control unit 110, and imaginary object analyzer 139 (e.g., in cooperation with the light sensors 158S and 159S) may be enabled to detect a modulated (infrared, visible, or ultraviolet) light within the 3D ambient space 302.

In some embodiments, the play system 300, device 100, control unit 110, and imaginary object analyzer 139 (e.g., in cooperation with the light sensors 158S and 159S, motion module 119, and communication module 118) may be enabled to detect an at least indirect collision of the controller device 100 and an arbitrary physical object 250 with an imaginary object 270 within the 3D ambient space based at least in part on detecting a modulated (infrared, visible, or ultraviolet) light within the 3D ambient space 302.

For example, in various embodiments, detecting an at least indirect collision of a controller device with an imaginary object may be based at least in part on, but not limited to: 1) a first movement of the controller device that substantially coincides in time with a second movement of the imaginary object; 2) a collision of meshes (e.g., voxels, models, or point clouds) of the controller device and the imaginary object in 3D ambient space and/or 3D virtual space; and/or 3) a close proximity of the controller device with the imaginary object in 3D ambient space and/or 3D virtual space.

In some embodiments, the play system 300, device 100, control unit 110, and imaginary object analyzer 139 (e.g., in cooperation with the light sensors 158S and 159S, motion module 119, and communication module 118) may be enabled to detect one or more imaginary object locations, imaginary object orientations, imaginary object accelerations, imaginary object velocities, imaginary object speeds, imaginary object directions, imaginary object collision events, imaginary object close proximity events, imaginary object launch events, and/or imaginary object timestamps of one or more imaginary objects 270 in the 3D ambient space 302 (and/or virtual space 204) of the play system 300.

In some embodiments, device 100 may comprise the virtual object description database 126. The virtual object description database 126, shown in FIG. 3 while referencing FIG. 1, may provide read/write virtual object description data storage functionality for the controller device 100, such that the controller device 100 can retain data related to one or more virtual objects. The database 126 may comprise data and computer instructions executable by the control unit 110. For example, the virtual object description database 126 may comprise one or more virtual object description data, comprising data and/or computer instructions, related to one or more virtual objects. In some embodiments, the controller device 100 and virtual object description database 126 may comprise at least one virtual object description data comprising at least a virtual object identifier that identifies a virtual object 260 on the display appliance 200, wherein the virtual object 260 may be associated with the controller device 100. In various embodiments, the controller device 100 and virtual object description database 126 may comprise at least one virtual object description data comprising a plurality of virtual object identifiers that identifies a virtual object 260 and one or more support virtual objects on the display appliance 200, wherein the virtual object 260 and the one or more support virtual objects may be associated with the controller device 100.

Moreover, the virtual object description database 126, shown in FIG. 3 while referencing FIG. 1, may be enabled to read (via the control unit 110) one or more virtual object description data from the database 126 and process accordingly. And the virtual object description database 126 may be enabled to write or store (via the control unit 110) one or more virtual object description data to the database 126 for future reference. For example, in the current embodiment, the virtual object description database 126 may be located in memory 120 that may comprise non-transitory computer-readable storage media, such that the stored one or more virtual object description data may endure, for example, for many months in duration even when the play system and controller device 100 are inoperable. For example, shown in FIG. 3 while referencing FIG. 1, the play system 300, controller device 100, control unit 110, and the virtual object description database 126 may store (write) and read a virtual object description data and/or signals related to a virtual object associated with the controller device 100.

In some embodiments, the controller device 100 (in cooperation with the control unit 110, communication module 118, and virtual object description database 126) may be enabled to communicatively receive at least a portion of a virtual object description data from a display appliance (such as appliance 200 of FIG. 1) or from another controller device within a play system, and respond accordingly, wherein the controller device 100 stores at least a portion of the virtual object description data in the virtual object description database 126, wherein at least a portion of the virtual object description data identifies one or more virtual objects that is associated with the controller device 100.

In various embodiments, the controller device 100 (in cooperation with the control unit 110, communication module 118, and virtual object description database 126) may be enabled to read at least portion of a virtual object description data from the virtual object description database 126, and accordingly respond, wherein the controller device 100 is enabled to communicatively transmit at least a portion of the virtual object description data to a display appliance (such as appliance 200 of FIG. 1) or another controller device within a play system, and the controller device 100 is at least in part controlling a virtual object on the display appliance, wherein at least a portion of the virtual object description data identifies one or more virtual objects on the display appliance.

For further details of a "virtual object description data," the reader may refer to the subsequent section "Virtual Object Description Data stored in Virtual Object Description Database" and elsewhere in this disclosure.

Controller Device Including Computing Datasets

FIG. 3 also shows data storage 140 comprising various collections of computer readable/writable datasets, such as, but not limited to, a controller dataset 123, a motion dataset 141, a signal dataset 142, a relocatable dataset 144, a gesture dataset 147, a collision dataset 148, and an imaginary object dataset 149. These datasets may be implemented in software, firmware, and/or hardware. In the current embodiment, these datasets may be implemented in data storage 140, which may be read from and/or written to (or modified) by control unit 110.

Controller dataset 123, shown in FIG. 3 while referencing FIG. 1, may represent application data (e.g., from controller application 122) and comprise, but not limited to, audio signal data, and/or mechanical signal data for the controller device 100 within the 3D ambient space 302 of the play system 300.

Motion dataset 141, shown in FIG. 3 while referencing FIG. 1, may represent spatial/temporal data (e.g., from motion analyzer 131) and comprise, but not limited to, one or more accelerations, translational velocities, translational directions, translational speeds, rotational velocities, rotational speeds, rotational directions, altitudes, locations, orientations, movement timestamps, and/or movement events of controller device 100 and/or arbitrary physical object 250 within the 3D ambient space 302 of the play system 300.

Signal dataset 142, shown in FIG. 3 while referencing FIG. 1, may represent received signal strength indicator (RSSI) value data (e.g., from signal analyzer 132) and comprising, but not limited to, one or more received signal strength indicator values detected during wireless communication or received from one or more controller devices 101, display appliances 200, and/or other appliances within the 3D ambient space 302 of the play system 300.

Relocatable dataset 144, shown in FIG. 3 while referencing FIG. 1, may comprise spatial relocation data (e.g., from relocatable translator 134) such that the controller device 100 may be enabled to be arbitrarily relocatable within the 3D ambient space 302. In some embodiments, the relocatable dataset 144 may be computationally determined (e.g., via the relocatable translator 134) during spatial calibration of the relocatable translator 134 of the controller device 100 within 3D ambient space 302. Subsequently, in some embodiments, the relocatable dataset 144 may be used to computationally transform, for example, a spatial feature—(e.g., movement, orientation, location, altitude, direction, and/or speed) in local-coordinates of the controller device 100 and/or an arbitrary physical object 250—into system-wide coordinates such that the controller device 100 may be arbitrarily relocatable in 3D ambient space 302 of the play system 300. For example, FIG. 9D shows an exemplary embodiment of a relocatable dataset D400 that may comprise home reference data D410 that includes, but not limited to, a device identifier D411, a virtual object identifier D412, a home reference location D413, and a home reference orientation D414.

Gesture dataset 147, shown in FIG. 3 while referencing FIG. 1, may represent gesture data (e.g., from gesture analyzer 137) and comprise, but not limited to, one or more gesture detection events, gesture timestamps (e.g., time clock values when gestures occurred), gesture orientations, gesture locations, gesture velocities, gesture directions, gesture speeds, and/or gesture types of the controller device 100 and/or an arbitrary physical object 250 within the 3D ambient space 302 of the play system 300.

Collision dataset 148, shown in FIG. 3 while referencing FIG. 1, may represent collision event data (e.g., from collision analyzer 138) and comprise, but not limited to, one or more collision detection events, collision timestamps (e.g., timeclock values when collisions occurred), collision orientations, collision locations, collision velocities, collision speeds, and/or collision directions of the controller device 100 and/or an arbitrary physical object 250 within the 3D ambient space 302 of the play system 300.

Imaginary object dataset 149, shown in FIG. 3 while referencing FIG. 1, may represent imaginary object event data (e.g., from imaginary object analyzer 139) and comprise, but not limited to, one or more imaginary object launch events, imaginary object timestamps (e.g., timeclock values when imaginary objects are launched), imaginary object orientations, imaginary object locations, imaginary object accelerations, imaginary object velocities, imaginary object speeds, imaginary object directions, and/or imaginary object collision events of the controller device 100, arbitrary physical object 250, and/or one or more imaginary objects 270 within the 3D ambient space 302 of the play system 300.

Display Appliance in the Play System

Figure 4:
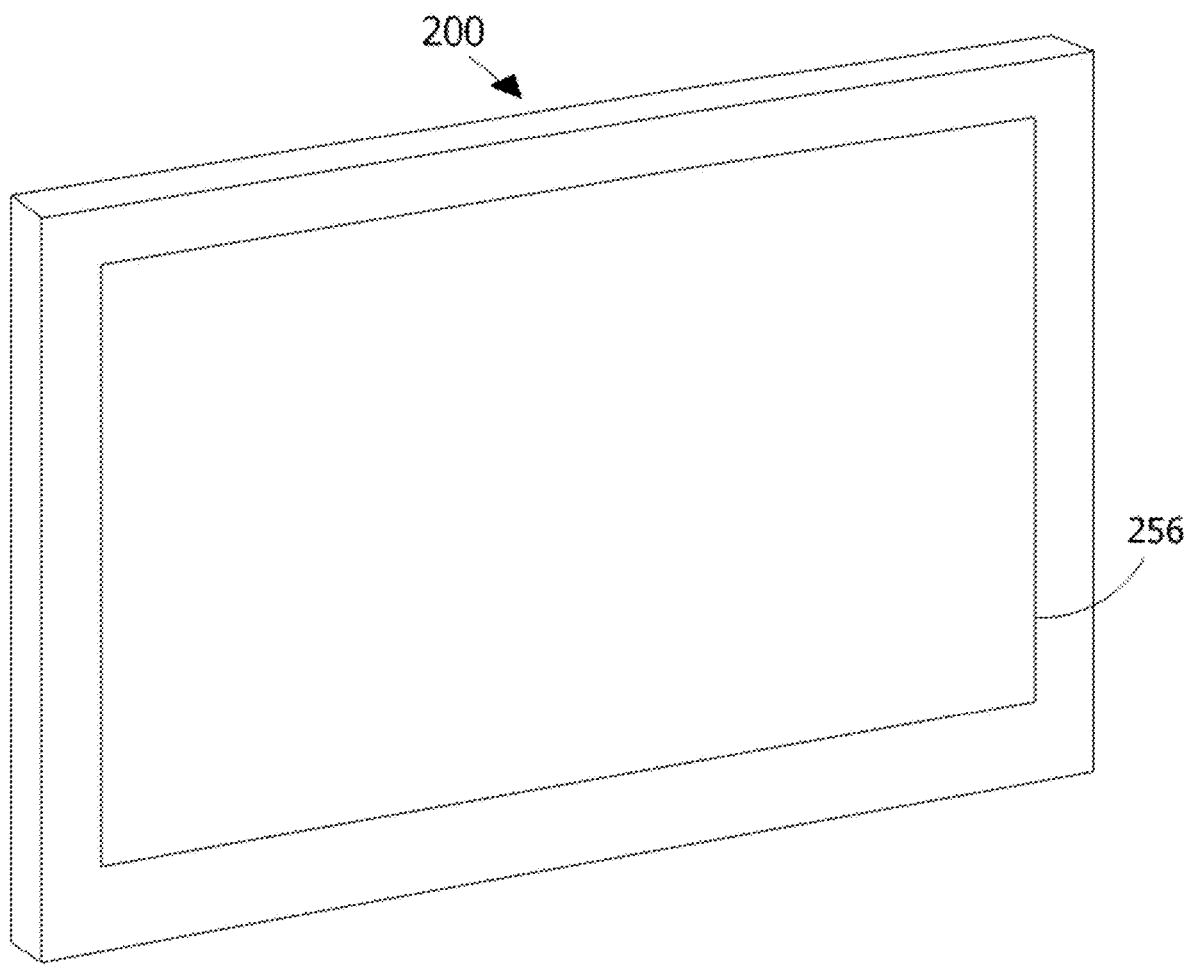
FIG. 4 is a perspective view for the play system of FIG. 1, of a display appliance.

Turning now to FIG. 4, a perspective view of a display appliance 200 for the play system 300 (of FIG. 1) is given. The display appliance 200 may be any type of electronic display appliance 200, including at least one video display 256, for potential viewing by one or more users. For example, the display appliance 200 may be a mobile appliance or a non-mobile appliance or system. Wherein, the display appliance 200 may be a smartphone, a cellular phone, a tablet computer, a smartwatch, an electronic watch, a handheld game device, a laptop computer, a virtual reality (VR) headset, an augmented reality (AR) headset, a sports implement, a music player, a toy comprising a video display, a desktop monitor, a television display, a game console system comprising a video display, or any other type of appliance or system comprising at least one video display 256 for viewing of an image, animated sequence of images, or video by a user/player. In the current embodiment, the display appliance 200 may be a mobile appliance, such as a smartphone or tablet computer.

Display Appliance Including Components

Figure 5:
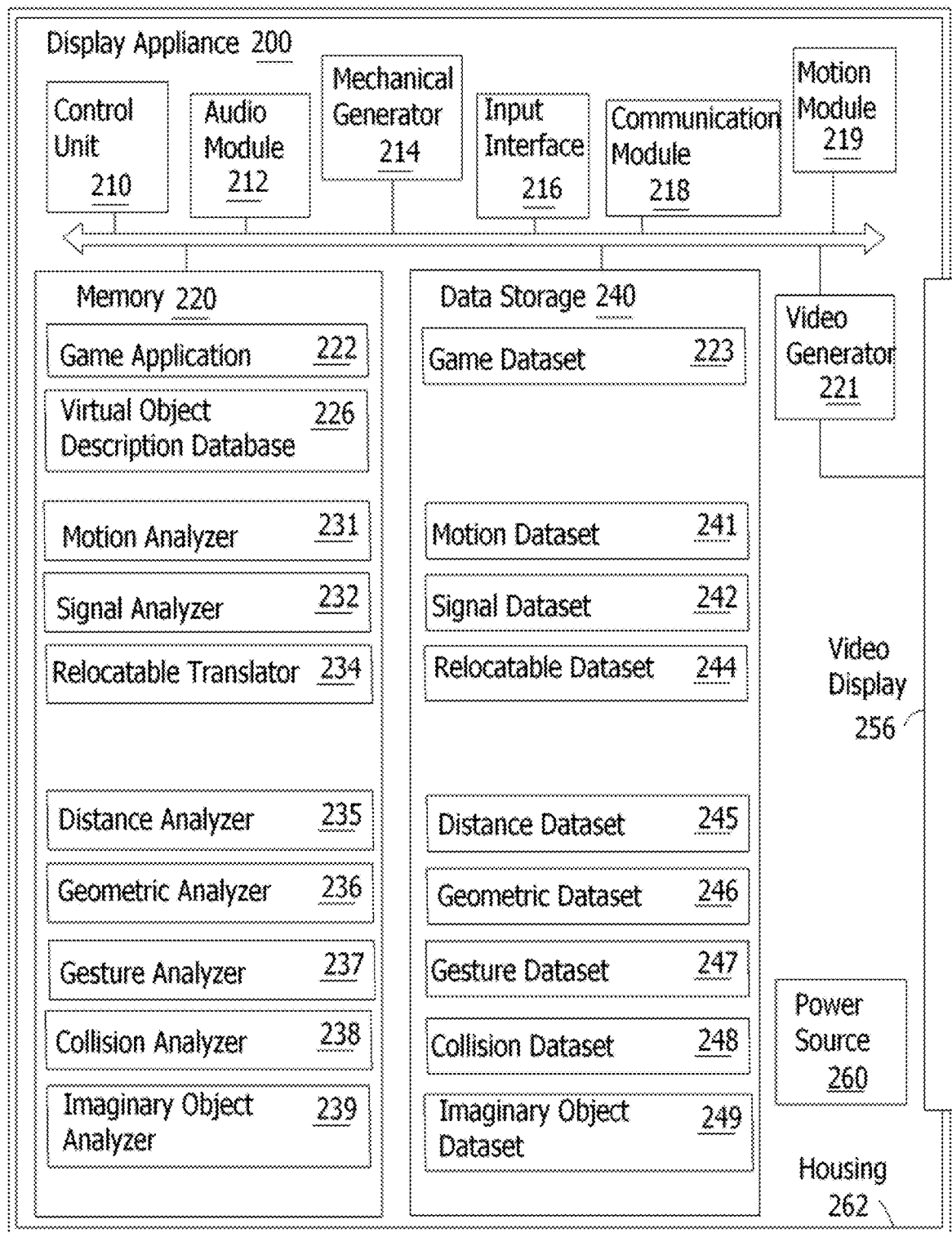
FIG. 5 is a block diagram for the play system of FIG. 1, of a display appliance, with components of the display appliance.

Turning now to FIG. 5, a detailed block diagram is presented with various components of the display appliance 200, which may comprise, but not limited to, a housing 262, a control unit 210, an audio module 212, a mechanical generator 214, a input interface 216, a communication module 218, a motion module 219, video generator 221, the video display 256, a memory 220, a data storage 240, and a power source 260.

The control unit 210, shown in FIG. 5 while referencing FIG. 1, may provide, but not limited to, computing capability for the display appliance 200. Wherein control unit 210 may comprise, for example, of one or more processors having appreciable processing speed (e.g., 1 GHz and faster) to execute computer instructions. In some embodiments, a display appliance may comprise one or more control units 210 configured to execute computer instructions. Control unit 210 may include one or more processors that are general-purpose and/or special purpose (e.g., microprocessor, microcontroller, System-on-a-Chip module, Bluetooth Low Energy module, Bluetooth module, Bluetooth Low Energy transceiver, Bluetooth transceiver, Wi-Fi module, Wi-Fi transceiver, ZigBee transceiver, and/or graphic processors) supported by one or more executable programs contained in a computer readable storage media, such as memory 220. The control unit 210 may be operatively coupled to, but not limited to, audio module 212, input interface 216, communication module 218, motion module 219, video generator 221, memory 220, and data storage 240.

The memory 220, shown in FIG. 5 while referencing FIG. 1, may comprise computer readable medium, which may contain, but not limited to, computer instructions and/or data. Memory 220 may be operatively coupled to control unit 210 such that control unit 210, for example, may execute the computer instructions. In the some embodiments, memory 220 may comprise one or more non-transitory computer-readable storage media configured with computer instructions and/or data. Memory 220 may comprise RAM, ROM, Flash, Secure Digital (SD) card, and/or hard drive, although other types of memory in whole, part, or combination may be used, including fixed and/or removable memory, volatile and/or nonvolatile memory.

Data storage 240, shown in FIG. 5 while referencing FIG. 1, may comprise computer readable medium, which may contain, but not limited to, computer related data. Data storage 240 may be operatively coupled to control unit 210 such that control unit 210, for example, may read data from and/or write data to data storage 240. Storage 240 may comprise RAM, ROM, Flash, Secure Digital (SD) card, and/or hard drive, although other types of memory in whole, part, or combination may be used, including fixed and/or removable, volatile and/or nonvolatile memory. Although memory 220 and data storage 240 are presented as separate components, some embodiments of the display appliance may use an integrated memory architecture, where memory 220 and data storage 240 may be wholly or partially integrated. In some embodiments, memory 220 and/or data storage 240 may be wholly or partially integrated with control unit 210.

Although an architecture to connect components of the display appliance 200 has been presented, alternative embodiments may rely on alternative bus, network, and/or hardware architectures. For example, although control unit 210 and communication module 218 are presented as separate components, some embodiments of the device may use an integrated "System on a Chip" architecture, where control unit 210, communication module 218, memory 220, data storage 240, and other components are wholly or partially integrated. Whereby in some embodiments, a controller device may have control unit 210, communication module 218, memory 220, and data storage 240 wholly integrated into a Bluetooth Low Energy module, Bluetooth module, Bluetooth Low Energy transceiver, RF module, Wi-Fi module, or Wi-Fi transceiver.

In some embodiments, appliance 200 may comprise the communication module 218. The communication module 218, shown in FIG. 5 while referencing FIG. 1, may provide, but not limited to, wireless and/or wired communication abilities for the display appliance 200. Whereby, communication module 218 may be operatively coupled to control unit 210 such that such that the display appliance 200, control unit 210, and communication module 218, for example, may detect, receive, and/or transmit communication signals and/or data with one or more controller devices 100 and 101 (in FIG. 1), other display appliances, other types of devices within the play system, and/or one or more computer networks 299 (in FIG. 1). For example, a plurality of play systems may communicate, via the display appliance 200 and the communication module 218, using the computer network 299 comprised of, but not limited to, an intranet, an extranet, a portion of the Internet, a cellular network, a data network, a satellite network, a virtual private network (VPN), a local area network (LAN), a wireless LAN (WLAN), a wide area network (WAN), a personal area network (PAN), a portion of the Public Switched Telephone Network (PSTN), or any combination thereof.

The communication module 218 may comprise, but not limited to, a wireless transceiver, data transceivers, processors, codecs, and/or antennae, as illustrative examples. For wireless communication, communication module 218 may comprise one or more wireless data or signal transceivers, such as, but not limited to, a Bluetooth Low Energy transceiver, a Bluetooth Low Energy communication module, a Bluetooth transceiver, a Wi-Fi transceiver, Wi-Fi communication module, a Radio Frequency Identification (RFID) transceiver, a RFID receiver, a IrDA infrared light transceiver, optical light transceiver, and/or any other type of wireless communication device. Whereby, in some embodiments, the display appliance 200 and communication module 218 may be configured to wirelessly communicate with, but not limited to, other controller devices, display appliances, arbitrary physical objects, electronic toys, and/or mobile appliances capable of receiving and/or transmitting wireless signals or data in the play system. Further, in some embodiments, the display appliance 200 and communication module 218 may be capable of receiving and/or transmitting signals or data with the computer network 299 (in FIG. 1, e.g., wideband network, cloud network, etc.), which may comprise one or more remote play systems comprising, but not limited to, remote controller devices, remote display appliances, and other remote devices. During wireless communication, module 218 may use modulated electromagnetic waves of one or more frequencies (e.g., RF, infrared, etc.) and/or modulated audio waves of one or more frequencies (e.g., ultrasonic, etc.). In some embodiments, module 218 may transmit and receive encrypted signals or data. In some embodiments, for wired communication, module 218 may provide one or more wired interface ports (e.g., universal serial bus (USB) port, a video port, a serial connection port, an IEEE-1394 port, an Ethernet or modem port, and/or an AC/DC power connection port). Module 218 may, for example, use one or more wired and/or wireless communication protocols (e.g., TCP/IP, Wi-Fi, ZigBee, Bluetooth Low Energy, Bluetooth, Wireless USB, Ethernet, Wireless Home Digital Interface (WHDI), Near Field Communication, and/or cellular telephone protocol).

In various embodiments, shown in FIG. 5 while referencing FIG. 1 and FIGS. 9B and 9C, the display appliance 200, control unit 210, and communication module 218 may be configured to transmit a control data, such as a control data D200 (shown in FIG. 9C), comprising information or data, to a controller device 100, another display appliance, and/or other type of device in the play system 300. In various embodiments, the display appliance 200, control unit 210, and communication module 218 may be configured to receive or detect one or more control data, such as a control data D100 (shown in FIG. 9B) from a controller device 100, another display appliance, and/or other type of device in the play system 300. For details related to a control data, the reader may refer to sections "Control Data transmitted by Controller Device to Display Appliance," "Control Data transmitted by Display Appliance to Controller Device," and other sections disclosed herein.

In some embodiments, the display appliance 200, control unit 210 and communication module 218 may receive or detect a control data D100 (in FIG. 9B) comprising a device identifier D111, which may identify a controller device (such as device 100 of FIG. 1), another display appliance, or other device within the play system 300. In various embodiments, a received control data D100 (in FIG. 9B) may comprise a virtual object identifier data D121 (in FIG. 9B), which may identify a virtual object in the play system. In some embodiments, a received control data D100 (in FIG. 9B) may comprise a plurality of virtual object identifiers, such as virtual object identifier D121 and one or more support virtual object identifiers D124, which may identify a plurality of virtual objects in the play system.

In some embodiments, the display appliance 200, control unit 210 and communication module 218 may transmit a control data D200 (in FIG. 9C) comprising a device identifier D211, which may identify a display appliance (such as appliance 200 of FIG. 1), controller device, or other device within the play system 300. In various embodiments, a transmitted control data D200 (in FIG. 9C) may comprise a virtual object identifier data D221, which may identify a virtual object in the play system. In some embodiments, a transmitted control data D200 (in FIG. 9C) may comprise a plurality of virtual object identifiers, such as virtual object identifier D221 and one or more support virtual object identifiers D224, which identify a plurality of virtual objects in the play system.

In various embodiments, the display appliance 200, communication module 218, and control unit 210 may detect or receive a Received Signal Strength Indicator (RSSI) value, Time of Flight (TOF) value, and/or Time of Arrival (TOA) value upon receiving a wireless signal or data from a controller device, a display appliance, or other type of device within the play system. The functionality for detecting a RSSI value, TOS value, and/or TOA value may be built into or retrieved from one or more wireless transceivers, such as a Bluetooth Low Energy module, Bluetooth Low Energy transceiver, or RF transceiver, as examples. For sake of discussion, the RSSI value typically represents, but not limited to, a numerical quantity (e.g., where RSSI value=−250 to 0) that is related to the signal strength of a received signal or data from another device or appliance. Whereby, the play system 300 (of FIG. 1) may be configured to communicate and utilize a plurality of detected RSSI values from a plurality of controller devices (such as between devices 100 and 101), and between one or more devices and display appliances (such as between device 100 and appliance 200), and between one or more display appliances (such as between display appliance 200 and another display appliance) within the 3D ambient space of the play system. Further, in some embodiments, wireless transceivers, such as a Bluetooth transceiver or Wi-Fi transceiver, may provide angle of arrival (AoA) information, such that spatial angles, of received wireless signals, may be determined by the communication module 218 and control unit 210 of appliance 200. In various embodiments, wireless transceivers, such as a Bluetooth transceiver or Wi-Fi transceiver, may provide Time of Flight (TOF) or Time of Arrival (AoA) information, of received wireless signals, such that time durations and time events may be determined by the communication module 218 and control unit 210 of appliance 200.

In some embodiments, appliance 200 may comprise the motion module 219. The motion module 219, shown in FIG. 5 while referencing FIG. 1, may provide, but not limited to, movement, inertial, and/or spatial feature detection functionality for the display appliance 200. Wherein, motion module 219 may comprise one or more of, but not limited to, accelerometers, tilt sensors, reed switches, vibration sensors, proximity sensors, magnetometers (e.g., electronic compass), angular rate sensors, gyroscopes, radar sensors, radar transceivers, geolocation sensors, global positioning system (GPS) receivers, altitude sensors, audio sensors, microphones, pressure sensors, barometric sensors, spatial distance sensors, speed sensors, temperature sensors, light detect sensors, cameras, image sensors, tracking sensors, electric field sensors, magnetic field sensors, Wi-Fi transceivers with received signal strength indicator sensing, Bluetooth Low Energy transceivers with received signal strength indicator sensing, Radio Frequency Identification (RFID) receiver, RFID transceiver, and/or any other device that receives or detects inertial, motion, or spatial related information.

Moreover, the motion module 219 may be operatively coupled to control unit 210 such that the play system 300, appliance 200, control unit 210, and motion module 219 may detect one or more spatial features of the display appliance 200 within the 3D ambient space 302 of the play system 300. For example, the play system 300, appliance 200, control unit 210, and motion module 219 may be configured to detect a spatial feature (e.g., movement, orientation, location, altitude, direction, and/or speed, etc.) of the display appliance 200 within the 3D ambient space 302 of the play system 300.

Moreover, in various embodiments, the display appliance 200, control unit 210, and motion module 219 may detect a spatial feature of the display appliance 200, such as a movement of the display appliance 200 within 3D ambient space of the play system. For example, the display appliance 200, control unit 210, and motion module 219 may detect a translational movement of the appliance 200 within 3D ambient space 302 in the play system 300. Or in another example, the display appliance 200, control unit 210, and motion module 219 may detect an orientation of the display appliance 200 within 3D ambient space 302 of the play system 300. Or in another example, the display appliance 200, control unit 210, and motion module 219 may detect a rotational movement of the display appliance 200 within 3D ambient space 302 of the play system 300.

Whereupon, various embodiments of a control data may comprise information related to a spatial feature (e.g., movement, orientation, location, velocity, altitude, direction, and/or speed, etc.) of the display appliance 200 within 3D ambient space 302 of the play system 300. For details related to a "control data", the reader may refer to sections "Control Data transmitted by Controller Device to Display Appliance," "Control Data transmitted by Display Appliance to Controller Device," and other sections disclosed herein. For details related to a "spatial feature," the reader may refer to the section "Controller Device and its Components" that discusses the motion module 119 in FIG. 3 and elsewhere in this disclosure.

In some embodiments, appliance 200 may comprise the input interface 216. The input interface 216, shown in FIG. 5 while referencing FIG. 1, may provide a means for a user input and/or computer-controlled input to the display appliance 200. Input interface 216 may comprise, but not limited to, one or more control buttons, keypads, touch pads, touch screens, rotating dials, trackballs, touch-sensitive displays, and/or hand gesture-sensitive devices. Wherein, the input interface 216 may be configured to generate one or more user input signals when a user actuates (e.g., presses, touches, taps, or hand gestures) the input interface 216. And for example, the input interface 216 may be operatively coupled to control unit 210 such that play system 300 and control unit 210 may receive one or more user input signals from the input interface 216, and respond accordingly, such as selecting one or more virtual objects 260 on the display appliance 200 of the play system 300.

Further, in some alternate embodiments or in combination with the current embodiment, input interface 216 may comprise, but not limited to, one or more image sensors, optical cameras, RFID readers, electric field sensors, magnetic field sensors, and/or other types of sensing elements. Wherein, the input interface 216 and control unit 210 may be configured to generate one or more computer-controlled input signals when the display appliance 200 and control unit 210 operate the input interface 216. For example, the input interface 216 may be operatively coupled to control unit 210 such that play system 300, display appliance 200, and control unit 210 may receive one or more computer-controlled input signals from the input interface 216, and respond accordingly, such as automatically selecting one or more virtual objects 260 on the display appliance 200 of the play system 300 based at least in part on the computer-controlled input from the display appliance 200. Computer-controlled input may be based at least in part, but not limited to, computer vision analysis, RFID detection, machine learning, artificial intelligence, signal detection, and/or other types of sensing and analysis of an arbitrary physical object or physical environment within a 3D ambient space.

In some embodiments, appliance 200 may comprise the audio module 212. The audio module 212, shown in FIG. 5 while referencing FIG. 1, may provide one or more audio inputs, audio outputs, audio stream analysis, and/or generated sound effects for the display appliance 200. Wherein, audio module 212 may comprise, but not limited to, one or more audio processors, audio codecs, audio microphones, input audio sensors, speech natural language processors, automatic speech recognition processors, audio synthesizers, audio signal amplifiers, sound generating elements (e.g., loudspeakers), and/or any other audio related devices. Audio module 212 may be operatively coupled to control unit 210 such that the play system 300, appliance 200, memory 220, control unit 210, and audio module 212 may respond to an event within the play system 300. For example, in FIGS. 1 and 5, appliance 200, memory 220, and control unit 210 may be configured to receive, via the communication module 218, a control data comprising information of a movement of the controller device 100 and an arbitrary physical object 250 in a 3D ambient space 302, and respond accordingly, such that the display appliance 200, via the audio module 212, generates one or more sound effects based at least in part on the movement of the controller device 100 and the arbitrary physical object within 3D ambient space 302. In some embodiments, the display appliance 200 may comprise a speech natural language processor and audio microphone configured to input one or more human speech commands and/or human speech natural languages from a user or player. For example, in FIGS. 1 and 5, the appliance 200, memory 220, and control unit 210 may be configured for detecting the one or more human speech commands and/or human speech natural languages from a user, via the audio module 212, and respond accordingly, wherein the display appliance 200, via the audio module 212, generates one or more sound effects based at least in part on the one or more human speech commands and/or human speech natural languages from the user. Sound effects may comprise, but not limited to, one or more audio pre-recorded sounds, synthetically generated sounds, human speech command sounds, and/or human speech natural language sounds.

In some embodiments, appliance 200 may comprise the mechanical generator 214. The mechanical generator 214, shown in FIG. 5 while referencing FIG. 1, may generate mechanical signals and/or mechanical effects for the display appliance 200. Wherein, mechanical generator 214 may comprise, but not limited to, one or more vibratory or mechanical processors, codecs, ultrasound transducers, electric motors, solenoids, electromagnets, electrically operated mechanical latches, eccentric rotating mass actuators, linear actuators, air vortices generators, electrostatic actuators, tactile actuators, vibrators, electro-mechanical vibrators, and/or any other mechanical effect producing device. The display appliance 200, via the mechanical generator 214, may generate one or more mechanical effects comprising, but not limited to, vibratory movements, haptic movements, physical movements, mechanical movements, and/or mechanical rotations within a 3D ambient space in the play system 300. Mechanical generator 214 may be operatively coupled to control unit 210 such that the play system, control unit 210, and mechanical generator 214 may respond to an event within the play system. For example, while viewing FIGS. 1 and 5, the play system 300, display appliance 200, and control unit 210 may be configured to receive, via the communication module 218, a control data comprising information of a movement of a controller device 100 and arbitrary physical object 250, and respond accordingly, such as generating, via the mechanical generator 214, one or more mechanical effects based at least in part on the movement of the controller device 100 and arbitrary physical object 250 within the play system 300.

In some embodiments, appliance 200 may comprise the video generator 221. The video generator 221, shown in FIG. 5 while referencing FIG. 1, may provide video signal generation for the display appliance 200 and video display 256. Video generator 221 may be operatively coupled to the control unit 210. Wherein, the video generator 221 may comprise, but not limited to, graphic processors, graphic codecs, display controllers, video drivers, and/or video signal generators.

In some embodiments, appliance 200 may comprise the video display 256. The video display 256, shown in FIG. 5 while referencing FIG. 1, may provide electronic graphic display for the display appliance 200, which may be viewable by one or more users of the play system. Video display 256 may comprise, but not limited to, a liquid crystal display (LCD), organic light emitting diode (OLED) display, plasma display, 3D graphic display, or any other type of electronic graphic display. The video display 256 may be operatively coupled to the video generator 221, wherein the video display 256 may present 2D and/or 3D graphic content, such as one or more virtual objects on the display appliance 200, which may be viewed by one or more users of the play system. In some embodiments of a display appliance, the video display 256 may be a separate and remote component or device that is operatively connected (e.g., by wire cable or wireless) to an electronic console (e.g., game console, video appliance, etc.). In the current embodiment, the video display 256 is integrated with components of the display appliance 200.

Finally, in some embodiments, appliance 200 may comprise the power source 260. The power source 260, shown in FIG. 5 while referencing FIG. 1, may provide energy to one or more components of the display appliance 200. Power source 260 may comprise, for example, of a portable battery and/or a power cable coupled to an external power supply. In the current embodiment, power source 260 is a rechargeable battery.

Display Appliance Including Computing Modules

As depicted in FIG. 5, the memory 220 may comprise various computing modules—which may include computer instructions executable by one or more control units 210—comprising, but not limited to, a game application 222, a motion analyzer 231, a signal analyzer 232, a relocatable translator 234, a distance analyzer 235, a geometric analyzer 236, a gesture analyzer 237, a collision analyzer 238, an imaginary object analyzer 239, and a virtual object description database 226. Such modules may be implemented in software, firmware, and/or hardware. In the current embodiment, these modules may be implemented in memory 220 and executed by control unit 210. In some embodiments, memory 220 may be further comprising computer readable/writable media for data storage. In some embodiments, memory 220 may comprise non-transitory computer-readable storage media.

In some embodiments, appliance 200 may comprise the game application 222. The game application 222, shown in FIG. 5 while referencing FIG. 1, may comprise one or more program applications, such as, but not limited to, game, utility, and/or educational programs for the display appliance 200. The game application 222 may comprise computer instructions executable by the control unit 210. Wherein, the display appliance 200, control unit 210, and application 222 (e.g., in cooperation with the audio module 212 and mechanical generator 214) may be enabled to, but not limited to, execute computer instructions for operations for game rules, object interaction rules, and multimedia effects (e.g., images, video, 2D/3D graphic object models, audio data, and/or mechanical effects data). For example, the application 222 may support read/write operations of the control unit 210 with hardware components, such as, but not limited to, input interface 216, communication module 218, mechanical generator 214, audio module 212, and motion module 219. Application 222 may include a graphics library of virtual object graphic data for generating one or more virtual objects on the display appliance 200. Application 222 may include audio and mechanical data for generating audio and mechanical effects for one or more virtual objects on the display appliance 200. Application 222 may include a game engine with graphic rendering functionality. The display appliance 200, control unit 210, and application 222 may be enabled to, but not limited to, render computer graphics of one or more virtual objects in game dataset 223, in preparation for displaying one or more virtual objects on the display appliance 200.

In some embodiments, appliance 200 may comprise the motion analyzer 231. The motion analyzer 231, shown in FIG. 5 while referencing FIG. 1, may provide movement and spatial feature analysis functionality for the display appliance 200. The motion analyzer 231 may comprise computer instructions executable by the control unit 210. In some embodiments, the play system 300, display appliance 200, control unit 210, and motion analyzer 231 (e.g., in cooperation with the communication module 218) may be enabled to detect and analyze one or more control data comprising information of one or more spatial features (e.g., movement, orientation, location, altitude, direction, and/or speed), communicatively received from, but not limited to, one or more controller devices 100 and 101, other display appliances, and other devices of the play system 300. In some embodiments, the play system 300, display appliance 200, control unit 210, and motion analyzer 231 (e.g., in cooperation with the motion module 219) may be further enabled to detect and/or analyze a spatial feature (e.g., movement, orientation, location, altitude, direction, and/or speed) of the display appliance 200 within the 3D ambient space 302. For a description of a "spatial feature," the reader may refer to the motion module 119 in FIG. 3 and elsewhere in this disclosure.

In some embodiments, appliance 200 may comprise the signal analyzer 232, operable to analyze one or more wireless RF and/or optical signals based on signal strength, time of flight (TOA), time of arrival (TOA), angle of arrival (AOA), and other means. The signal analyzer 232 may comprise computer instructions executable by the control unit 210. For example, the signal analyzer 232 may provide received signal strength indicator (RSSI) analysis of one or more RSSI values for the display appliance 200. The received signal strength indicator may be a numeric value or magnitude (e.g., where RSSI=−120 to −10) that is related to the signal strength of a wirelessly received signal or data from a transmitting controller device, display appliance, or appliance within the play system. Whereby, the play system 300, display appliance 200, control unit 210, and signal analyzer 232 (e.g., in cooperation with the communication module 218) may be enabled to analyze one or more RSSI values communicatively received from or determined by, but not limited to, one or more controller devices 100 and 101, display appliances, and/or other devices within the 3D ambient space 302. For example, the play system, display appliance 200, control unit 210, and signal analyzer 232 may be enabled to detect and compute one or more unprocessed RSSI values, median RSSI values, and/or arithmetic average RSSI values of one or more received signal strength indicators. In some alternative embodiments, signal analyzer 132 may utilize time of flight (TOF), time of arrival (TOA), angle of arrival (AOA), and/or other types of signal analysis. Whereby, the play system 300, display appliance 200, control unit 210, and signal analyzer 232 (e.g., in cooperation with the communication module 218) may be enabled to analyze one or more time of flight signal values, time of arrival signal values, and/or angle of arrival values communicatively received from or determined by, but not limited to, one or more controller devices 100 and 101, display appliances, and/or other devices within the 3D ambient space 302 in the play system 300. In some embodiments, the signal analyzer 232 may comprise, but not limited to, digital filters and statistical functions to process RSSI values, TOF values, TOA values, and/or AOA values to optimize signal to noise ratios.

In some embodiments, appliance 200 may comprise the relocatable translator 234. The relocatable translator 234, shown in FIG. 5 while referencing FIG. 1, may provide spatial relocation functionality such that one or more controller devices 100 and 101 may be enabled to be arbitrarily relocatable in 3D ambient space 302. The relocatable translator 234 may comprise computer instructions executable by the control unit 210. In some embodiments, the display appliance 200, control unit 210, and relocatable translator 234 may be operable such that the controller device 100 may be enabled to be arbitrarily relocatable within 3D ambient space 302 of the play system 300, wherein the controller device 100 may be enabled to be attached to or at least partially contained in an arbitrary physical object 250 at an arbitrary location, and an arbitrary orientation, relative to the arbitrary physical object 250 in the 3D ambient space 302, and the controller device 100 may be enabled to be arbitrarily located and arbitrarily oriented in the 3D ambient space 302 that is movable in the 3D real-world space 303.

In some embodiments, the display appliance 200, control unit 210, and relocatable translator 234 (e.g., in cooperation with the communication module 218) may computationally determine a relocatable dataset 244 during, but not limited to, spatial calibration of the relocatable translator 234 upon communicatively receiving one or more control data from one or more controller devices 100 and 101, other display appliances, and other devices of the play system 300. For example, a control data, communicatively received from each controller device, may comprise information of a spatial feature (e.g., movement, orientation, location, velocity, altitude, direction, and/or speed, etc.) of each controller device, appliance, or other device within 3D ambient space 302. In various embodiments, operations of spatial calibration of the relocatable translator 234 may determine a home reference data, for each controller device, which computationally acts as a template, defining the geometric spatial relationship (e.g., location and orientation) of the controller device 100, arbitrary physical object 250, and the virtual object 260 on the display appliance 200 within the 3D ambient space 302 and the 3D virtual space 204 (in FIG. 1). For example, FIG. 8E shows an exemplary embodiment of a relocatable dataset D450 comprising one or more home reference data for one or more controller devices and display appliances of the play system 300. As depicted, the relocatable dataset D450 includes a first home reference data D460 (related to a first controller device 100) and a second home reference data D470 (related to a second controller device 101). The first home reference data D460 includes, but not limited to, a device identifier D461, a virtual object identifier D462, a home reference location D463, and a home reference orientation D464. And the second home reference data D470 includes, but not limited to, a device identifier D471, a virtual object identifier D472, a home reference location D473, and a home reference orientation D474.

Subsequently, in various embodiments, as shown in FIG. 5 while referencing FIG. 1, the display appliance 200, control unit 210, and relocatable translator 234 (e.g., in cooperation with the communication module 218) may utilize the relocatable dataset 244 during operations of play activity for a controller device 100, such that the controller device 100 may be enabled to be arbitrarily relocatable in 3D ambient space 302 of the play system 300. For example, the display appliance 200, control unit 210, and relocatable translator 234 (e.g., in cooperation with the communication module 218) may be enabled to computationally transform one or more spatial features and/or control data comprising information of spatial features (e.g., movement, orientation, location, altitude, direction, and/or speed) of the controller device 100 and/or the arbitrary physical object 250 in 3D ambient space 302—from a local coordinate system of the controller device 100—to a system-wide coordinate system of the play system 300. That is, in various embodiments, spatial coordinates of the controller device 100 may be computationally transformed to a shared, system-wide coordinate system among a plurality of controller devices 100 and 101, display appliances 200, and other devices of the play system 300.

Further, in various embodiments, as shown in FIG. 5 while referencing FIG. 1, the display appliance 200, control unit 210, and relocatable translator 234 may provide geometric and computational transformations of spatial-temporal coordinates between various real and virtual spaces. As described earlier, such geometric spaces (e.g., 3D ambient space 302, 3D virtual space 204, etc.) may be of various shapes (e.g., rectangular, spherical, cylindrical, planar, linear, etc.) and of various size, such as finite (e.g., 20 meters in diameter), variable (10 to 50 meters in diameter), or of unlimited size, depending on the design choices for an embodiment of a play system. For example, the relocatable translator 234 may support a play region referred to as the 3D ambient space 302, in 3D real-world space 303, which contains one or more controller devices 100 and 101 connected to arbitrary physical objects 250 and 251 in the play system 300. Further, the relocatable translator 234 may support the 3D virtual space 204, comprising virtual objects 260 and 261, on the display appliance 200 in the play system 300. Whereupon in some embodiments, the relocatable translator 234 may be configured and operative of computational transformation of first spatial-temporal coordinates, of one or more controller devices 100 and 101 in the 3D ambient space 302, to second spatial-temporal coordinates of one or more virtual objects 260 and 261 in the 3D virtual space 204 on the display appliance 200, respectively—and vice versa. That is, in various embodiments, the relocatable translator 234 may be operative of computational transformation of first spatial-temporal coordinates, of one or more virtual objects 260 and 261 in the 3D virtual space 204 on the display appliance 200, to second spatial-temporal coordinates of imaginary objects 270 in the 3D ambient space 302, respectively. For example, in some embodiments, the relocatable translator 234 may provide computational transformation of first spatial-temporal coordinates of imaginary objects 270, in the 3D ambient space 302 and/or 3D virtual space, to second spatial-temporal coordinates in the 3D virtual space 204 and/or 3D ambient space 302—and vice versa. Whereby further supporting, in some embodiments, the relocatable translator 234 may be configured and be operable such that one or more controller devices 100 and 101 may be enabled to be arbitrarily relocatable within 3D ambient space 302 of the play system 300.

Whereupon, the relocatable translator 234 may comprise computer instructions that when executed by one or more control units 210 may perform operations of, but not limited to, geometric transformation, mapping, and/or projective functions. In various embodiments, translational, projective, matrix, and vector data types and operations may be considered for geometric transformations related to spatial distances, proximities, and displacements in 1 D, 2D and/or 3D space, although alternative approaches may be considered as well. Further, in various embodiments, rotational, trigonometric, and quaternion data types and operations may be considered for geometric transformations related to angles, orientations, and/or rotations in 1 D, 2D and/or 3D space, although alternative approaches may be considered as well. For example, in some embodiments, a portion of computational transformation of a spatial feature comprising orientation or rotation, such that the controller device 100 may be relocatable in 3D space, may use quaternion matrix math:

$$p'=hph^{-1}$$

wherein p=(p0, p1, p2, p3) is a detected orientation.
h=(h0, h1, h2, h3) is a home reference orientation.
p'=(p0', p1', p2', p3') is a transformed orientation.

Although various implementations and operations of the relocatable translator 234 of the display appliance 200 have been disclosed, such apparatus and operations may not be wholly exclusive to the display appliance 200. For in some embodiments, the operations of enabling the controller device 100 to be arbitrarily relocatable in 3D ambient space 302 may be shared among multiple devices and appliances of the play system 300. For example, in some embodiments, the relocatable translator 234 of the display appliance 200 (in FIG. 5)—and further—the relocatable translator 134 of the controller device 100 (in FIG. 3) may share operations such that the controller device 100 is enabled to be arbitrarily relocatable in 3D ambient space 302. Or alternatively, in some embodiments, the relocatable translator 134 of the controller device 100 may accomplish most or all of the operations such that the controller device 100 may be enabled to be arbitrarily relocatable in 3D ambient space 302. Or alternatively, in various embodiments, the relocatable translator 234 of the display appliance 200 may accomplish most or all of the operations such that the controller device 100 may be enabled to be arbitrarily relocatable in 3D ambient space 302. For further details, the reader may refer to the relocatable translator 134 of the controller device in FIG. 3 and elsewhere in this disclosure. Although various implementations and operations of the relocatable translator 234 have been disclosed, alternative implementations and operations of the relocatable translator 234 should be considered to be well within the scope of this disclosure.

In some embodiments, appliance 200 may comprise the distance analyzer 235. The distance analyzer 235, shown in FIG. 5 while referencing FIG. 1, may provide spatial distance analysis functionality for the display appliance 200. The distance analyzer 235 may comprise computer instructions executable by the control unit 210. In some embodiments, the play system 300, display appliance 200, control unit 210, and distance analyzer 235 (e.g. in cooperation with the 232 signal analyzer) may be enabled to, for example, detect one or more spatial distances, median spatial distances, and/or arithmetic average spatial distances between two or more controller devices 100 and 101, display appliances 200, components, and imaginary objects 270 of the play system. The distance analyzer 235 may comprise, but not limited to, digital filters, signal analysis, and statistical functions to compute spatial distances. In the current embodiment, the distance analyzer 235 may be enabled to computationally transform one or more received signal strength indicator (RSSI) values (e.g., from the signal dataset 235) into one or more spatial distances existing in 3D ambient space of the play system. In some embodiments, the magnitude of an RSSI value may be proportional to spatial distance, and thus, converted to spatial distance using, but not limited to, statistical math functions, Kalman filtering, and/or digital filter functionality. In some alternate embodiments of a play system that does not use received signal strength indicator (RSSI) values, the distance analyzer 235 may analyze signal data comprised of time of flight (TOF) signals, time of arrival (TOA) signals, angle of arrival (AOA) signals, or other types of signals, which may be transformed into spatial distances.

In some embodiments, appliance 200 may comprise the geometric analyzer 236. The geometric analyzer 236, shown in FIG. 5 while referencing FIG. 1, may provide, but not limited to, close proximity, location, orientation, and event analysis functionality for the display appliance 200. The geometric analyzer 236 may comprise computer instructions executable by the control unit 210. For example, the play system 300, display appliance 200, control unit 210, and geometric analyzer 236 (e.g. in cooperation with the distance analyzer 235) may be enabled to, for example, detect one or more locations, median locations, arithmetic average locations, orientations, median orientations, and/or arithmetic average orientations for one or more controller devices 100 and 101, display appliances 200, components, and imaginary objects 270 of the play system 300. For general information about "close proximity," the reader may refer to the collision analyzer 238 (in FIG. 5) and elsewhere in this disclosure.

Moreover, the geometric analyzer 236 may comprise, but not limited to, optimization functions and geometry estimation functions to compute close proximity, locations, orientations, and events in 3D ambient space. For example, geometry estimation functions may include, but not limited to, trilateration to determine locations using estimated distances between devices (e.g., from RSSI values shared among controller devices and display appliances within the play system), multi-lateration to determine locations using time difference of arrival signals among multiple devices (e.g., from controller devices within the play system), triangulation to determine locations using determined angles of received signals (e.g., via communication modules of controller devices within the play system), global position sensing (GPS), global system for mobile communications (GSM), and/or real-time locating systems, although other types or combinations of types of geometric estimation functions may be considered as well. In the current embodiment, the geometric analyzer 236 may be enabled to, but not limited to, computationally transform one or more spatial distances, geometric angles, velocities, rotations, gesture data, collision data, and/or imaginary object data (e.g., from datasets 223 and 241-249) into one or more proximities, locations, orientations, and spatial events defined within the 3D ambient space of the play system. Further, in the current embodiment, spatial events may be triggered, but not limited to, based on close proximity, location, and/or orientation.

In some embodiments, the geometric analyzer 236 may computationally transform one or more spatial distances and/or other spatial information into one or more estimated proximity maps, geometry maps, or geographic maps comprising, but not limited to, estimated vertices, close proximities, locations, relationship angles, and/or orientations in 3D ambient space of controller devices, display appliances, components, and imaginary objects that are active in a play system. In various embodiments, one or more proximity maps, geometry maps, and/or geographic maps may be constructed from a mix of input information comprising 1 D, 2D, and/or 3D spatial and temporal information collected in real-time, during operation. Often such information is vague with a high degree of noise and uncertainty from one moment to the next (e.g., every 0.01 second) during operation of a play system. Whereby, the geometric analyzer 236 may comprise, for example, signal processing functions, digital filters, optimization algorithms, and data aggregation functions (e.g., least square optimization, costing functions, Kalman filters, low-pass filters, etc.) to increase accuracy, reliability, and responsiveness of the computed and estimated spatial-temporal coordinates of the play system. Moreover, In some alternate embodiments of a geometric analyzer, other types of proximity, location, and/or orientation sensing apparatus may be utilized, such as, but not limited to, one or more spatial proximity sensors, time of flight sensors, angle of arrival (AoA) antenna arrays, orientation sensors, and/or optical sensors.

In some embodiments, appliance 200 may comprise the gesture analyzer 237. The gesture analyzer 237, shown in FIG. 5 while referencing FIG. 1, may provide the display appliance 200 with gesture movement detection and analysis functionality of one or more controller devices 100 and 101 and/or arbitrary physical objects 250 and 251 in the play system 300. The gesture analyzer 237 may comprise computer instructions executable by the control unit 210. A gesture movement may be an identifiable pattern of movement of a controller device and/or arbitrary physical object within 3D ambient space. Whereby, in some embodiments of a play system, one or more gesture movements may be detected by one or more controller devices, and the play system responds accordingly, such at least in part controlling one or more virtual objects, sound effects, and mechanical effects on a display appliance based at least in part on the one or more gesture movements. For a description of various gesture movements and gesture types, the reader may refer to the gesture analyzer 137 in FIG. 3 and other sections of this disclosure.

In some embodiments, the play system 300, display appliance 200, control unit 210, and gesture analyzer 237 (e.g., in cooperation with the communication module 218) may be enabled to analyze one or more control data, received from one or more controller devices, wherein the one or more control data may comprise information of one or more gesture movements of the one or more controller devices in 3D ambient space. In some embodiments, the play system 300, display appliance 200, control unit 210, and gesture analyzer 237 may detect a gesture movement, gesture type, gesture event, gesture timestamp (e.g., timeclock of when the gesture occurred), gesture location, gesture orientation, gesture translational velocity, gesture speed, gesture direction, and/or gesture rotational velocity made by a one or more controller devices 100 and/or one or more arbitrary physical objects 250 within the 3D ambient space 302 of the play system 300. Gesture translational velocity refers to the translational velocity of a gesture movement in 3D ambient space. Gesture rotational velocity refers to the rotational velocity on a spatial axis of a gesture movement in 3D ambient space.

In some embodiments of the gesture analyzer 237, detecting a combined gesture of first and second controller devices may be based on detecting spatial features of the first and second controller devices in 3D ambient space. Such spatial features may include, but not limited to, close proximity, movement, and/or acceleration in 3D ambient space. For general information about "close proximity," the reader may refer to the collision analyzer 238 (in FIG. 5) and elsewhere in this disclosure.

In some embodiments, appliance 200 may comprise the collision analyzer 238. The collision analyzer 238, shown in FIG. 5 while referencing FIG. 1, may provide the display appliance 200 with detection and analysis functionality for, but not limited to, at least indirect collisions of one or more controller devices 100 (connected to arbitrary physical object 250) with other controller devices 101 or other arbitrary physical objects 252 in 3D ambient space. Further, in some embodiments, the collision analyzer 138 may detect close proximity of one or more controller devices 100 (connected to arbitrary physical objects 250) with other controller devices 101 or other arbitrary physical objects 252 in 3D ambient space. The collision analyzer 238 may comprise computer instructions executable by the control unit 210.

In some embodiments, the play system 300, display appliance 200, control unit 210, and collision analyzer 238 (e.g., in cooperation with the communication module 218) may be enabled to detect an at least indirect collision of a first controller device 100 and a first arbitrary physical object 250 with a second controller device 101 and a second arbitrary physical object 251 within the 3D ambient space 302 of the play system 300. In another example, the play system 300, display appliance 200, control unit 210, and collision analyzer 238 (e.g., in cooperation with the communication module 218) may be enabled to detect an at least indirect collision of a first controller device 100 and a first arbitrary physical object 250 with a second arbitrary physical object 251 within the 3D ambient space 302 of the play system 300.

In some embodiments, the play system 300, display appliance 200, control unit 210, and collision analyzer 238 may be enabled to detect an at least indirect collision of a first controller device with a second controller or a second arbitrary physical object based at least in part on detecting a spatial feature of the first controller device. Such spatial feature may include, but not limited to, close proximity, movement, and/or acceleration in 3D ambient space.

For example, in various methods of operations, detecting an at least indirect collision between two controller devices may be based at least in part on, but not limited to: 1) a first movement of a first controller device that substantially coincides in time a second movement of a second controller device in 3D ambient space and/or 3D virtual space; 2) a collision of 3D meshes (e.g., voxels, models, or point clouds) of the first controller device and the second controller device in 3D ambient space and/or virtual space; and/or 3) a close proximity of the first controller device with the second controller device in 3D ambient space and/or virtual space, although other methods may be considered as well. Further, in various methods of operations, detecting an at least indirect collision between a controller device and an arbitrary physical object may be based at least in part on, but not limited to: 1) a first movement (e.g., acceleration, translational movement) of a first controller device followed in time by no movement (e.g., where there is no acceleration or velocity) of the first controller device in 3D ambient space, although other methods may be considered as well.

In some embodiments, the play system 300, display appliance 200, control unit 210, and collision analyzer 238 may be enabled to detect a close proximity of a first controller device with a second controller device or a second arbitrary physical object based at least in part on detecting spatial features of the controller device(s). Such spatial features may include, but not limited to, close proximity, movement, and/or acceleration in 3D ambient space.

In some embodiments, detecting a close proximity of a first controller device with a second controller device or a second arbitrary physical object may be based on detecting spatial features of the controller device(s). Such spatial features may include, but not limited to, close proximity, movement, and/or acceleration in 3D ambient space.

For example, in various methods of operations, detecting a close proximity of a first controller device with a second controller device or a second arbitrary physical object may be based at least in part on, but not limited to: 1) a collision of 3D meshes (e.g., 3D voxels, 3D models, or 3D point clouds based on associated virtual objects, etc.) of the first controller device and the second controller device in 3D ambient space; 2) and/or a spatial distance, between the first and second controller devices in 3D ambient space, is less than or equal to a close proximity threshold distance in 3D ambient space, although alternative methods may be considered as well. In some embodiments, if a first and second controller devices are in close proximity (e.g., separated in distance by less than 5 centimeters), the play system may generate a proximity event, and respond accordingly, such as generating and controlling visual, sound, and mechanical effects based at least in part on the close proximity of the first and second controller devices in 3D ambient space. In various embodiments, a first and second controller device may be in close proximity when at least a spatial distance, between the first and second controller device in 3D ambient space, is less than or equal to a close proximity threshold distance. In various embodiments, a first controller device and a display appliance are in close proximity when at least a spatial distance, between the first controller device and the display appliance in 3D ambient space, is less than or equal to a close proximity threshold distance. Wherein, in some embodiments, the close proximity threshold distance may 5 centimeters, 10 centimeters, 20 centimeters, or 50 centimeters, although other spatial distances may be considered as well. In some embodiments, the close proximity threshold distance may be dynamically variable such as, for example, between 0 and 20 centimeters. In some alternate embodiments, controller devices, display appliances, and/or other devices are in close proximity when their respective volumes, shapes, voxels, or 3D models overlap or collide in 3D ambient space. Computing methods may include, but not limited to, 2D or 3D mesh overlap detection, shape collision detection, voxel collision detection, model collision detect, distance detection, and/or distance comparison may be used to determine close proximity of two or more controller devices, display appliances, and/or other devices within 3D ambient space of the play system, although alternative methods may be considered as well.

In various embodiments, the play system 300, display appliance 200, control unit 210, and collision analyzer 238 may be enabled to detect one or more collision events, close proximity events, collision timestamps (e.g., timeclock of when the collision occurred), collision orientations, collision locations, collision velocities, collision speeds, collision directions, and/or collision accelerations of a first controller device 100 and a first arbitrary physical object 250 with a second controller device 101 and a second arbitrary physical object 251 within the 3D ambient space 302 of the play system 300.

In some embodiments, appliance 200 may comprise the imaginary object analyzer 239. The imaginary object analyzer 239, shown in FIG. 5 while referencing FIG. 1, may provide imaginary object launching, close proximity, and collision detection functionality for the display appliance 200. The imaginary object analyzer 239 may comprise computer instructions executable by the control unit 210. In some embodiments, the play system 300, display appliance 200, control unit 210, and imaginary object analyzer 239 (e.g., in cooperation with the communication module 218) may be enabled to launch one or more imaginary objects 270 from one or more controller devices 100 and arbitrary physical objects 250 into the 3D ambient space 302 (and/or virtual space 204) of the play system 300.

In some embodiments, the play system 300, display appliance 200, control unit 210, and imaginary object analyzer 239 (e.g., in cooperation with the communication module 218) may be enabled to detect a close proximity of one or more controller devices 100 with one or more imaginary objects 270 in the 3D ambient space 302 (and/or virtual space 204). For general information about "close proximity," the reader may refer to the collision analyzer 238 (in FIG. 5) and elsewhere in this disclosure.

In various embodiments, the play system 300, display appliance 200, control unit 210, and imaginary object analyzer 239 (e.g., in cooperation with the communication module 218) may be enabled to detect an at least indirect collision of one or more controller devices 100 with one or more imaginary objects 270 in the 3D ambient space 302 (and/or virtual space 204).

In various embodiments, the play system 300, display appliance 200, control unit 210, and imaginary object analyzer 239 (e.g., in cooperation with the communication module 218) may be enabled to detect an at least indirect collision of one or more controller devices 100 with one or more imaginary objects 270 in the 3D ambient space 302 (and/or virtual space 204) based at least in part on one or more spatial features of the one or more controller devices 100. Such spatial features may include, but not limited to, close proximity, movement, and/or acceleration in 3D ambient space 302 (and/or virtual space 204). For general information about "close proximity," the reader may refer to the collision analyzer 238 (in FIG. 5) and elsewhere in this disclosure.

For example, detecting an at least indirect collision of a controller device with an imaginary object may be based at least in part on, but not limited to: 1) a first movement of the controller device that substantially coincides in time a second movement of the imaginary object; 2) a collision of 3D meshes (e.g., voxels, models, or point clouds) of the controller device and the imaginary object in 3D ambient space and/or virtual space; and/or 3) a close proximity of the controller device with the imaginary object in 3D ambient space and/or virtual space.

In some embodiments, play system 300, display appliance 200, control unit 210, and imaginary object analyzer 239 (e.g., in cooperation with the communication module 218) may be enabled to detect one or more imaginary object locations, imaginary object orientations, imaginary object accelerations, imaginary object velocities, imaginary object speeds, imaginary object directions, imaginary object collision events, imaginary object launch events, and/or imaginary object timestamps of one or more imaginary objects 270 within the 3D ambient space 302 (and/or virtual space 204) of the play system 300.

In some embodiments, appliance 200 may comprise the virtual object description database 226. The virtual object description database 226, shown in FIG. 5 while referencing FIG. 1, may provide read/write data storage functionality for the display appliance 200, such that the display appliance 200 can retain data related to one or more virtual objects.

The virtual object description database 226 may comprise data and computer instructions executable by the control unit 210. In some embodiments, the virtual object description database 226 may comprise one or more virtual object description data, comprising data and/or computer instructions, related to one or more virtual objects. In various embodiments, the display appliance 200 and virtual object description database 226 may comprise at least one virtual object description data comprising at least a virtual object identifier that identifies a virtual object 260 on the display appliance 200, wherein the virtual object 260 may be associated with the controller device 100. In some embodiments, the display appliance 200 and virtual object description database 226 may comprise at least one virtual object description data comprising a plurality of virtual object identifiers that identify a virtual object 260 and one or more support virtual objects on the display appliance 200, wherein the virtual object 260 and the one or more support virtual objects may be associated with the controller device 100.

In some embodiments, the virtual object description database 226, shown in FIG. 5 while referencing FIG. 1, may be enabled to read (via the control unit 210) one or more virtual object description data from the database 226 and process accordingly. In various embodiments, the virtual object description database 226 may be enabled to write or store (via the control unit 210) one or more virtual object description data to the database 226 for future reference. In the current embodiment, the virtual object description database 226 may be located in memory 220 that may comprise non-transitory computer-readable storage media, such that the stored one or more virtual object description data may endure, for example, for many months in duration even when the play system and display appliance 200 are inoperable. For example, shown in FIG. 5 while referencing FIG. 1, the play system 300, display appliance 200, control unit 210, and the virtual object description database 226 may store (write) and read a virtual object description data and/or signals related to one or more virtual object associated with a controller device 100.

In some embodiments, the display appliance 200 (in cooperation with the control unit 210, communication module 218, and virtual object description database 226) may be enabled to communicatively receive at least a portion of a virtual object description data from a controller device 100 (of FIG. 1) or from another display appliance (not shown) within the play system, and respond accordingly, wherein the display appliance 200 stores at least a portion of the virtual object description data in the virtual object description database 226, wherein at least a portion of the virtual object description data may identify one or more virtual objects that is associated with the controller device 100.

In various embodiments, the display appliance 200 (in cooperation with the control unit 210, communication module 218, and virtual object description database 226) may be enabled to read at least portion of a virtual object description data from the virtual object description database 226, and accordingly respond, wherein the display appliance 200 is enabled to communicatively transmit at least a portion of the virtual object description data to a controller device (such as device 100 of FIG. 1) or another display appliance (not shown) within the play system. Whereby, one or more virtual object descriptions may be retained and shared among one or more controller devices 100 and 101, display appliances 200, and components of the play system 300. For details of a "virtual object description data," the reader may refer to the section "Virtual Object Description Data stored in Virtual Object Description Database" and elsewhere in this disclosure.

Display Appliance Including Computing Datasets

FIG. 5 also shows data storage 240 may comprise various collections of computer readable/writable datasets, such as, but not limited to, a game dataset 223, a motion dataset 241, a signal dataset 242, a relocatable dataset 244, a distance dataset 245, a geometric dataset 246, a gesture dataset 247, a collision dataset 248, and an imaginary object dataset 249. These datasets may be implemented in software, firmware, and/or hardware. In the current embodiment, these datasets may be implemented in data storage 240, which may be read from and/or written to (or modified) by control unit 210.

Game dataset 223, shown in FIG. 5 while referencing FIG. 1, may represent application data (e.g., from game application 222) and comprise, but not limited to, graphic images and textures, 2D/3D object models, video data, audio signal data, and/or mechanical signal data for the display appliance 200 within the 3D ambient space 302 of the play system 300.

Motion dataset 241, shown in FIG. 5 while referencing FIG. 1, may represent spatial/temporal data (e.g., from motion analyzer 231) and comprise, but not limited to, one or more accelerations, translational velocities, translational directions, translational speeds, rotational velocities, rotational speeds, rotational directions, altitudes, locations, orientations, movement timestamps, and/or movement events of one or more controller devices 100 and 101, arbitrary physical objects 250 and 251, and imaginary objects 270 within the 3D ambient space 302 of the play system 300.

Signal dataset 242, shown in FIG. 5 while referencing FIG. 1, may represent signal strength data (e.g., from signal analyzer 232) and comprising, but not limited to, one or more received signal strength indicator values detected during wireless communication or received from one or more controller devices 100 and 101, display appliances 200, electronic toys, and/or other devices within the 3D ambient space 302 of the play system 300.

Relocatable dataset 244, shown in FIG. 5 while referencing FIG. 1, may comprise spatial relocation data (e.g., from relocatable translator 134) such that one or more controller devices 100 and 101, display appliances, and other potential devices are enabled to be arbitrarily relocatable within the 3D ambient space 302. In some embodiments, the relocatable dataset 244 may be computationally determined (e.g., via the relocatable translator 234) during spatial calibration of the relocatable translator 234 of the display appliance 200 within 3D ambient space 302. Subsequently, in some embodiments, the relocatable dataset 244 may be used to computationally transform, for example, one or more spatial features—(e.g., movement, orientation, location, altitude, direction, and/or speed) in local-coordinates, of one or more controller devices 100 and/or arbitrary physical objects 250—into system-wide coordinates such that the one or more controller devices 100 and 101 may be enabled to be arbitrarily relocatable in 3D ambient space 302 of the play system 300. For example, FIG. 8E shows an exemplary embodiment of a relocatable dataset D450 that may comprise home reference data for one or more controller devices and display appliances of the play system 300. As depicted, the relocatable dataset D450 includes a first home reference data D460 (related to a first controller device 100) and a second home reference data D470 (related to a second controller device 101). The first home reference data D460 includes, but not limited to, a device identifier D461, a virtual object identifier D462, a home reference location D463, and a home reference orientation D464. And the second home reference data D470 includes, but not limited to, a device identifier D471, a virtual object identifier D472, a home reference location D473, and a home reference orientation D474.

Distance dataset 245, shown in FIG. 5 while referencing FIG. 1, may represent spatial distance data (e.g., from the distance analyzer 235) and comprise, but not limited to, one or more distances and average distances between and among one or more controller devices 100 and 101, arbitrary physical objects 250 and 251, display appliances 200, and imaginary objects 270, and other devices within the 3D ambient space 302 of the play system 300.

Geometric dataset 246, shown in FIG. 5 while referencing FIG. 1, may comprise spatial geometry data (e.g., from geometric analyzer 236) and comprise, but not limited to, one or more vertices in 1 D, 2D and/or 3D space, close proximities, relationship angles, locations, and/or average locations of one or more controller devices 100 and 101, arbitrary physical objects 250 and 251, display appliances 200, and imaginary objects 270, and other devices within the 3D ambient space 302 of the play system 300.

Gesture dataset 247, shown in FIG. 5 while referencing FIG. 1, may represent gesture event data (e.g., from gesture analyzer 237) and comprise, but not limited to, one or more gesture detection events, gesture timestamps (e.g., time clock values when gestures occurred), gesture locations, gesture orientations, gesture velocities, gesture directions, gesture speeds, and/or gesture types for one or more controller devices 100 and 101 connected to one or more arbitrary physical objects 250 and 251 within the 3D ambient space 302 of the play system 300. For a description of various gesture movements and gesture types, the reader may refer to the gesture analyzer 137 in FIG. 3 and other sections of this disclosure.

Collision dataset 248, shown in FIG. 5 while referencing FIG. 1, may represent collision event data (e.g., from collision analyzer 238) and comprise, but not limited to, one or more physical collision detection events, collision timestamps (e.g., timeclock values when collisions occurred), collision locations, collision orientations, collision velocities, collision speeds, and/or collision directions for one or more controller devices 100 and 101, arbitrary physical objects 250 and 251, display appliances 200, and imaginary objects 270, and other devices within the 3D ambient space 302 of the play system 300.

Imaginary object dataset 249, shown in FIG. 5 while referencing FIG. 1, may represent imaginary object event data (e.g., from imaginary object analyzer 239) and comprise, but not limited to, one or more imaginary object launch events, imaginary object timestamps (e.g., timeclock values when imaginary objects are launched), imaginary object size (e.g., width, height, depth), imaginary object orientations, imaginary object locations, imaginary object velocities, imaginary object accelerations, imaginary object speeds, imaginary object directions, and/or imaginary object collision events for one or more imaginary objects 270 within the 3D ambient space 302 of the play system 300.

Virtual Object Description Data Transmitted to Controller Devices and Display Appliances So turning now to FIG. 9A while referencing FIGS. 5, 3, and 1, there shown is an exemplary embodiment of a virtual object description data D300, which is data related to a virtual object. In some embodiments, the display appliance 200 (e.g., via the control unit 210) may store the virtual object description D300 in a virtual object description database 226 (in FIG. 5). In various embodiments, the display appliance 200, via the communication module 218 of the display appliance 200, may transmit the virtual object description D300, comprising at least one virtual object identifier D311 that identifies at least one virtual object 260 on the display appliance 200, to one or more controller devices 100 and 101, other display appliances, and/or other devices in the play system 300. In some embodiments, the display appliance 200, via the communication module 218 of the display appliance 200, may transmit, a virtual object identifier D311 that identifies a first virtual object 260 on the display appliance 200, to a first controller device in the play system 300, wherein accordingly, the controller device 100, via the communication module 118 of the controller device 100, may be at least in part controlling the first virtual object 260 on the display appliance 200.

In some embodiments, the controller device 100 (e.g., via the control unit 110) may store the virtual object description D300 in a virtual object description database 126 (in FIG. 3). In various embodiments, the controller device 100, via the communication module 118 of the controller device 100, may transmit the virtual object description D300, comprising at least one virtual object identifier D311 that identifies at least one virtual object 260 on the display appliance 200, to one or more display appliances 200, other controller devices 101, and/or other devices in the play system 300. In some embodiments, the controller device 100, via the communication module 118, may be at least in part controlling a first virtual object 260 on a first display appliance 200 in a first play system 300, and accordingly, the controller device 100 may be transported from a first geographic location to a second geographic location, wherein the controller device 100 may be at least in part controlling the first virtual object 260 on a second display appliance in a second play system. In some embodiments, the controller device 100, via the communication module 118 of the controller device 100, may transmit, a virtual object identifier D311 that identifies a first virtual object 260, to a first display appliance 200 in a first play system 300, wherein the controller device 100 may be at least in part controlling the first virtual object 260 on the first display appliance 200, and accordingly, the controller device 100 may be transported from a first geographic location to a second geographic location, wherein the controller device 100, via the communication module 118 of the controller device 100, may transmit, the virtual object identifier D311 that identifies the first virtual object 260, to a second display appliance in a second play system, wherein the controller device 100 may be at least in part controlling a second virtual object on the second display appliance.

In some embodiments, the virtual object description data D300 may comprise at least the virtual object identifier D311 that identifies the virtual object 260 on the display appliance 200. In various embodiments, the virtual object description data D300 may comprise one or more virtual object identifiers D311 and D315 that identify one or more virtual objects 260 on the display appliance 200. Further, the organization of data within a virtual object description data may be grouped or arbitrary, depending on the implementation. In some embodiments, virtual object description data D300 may comprise, but not limited to, a virtual object identity data D310, a virtual object state data D320, a virtual object behavior data D340, and a virtual object content data D350.

In some embodiments, the virtual object identity data D310 may comprise, but not limited to, a virtual object identifier D311 (e.g., ID="260" that identifies a virtual object), support virtual object identifiers D315 (e.g., ID="360B" that identify one or more support virtual objects), a virtual object type D312 (e.g., "superhero human" indicating the type of virtual object), a virtual object brand D313 (e.g., "Superheroes" identifying a brand or brand name), and/or a device identifier D314 (e.g., ID="100" that identifies a controller device that is associated with the one or more virtual objects).

In some embodiments, the virtual object state data D320 may comprise, but not limited to, a virtual object location D321 (e.g., defining character location in 3D virtual space), a virtual object orientation D322 (e.g., defining character orientation in 3D virtual space), a virtual object rank D323 (e.g., defining character rank), a virtual object hit points D324 (e.g., defining character durability), a virtual object intelligence D325 (e.g., defining character cleverness), a virtual object strength D326 (e.g., defining character strength), a virtual object wealth D327 (e.g., defining character coins collected), a virtual object weapons D328 (e.g., available weapons such as laser blaster, missile launcher, etc.), a virtual object shields D329 (e.g., available shields such as plasma shield, etc.), a virtual object emotion D330 (e.g., happy, angry, excited, or sad), virtual object purchase cost D331 (e.g., customer purchase cost to purchase this virtual object, such as 1.50 USD), and/or a virtual object inventory D332 (e.g., defining collected game items such as a fishing pole, coin, key, etc.).

In some embodiments, the virtual object behavior data D340 may comprise, but not limited to, one or more behaviors defined in data and/or executable computer instructions, such as a double tap gesture behavior D341 (e.g., which may cause a projectile imaginary object to be generated upon detecting a double tap gesture). In various embodiments, the virtual object content data D350 may comprise, but not limited to, a virtual object 3D model D351 (e.g., spatial coordinates in 3D virtual space of a superhero character with cape), a virtual object audio data D352 (e.g., whistling air audio when superhero character flies), and/or a virtual object mechanical data D353 (e.g., single vibration when superhero character lands).

Control Data Transmitted by Controller Device to Display Appliance

So turning now to FIG. 9B while referencing FIGS. 3 and 1, there shown is an exemplary embodiment of a control data D100, comprising information or data, that may be transmitted by the communication module 118 of the controller device 100 (e.g., in cooperation with the control unit 110) to one or more display appliances 200, controller devices 101, and/or other devices in the play system 300. Alternative embodiments of a control data may comprise other types of data, and/or different amounts of data for communication as well. For example, some embodiments of a control data may comprise only a device identifier, or at least a device identifier. The organization of data within a control data may be grouped or arbitrary, depending on the implementation. As depicted, control data D100 may comprise, but not limited to:

A device description data D110 may comprise a device identifier D111 (e.g. device ID="100"), and/or other types of data related to a device (e.g., controller device) that is sending and/or receiving data.

A virtual object description data D120 may comprise a virtual object identifier D121 (e.g., ID="260", or "superhero human", etc. that identifies a virtual object), support virtual object identifiers D124 (e.g., ID="360B", etc. that identify one or more support virtual objects), a virtual object type D122 (e.g., "Superhero human" indicating a type of virtual object), a virtual object brand D123 (e.g., "Superheroes" indicating brand of virtual object portrayed), and/or other types of data related to a virtual object. In some embodiments, the virtual object description data D120 may comprise at least a virtual object identifier D121 that identifies a virtual object in the play system. In various embodiments, the virtual object description data D120 may comprise a plurality of virtual object identifiers, such as virtual object identifier D121 and one or more support virtual object identifiers D124, which identify a plurality of virtual objects in the play system.

A command data D130 may comprise a command type D131 (e.g., Normal, Spatial calibrate, etc.), and other types of data related to commands issued to the receiving device.

A motion data D140 may comprise an orientation D141 (e.g. 10, 10, 5 degrees), a translational movement D142 (e.g., −10, −5, 0 units/sec), a rotational movement D143 (e.g., 0, 0, 0 degrees/sec), a translational velocity D144 (e.g., −10, −5, 0 units/sec), a rotational velocity D145 (e.g., 0, 0, 0 degrees/sec), an altitude D146 (e.g., 10 units above the surface), and/or other aspects of a spatial feature of the controller device 100, display appliance, and/or another device in the play system.

A signal data D150 may comprise, but not limited to, a RSSI device identifier D151 (e.g., "100" that identifies the device related to an RSSI value), a RSSI value D152 (e.g., −100 associated with the device), and/or other types of data related to signals, RSSI values, and/or associated devices. In some embodiments, signal data D150 may be comprised of TOF values, or other signal related information.

A gesture data D160 may comprise a gesture type D161 (e.g., double tap gesture, spin gesture, shake gesture, etc.), an input type D162 (e.g., indicator sensor pressed), and/or other data related to user input and gesture movements of the controller device. For a description of various gesture movements and gesture types, the reader may refer to the gesture analyzer 137 in FIG. 3 and other sections of this disclosure.

A collision data D170 may comprise a physical object collision event D171 (e.g., event=false indicating no collisions, or =true if collision detected, a physical object close proximity event D172 (e.g., event=false indicating no close proximity, or =true if close proximity detected, device identifier of controller device in close proximity, timestamp of close proximity, etc.), and/or other types of data related to an at least indirect collision of an arbitrary physical object with the controller device 100.

An imaginary object data D180 may comprise an imaginary object launch event D81 (e.g., event=false indicating no launches, or =true if launch occurred, imaginary object identifier, imaginary object velocity, etc.), imaginary object collision event D182 (e.g., event=false indicating no collisions, or =true if collision detected, device identifier of controller device in collision, timestamp of collision, etc.), an imaginary object close proximity event D183 (e.g., event=false indicating no close proximity, or =true if close proximity detected, device identifier of imaginary object in close proximity, timestamp of close proximity, etc.), and/or other types of data related to an at least indirect collision of an imaginary object with the controller device 100.

Control Data Transmitted by Display Appliance to Controller Device

So now turning to FIG. 9C while referencing FIGS. 5 and 1, there shown is an exemplary embodiment of a control data D200, comprising information or data, that may be transmitted by the communication module 218 of the display appliance 200 (e.g., in cooperation with the control unit 210) to one or more controller devices 100 and 101, other display appliances, and/or other devices in the play system 300.

Alternative embodiments of a control data may comprise other types of data and/or different amounts of data for communication as well. For example, some embodiments of a control data may comprise only a device identifier, or at least a device identifier. The organization of data within a control data may be grouped or arbitrary, depending on the implementation. As depicted, control data D200 may comprise, but not limited to:

A device description data D210 may comprise a device identifier D211 (e.g. device ID="200"), and/or other types of data related to a device (e.g., display appliance) that is sending and/or receiving data.

A virtual object description data D220 may comprise a virtual object identifier D221 (e.g., ID="260", or "superhero human", etc. that identifies a virtual object), one or more support virtual object identifiers D224 (e.g., ID="360B" saber, etc. that identifies one or more support virtual objects), a virtual object type D222 (e.g., "Superhero human" indicating a type of virtual object), a virtual object brand D223 (e.g., "Superheroes" indicating brand of virtual object portrayed), and/or other types of data related to a virtual object. In some embodiments, the virtual object description data D220 may comprise at least a virtual object identifier D221 that identifies a virtual object in the play system. In various embodiments, the virtual object description data D220 may comprise a plurality of virtual object identifiers, such as virtual object identifier D221 and one or more support virtual object identifiers D224, which identify a plurality of virtual objects in the play system.

A command data D230 may comprise a command type D231 (e.g., Normal, Spatial calibrate, etc.), and other types of data related to commands issued to the receiving device.

A signal data D240 may comprise, but not limited to, a RSSI device identifier D241 (e.g., "100" that identifies the device related to an RSSI value), a RSSI value D242 (e.g., −100 associated with the device), and/or other types of data related to signals, RSSI values, and/or associated devices. In some embodiments, signal data D240 may be comprised of TOF values, or other signal related information.

Connecting First Controller Device to First Arbitrary Physical Object

As presented in FIGS. 6A-6D, a collection of perspective views give an overview of operations related to connecting, associating, and spatial calibrating a first controller device with a first arbitrary physical object and a first virtual object in the play system 300.

Figure 6A:
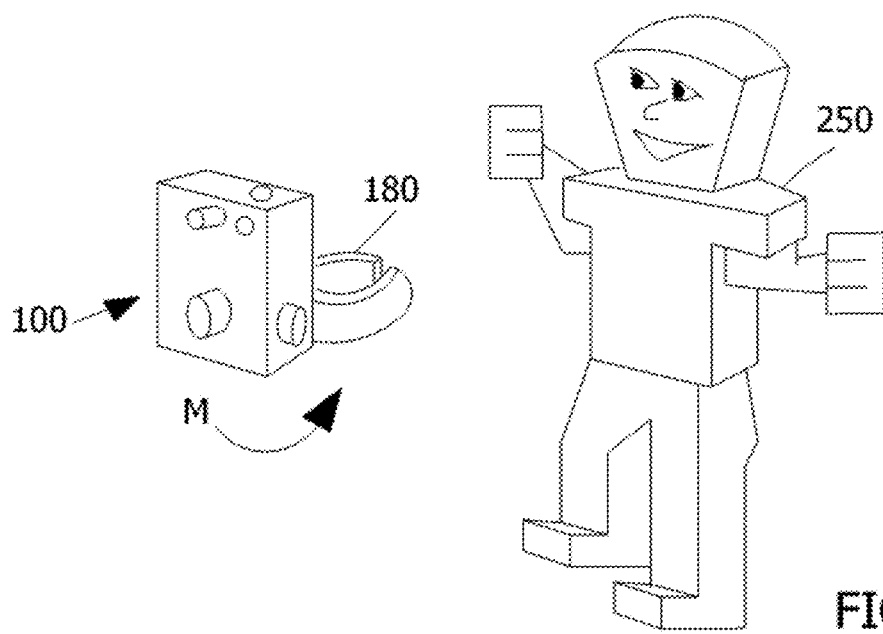
FIG. 6A is a perspective view for the play system of FIG. 1, of a first controller device and a first arbitrary physical object, prior to connecting.
Figure 6B:
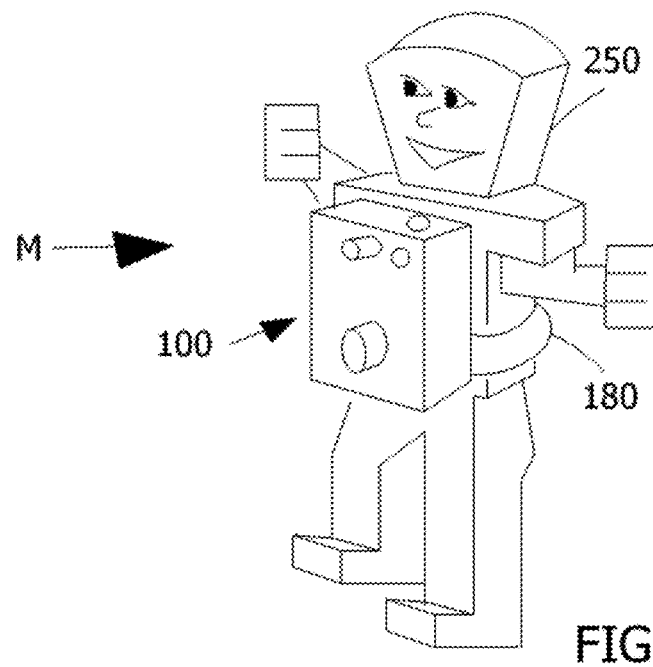
FIG. 6B is a perspective view for the play system of FIG. 1, of a first controller device and a first arbitrary physical object, after connecting.

So turning first to FIG. 6A, there presented is a first controller device 100 (as shown earlier in FIGS. 2A-2D) with a first arbitrary physical object 250, which is a toy robot. The first arbitrary physical object 250 may be selected (e.g. picked up in the hand) from the 3D ambient space by a player/user (not shown). Whereupon, the player/user may grip (e.g. handhold) the first controller device 100 and rotate its clip object connector 180 in an inward direction M, as shown in FIG. 6A. Then in FIG. 6B, the player/user (not shown) may grip and move the first controller device 100 through ambient space until pressed against the first arbitrary physical object 250 in a direction M until the clip object connector 180 opens up and grips around the first arbitrary physical object 250. Thus, the first controller device 100 is connected to the first arbitrary physical object 250. Since the clip object connector 180 comprises, for example, flexible plastic or rubber, the controller device 100 may be held tight (e.g., using a friction fit) to the surface of the first arbitrary physical object 250. Whereby, for example, a player/user (not shown) may now grip, make gesture movements, rotate, and move the first arbitrary physical object 250 with device 100 as a single physical unit through 3D ambient space.

Selecting First Virtual Object

Figure 6C:
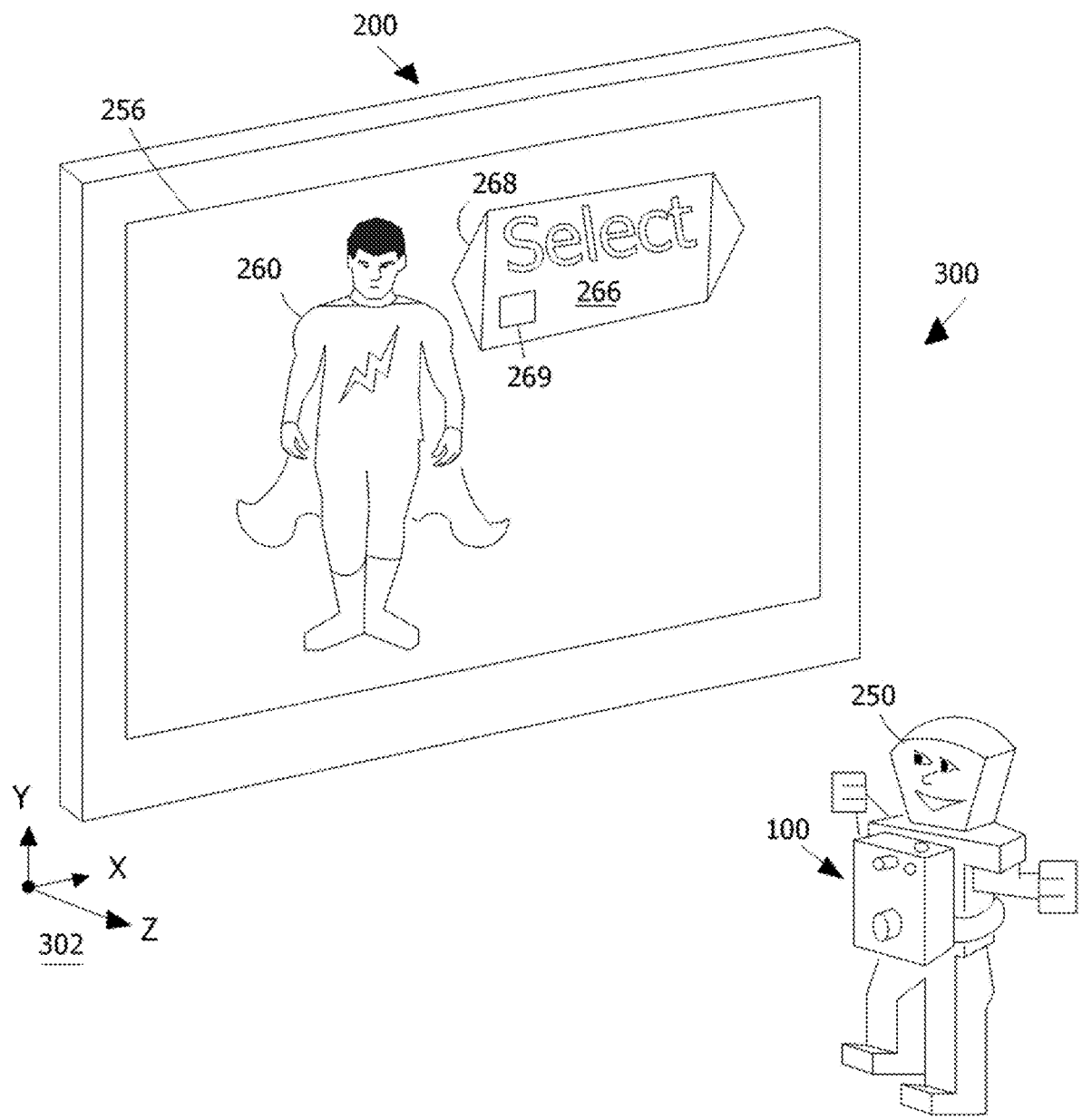
FIG. 6C is a perspective view for the play system of FIG. 1, of a display appliance, for selecting a virtual object for a first controller device and a first arbitrary physical object.

So now turning to FIG. 6C while referencing FIG. 5, the play system 300 is shown with the first controller device 100, first arbitrary physical object 250, and display appliance 200 during the selection of a first virtual object 260 by a user (not shown). Whereby, the play system 300, display appliance 200, input interface 216, and control unit 210 (e.g., executing computer instructions of the game application 222 and the virtual object description database 226 of FIG. 5) may present a graphic user interface (GUI), on the display appliance 200 with a video display 256, which includes a GUI menu 268 comprising a plurality of virtual objects, wherein at least one virtual object 260, from the plurality of virtual objects, is presented on the display appliance 200. To assist the user, the display appliance 200 may further present a GUI notification 266, on the display appliance 200, which may read "Select," "Choose," or other types of notification text or graphics viewable by a user. In some alternate embodiments, a GUI notification may read, but not limited to, "Select Character", "Select Vehicle", "Select Spaceship", or "Select Weapon." In many embodiments, a GUI notification may include text, images, sound effects, mechanical effects, or references to other information (e.g., links). In some embodiments, a GUI notification may be displayed proximate to a virtual object. Wherein, GUI notifications may provide useful information about a virtual object to a user/player. GUI notifications may appear automatically or in response to trigger events. For example, GUI notifications may only appear on the display appliance 200 when the user is interacting with a virtual object.

In some embodiments, user input may be received from one or more users while the play system 300 is operating multimedia effects in real-time with play activity for one or more users. For example, the play system 300, display appliance 200, input interface 216, and control unit 210 (in FIG. 5) may detect user input comprising, but not limited to, a user continuously sliding his/her finger across the GUI menu 268 on the display appliance 200.

In some embodiments, computer-controlled input may be automatically executed by the play system 300 while the play system 300 is operating multimedia effects in real-time with play activity for one or more users. For example, the play system 300, display appliance 200, input interface 216, and control unit 210 (in FIG. 5) may detect computer-controlled input comprising, but not limited to, selecting the type of virtual object(s), character ranking, and game level in the game application 222 (in FIG. 5). In some embodiments, a play system may use computer-controlled input based at least in part on arbitrary and random selection. In other embodiments, a play system may utilize computer-controlled input based at least in part on computer vision analysis, optical image sensing, spatial depth sensing, and/or other types of sensing of the 3D ambient space 302 including, but not limited to, the spatial geometry of the 3D ambient space 302, or the arbitrary physical objects in the 3D ambient space 302. For details related to "computer-controlled input," the reader may refer to discussion of the input interface 216 in FIG. 5 and elsewhere in this disclosure.

Now in various embodiments, one or more virtual objects may be presented on the display panel 200. Whereby, the play system 300, display appliance 200, input interface 216, and control unit 210 (in FIG. 5) may detect user input or computer-controlled input to scroll or shift to a next virtual object, from the plurality of virtual objects, on the GUI menu 268. Wherein, in some embodiments, the type of the virtual object (e.g., superhero, racecar, etc.), which is scrolled or shifted to, is arbitrary and not necessarily related to the type of arbitrary physical object 250 (e.g., robot, book, etc.) coupled to the controller device 100. That is, in some embodiments, user input or computer-controlled input can scroll to any type or unlimited type of virtual object 260 irrespective of the type of arbitrary physical object 250 coupled to the controller device 100. For example, user input may be based at least in part on a user continuously sliding his/her finger across the virtual object 260, or a user finger taps a GUI button 269 on the display appliance 200. Accordingly in response, the play system 300, display appliance 200, and control unit 210 may modify the GUI menu 268 to present the next virtual object, from the plurality of virtual objects, on the display appliance 200.

In some embodiments, the virtual object 260 may not be owned or retained by the play system 300. Whereby, the play system 300, display appliance 200, communication module 218 in communication with a computer network 299 (in FIG. 1), input interface 216, and control unit 210 (in FIG. 5) may detect user input or computer-controlled input to purchase or acquire a virtual object (e.g., from an online store or internet website in a computer network 299) for usage in the play system 300, from the plurality of virtual objects, on the GUI menu 268. In some embodiments, the virtual object 260 may be purchased or acquired from an online store or internet website in the computer network 299, electronic digital publication, universal resource locator (URL), internet service provider, digital token, digital memory, and other types of a digital information source. Wherein, in some embodiments, the type of the virtual object 260 (e.g., superhero, racecar, etc.), which is purchased or acquired, is arbitrary and not necessarily related to the type of arbitrary physical object 250 (e.g., robot, book, etc.) coupled to the controller device 100. That is, in some embodiments, user input or computer-controlled input can purchase or acquire any type or unlimited type of virtual object 260 irrespective of the type of arbitrary physical object 250 coupled to the controller device 100. Further, GUI menu 268 may be configured with functionality having a transaction interface (e.g., via the computer network 299 in FIG. 1) such that a user or computer-controlled input can complete a purchase transaction (e.g., with virtual tokens, virtual coins, legal tender, or national currency) of the virtual object 260. For example, user input may be based at least in part on a user continuously sliding his/her finger across the virtual object 260, or a user finger taps a GUI button 269 on the display appliance 200. Accordingly in response, the play system 300, display appliance 200, communication module 218 in communication with the computer network 299, and control unit 210 may modify the GUI menu 268 to purchase or acquire the virtual object 260 for usage in the play system 300, from the plurality of virtual objects, on the display appliance 200.

In some embodiments, the virtual object 260 may be "locked" and unavailable for usage in the play system 300. Thus the virtual object 260 has disabled functionality (e.g., indicated by a gray appearance) on the display appliance 200. However, the play system 300, display appliance 200, input interface 216, and control unit 210 (in FIG. 5) may detect user input or computer-controlled input to "unlock" or make available the virtual object 260 for usage in the play system 300, from the plurality of virtual objects, on the GUI menu 268. In some embodiments, the type of the virtual object (e.g., superhero, racecar, etc.), which is unlocked and made available, is arbitrary and not necessarily related to the type of arbitrary physical object 250 (e.g., robot, book, etc.) coupled to the controller device 100. That is, in some embodiments, user input or computer-controlled input can unlock and make available any type or unlimited type of virtual object 260 irrespective of the type of arbitrary physical object 250 coupled to the controller device 100. For example, user input may be based at least in part on a user continuously sliding his/her finger across the virtual object 260, or a user finger taps a GUI button 269, or a user shows a barcode to an optical camera on the display appliance 200, or a user enters an unlock code via a keypad on the display appliance 200. In various embodiments, an unlock code may be comprised of, but not limited to, numerical values, alpha-numeric text, barcode, QR code, digital key, digital certificate, or other types of an informational code. In some embodiments, an unlock code may be provided to a user or purchased from an online store or internet website in the computer network 299, electronic digital publication, a universal resource locator (URL), paper publication, packaging material, indicia (e.g., inscribed, printed, or molded) on a manufacturer's product, and other types of sources of an informational code. Accordingly in response to user input or computer-controlled input, the play system 300, display appliance 200, and control unit 210 may modify the GUI menu 268 to unlock or make available the virtual object 260 (e.g., now with full-color appearance) for usage for play activity in the play system 300, from the plurality of virtual objects, on the display appliance 200.

In some embodiments, the virtual object 260 may be considered for selecting and associating with the arbitrary physical object 250 coupled to the controller device 100. Whereby, the play system 300, display appliance 200, input interface 216, and control unit 210 (in FIG. 5) may detect user input or computer-controlled input for selection of the first virtual object 260 and/or one or more support virtual objects, from the plurality of virtual objects, within the GUI menu 268 on the display appliance 200. Then in subsequent steps, the virtual object 260 selected will be associated with the arbitrary physical object 250 coupled to the controller device 100. Wherein, in some embodiments, the type of the virtual object (e.g., superhero, racecar, etc.), which is selected, is arbitrary and not necessarily related to the type of arbitrary physical object 250 (e.g., robot, book, etc.) coupled to the controller device 100. That is, in some embodiments, user input or computer-controlled input can select any type or unlimited type of virtual object 260 irrespective of the type of arbitrary physical object 250 coupled to the controller device 100. For example, user input may be based at least in part on a user finger taps the GUI menu 268, first virtual object 260, one or more support virtual objects, or GUI button 269 on the display appliance 200. Accordingly in response, the play system 300, display appliance 200, and control unit 210 may select the first virtual object 260 and/or one or more support virtual objects, from the plurality of virtual objects, within GUI menu 268 on the display appliance 200, based at least in part on the user input provided by the user.

In some alternative embodiments using computer-controlled input, the play system 300, display appliance 200, input interface 216, and control unit 210 (in FIG. 5) may detect computer-controlled input for selection of a first virtual object 260 and/or one or more support virtual objects, from the plurality of virtual objects, within the GUI menu 268 on the display appliance 200. For example, the play system 300 may use computer-controlled input based at least in part on computer vision analysis, optical image sensing, RFID detection, signal detection, and/or other types of sensing of the arbitrary physical object 250 coupled to the controller device 100 in 3D ambient space. Accordingly in response, the play system 300, display appliance 200, input interface 216, and control unit 210 may select the first virtual object 260 and/or one or more support virtual objects, from the plurality of virtual objects, within GUI menu 268 on the display appliance 200, based at least in part on the computer-controlled input of the display appliance 200. For details related to "computer-controlled input," the reader may refer to discussion of the input interface 216 in FIG. 5 and elsewhere in this disclosure.

Creating First Virtual Object Description

Whereupon, continuing with FIG. 6C while referencing FIG. 5, the play system 300, display appliance 200, and control unit 210 (e.g., executing computer instructions of the game application 222 and the virtual object description database 226) may create a virtual object description data D300 (in FIG. 9A), based at least in part on the first virtual object 260 and/or one or more support virtual objects selected by a user, and store the virtual object description data D300 in the virtual object description database 226 for future reference. The virtual object description data D300 may comprise data and/or computer instructions, which is related to the first virtual object 260 and/or one or more support virtual objects selected by a user (as described above) and/or determined by the play system 300 (e.g., computer vision sensing, or RFID tag sensing). In some alternative embodiments, one or more support virtual objects may be optional or not implemented in a play system. In many embodiments, the virtual object description data D300 may comprise at least a virtual object identifier (e.g., ID="260") that identifies the first virtual object 260. In some embodiments, the virtual object description data D300 may comprise a plurality of virtual object identifiers that identify the first virtual object 260 and one or more support virtual objects. In some embodiments, the virtual object description data D300 may comprise, but not limited to, a virtual object identifier (e.g., ID="260"), virtual object type (e.g., "superhero character"), virtual object brand (e.g., "Superheroes"), virtual object state data (e.g., rank=8, strength=400, intelligence=8, hit points=1200, wealth=10, location=0,0,1, orientation=0,0,180, purchase cost=1.75 USD), virtual object behavior data (e.g., responses based on input stimuli), and/or virtual object content data (e.g., graphics/model data, auditory data, and/or mechanical data). For details regarding a virtual object description, the reader may refer to the virtual object description database 226 in FIG. 5 and other sections of this disclosure.

Detecting Spatial Calibrate Event for First Controller Device

Figure 6D:
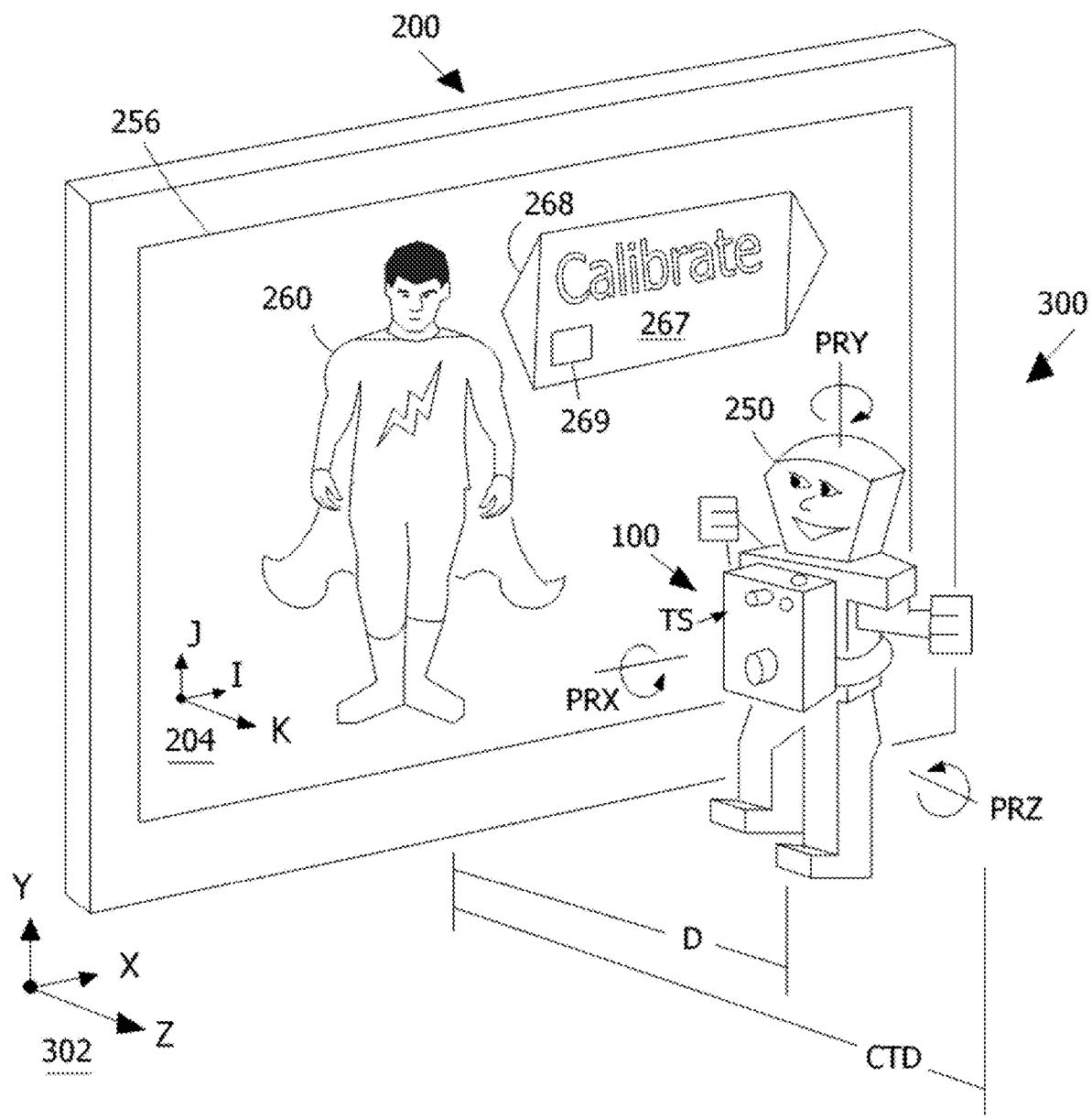
FIG. 6D is a perspective view for the play system of FIG. 1, of a display appliance, for spatial calibrating a virtual object and a first controller device and a first arbitrary physical object.

So now turning to FIG. 6D while referencing FIGS. 3 and 5, the play system 300 is presented with the first controller device 100, first arbitrary physical object 250, display appliance 200, and virtual object 260 during detection of a spatial calibrate event for the first controller device 100 within 3D ambient space 302. Further, in some embodiments, the play system 300, display appliance 200 with control unit 210 (e.g., executing computer instructions of the game application 222 and the relocatable translator 234) and the first controller device 100 with control unit 110 (e.g., executing computer instructions of the controller application 122 and the relocatable translator 134) may be configured to detect a spatial distance D, between the first controller device 100 and the display appliance 200, and define a spatial calibrate threshold distance CTD. Wherein, in various embodiments, the spatial calibrate threshold distance CTD may be less than 10 centimeters, 20 centimeters, 0.3 meter, 0.5 meter, or 1.0 meter. In some embodiments, the spatial calibrate threshold distance CTD may be variable between 0 and 0.5 meters inclusive. In the current embodiment, the spatial calibrate threshold distance CTD may be less than 20 centimeters.

So now during operation, a user may move the first controller device 100 and the first arbitrary physical object 250 near the display appliance 200. Whereupon, the play system 300, display appliance 200 with control unit 210 (e.g., executing computer instructions of the game application 222 and the relocatable translator 234) and/or the first controller device 100 with control unit 110 (e.g., executing computer instructions of the controller application 122 and the relocatable translator 134) may be enabled to detect a spatial calibrate event for the first controller device 100 within the 3D ambient space 302.

In some embodiments, the detection of a spatial calibrate event may be based at least in part on detecting the first controller device 100 and the first arbitrary physical object 250 are located at a spatial distance D, from the display appliance 200, that is less than or equal to a spatial calibrate threshold distance CTD. That is, in some embodiments, the play system 300, display appliance 200, and control unit 210 (e.g., executing computer instructions of the game application 222 and the relocatable translator 234) may detect the first controller device 100 and the first arbitrary physical object 250 are located at a spatial distance D, from the display appliance 200, that is less than or equal to a spatial calibrate threshold distance CTD. In some alternate embodiments, the play system 300, the first controller device 100 with control unit 110 (e.g., executing computer instructions of the controller application 122 and the relocatable translator 134) may detect the first controller device 100 and the first arbitrary physical object 250 are located at a spatial distance D, from the display appliance 200, that is less than or equal to a spatial calibrate threshold distance CTD.

In some embodiments, the detection of a spatial calibrate event may be based at least in part on detecting user input, via the input interface 216 of the display appliance 200, indicative of a spatial calibrate event for the first controller device 100. That is, in some embodiments, the play system 300, display appliance 200, input interface 216, and control unit 210 (e.g., executing computer instructions of the game application 222) may detect user input indicative of a spatial calibrate event for the first controller device 100. For example, user input may be based at least in part on a user that taps or a user finger that taps a GUI button 269 on the display appliance 200. In some alternate embodiments, the play system 300, the first controller device 100 with control unit 110 (e.g., executing computer instructions of the controller application 122 and the relocatable translator 134) may detect user input indicative of a spatial calibrate event for the first controller device 100. For example, user input may be based at least in part on a user or user finger taps an indicator sensor 157 (in FIG. 3) on the controller device 100.

In some alternate embodiments, the detection of a spatial calibrate event may be based at least in part on detecting a gesture movement, via the display appliance 200, indicative of a spatial calibrate event for the first controller device 100 within the 3D ambient space 302. That is, the play system 300, display appliance 200, motion module 219, and control unit 210 (e.g., executing computer instructions of the game application 222) may detect a gesture movement, via the display appliance 200, indicative of a spatial calibrate event for the first controller device 100 within the 3D ambient space 302. For example, a gesture movement may be based at least in part on a user that double taps (e.g., with a user finger or hand) the display appliance 200. In some alternate embodiments, the play system 300, the first controller device 100 with control unit 110 (e.g., executing computer instructions of the controller application 122 and the relocatable translator 134) may detect a gesture movement, via the controller device 100, indicative of a spatial calibrate event for the first controller device 100. For example, the gesture movement may be based at least in part on a gesture movement (e.g., double tap gesture, shake gesture, etc.) of the controller device 100.

Associating First Controller Device with First Virtual Object

Continuing with FIG. 6D while referencing FIGS. 3 and 5, the play system 300 is presented with the first controller device 100, first arbitrary physical object 250, display appliance 200, and virtual object 260 during an association process. As described in the above section "Detecting Spatial Calibrate Event for First Controller Device," a spatial calibrate event is detected by the play system 300. Wherein, in response to detecting a spatial calibrate event for the first controller device 100, the play system 300, display appliance 200, and control unit 210 (e.g., executing computer instructions of the game application 222 and the relocatable translator 234) may complete the following operations:

In response, the play system 300, display appliance 200, and control unit 210 (e.g., executing computer instructions of the game application 222 and the relocatable translator 234) may present a GUI notification 267 based on associating the first arbitrary physical object 250 with the first virtual object 260 and, if available, one or more support virtual objects. Wherein the GUI notification 267, on the display appliance 200, may read "Linking," "Connecting," "Joining", or other types of notification text or graphics viewable by a user.

Further in response, associating the first controller device 100 with the first virtual object 260 in the play system 300, wherein the virtual object description data D300 (in FIG. 9A) may be associated with the first controller device 100. That is, in some embodiments, the virtual object description data D300 may comprise at least a virtual object identifier D311 (e.g. ID="260") and a device identifier D314 (e.g., ID="100"), which identifies the first controller device 100— and thereby forms an association of the first virtual object 260 and the first controller device 100 within the play system 300. In various embodiments, the virtual object description data D300 may comprise a plurality of virtual object identifiers D311 and D315 (e.g. ID="260") and a device identifier D314 (e.g., ID="100"), which identifies the first controller device 100—and thereby forms an association of the first virtual object 260 and the one or more support virtual objects with the first controller device 100 within the play system 300.

Spatial Calibrating First Controller Device with First Virtual Object

Continuing with FIG. 6D while referencing FIGS. 3 and 5, the play system 300 is presented with the first controller device 100, first arbitrary physical object 250, display appliance 200, and virtual object 260 during a spatial calibration process. As described in the above section "Detecting Spatial Calibrate Event for First Controller Device," a spatial calibrate event is detected by the play system 300. Wherein, in response to detecting a spatial calibrate event for the first controller device 100, the play system 300 may complete the following operations:

In response, the play system 300, display appliance 200, and control unit 210 (e.g., executing computer instructions of the game application 222 and the relocatable translator 234) may present a GUI notification 267 based on spatial calibrating the spatial geometry of the first controller device 100 and first arbitrary physical object 250 with the first virtual object 260 and, if available, one or more support virtual objects. Wherein the GUI notification, on the display appliance 200, may read "Spatial Calibrate", "Align", "Sync", or other types of notification text or graphics viewable by a user.

Further in response, the play system 300, display appliance 200 with control unit 210 (e.g., executing computer instructions of the game application 222 and the relocatable translator 234) and/or the first controller device 100 with control unit 110 (e.g., executing computer instructions of the controller application 122 and the relocatable translator 134) may spatial calibrate the spatial geometry (e.g., orientation and/or location) of the first controller device 100 and the first arbitrary physical object 250, within the 3D ambient space 302, with the first virtual object 260, within the 3D virtual space 204, on the display appliance 200 in the play system 300. Thus, in some embodiments, spatial calibrating the spatial geometry may include, but not limited to, spatial calibrating the relocatable translator 134 of the controller device 100 in FIG. 3, and/or spatial calibrating the relocatable translator 234 of the display appliance 200 in FIG. 5. The result being, in some embodiments, there is a correlation at least in part of, but not limited to, orientation, location, and/or movement of the controller device 100 and arbitrary physical object 250, in 3D ambient space 302, with one or more virtual objects 260, in 3D virtual space 204, on the display appliance 200. In some embodiments, spatial calibrating, via the first controller device, the first relocatable translator 134 of the first controller device 100, such that the first controller device 100 is enabled to be arbitrarily relocatable within the 3D ambient space 302, wherein at least once a first orientation (and/or a first location), of the first controller device 100 in the 3D ambient space 302, is independently and arbitrarily adjustable in respect to a second orientation (and/or a second location) of the first virtual object 260, in a 3D virtual space 204, on the display appliance 200. For more details regarding spatial calibration of spatial geometry, see the description of relocatable translators 134 and 234 in FIGS. 3 and 5 and elsewhere in this disclosure.

Connecting Second Controller Device to Second Arbitrary Physical Object

So turning now to FIGS. 7A-7D, a collection of perspective views give an overview of operations related to connecting, associating, and spatial calibrating a second controller device with a second arbitrary physical object and a second virtual object in the play system 300. The configuration and operations in FIGS. 7A-7D are similar to configuration and operations discussed earlier in FIGS. 6A-6D.

Figure 7A:
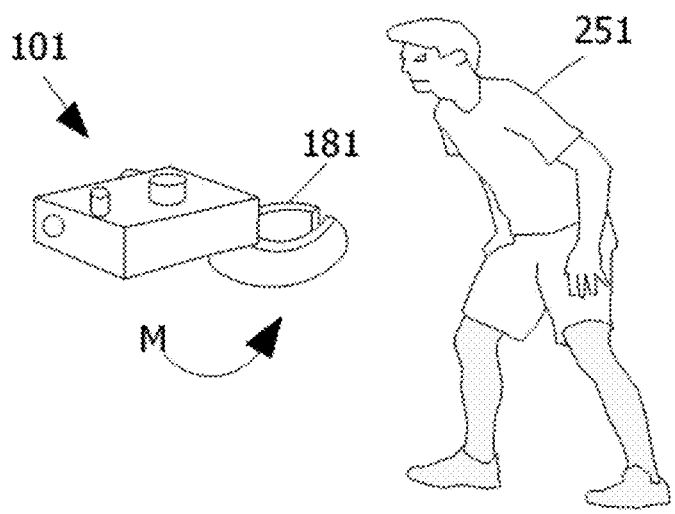
FIG. 7A is a perspective view for the play system of FIG. 1, of a second controller device and a second arbitrary physical object, prior to connecting.

So turning first to FIG. 7A, there presented is the second controller device 101 (similar in apparatus and functionality as device 100 shown in FIGS. 2A-2D) with the second arbitrary physical object 251, which is a toy action figure. The second arbitrary physical object 251 may be selected (e.g. picked up in the hand) from the 3D ambient space by a player/user (not shown). Whereupon, the player/user may grip the second controller device 101 and rotate its clip object connector 181 in an outward direction M, as shown in FIG. 7A.

Figure 7B:
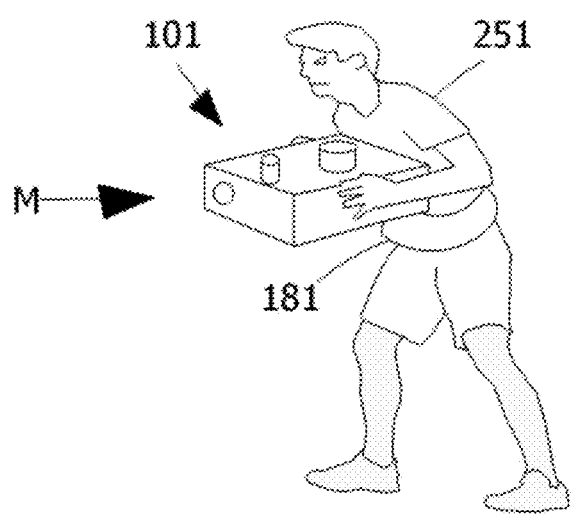
FIG. 7B is a perspective view for the play system of FIG. 1, of a second controller device and a second arbitrary physical object, after connecting.

Then in FIG. 7B, the player/user (not shown) may grip and move the second controller device 101 through ambient space until pressed against the second arbitrary physical object 251 in a direction M until the clip object connector 181 opens up and grips around the second arbitrary physical object 251. Thus, the second controller device 101 is connected to the second arbitrary physical object 251. Since the clip object connector 181 comprises, for example, flexible plastic or rubber, the controller device 101 may be held tight (e.g., using a friction fit) to the surface of the second arbitrary physical object 251. Whereby, for example, a player/user (not shown) may now grip, make gesture movements, rotate, and move the second arbitrary physical object 251 with device 101 as a single physical unit through 3D ambient space.

Selecting a Second Virtual Object

Figure 7C:
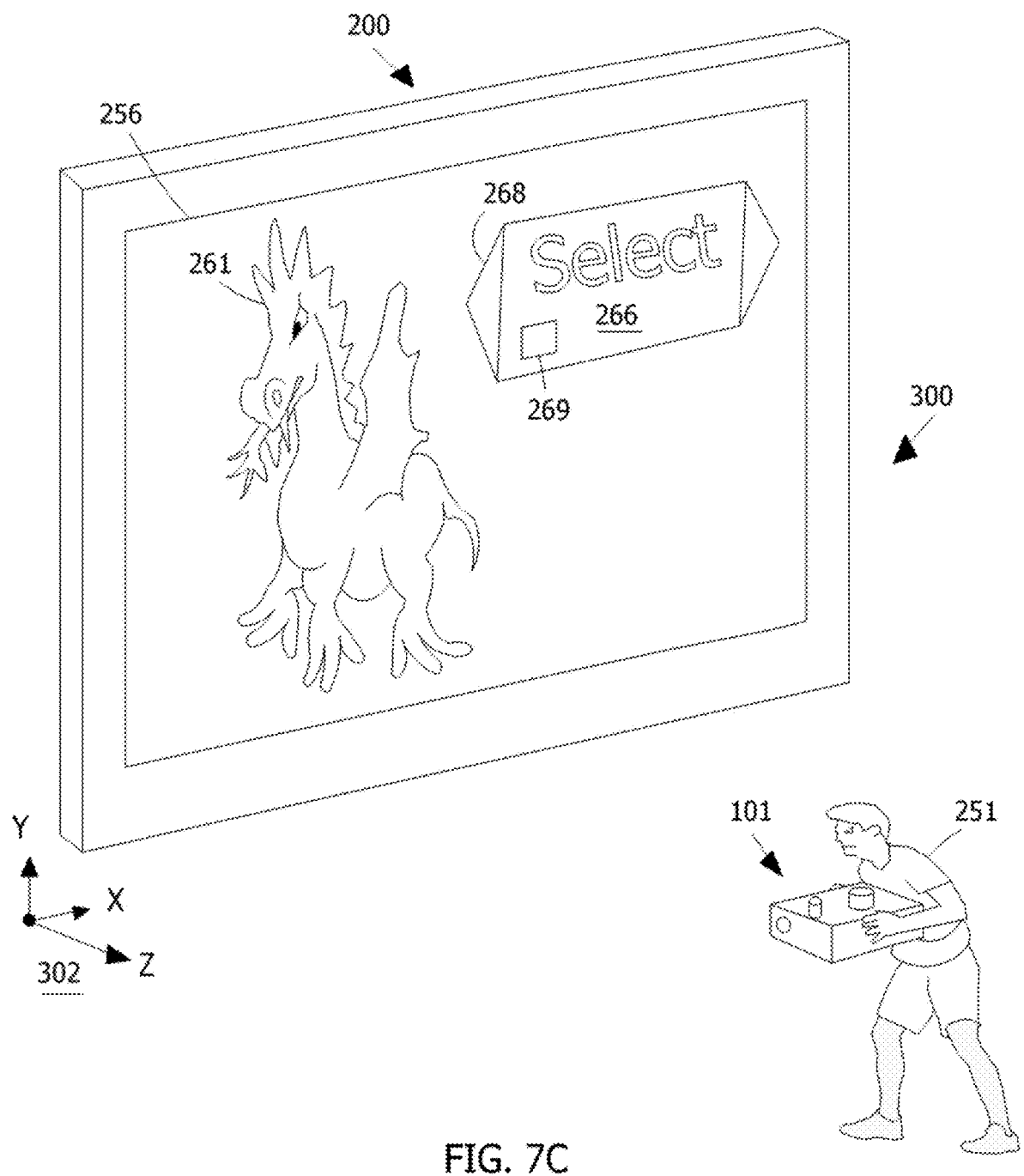
FIG. 7C is a perspective view for the play system of FIG. 1, of a display appliance, for selecting a virtual object for a second controller device and a second arbitrary physical object.

So now turning to FIG. 7C while referencing FIG. 5, the play system 300 is shown with the second controller device 101, second arbitrary physical object 251, and the display appliance 200 in operation during the selection of a second virtual object 261 (e.g., a dragon) by a user (not shown). Now selecting the second virtual object 261 may be similar to selecting the first virtual object 260 in FIG. 6C, as discussed earlier under the section "Selecting First Virtual Object" for FIG. 6C. Wherein, for sake of brevity, the reader may refer to the previously disclosed description.

Creating a Second Virtual Object Description

Whereupon, continuing with FIG. 7C while referencing FIG. 5, the play system 300, display appliance 200, and control unit 210 (e.g., executing computer instructions of the game application 222 and the virtual object description database 226) may create a virtual object description data D300 (in FIG. 9A), based at least in part on the second virtual object 261 and/or one or more support virtual objects selected by a user, and store the virtual object description data D300 in the virtual object description database 226 for future reference. The virtual object description data D300 may comprise data and/or computer instructions, which is related to the second virtual object 261 selected by a user (as described above) and/or determined by the play system 300 (e.g., computer vision sensing, or RFID tag sensing). In many embodiments, the virtual object description data D300 may comprise at least a virtual object identifier D311 (e.g., ID="261") that identifies the second virtual object 261. In many embodiments, the virtual object description may comprise, but not limited to, a virtual object identifier D311 (e.g., ID="261"), support virtual object identifiers D315 (e.g., ID="360B", none), virtual object type (e.g., "villain character"), virtual object brand (e.g., "Superheroes"), virtual object state data (e.g., rank=8, strength=300, intelligence=5, hit points=1200, wealth=8, location=0,0,1, orientation=0,0, 180, purchase cost=1.50 USD), virtual object behavior data (e.g., responses based on input stimuli), and/or virtual object content data (e.g., graphics/model data, auditory data, and/or mechanical data). For details regarding a virtual object description, the reader may refer to the virtual object description database 226 in FIG. 5 and other sections of this disclosure.

Detecting a Spatial Calibrate Event for the Second Controller Device

Figure 7D:
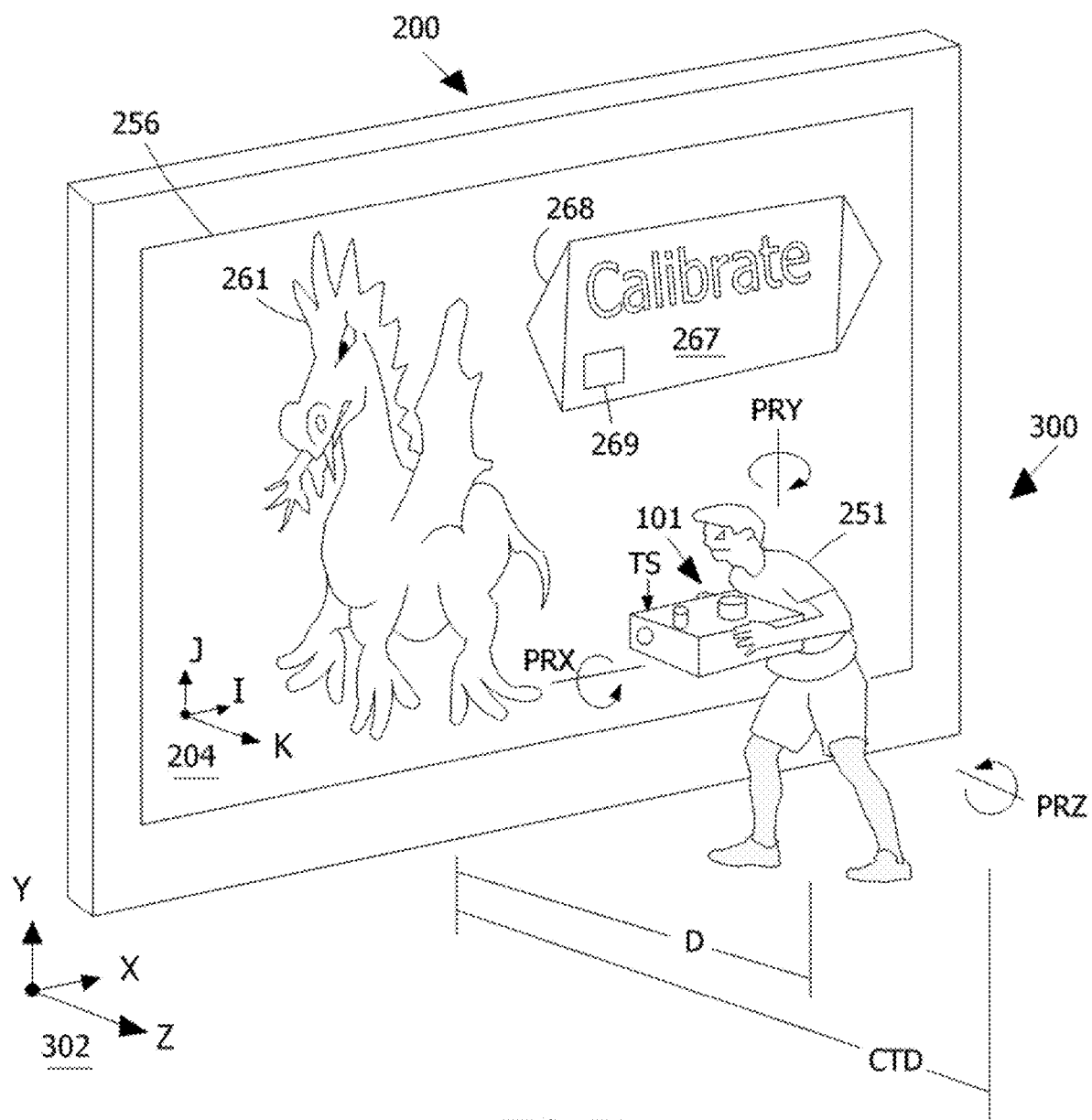
FIG. 7D is a perspective view for the play system of FIG. 1, of a display appliance, for spatial calibrating a virtual object and a second controller device with a second arbitrary physical object.

So now turning to FIG. 7D while referencing FIGS. 3 and 5, the play system 300 is presented with the second controller device 101, second arbitrary physical object 251, display appliance 200, and virtual object 261 during detection of a spatial calibrate event for the second controller device 100 within 3D ambient space 302. Wherein, for sake of brevity, the reader may refer to the earlier similar description in sections "Detecting Spatial Calibrate Event for First Controller Device" for FIG. 6D.

Associating the Second Controller Device with the Second Virtual Object

So turning to FIG. 7D while referencing FIGS. 3 and 5, the play system 300 is presented with the second controller device 101, second arbitrary physical object 251, display appliance 200, and virtual object 261 during an association process. Wherein, for sake of brevity, the reader may refer to the earlier similar description in sections "Associating the First Controller Device with the First Virtual Object" for FIG. 6D.

Spatial Calibrating the Second Controller Device with the Second Virtual Object

So turning to FIG. 7D while referencing FIGS. 3 and 5, the play system 300 is presented with the second controller device 101, second arbitrary physical object 251, display appliance 200, and virtual object 261 during a spatial calibration process. Wherein, for sake of brevity, the reader may refer to the earlier similar description in sections "Spatial Calibrating the First Controller Device with the First Virtual Object" for FIG. 6D.

Connecting Third Controller Device to Third Arbitrary Physical Object

So turning now to FIGS. 8A-8D, a collection of perspective views give an overview of operations related to connecting, associating, and spatial calibrating a third controller device with a third arbitrary physical object and a third virtual object in the play system 300. The configuration and operations in FIGS. 8A-8D are similar to configuration and operations discussed earlier in FIGS. 6A-6D.

Figure 8A:
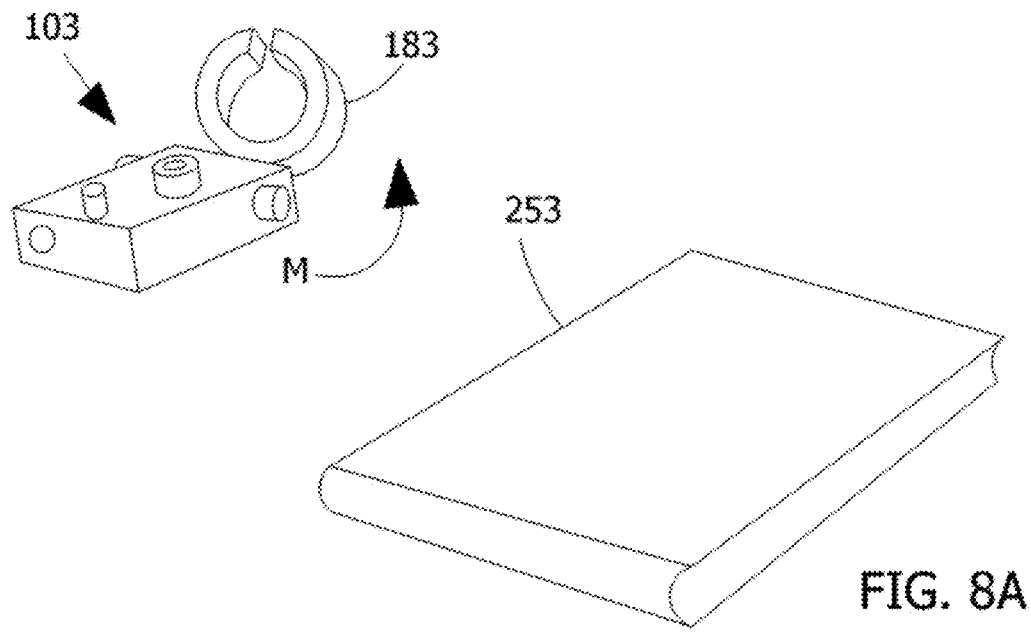
FIG. 8A is a perspective view for the play system of FIG. 1, of a third controller device and a third arbitrary physical object, prior to connecting.

So turning first to FIG. 8A, there presented is the third controller device 103 (similar in apparatus and functionality as device 100 shown in FIGS. 2A-2D) with the third arbitrary physical object 253, which is a paperback book. The third arbitrary physical object 253 may be selected (e.g. picked up in the hand) from the 3D ambient space by a player/user (not shown). Whereupon, the player/user may grip the third controller device 103 and rotate its clip object connector 183 in an outward direction M, as shown in FIG. 8A.

Figure 8B:
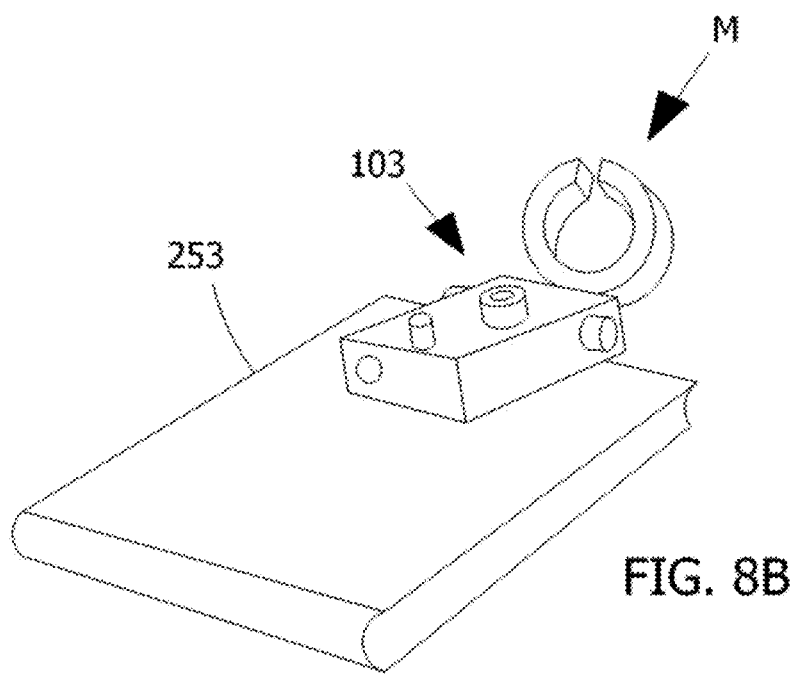
FIG. 8B is a perspective view for the play system of FIG. 1, of a third controller device and a third arbitrary physical object, after connecting.

Then in FIG. 8B, the player/user (not shown) may grip and move the third controller device 103 through ambient space until pressed against the third arbitrary physical object 253 in a direction M until the clip object connector 186 (shown in FIG. 2C on the bottom of the device) opens up and grips the third arbitrary physical object 253. Thus, the third controller device 103 is connected to the third arbitrary physical object 253. Since the clip object connector 186 (in FIG. 2C) comprises, for example, flexible plastic or rubber, the controller device 103 may be held tight (e.g., using a friction fit) to the surface of the third arbitrary physical object 253. Whereby, for example, a player/user (not shown) may now grip, make gesture movements, rotate, and move the third arbitrary physical object 253 with device 103 as a single physical unit through 3D ambient space.

Selecting a Third Virtual Object

Figure 8C:
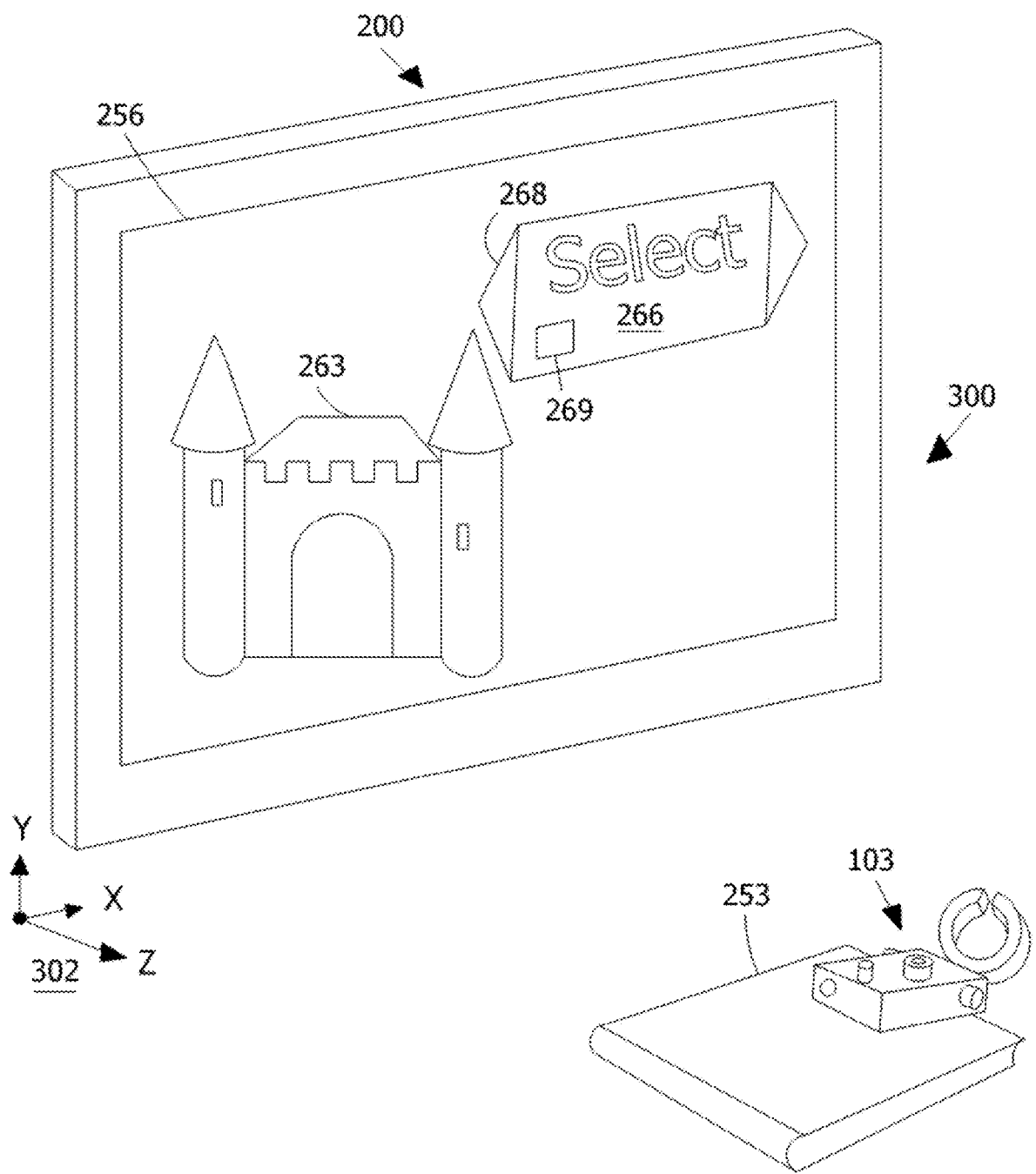
FIG. 8C is a perspective view for the play system of FIG. 1, of a display appliance, for selecting a virtual object for a third controller device and a third arbitrary physical object.

So now turning to FIG. 8C while referencing FIG. 5, the play system 300 is shown with the third controller device 103, third arbitrary physical object 253, and the display appliance 200 in operation during the selection of a third virtual object 263 (e.g., a castle) by a user (not shown). Wherein, for sake of brevity, the reader may refer to the earlier similar description in sections "Selecting First Virtual Object" for FIG. 6C.

Creating a Third Virtual Object Description

Whereupon, continuing with FIG. 8C while referencing FIG. 5, the play system 300, display appliance 200, and control unit 210 (e.g., executing computer instructions of the game application 222 and the virtual object description database 226) may create a virtual object description data D300 (in FIG. 9A), based at least in part on the third virtual object 263 and/or one or more support virtual objects selected by a user, and store the virtual object description data D300 in the virtual object description database 226 for future reference. The virtual object description data D300 may comprise data and/or computer instructions, which is related to the third virtual object 263 selected by a user (as described above) and/or determined by the play system 300 (e.g., computer vision sensing, or RFID tag sensing). In many embodiments, the virtual object description data D300 may comprise at least a virtual object identifier D311 (e.g., ID="263") that identifies the third virtual object 263. In many embodiments, the virtual object description may comprise, but not limited to, a virtual object identifier D311 (e.g., ID="263"), support virtual object identifiers D315 (e.g., ID="360B", none), virtual object type (e.g., "castle"), virtual object brand (e.g., "Superheroes"), virtual object state data (e.g., rank=8, strength=300, intelligence=5, hit points=1200, wealth=8, location=0,0,1, orientation=0,0, 180, purchase cost=2.50 USD), virtual object behavior data (e.g., responses based on input stimuli), and/or virtual object content data (e.g., graphics/model data, auditory data, and/or mechanical data). For details regarding a virtual object description, the reader may refer to the virtual object description database 226 in FIG. 5 and other sections of this disclosure.

Detecting a Spatial Calibrate Event for the Third Controller Device

Figure 8D:
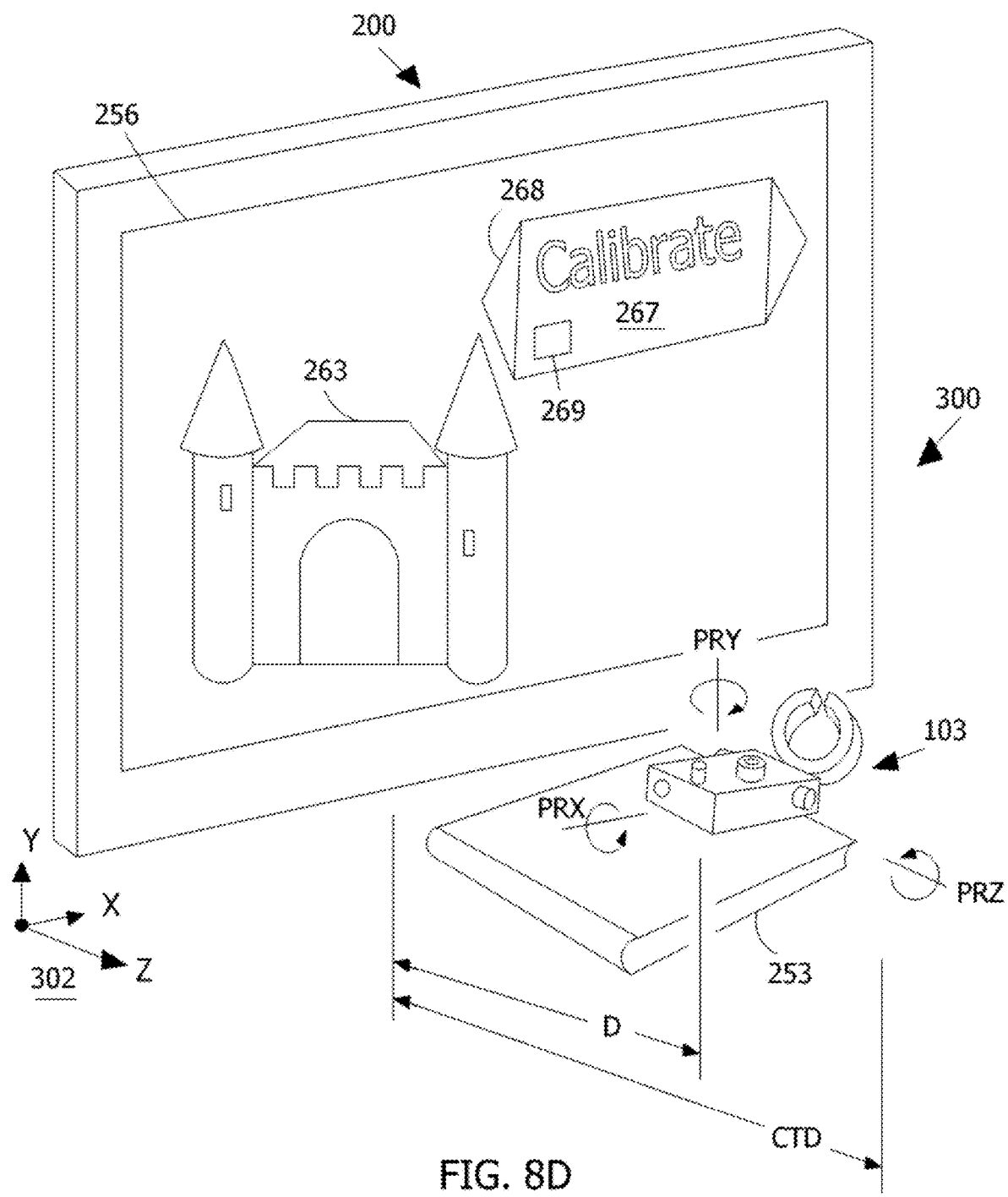
FIG. 8D is a perspective view for the play system of FIG. 1, of a display appliance, for spatial calibrating a virtual object and third controller device and a third arbitrary physical object.

So now turning to FIG. 8D while referencing FIGS. 3 and 5, the play system 300 is presented with the third controller device 103, third arbitrary physical object 253, display appliance 200, and virtual object 263 during detection of a spatial calibrate event for the third controller device 103 within 3D ambient space 302. Wherein, for sake of brevity, the reader may refer to the earlier similar description in sections "Detecting Spatial Calibrate Event for First Controller Device" for FIG. 6D.

Associating the Third Controller Device with the Third Virtual Object

So turning to FIG. 8D while referencing FIGS. 3 and 5, the play system 300 is presented with the third controller device 103, third arbitrary physical object 253, display appliance 200, and virtual object 263 during an association process. Wherein, for sake of brevity, the reader may refer to the earlier similar description in sections "Associating the First Controller Device with the First Virtual Object" for FIG. 6C.

Spatial Calibrating the Third Controller Device with the Third Virtual Object

So turning to FIG. 8D while referencing FIGS. 3 and 5, the play system 300 is presented with the third controller device 103, third arbitrary physical object 253, display appliance 200, and virtual object 263 during a spatial calibration process. Wherein, for sake of brevity, the reader may refer to the earlier similar description in sections "Spatial Calibrating the First Controller Device with the First Virtual Object" for FIG. 6D.

Figure 10A:
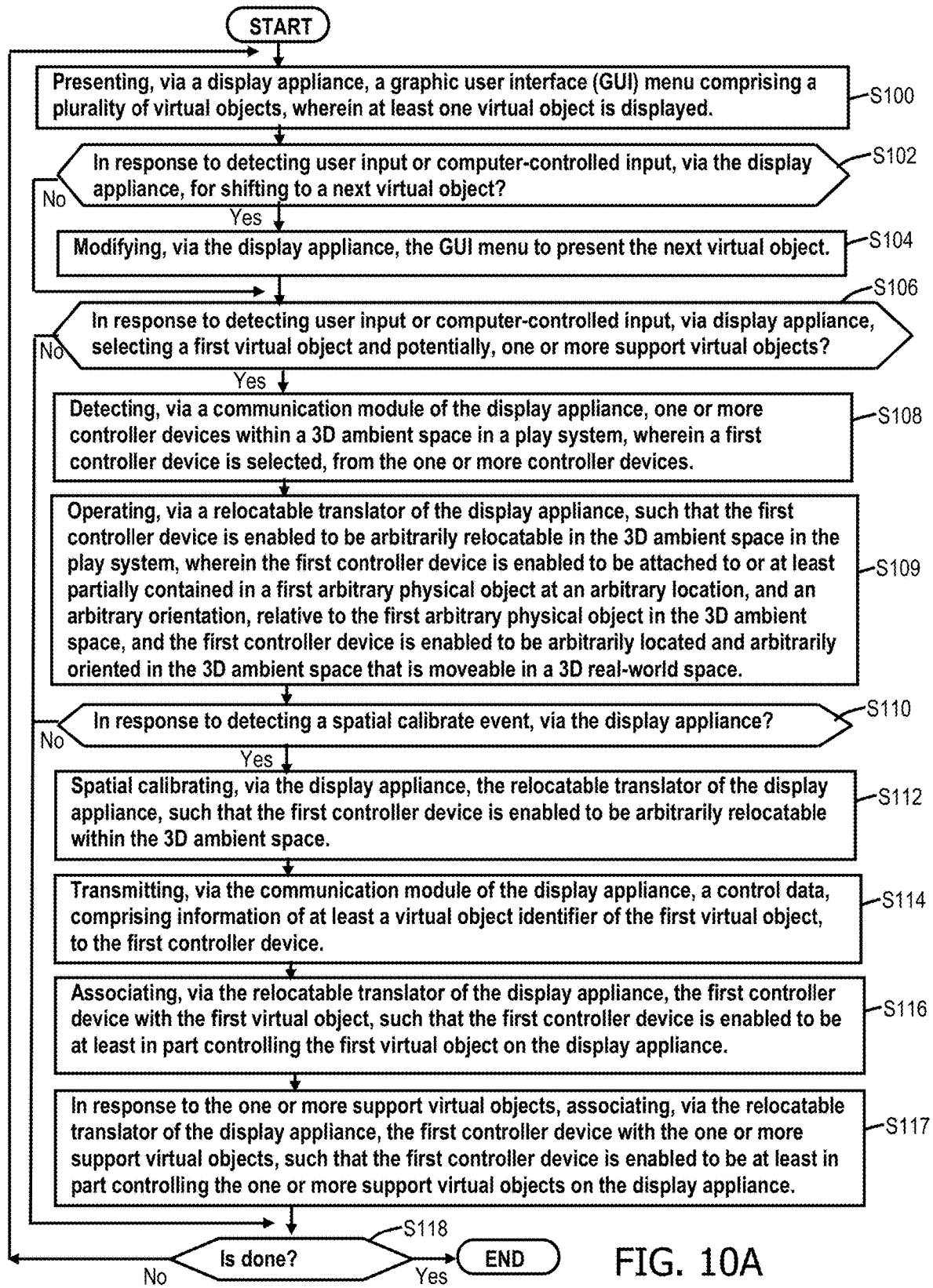
FIG. 10A is a flowchart for the play system of FIG. 1, of a method of a display appliance, for operating a graphic user interface for selecting, associating, and spatial calibrating a first controller device with a first arbitrary physical object with a first virtual object and one or more support virtual objects.

Method for Display Appliance to Select, Associate, and Spatial Calibrate Controller Device Turning now to FIG. 10A while referencing FIGS. 5, 6C, and 6D, there shown is a flowchart of an exemplary embodiment of a computer-implemented method for a display appliance that may enable selecting, associating, and spatial calibrating operations of a first controller device with a first arbitrary physical object and a first virtual object and one or more support virtual objects in the play system, although alternative methods may also be considered. In the current embodiment, the computable aspects of a method may be implemented in memory (e.g., memory 220) storing computer instructions (e.g., relocatable translator 234 and game application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., invoked every 0.03 seconds) or continually executed on a needed basis. Whereby, play system may be operating multimedia effects in real-time with play activity for one or more users.

So to begin, in some embodiments, a computer-implemented method may comprise: at a display appliance 200, with one or more control units 210 and memory 220, wherein the one or more control units 210 execute computer instructions performing first operations for a play system 300:

In some embodiments, beginning with step S100, presenting, via a video display 256 of the display appliance 200, a graphic user interface (GUI) menu 268 comprising a plurality of virtual objects, wherein at least one virtual object 260, from the plurality of virtual objects, is presented on the display appliance 200.

In some embodiments, in step S102, in response to detecting user input or computer-controlled input, via the display appliance 200 (e.g., input interface 216 in FIG. 5), for scrolling or shifting to a next virtual object, from the plurality of virtual objects, within the GUI menu 268 on the display appliance 200—then continue to next step S104. Otherwise, if no user input or computer-controlled input is detected, the method skips to step S106. For example, user input may be based at least in part on a user continuously sliding his/her finger across the virtual object 260, or a user finger taps a GUI button 269 on the display appliance 200. In other embodiments, user input may be based at least in part on a user depressing a pushbutton or sliding a switch on a display appliance. In other embodiments, user input may be based at least in part on a user making a gesture movement (e.g., double tap gesture, shake gesture movement, spin gesture movement, etc.) of a controller device, or depresses a pushbutton or touchpad on a controller device in a play system. In various embodiments, computer-controlled input may be based at least in part on computer vision, RFID tag reading, machine learning, and/or other types of sensing and/or analysis of an arbitrary physical object or a physical environment within 3D ambient space 302 of the play system 300. For further information about user input or computer-controlled input, the reader may refer to the input interface 216 (in FIG. 5) and elsewhere in this disclosure.

In some embodiments, in step S104, modifying, via the display appliance 200 (e.g., game application 222 in FIG. 5), the GUI menu 268 to present the next virtual object on the display appliance 200. In various embodiments, modifying the GUI menu 268 may be scrolling the GUI menu 268 in a horizontal or vertical direction such that the next virtual object appears on the display appliance 200.

In some embodiments, in step S106, in response to detecting user input or computer-controlled input, via the display appliance 200 (e.g., input interface 216 in FIG. 5), selecting a first virtual object 260 and, potentially, one or more support virtual objects, from the plurality of virtual objects, within the GUI menu 268 on the display appliance 200—then continue to the next step. Otherwise, if no user input or computer-controlled input is detected, the method skips to step S118. In various embodiments, user input may be based at least in part on a user finger taps the GUI menu 268, virtual object 260, one or more support virtual objects (not shown), or GUI button 269 on the display appliance 200. In some embodiments, user input may be based at least in part on a user depressing a pushbutton or sliding a switch on a display appliance. In some embodiments, user input may be based at least in part on a user making a gesture movement (e.g., double tap gesture, shake gesture movement, spin gesture movement, etc.) of a controller device, or a user touching an indicator sensor, pushbutton, or touchpad on a controller device in a play system. In various embodiments, computer-controlled input may be based at least in part on computer vision, RFID tag reading, machine learning, and/or other types of sensing and/or analysis of an arbitrary physical object or a physical environment within 3D ambient space 302 of the play system 300. For further information about user input or computer-controlled input, the reader may refer to the input interface 216 (in FIG. 5) and elsewhere in this disclosure. In some embodiments, support virtual objects may be optional and not implemented, wherein the current step may not facilitate the selection of support virtual object(s).

In some embodiments, in step S108, detecting, via a communication module 218 of the display appliance 200, one or more controller devices within a 3D ambient space 302 in the play system 300, wherein a first controller device 100 is selected, from the one or more controller devices. In the current embodiment, the one or more controller devices may be detected, via the communication module 218 of the display appliance 200, by wirelessly receiving one or more control data D100 (in FIG. 9B) from the one or more controller devices 100 and 101 within the 3D ambient space 302. In the current embodiment, the first controller device 100 may be selected, via the display appliance 200, based at least in part on a control data D100 comprising information of a spatial feature (e.g., motion data D140, gesture data D160, collision data D170, and/or imaginary data D180, etc. in FIG. 9B) of the first controller device 100. Wherein, the spatial feature may comprise, but not limited to, a location, orientation, distance, movement, gesture movement, and/or any other type of spatial information that corresponds to the first controller device. In other embodiments, the first controller device 100 may be selected, via the communication module 218 of the display appliance 200, based at least in part on detecting a control data D100 (in FIG. 9B) wirelessly received from the first controller device 100. Wherein, the control data D100 may comprise information indicative of a user depressing a pushbutton (e.g., via the input interface 116 of the device 100) on the first controller device 100, or a user has made a gesture movement (e.g., gesture data D160 in FIG. 9B) with the first controller device 100. In alternate embodiments, the first controller device 100 may be selected, via a input interface 216 of the display appliance 200, based at least in part on detecting user input selecting a first controller device, such as for example, a user finger taps the GUI menu 268, GUI button 269, or GUI item on the display appliance 200 indicative of selecting the first controller device 100.

In some embodiments, in step S109, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps in FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S110, in response to detecting a spatial calibrate event, via the display appliance 200, the method continues to step S112. Otherwise if no detection occurred, the method skips to step S118. In various embodiments, a spatial calibrate event may be based at least in part on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps in FIGS. 10H, 10I, 10J, 10K, 10L, and/or 10M, which are discussed in the section titled "Method for Display Appliance to Spatial Calibrate in Real-time."

In some embodiments, in step S112, spatial calibrating, via the display appliance 200, the relocatable translator 234 of the display appliance 200, such that the first controller device 100 is enabled to be arbitrarily relocatable within the 3D ambient space 302. Whereby, the first controller device 100 is enabled to be attached to or at least partially contained in an arbitrary physical object 250 at an arbitrary location, and an arbitrary orientation, relative to the arbitrary physical object 250 within the 3D ambient space 302. And the first controller device 100 is further enabled to be arbitrarily located and arbitrarily oriented in the 3D ambient space 302 that is movable in a 3D real-world space. In some embodiments, spatial calibrating, via the relocatable translator 234 of the display appliance 200, may comprise operations that spatial calibrates the relocatable translator 234 of the display appliance 200, which may include, but not limited to, modifying data within the relocatable dataset D450 (e.g., controller device identifier D461, virtual object identifier D462, home reference orientation D464, home reference location D463, etc.). Further, in some embodiments, the relocatable dataset D450 may be modified based at least in part on a control data D100 (in FIG. 9B), received from the first controller device 100 via the communication module 218 of the display appliance 200, which comprises information of spatial features (e.g., orientation, location, etc.) of the first controller device 100 within the 3D ambient space 302. For more details, the reader may refer to the discussion of the relocatable translator 234 of the display appliance 200 (in FIG. 5) and elsewhere in this disclosure. In various alternate embodiments, the current step may be replaced in part, in whole, and/or in combination with the operational steps in FIGS. 10H, 10I, 10J, 10K, 10L, and/or 10M, which are discussed in the section titled "Method for Display Appliance to Spatial calibrate in Real-time."

In some embodiments, in step S114, transmitting, via the communication module 218 of the display appliance 200, a control data D200, comprising at least a virtual object identifier D221 of the first virtual object 260, to the first controller device 100 within the 3D ambient space. In some embodiments, the virtual object identifier D221 identifies the first virtual object 260 that is associated with the first controller device 100. In some alternate embodiments, in the current step, transmitting, via the communication module 218 of the display appliance 200, a control data D200 comprising a virtual object description D220, which comprises at least a virtual object identifier D221 of the first virtual object 260, to the first controller device 100. In other alternate embodiments, in the current step, transmitting, via the communication module 218 of the display appliance 200, a control data D200 comprising a virtual object description D220, which comprises a plurality of virtual object identifiers, such as virtual object identifier D221 and one or more support virtual object identifiers D224, which identify a plurality of virtual objects, to the first controller device 100. In some alternate embodiments, the current step may be optional and not required.

In some embodiments, in step S116, associating, via the relocatable translator 234 of the display appliance 200, the first controller device 100 with the first virtual object 260, such that the first controller device 100 is enabled to be at least in part controlling the first virtual object 260 on the display appliance 200. Whereby, for example in some embodiments, when the first controller device 200 makes a first movement within 3D ambient space 302—the first virtual object 260, on the display appliance 200, makes a second movement based at least in part on the first movement of the first controller device 100 in 3D ambient space 302.

In some embodiments, in step S117, in response to the one or more support virtual objects, associating, via the relocatable translator 234 of the display appliance 200, the first controller device 100 with the one or more support virtual objects, such that the first controller device 100 is enabled to be at least in part controlling the one or more support virtual objects on the display appliance 200. Whereby, for example in some embodiments, when the first controller device 200 makes a first movement within 3D ambient space 302—the one or more support virtual objects, on the display appliance 200, make a third movement based at least in part on the first movement of the first controller device 100 in 3D ambient space 302. In some embodiments, support virtual objects are not implemented, wherein the current step may not be required.

Finally, in some embodiments, in step S118, in response to determining, via the display appliance 200, that the method is not done, the method goes back to step S100. Otherwise the method is done, so the method ends. In the current embodiment, determining if the method is done may be based at least in part on a substantially periodic time interval or a detected periodic state, wherein the method may be continuously executed (looping from step S118 back to step S100) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S118 back to step S100) in a substantially aperiodic or on a needed basis. In other embodiments, the current step may not be required, or implemented elsewhere.

Method for Controller Device to Spatial Calibrate in Real-Time

Turning now to FIG. 10B while referencing FIGS. 1 and 3, there shown is a flowchart of an exemplary embodiment of a computer-implemented method for a first controller device that spatial calibrates the first controller device within 3D ambient space, although alternative methods may also be considered.

In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some embodiments, beginning with step S120, in response to detecting a spatial calibrate event, via the first controller device 100, the method continues to step S122. Otherwise if no detection occurred, the method ends. In various embodiments, a spatial calibrate event may be based on, but not limited to, a spatial feature, user input, spatial distance between a controller device and a display appliance, and/or gesture movement of a controller device or a display appliance.

In some embodiments, in step S122, spatial calibrating, via the first controller device 100, the relocatable translator 134 of the first controller device 100, such that the first controller device 100 is enabled to be arbitrarily relocatable within the 3D ambient space 302. Whereby, for example, the first controller device 100 may be enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. In some embodiments, the current step may include: wherein the play system 300 is operating multimedia effects in real-time with play activity for one or more users. In some embodiments, spatial calibrating, via the first controller device 100, may comprise operations that spatial calibrates the relocatable translator 134 of the first controller device 100, which may include, but not limited to, modifying data within the relocatable dataset D410 (e.g., controller device identifier D411, virtual object identifier D412, home reference location D413, home reference orientation D414, etc.). Further, in some embodiments, the relocatable dataset D410 may be modified based at least in part on a control data D200 (in FIG. 9C), received from the display appliance 200 via the communication module 118 of the first controller device 100. For more details, the reader may refer to the discussion of the relocatable translator 134 of the first controller device 100 (in FIG. 3) and elsewhere in this disclosure.

Finally, the method of FIG. 10B ends.

In some alternate method embodiments of FIG. 10B, step S120 may be replaced with step S130 of FIG. 10C that reads: in response to detecting a spatial calibrate event, via the first relocatable translator 134 of the first controller device 100, based at least in part on the first controller device 100 is located at a spatial distance D, from the display appliance 200, that is less than or equal to a spatial calibrate threshold distance CTD within the 3D ambient space 302, the method continues to step S122 in FIG. 10B. Otherwise if no detection occurred, the method ends. The spatial calibrate threshold distance CTD may be a predetermined distance or a variable distance, depending on implementation. Wherein, in various embodiments, the spatial calibrate threshold distance CTD may be less than 10 centimeters, 20 centimeters, 0.3 meter, 0.5 meter, or 1.0 meter. In some embodiments, the spatial calibrate threshold distance CTD may be variable between 0 and 0.5 meters inclusive. In the current embodiment, the spatial calibrate threshold distance CTD may be less than 20 centimeters.

In various alternate method embodiments of FIG. 10B, step S120 may be replaced with step S131 of FIG. 10D that reads: In response to detecting a spatial calibrate event, via a input interface 116 of the first controller device 100, based at least in part on user input to the first controller device 100 within the 3D ambient space 302, then continue to step S122 in FIG. 10B. Otherwise if no detection occurred, the method ends.

In other alternate method embodiments of FIG. 10B, step S120 may be replaced with step S132 of FIG. 10E that reads: In response to detecting a spatial calibrate event, via a first motion module 119 of the first controller device 100, based at least in part on a gesture movement of the first controller device 100 within the 3D ambient space 302, then continue to step S122 in FIG. 10B. Otherwise if no detection occurred, the method ends.

In some alternate method embodiments of FIG. 10B, step S122 may be replaced with step S133 of FIG. 10F that reads: Spatial calibrating, via the first controller device 100, the first relocatable translator 134 of the first controller device 100, such that the first controller device 100 is enabled to be arbitrarily relocatable within the 3D ambient space 302, wherein at least once a first orientation (and/or first location), of the first controller device 100 in the 3D ambient space 302, is independently and arbitrarily adjustable in respect to a second orientation (and/or second location) of the first virtual object 260, in a 3D virtual space 204, on the display appliance 200. Whereupon, the method ends.

In various alternate method embodiments of FIG. 10B, step S122 may be replaced with step S134 of FIG. 10G that reads: Spatial calibrating, via the first controller device 100, the first relocatable translator 134 of the first controller device 100, such that the first controller device 100 is enabled to be arbitrarily relocatable within the 3D ambient space 302, wherein at least once, associating the first controller device 100 with a second virtual object (e.g., which may replace the first virtual object), such that the first controller device 100 is enabled to be at least in part controlling the second virtual object on the display appliance 200. Whereupon, the method ends.

In some alternate method embodiments of FIG. 10B, step S122 may be replaced with in part, in whole, and/or in combination with the method operational steps of FIG. 10A. Whereby, for example, the controller device 100 may be at least in part controlling a graphic user interface, on the display appliance 200, for the selection of one or more virtual objects, and further, associating and spatial calibrating the controller device 100 with the one or more virtual objects on the display appliance 200 (e.g., as shown and described in FIGS. 6C and 6D, and elsewhere in this disclosure). Whereupon, the method ends.

In other alternate method embodiments, in part, in whole, and/or a combination of operational steps of FIGS. 10B, 10C, 10D, 10E, 10F, and/or 10G or similar operations may be implemented.

Method for Display Appliance to Spatial Calibrate in Real-Time

Turning now to FIG. 10H while referencing FIGS. 1 and 5, there shown is a flowchart of an exemplary embodiment of a computer-implemented method for a display appliance that spatial calibrates a first controller device within 3D ambient space, although alternative methods may also be considered.

In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S220, in response to detecting a spatial calibrate event, via the display appliance 200, the method continues to step S222. Otherwise if no detection occurred, the method ends. In various embodiments, a spatial calibrate event may be based at least in part on, but not limited to, a spatial feature, user input, spatial distance between a controller device and a display appliance, and/or gesture movement of a controller device or a display appliance.

In some embodiments, in step S222, spatial calibrating, via the display appliance 200, the relocatable translator 234 of the display appliance 200, such that the first controller device 100 is enabled to be arbitrarily relocatable within the 3D ambient space 302. Whereby, for example, the first controller device 100 may be enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. In some embodiments, the current step may include: wherein the play system 300 is operating multimedia effects in real-time with play activity for one or more users. In some embodiments, spatial calibrating, via the display appliance 200, may comprise operations that spatial calibrates the relocatable translator 234 of the display appliance 200, which may include, but not limited to, modifying data within the relocatable dataset D450 (e.g., controller device identifier D461, virtual object identifier D462, home reference location D463, home reference orientation D464, etc.). Further, in some embodiments, the relocatable dataset D450 may be modified based at least in part on a control data D100 (in FIG. 9B), received from the first controller device 100 via the communication module 218 of the display appliance 200, which comprises information of spatial features (e.g., orientation, location, etc.) of the first controller device 100 within the 3D ambient space 302. For more details, the reader may refer to the discussion of the relocatable translator 234 of the display appliance 200 (in FIG. 5) and elsewhere in this disclosure.

Finally, the method of FIG. 10H ends.

In some alternate method embodiments of FIG. 10H, step S220 may be replaced with step S230 of FIG. 10I that reads: In response to detecting a spatial calibrate event, via the relocatable translator 234 (and/or distance analyzer 235) of the display appliance 200, based at least in part on the first controller device 100 is located at a spatial distance D, from the display appliance 200, that is less than or equal to a spatial calibrate threshold distance CTD within the 3D ambient space 302, then continue to step S222 in FIG. 10H. Otherwise if no detection occurred, the method ends. The spatial calibrate threshold distance CTD may be a predetermined distance or a variable distance, depending on implementation. Wherein, in various embodiments, the spatial calibrate threshold distance CTD may be less than 10 centimeters, 20 centimeters, 0.3 meter, 0.5 meter, or 1.0 meter. In some embodiments, the spatial calibrate threshold distance CTD may be variable between 0 and 0.5 meters inclusive. In the current embodiment, the spatial calibrate threshold distance CTD may be less than 20 centimeters.

In various alternate method embodiments of FIG. 10H, step S220 may be replaced with step S231 of FIG. 10J that reads: In response to detecting a spatial calibrate event, via a input interface 216 of the display appliance 200, based at least in part on user input to the display appliance 200 within the 3D ambient space 302, then continue to step S222 in FIG. 10H. Otherwise if no detection occurred, the method ends.

In some alternate method embodiments of FIG. 10H, step S220 may be replaced with step S232 of FIG. 10K that reads: In response to detecting a spatial calibrate event, via a motion module 219 of the display appliance 200, based at least in part on a gesture movement of the display appliance 200 within the 3D ambient space 302, then continue to step S222 in FIG. 10H. Otherwise if no detection occurred, the method ends.

In some alternate method embodiments of FIG. 10H, step S222 may be replaced with step S233 of FIG. 10L that reads: Spatial calibrating, via the display appliance 200, the relocatable translator 234 of the display appliance 200, such that the first controller device 100 is enabled to be arbitrarily relocatable within the 3D ambient space 302, wherein at least once a first orientation (and/or a first location), of the first controller device 100 in the 3D ambient space 302, is independently and arbitrarily adjustable in respect to a second orientation (and/or a second location) of the first virtual object 260, in a 3D virtual space 204, on the display appliance 200. Whereupon, the method ends.

In various alternate method embodiments of FIG. 10H, step S222 may be replaced with step S234 of FIG. 10M that reads: Spatial calibrating, via the display appliance 200, the relocatable translator 234 of the display appliance 200, such that the first controller device 100 is enabled to be arbitrarily relocatable within the 3D ambient space 302, wherein at least once, associating the first controller device 100 with a second virtual object (e.g., which may replace the first virtual object), such that the first controller device 100 is enabled to be at least in part controlling the second virtual object on the display appliance 200. Whereupon, the method ends.

In some alternate method embodiments of FIG. 10H, step S222 may be replaced with in part, in whole, and/or in combination with the method operational steps of FIG. 10A. Whereby, for example, the display appliance 200 may be at least in part controlling a graphic user interface, on the display appliance 200, for the selection of one or more virtual objects, and further, associating and spatial calibrating the controller device 100 with the one or more virtual objects on the display appliance 200 (e.g., as shown and described in FIGS. 6C and 6D, and elsewhere in this disclosure). Whereupon, the method ends.

In other alternate method embodiments, in part, in whole, and/or a combination of operational steps of FIGS. 10H, 10I, 10J, 10K, 10L, and/or 10M or similar operations may be implemented.

Controller Devices are Arbitrarily Relocatable in 3D Ambient Space

In an innovative aspect, FIGS. 6D and 7D show that both controller devices 100 and 101 may be arbitrarily relocatable within the 3D ambient space 302 of the play system 300. Whereby, in many embodiments, the controller devices 100 and 101 may be connected to arbitrary physical objects of different types, shapes, and sizes at an arbitrary orientation and location relative to the arbitrary physical objects in the 3D ambient space. Moreover, in many embodiments, the controller devices 100 and 101, arbitrary physical objects 250 and 251, and virtual objects 260 and 261 may be enabled for selecting, associating, and spatial calibrating at any time, including when the play system 300 is operating multimedia effects in real-time with play activity for one or more users. That is, selecting, associating, and spatial calibrating (as described earlier in FIGS. 6A-8D) does not need to occur only when the controller device 100 is being attached to or coupled to the arbitrary physical object 250.

For the careful reader may have noticed that during the spatial calibration operations described earlier, the controller device 100 (in FIG. 6D) is oriented and located differently than the controller device 101 (in FIG. 7D) within 3D ambient space 302. That is, in FIG. 6D the top side TS of controller device 100 is parallel with a plane Y-Z of 3D ambient space 302, with the controller device 100 connected to arbitrary physical object 250. And alternatively in FIG. 7D the top side TS of the controller device 101 is parallel with a plane X-Z of 3D ambient space 302, with the controller device 101 connected to arbitrary physical object 251. Yet both controller devices 100 and 101 are constructed the same, having the same apparatus, structure, and functionality.

Thus in the current embodiment, FIGS. 6D and 7D show that a controller device 100 (or 101) may be enabled to be arbitrarily relocatable within the 3D ambient space 302 while the play system 300 operating multimedia effects in real-time: wherein the controller device 100 (or 101) may be enabled to be attached to or at least partially contained in an arbitrary physical object 250 (or 251) at an arbitrary location, and an arbitrary orientation, relative to the arbitrary physical object 250 (or 251) within the 3D ambient space 302, and the controller device 100 (or 101) may be enabled to be arbitrarily located and arbitrarily oriented in the 3D ambient space 302 that is movable in a 3D real-world space. Further, in various embodiments, the first controller device 100 may be enabled to be arbitrarily relocatable within 3D ambient space 302 while the play system 300 is operating multimedia effects in real-time, wherein the first controller device 100 may be coupled to, and then uncoupled from a first arbitrary physical object 250 (e.g., which is arbitrarily selected by a user)—and moved and re-coupled to a second arbitrary physical object 251 (e.g., which is arbitrarily selected by the user), and the first and second arbitrary physical objects 250 and 251 are of different type, shape, and/or size. Further, in some embodiments, the first controller device 100 may be enabled to be arbitrarily relocatable within 3D ambient space 302 while the play system 300 is operating multimedia effects in real-time, wherein the first controller device 100 may be coupled to a first arbitrary physical object 250 at a first orientation—uncoupled from the first arbitrary physical object 250, and moved and coupled to a second arbitrary physical object 251 at a second orientation, wherein the second orientation is rotated by at least 50 degrees, on at least one spatial axis within 3D ambient space 302, relative to the first orientation.

Also, in various embodiments, a controller device 100 may be enabled for spatial calibrating within the 3D ambient space, while the play system 300 is operating multimedia effects in real-time with play activities for one or more users. Whereby, in response to a spatial calibrate event, the controller device 100 may be operative to be spatial calibrating, the first relocatable translator 134 (in FIG. 3) of the first controller device 100, such that the first controller device 100 is enabled to be arbitrarily relocatable within the 3D ambient space 302, wherein at least once a first orientation, of the first controller device 100 in the 3D ambient space 302, is independently and arbitrarily adjustable in respect to a second orientation of the first virtual object 260, in a 3D virtual space 204, on the display appliance 200.

Moreover, in some embodiments, a display appliance 200 may be enabled for spatial calibrating a controller device 100 within the 3D ambient space, while the play system 300 is operating multimedia effects in real-time with play activities for one or more users. Whereby, in response to a spatial calibrate event, the display appliance 200 may be operative to be spatial calibrating, the relocatable translator 234 (in FIG. 5) of the display appliance 200, such that the first controller device 100 is enabled to be arbitrarily relocatable within the 3D ambient space 302, wherein at least once a first orientation, of the first controller device 100 in the 3D ambient space 302, is independently and arbitrarily adjustable in respect to a second orientation of the first virtual object 260, in a 3D virtual space 204, on the display appliance 200.

Figure 11A:
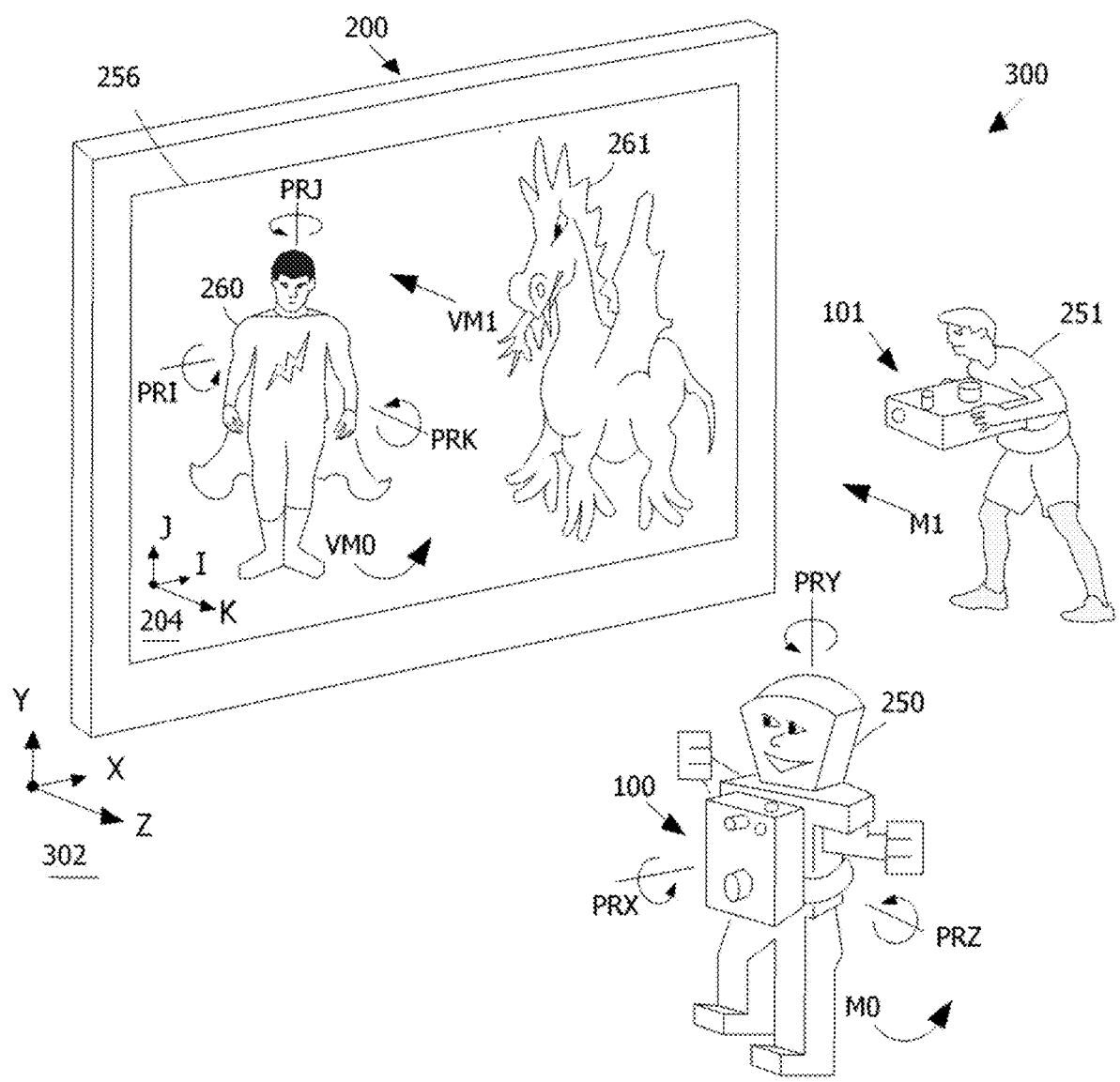
FIG. 11A is a perspective view for the play system of FIG. 1, where two controller devices and arbitrarily physical objects are moved and rotated in 3D ambient space.

Movements of Controller Devices, Arbitrary Physical Objects, and Virtual Objects So turning now to FIG. 11A, there presented are some exemplary embodiments of play activity operations of the play system 300, which enable controller devices to be arbitrarily relocatable and movable within a 3D ambient space 302. A first controller device 100 is shown connected to a first arbitrary physical object 250, and a second controller device 101 is shown connected to a second arbitrary physical object 251. Moreover, the play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256.

As shown, in some embodiments of play activity operations, the first arbitrary physical object 250 and first controller device 100 (which is connected) may be moved in 3D ambient space 302 by a user/player (not shown). Whereupon, the first controller device 100 may be enabled to detect a first spatial feature M0 (e.g., movement, orientation, location, altitude, direction, and/or speed, etc.) of the first controller device 100 and the first arbitrary physical object 250 in 3D ambient space 302. Thereby the first controller device 100 may transmit a first control data, comprising information of the first spatial feature M0, to the display appliance 200. And accordingly, the first controller device 100 may be at least in part controlling a first virtual object 260, on the display appliance 200, such that a second spatial feature VM0, of the first virtual object 260, may be based at least in part on the first spatial feature M0 of the first controller device 100 and the first arbitrary physical object 250 within 3D ambient space 302 of the play system 300. For a description of a "spatial feature," the reader may refer to the earlier discussion related to the motion module 119 in FIG. 3 and elsewhere in this disclosure.

In some embodiments, the first controller device 100 may be generating one or more sound effects (e.g., saber woosh, gunfire, human speech sound effects, etc.), via an audio module 112 of the first controller device 100, based at least in part on the first spatial feature M0 of the first controller device 100 within the 3D ambient space 302.

In some embodiments, the first controller device 100 may be generating one or more mechanical effects, via a mechanical generator 114 of the first controller device 100, based at least in part on the first spatial feature M0 of the first controller device 100 within the 3D ambient space 302.

Further, in some embodiments, the first spatial feature M0, of the first controller device 100 and first arbitrary physical object 250 within the 3D ambient space 302, correlates at least in part with the second spatial feature VM0 of the first virtual object 260, in a 3D virtual space 204, on the display appliance 200.

Further, in some embodiments, the display appliance 200 may be generating, via the display appliance 200, one or more video frames comprising a first virtual object 260 such that a second spatial feature, of the first virtual object 260 on the display appliance 200, is based at least in part on the first spatial feature of the first controller device 100 within the 3D ambient space 302.

In some embodiments, the display appliance 200 may be generating, via the display appliance 200, one or more sound effects (e.g., saber woosh, gunfire, human speech sound effects, etc.) based at least in part on the first spatial feature M0 of the first controller device 100 within the 3D ambient space 302.

In some embodiments, the display appliance 200 may be generating, via the display appliance 200, one or more mechanical effects based at least in part on the first spatial feature M0 of the first controller device 100 within the 3D ambient space 302.

Also shown, in various embodiments of play activity operations, the first arbitrary physical object 250 and first controller device 100 (which is connected) may be moved in 3D ambient space 302 by a user/player (not shown). Whereupon, the first controller device 100 may operably detect a first movement M0 of the first controller device 100 and the first arbitrary physical object 250 in 3D ambient space 302. Thereby the first controller device 100 may transmit a first control data, comprising information of the first movement M0, to the display appliance 200. And accordingly, the first controller device 100 may be at least in part controlling a first virtual object 260, on the display appliance 200, such that a second movement VM0, of the first virtual object 260, may be based at least in part on the first movement M0 of the first controller device 100 and the first arbitrary physical object 250 within 3D ambient space 302 of the play system 300.

In some embodiments, the first controller device 100 may be generating one or more sound effects (e.g., saber woosh, gunfire, human speech sound effects, etc.), via an audio module 112 of the first controller device 100, based at least in part on the first movement M0 of the first controller device 100 within the 3D ambient space 302.

In some embodiments, the first controller device 100 may be generating one or more mechanical effects, via a mechanical generator 114 of the first controller device 100, based at least in part on the first movement M0 of the first controller device 100 within the 3D ambient space 302.

Further, in some embodiments, the first movement M0, of the first controller device 100 and first arbitrary physical object 250, correlates at least in part with the second movement VM0, of the first virtual object 260, in a 3D virtual space 204, on the display appliance 200.

Also shown, in some embodiments of play activity operations, the first arbitrary physical object 250 and first controller device 100 (which is connected) may be rotated in 3D ambient space 302 by the user/player (not shown). Whereupon, the first controller device 100 may operably detect a first rotational movement M0 of the first controller device 100 and the first arbitrary physical object 250 in 3D ambient space 302. Thereby the first controller device 100 may transmit a first control data, comprising information of the first rotational movement M0, to the display appliance 200. And accordingly, the first controller device 100 may be at least in part controlling a first virtual object 260, on the display appliance 200, such that a second rotational movement VM0, of the first virtual object 260, is based at least in part on the first rotational movement M0 of the first controller device 100 and the first arbitrary physical object 250 within 3D ambient space 302 of the play system 300.

In some embodiments, the first controller device 100 may be generating one or more sound effects (e.g., saber woosh, gunfire, human speech sound effects, etc.), via an audio module 112 of the first controller device 100, based at least in part on the first rotational movement M0 of the first controller device 100 within the 3D ambient space 302.

In some embodiments, the first controller device 100 may be generating one or more mechanical effects, via a mechanical generator 114 of the first controller device 100, based at least in part on the first rotational movement M0 of the first controller device 100 within the 3D ambient space 302.

Further, in some embodiments, the first rotational movement M0, of the first controller device 100 and first arbitrary physical object 250, correlates at least in part with the second rotational movement VM0 of the first virtual object 260, in a 3D virtual space 204, on the display appliance 200.

Further, in some embodiments, the rotational movement M0, of the first controller device 100 and first arbitrary physical object 250, may exist on one axis PRY of 3D ambient space 302, and correspondingly, the rotational movement VM0, of the first virtual object 260, may exist on one axis PRJ of 3D virtual space 204.

Further, in some embodiments, the rotational movement M0, of the first controller device 100 and first arbitrary physical object 250, may exist on one axis PRY of 3D ambient space 302, and correspondingly, the rotational movement VM0, of the first virtual object 260, may exist on one axis PRJ of 3D virtual space 204, wherein the axis PRY and axis PRJ are substantially parallel.

Further, in some embodiments, the rotational movement M0 may cause the first controller device and the first arbitrary physical object 250 to rotate between 170 to 190 degrees on one axis PRY within 3D ambient space 302, and correspondingly, the rotational movement VM0 may cause the virtual object 260 to rotate between 170 to 190 degrees on one axis PRJ within 3D virtual space 204.

Also shown, in some embodiments of play activity operations, the first arbitrary physical object 250 and first controller device 100 (which is connected) may be oriented in 3D ambient space 302 by the user/player (not shown). Whereupon, the first controller device 100 may operably detect a first orientation M0 of the first controller device 100 and the first arbitrary physical object 250 in 3D ambient space 302. Thereby the first controller device 100 may transmit a first control data, comprising information of the first orientation M0, to the display appliance 200. And accordingly, the first controller device 100 may be at least in part controlling a first virtual object 260, on the display appliance 200, such that a second orientation VM0, of the first virtual object 260, may be based at least in part on the first orientation M0 of the first controller device 100 and the first arbitrary physical object 250 within 3D ambient space 302 of the play system 300.

In some embodiments, the first controller device 100 may be generating one or more sound effects (e.g., saber woosh, gunfire, human speech sound effects, etc.), via an audio module 112 of the first controller device 100, based at least in part on the first orientation M0 of the first controller device 100 within the 3D ambient space 302.

In some embodiments, the first controller device 100 may be generating one or more mechanical effects, via a mechanical generator 114 of the first controller device 100, based at least in part on the first orientation M0 of the first controller device 100 within the 3D ambient space 302.

Further, in some embodiments, the first orientation M0, of the first controller device 100 and first arbitrary physical object 250, correlates at least in part with the second orientation VM0 of the first virtual object 260, in a 3D virtual space 204, on the display appliance 200.

Also shown, in some embodiments of play activity operations, the first arbitrary physical object 250 and first controller device 100 (which is connected) may be located in 3D ambient space 302 by the user/player (not shown). Whereupon, the first controller device 100 may operably detect a first location M0 of the first controller device 100 and the first arbitrary physical object 250 in 3D ambient space 302. Thereby the first controller device 100 may transmit a first control data, comprising information of the first location M0, to the display appliance 200. And accordingly, the first controller device 100 may be at least in part controlling a first virtual object 260, on the display appliance 200, such that a second location VM0, of the first virtual object 260, may be based at least in part on the first location M0 of the first controller device 100 and the first arbitrary physical object 250 within 3D ambient space 302 of the play system 300.

In some embodiments, the first controller device 100 may be generating one or more sound effects, via an audio module 112 of the first controller device 100, based at least in part on the first location M0 of the first controller device 100 within the 3D ambient space 302.

In some embodiments, the first controller device 100 may be generating one or more mechanical effects, via a mechanical generator 114 of the first controller device 100, based at least in part on the first location M0 of the first controller device 100 within the 3D ambient space 302.

Further, in some embodiments, the first location M0, of the first controller device 100 and first arbitrary physical object 250, correlates at least in part with the second location VM0 of the first virtual object 260, in a 3D virtual space 204, on the display appliance 200.

Also shown, in various embodiments of play activity operations, the second arbitrary physical object 251 and second controller device 101 (which is connected) may be moved in 3D ambient space 302 by the user/player (not shown). Whereupon, the second controller device 101 may operably detect a first translational movement M1 of the second controller device 101 and the second arbitrary physical object 251 in 3D ambient space 302. Thereby the second controller device 101 may transmit the first control data, comprising information of the first translational movement M0, to the display appliance 200. And accordingly, the second controller device 101 may be at least in part controlling a second virtual object 261, on the display appliance 200, such that a second translational movement VM1, of the second virtual object 261, may be based at least in part on the first translational movement M1 of the second controller device 101 and the second arbitrary physical object 251 within 3D ambient space 302 of the play system 300.

In some embodiments, the first controller device 100 may be generating one or more sound effects, via an audio module 112 of the first controller device 100, based at least in part on the first translational M0 of the first controller device 100 within the 3D ambient space 302.

In some embodiments, the first controller device 100 may be generating one or more mechanical effects, via a mechanical generator 114 of the first controller device 100, based at least in part on the first translational movement M0 of the first controller device 100 within the 3D ambient space 302.

Further, in some embodiments, the first translational movement M0, of the first controller device 100 and first arbitrary physical object 250, correlates at least in part with the second translational movement VM0 of the first virtual object 260, in a 3D virtual space 204, on the display appliance 200.

Further, in some embodiments, the first translational movement M1 may exist on one axis Z of 3D ambient space 302, and correspondingly, the second translational movement VM1 may exist on one axis K of 3D virtual space 204.

Figure 11B:
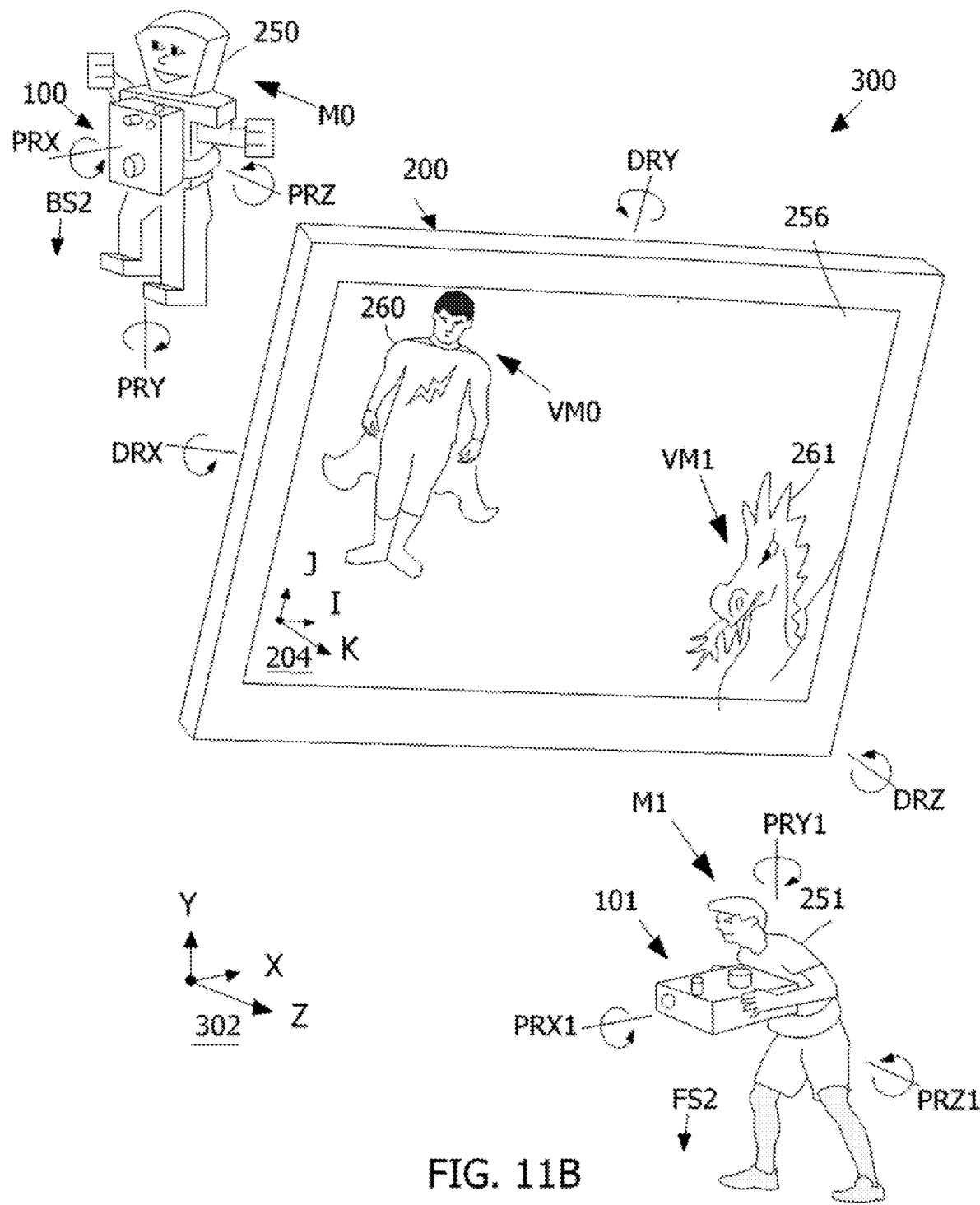
FIG. 11B is a perspective view for the play system of FIG. 1, where the controller devices and arbitrarily physical objects are arbitrarily oriented and arbitrarily located and moved in 3D ambient space, irrespective of the orientation and location of the display appliance in 3D ambient space.

Arbitrarily Located and Oriented Controller Devices and Arbitrary Physical Objects So turning now to FIG. 11B, there presented are some exemplary embodiments of play activity operations of the play system 300, which enable controller devices to be arbitrarily located and arbitrarily oriented in 3D ambient space, while the play system 300 is operating multimedia effects in real-time with play activities for one or more users. Thus, in some embodiments of a play system, users/players and arbitrary physical objects may move a full 360 degrees of travel "in the round"—on the vertical and horizontal planes of three-dimensional (3D) ambient space. Whereby, in many embodiments, users and arbitrary physical objects are not limited to be located "on stage" in a small region— but users may now have the joy and freedom of a wall to wall play experience or multi-room play experience.

A first controller device 100 is shown connected to a first arbitrary physical object 250, and a second controller device 101 is shown connected to a second arbitrary physical object 251. Moreover, the play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256.

As shown, in some embodiments of play activity operations, the first arbitrary physical object 250 and first controller device 100 (which is connected) may be moved in 3D ambient space 302 by a user/player (not shown). Whereupon, the first controller device 100 may operably detect a first spatial feature M0 (e.g., movement, orientation, location, altitude, direction, and/or speed, etc.) of the first controller device 100 and the first arbitrary physical object 250 in 3D ambient space 302. Thereby the first controller device 100 may transmit a first control data, comprising information of the first spatial feature M0, to the display appliance 200. And accordingly, the first controller device 100 may be at least in part controlling a first virtual object 260, on the display appliance 200, such that a second spatial feature VM0, of the first virtual object 260, may be based at least in part on the first spatial feature M0 of the first controller device 100 and the first arbitrary physical object 250 within 3D ambient space 302 of the play system 300.

Also shown, in some embodiments of play activity operations, the controller device 100 (or 101) may be arbitrarily located and arbitrarily oriented in 3D ambient space 302. As presented, the first controller device 100 and first arbitrary physical object 250 are arbitrarily located (e.g., within a region back side BS2, which is behind the video display 256 of the display appliance 200) within 3D ambient space 302. And the second controller device 101 and second arbitrary physical object 251 are arbitrarily located (e.g., within a region front side FS2 forward of the video display 256 of the display appliance 200) within 3D ambient space 302. As also presented, the first controller device 100 and first arbitrary physical object 250 are arbitrarily oriented (e.g., on axis PRX, PRY, and PRZ) within 3D ambient space 302. And the second controller device 101 and second arbitrary physical object 251 are arbitrarily oriented (e.g., on axis PRX1, PRY1, and PRZ1) within 3D ambient space 302. Thereby, in some embodiments of play activity operations, one or more controller devices 100 and 101 may be enabled to be arbitrarily located and arbitrarily oriented in 3D ambient space 302.

In various embodiments of play activity operations, the controller device 100 (or 101) may be enabled to be arbitrarily located and arbitrarily oriented in the 3D ambient space 302—irrespective of the location and orientation of the display appliance 200 within 3D ambient space 302. For one or more display appliances 200 may be enabled to be arbitrarily located (on axis X, Y, and Z) and arbitrarily oriented (on axis DRX, DRY, and/or DRZ) within 3D ambient space 302. Wherein, one or more controller devices 100 and 101 may be enabled to be arbitrarily located and arbitrary oriented in 3D ambient space 302—irrespective of the location and orientation of one or more display appliances 200 within 3D ambient space 302.

In some embodiments of play activity operations, one or more controller devices 100 and 101 may be enabled to be moved in any direction within the 3D ambient space 302.

In some embodiments of play activity operations, one or more controller devices 100 and 101 may be enabled to be moved in substantially unlimited range of direction on the horizontal plane (e.g., coincident with axis X and Z) and/or moved in substantially unlimited range of direction on the vertical plane (e.g., coincident with axis X and Y) within the 3D ambient space 302.

In some embodiments of play activity operations, one or more controller devices 100 and 101 may be enabled to be moved in at least 330 degrees range of direction on the horizontal plane (e.g., coincident with axis X and Z) and/or moved in at least 330 degrees range of direction on the vertical plane (e.g., coincident with axis X and Y) within the 3D ambient space 302.

In some embodiments of play activity operations, one or more controller devices 100 and 101 may be enabled to be moved in at least 170 degrees range of direction on the horizontal plane (e.g., coincident with axis X and Z) and/or moved in at least 170 degrees range of direction on the vertical plane (e.g., coincident with axis X and Y) within the 3D ambient space 302.

Occluded From View of Controller Devices and Arbitrary Physical Objects

Figure 11C:
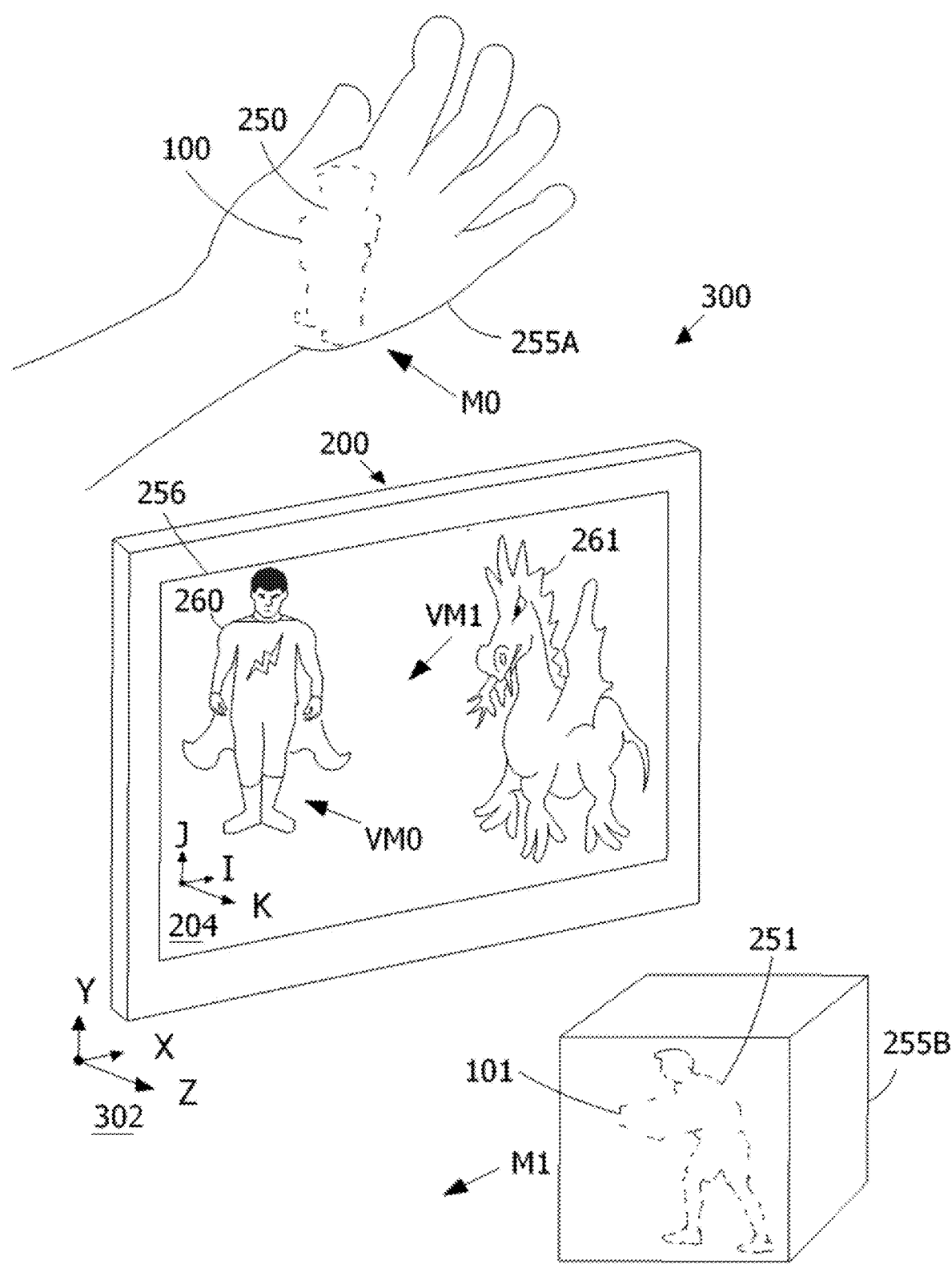
FIG. 11C is a perspective view for the play system of FIG. 1, where the controller devices and arbitrarily physical objects are moved while wholly occluded from view in 3D ambient space.

So turning now to FIG. 11C, there presented are some exemplary embodiments of play activity operations of the play system 300, which enable controller devices and arbitrary physical objects to be at least partially occluded from view in 3D ambient space. Thus, in some embodiments of a play system, controller devices and arbitrary physical objects may be enabled to be at least partially occluded from view within 3D ambient space—while the play system 300 is operating multimedia effects in real-time with play activity for one or more users.

Whereby, in some play system embodiments, the controller devices, arbitrary physical objects, and/or display appliances are not limited to be located "on stage" and always viewable—but users may now have the joy and freedom of arbitrary movement and arbitrary arrangement of users and players, controller devices, arbitrary physical objects, and/or display appliances within the 3D ambient space of a play system.

There shown is a first controller device 100 connected to a first arbitrary physical object 250 (as depicted with dashed outlines for discussion purposes) and occluded from view by a third physical object 255A. And a second controller device 101 is shown connected to a second arbitrary physical object 251 (as depicted with dashed outlines for discussion purposes) and occluded from view by a fourth arbitrary physical object 255B. Moreover, the play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256.

As shown, in some embodiments of play activity operations, the first arbitrary physical object 250 and first controller device 100 (which is connected) may be moved in 3D ambient space 302 by a user/player (not shown). Whereupon, the first controller device 100 may operably detect a first spatial feature M0 (e.g., movement, orientation, location, altitude, direction, and/or speed, etc.) of the first controller device 100 and the first arbitrary physical object 250 in 3D ambient space 302. Thereby the first controller device 100 may transmit a first control data, comprising information of the first spatial feature M0, to the display appliance 200. And accordingly, the first controller device 100 may be at least in part controlling a first virtual object 260, on the display appliance 200, such that a second spatial feature VM0, of the first virtual object 260, may be based at least in part on the first spatial feature M0 of the first controller device 100 and the first arbitrary physical object 250 within 3D ambient space 302 of the play system 300.

Also shown, in some embodiments of play activity operations, the controller device 100 (or 101) and arbitrary physical object 250 (or 251) may be enabled to be arbitrarily located and arbitrarily oriented and capable of being at least partially occluded from view by another arbitrary physical object—while the play system 300 is operating multimedia effects in real-time with play activity for one or more users. As presented, the first controller device 100 and first arbitrary physical object 250 may be enabled to be arbitrarily located and arbitrarily oriented and capable of being at least partially occluded from view by a third physical object 255A (e.g., a user hand) within the 3D ambient space in a 3D real-world space. And the second controller device 101 and second arbitrary physical object 251 may be enabled to be arbitrarily located and arbitrarily oriented and capable of being at least partially occluded from view by a fourth arbitrary physical object 255B (e.g., a cardboard box) within 3D ambient space 302. Thereby, in some embodiments of play activity operations, one or more controller devices 100 and 101 and arbitrary physical objects 250 and 251 may be enabled to be arbitrarily located and arbitrarily oriented and capable of being at least partially occluded from view by one or more other arbitrary physical objects 255A and 255B within 3D ambient space 302.

Also shown, in some embodiments of play activity operations, the controller device 100 (or 101) and arbitrary physical object 250 (or 251) may be enabled to be arbitrarily located and arbitrarily oriented and capable of being wholly occluded from view by another arbitrary physical object—while the play system 300 operating multimedia effects in real-time with play activity for one or more users. As presented, the first controller device 100 and first arbitrary physical object 250 may be enabled to be arbitrarily located and arbitrarily oriented and capable of being wholly occluded from view by a third physical object 255A (e.g., a user hand) within the 3D ambient space in a 3D real-world space. And the second controller device 101 and second arbitrary physical object 251 may be enabled to be arbitrarily located and arbitrarily oriented and capable of being wholly occluded from view by a fourth arbitrary physical object 255B (e.g., a cardboard box) within 3D ambient space 302. Thereby, in some embodiments of play activity operations, one or more controller devices 100 and 101 and arbitrary physical objects 250 and 251 may be enabled to be arbitrarily located and arbitrarily oriented and capable of being wholly occluded from view by one or more other arbitrary physical objects 255A and 255B within 3D ambient space 302.

Also shown, in some embodiments of play activity operations, the controller device 100 (or 101) and arbitrary physical object 250 (or 251) may be arbitrarily located, and arbitrarily oriented, relative to one or more other arbitrary physical objects within 3D ambient space 302. As presented, the first controller device 100 and first arbitrary physical object 250 may be enabled to be arbitrarily located, and arbitrarily oriented, relative to a second arbitrary physical object 255A (e.g., a user hand) within 3D ambient space 302. And the second controller device 101 and second arbitrary physical object 251 may be enabled to be arbitrarily located, and arbitrarily oriented, relative to a third arbitrary physical object 255B (e.g., a cardboard box) within 3D ambient space 302. Thereby, in some embodiments of play activity operations, one or more controller devices 100 and 101 and arbitrary physical objects 250 and 251 may be enabled to be arbitrarily located, and arbitrarily oriented, relative to one or more other arbitrary physical objects 255A and 255B within 3D ambient space 302.

Also shown, in some embodiments of play activity operations, the controller device 100 (or 101) and arbitrary physical object 250 (or 251) may be enabled to be arbitrarily located and arbitrarily oriented and capable of being at least partially contained by another arbitrary physical object. As presented, the first controller device 100 and first arbitrary physical object 250 may be enabled to be at least partially contained by a third arbitrary physical object 255A (e.g., a user hand) within 3D ambient space 302. And the second controller device 101 and second arbitrary physical object 251 may be enabled to be arbitrarily located and arbitrarily oriented and capable of being at least partially contained by a fourth arbitrary physical object 255B (e.g., a cardboard box) within 3D ambient space 302. Thereby, in some embodiments of play activity operations, one or more controller devices 100 and 101 and arbitrary physical objects 250 and 251 may be enabled to be arbitrarily located and arbitrarily oriented and capable of being at least partially contained by one or more other arbitrary physical objects 255A and 255B within 3D ambient space 302.

Also shown, in some embodiments of play activity operations, the controller device 100 (or 101) and arbitrary physical object 250 (or 251) may be enabled to be arbitrarily located and arbitrarily oriented and capable of being wholly contained by another arbitrary physical object. As presented, the first controller device 100 and first arbitrary physical object 250 may be enabled to be arbitrarily located and arbitrarily oriented and capable of being wholly contained by a third arbitrary physical object 255A (e.g., a user hand) within 3D ambient space 302. And the second controller device 101 and second arbitrary physical object 251 may be enabled to be wholly contained by a fourth arbitrary physical object 255B (e.g., a cardboard box) within 3D ambient space 302. Thereby, in some embodiments of play activity operations, one or more controller devices 100 and 101 and arbitrary physical objects 250 and 251 may be enabled to be arbitrarily located and arbitrarily oriented and capable of being wholly contained by one or more other arbitrary physical objects 255A and 255B within 3D ambient space 302.

3D Ambient Space is Movable in 3D Real-World Space

Figure 11D:
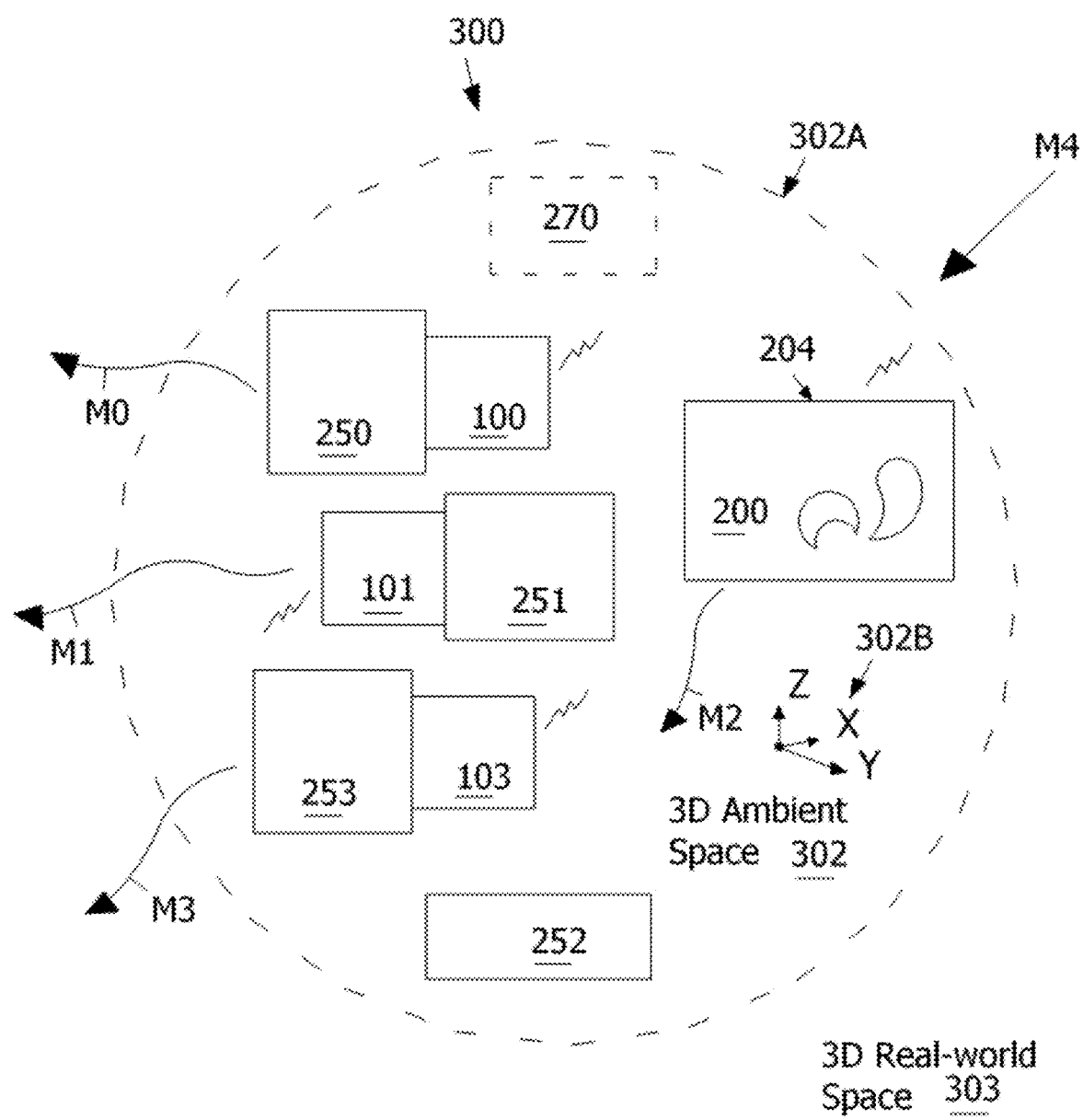
FIG. 11D is a block diagram for the play system of FIG. 1, wherein the controller devices and display appliance are moving in 3D ambient space, causing the 3D ambient space to move from a first location to a second location in a 3D real-world space.

So turning now to FIG. 11D, there presented are embodiments of play activity operations, which enable the play system 300 and the 3D ambient space 302 to be movable in a 3D real-world space 303—while the play system 300 is operating multimedia effects in real-time with play activity for one or more users (not shown). Whereby, controller devices, arbitrary physical objects, and/or display appliances are not limited to be at a single location—but users may have the joy and freedom of the play system 300 that includes the 3D ambient space 302 that is movable in the 3D real-world space 303. Understandably, alternate embodiments may also be considered, wherein a play system operates continuously or sporadically with a 3D ambient space that remains at a fixed location in 3D real-world space.

As disclosed earlier in the section "Ambient Space of the Play System," the 3D ambient space 302 may be considered the "play region" of the play system 300. In the current embodiment, the play system 300 implements the 3D ambient space 302 with an ambient space perimeter 302A (dashed circular line) defining the extent of the 3D ambient space 302, wherein the perimeter 302A should not be construed as a physical boundary (or wall). Rather, the play system 300, controller devices 250, 251, 253, and display appliance 200 implement an ambient space coordinate system 302B comprising spatial axis X, Y, and Z that extend to the ambient space perimeter 302A and no farther. A first, second, and third controller devices 100, 101, 103 are shown coupled to a first, second, and third arbitrary physical object 250, 251, and 253, respectively, along an imaginary object 270 and an extra arbitrary physical object 252. The play system 300 further implements a 3D virtual space 204 as presented on a display appliance 200.

Thereby, in various embodiments, the 3D ambient space 302 may be moved in 3D real-world space 303 while the play system 300 is operating multimedia effects in real-time with play activity, such as controlling virtual objects on display appliance(s), sound effects, and mechanical effects. For example, one or more users may pick-up and move (either concurrently, sporadically, and/or sequentially in time) one or more controller devices 100, 101, 103 and display appliances 200 within 3D ambient space 302. Whereupon, the first controller device 100 may be enabled to detect a first movement M0 of the first controller device 100 and the first arbitrary physical object 250 in 3D ambient space 302. The first controller device 100 may transmit a first control data, comprising information of the first movement M0, to the display appliance 200. And accordingly, the first controller device 100 may be at least in part controlling a fifth movement M4 of the 3D ambient space 302 that is movable in the 3D real-world space 303. Similarly, one and more controller devices 101 and 103 and display appliances 200 may detect second, third, and fourth movements M1, M3, and M2, respectively. And accordingly, the one or more controller devices 101 and 103 and display appliances 200 may be at least in part controlling the fifth movement M4 of the 3D ambient space 302 that is movable in the 3D real-world space 303.

Thus, in some embodiments, one or more controller devices 100, 101, 103, arbitrary physical objects 250, 251, 253, and/or display appliances 200 may be enabled to be arbitrarily located and arbitrarily oriented within the 3D ambient space 302 that is movable in the 3D real-world space 303—while the play system 300 is operating multimedia effects in real-time with play activity for one or more users. In various embodiments, one or more controller devices 100, 101, 103, arbitrary physical objects 250, 251, 253, and/or display appliances 200 may enabled to be movable within the 3D ambient space 302 such that the 3D ambient space 302 (including the ambient space coordinate system 302B) is movable in the 3D real-world space 303— while the play system 300 is operating multimedia effects in real-time with play activity for one or more users. In some embodiments of play activity operations, in various embodiments of play activity operations, one or more controller devices 100,101,103, arbitrary physical objects 250, 251, 253, and/or display appliances 200 may be enabled to movable in unlimited spatial direction and/or spatial distance in the 3D ambient space 302 such that the 3D ambient space 302 is movable (including the ambient space coordinate system 302B) in unlimited spatial direction and/or spatial distance within the 3D real-world space 303—while the play system 300 is operating multimedia effects in real-time with play activity for one or more users. In some embodiments of play activity operations, one or more controller devices 100,101, 103 may be enabled to be movable in the 3D ambient space 302 such that the 3D ambient space is movable (including the ambient space coordinate system 302B) in at least 330 degrees range of direction on the horizontal plane (e.g., on axis X and Z) and/or movable in at least 330 degrees range of direction on the vertical plane (e.g., on axis X and Y) within the 3D real-world space 303—while the play system 300 is operating multimedia effects in real-time with play activity for one or more users.

Method for Controller Device to Control a Virtual Object

Figure 12A:
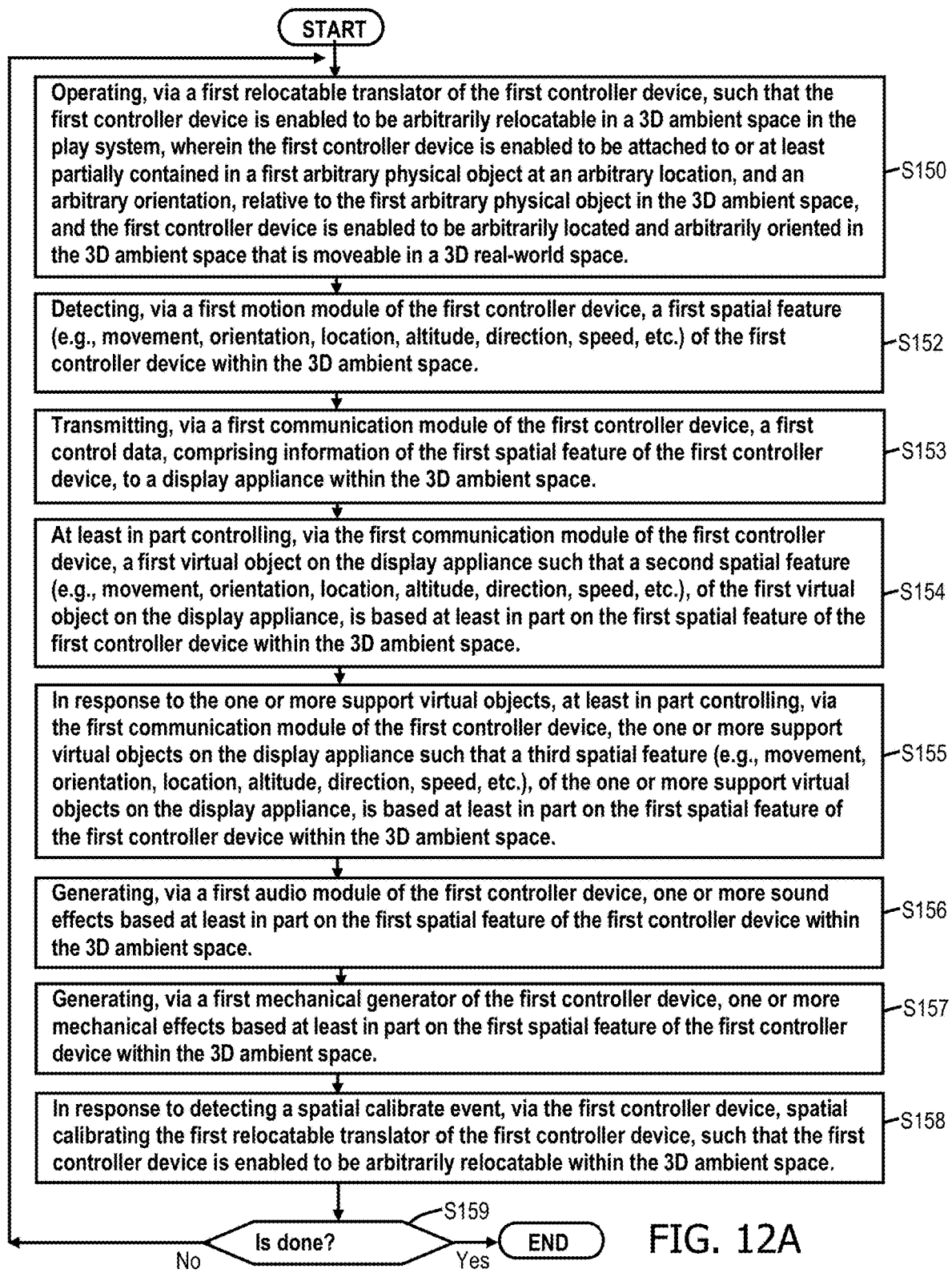
FIG. 12A is a flowchart for the play system of FIG. 1, of a method of the controller device, comprising operations for movement of a controller device and arbitrary physical object.

Turning now to FIG. 12A while referencing FIGS. 11A, 1, and 3, there shown is a flowchart of an exemplary embodiment of a computer-implemented method for a first controller device with play activity operations in the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some embodiments, beginning with step S150, operating, via a first relocatable translator 134 of the first controller device 100, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S152, detecting, via a first motion module 119 of the first controller device 100, a first spatial feature M0 (e.g., movement, orientation, location, altitude, direction, and/or speed, etc.) of the first controller device 100 within the 3D ambient space 302 in the play system 300. For a description of a "spatial feature," the reader may refer to the motion module 119 in FIG. 3 and elsewhere in this disclosure.

In some embodiments, in step S153, transmitting, via a first communication module 118 of the first controller device 100, a first control data, comprising information of the first spatial feature M0 of the first controller device 100, to a display appliance 200 within the 3D ambient space 302 in the play system 300. In some alternate embodiments, in the current step, transmitting, via a first communication module 118 of the first controller device 100, the first control data, comprising information of the first spatial feature M0 and a RSSI value D152 (as shown in FIG. 9B), to a display appliance 200 within the 3D ambient space 302 in the play system 300.

In some embodiments, in step S154, at least in part controlling, via the first communication module 118 of the first controller device 100, a first virtual object 260 on the display appliance 200 such that a second spatial feature VM0 (e.g., movement, orientation, location, altitude, direction, speed, etc.), of the first virtual object 260 on the display appliance 200, is based at least in part on the first spatial feature M0 of the first controller device 100 within the 3D ambient space 302 in the play system 300. In various alternate embodiments, the current step may be modified in part, in whole, and/or in combination with the operational steps described in FIGS. 12K, 12L, 12M, 12N, 12O, and/or 12P, which are discussed in the section titled "Method for Controller Device to Modify a Virtual Object." In some alternate embodiments, in the current step, at least in part controlling, via the first communication module 118 of the first controller device 100, a first virtual object 260 on the display appliance 200 such that a second spatial feature VM0 (e.g., movement, orientation, location, altitude, direction, speed, etc.), of the first virtual object 260 on the display appliance 200, is based at least in part on the RSSI value D152 (in FIG. 9B) from the first controller device 100.

In some embodiments, in step S155, in response to the one or more support virtual objects, at least in part controlling, via the first communication module 118 of the first controller device 100, the one or more support virtual objects on the display appliance 200 such that a third spatial feature (e.g., movement, orientation, location, altitude, direction, speed, etc.), of the one or more support virtual objects on the display appliance 200, is based at least in part on the first spatial feature of the first controller device 100 within the 3D ambient space 302. In the current step, if there are no support virtual objects implemented, the method skips the current step. In some alternate embodiments, the current step may be optional and not required. In various alternate embodiments, the current step may be modified in part, in whole, and/or in combination with the operational steps described in FIGS. 12K, 12L, 12M, 12N, 12O, and/or 12P, which are discussed in the section titled "Method for Controller Device to Modify a Virtual Object."

In some embodiments, in step S156, generating, via a first audio module 112 of the first controller device 100, one or more sound effects (e.g., saber woosh, gunfire, human speech sound effects, etc.) based at least in part on the first spatial feature of the first controller device 100 within the 3D ambient space 302. In various embodiments, the current step may be optional and not required.

In some embodiments, in step S157, generating, via a first mechanical generator 114 of the first controller device 100, one or more mechanical effects based at least in part on the first spatial feature of the first controller device 100 within the 3D ambient space 302. In various embodiments, the current step may be optional and not required.

In some embodiments, in step S158, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial calibrate in Real-time." In some alternate embodiments, the current step may not be required in the method.

Finally, in some embodiments, in step S159, in response to determining, via the first controller device 100, that the method is not done, the method goes back to step S150. Otherwise the method is done, so the method ends. In the current embodiment, determining if the method is done may be based at least in part on a substantially periodic time interval or a detected periodic state, wherein the method may be continuously executed (looping from step S159 and back to step S150) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S159 and back to step S150) in a substantially aperiodic or on a needed basis. In other embodiments, the current step may not be required, or implemented elsewhere.

Method for Display Appliance to Generate a Virtual Object

Figure 12B:
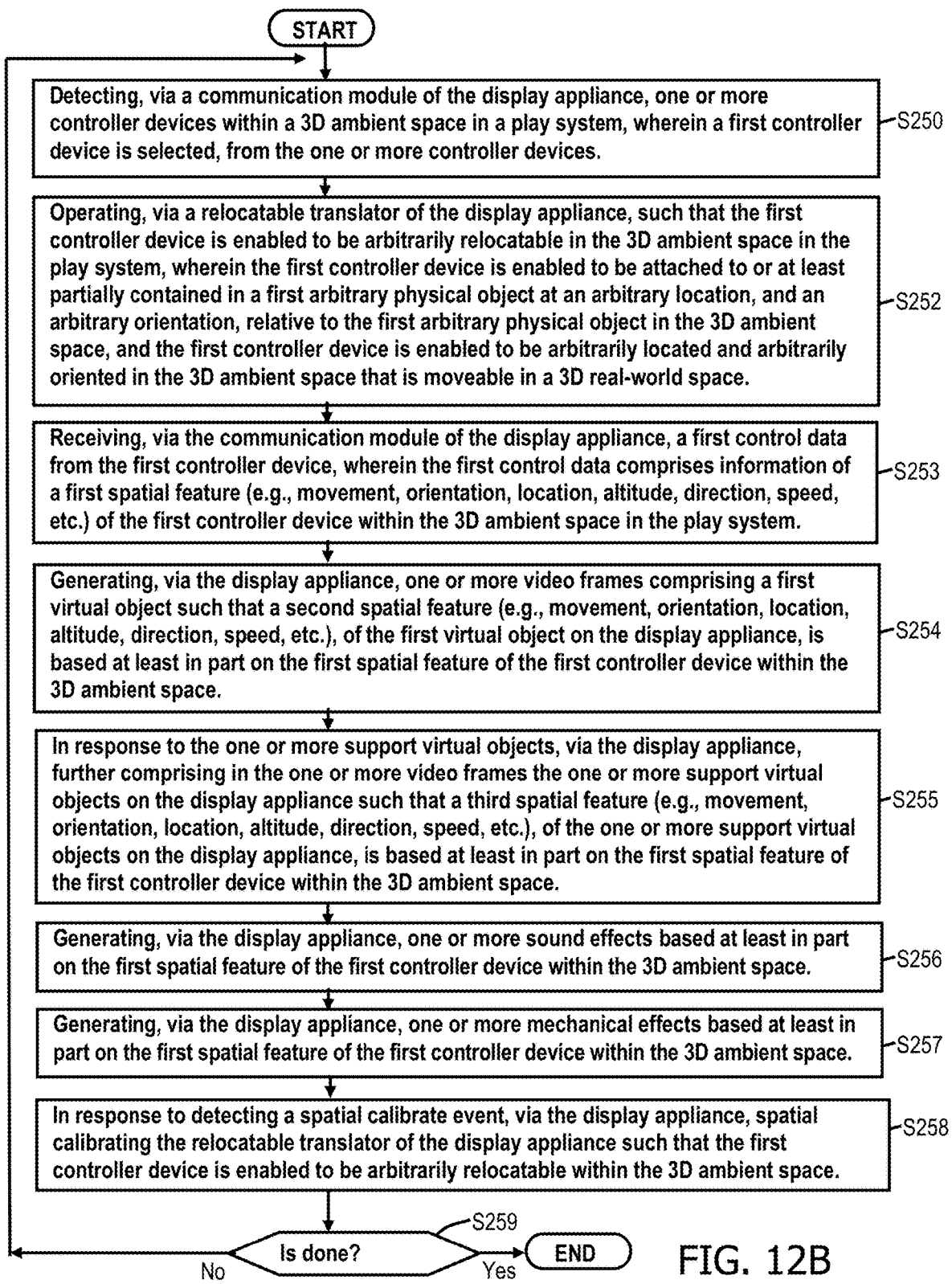
FIG. 12B is a flowchart for the play system of FIG. 1, of a method of the display appliance, comprising operations for movement of a controller device and arbitrary physical object.

Turning now to FIG. 12B while referencing FIGS. 11A, 1, and 5, there shown is a flowchart of an exemplary embodiment of a computer-implemented method for a display appliance with play activity operations to generate one or more virtual objects in a play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S250, detecting, via a communication module 218 of the display appliance 200, one or more controller devices within a 3D ambient space 302 in the play system 300, wherein a first controller device 100 is selected, from the one or more controller devices. In the current embodiment, the first controller device 100 may be iteratively and sequentially selected, from the one or more controller devices detected in the play system 300, whenever the current step is executed. In alternate embodiments, the first controller device 100 may be arbitrarily selected from the one or more controller devices, detected in the play system 300, although other approaches may be considered as well.

In some embodiments, in step S252, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S253, receiving, via a communication module 218 of the display appliance 200, a first control data from the first controller device 100, wherein the first control data comprises information of a first spatial feature M0 (e.g., movement, orientation, location, altitude, direction, and/or speed, etc.) of the first controller device 100 within the 3D ambient space 302. For a description of a "spatial feature," the reader may refer to the motion module 119 in FIG. 3 and elsewhere in this disclosure. In some alternate embodiments, in the current step, the first control data may comprise information of the first spatial feature M0 and a RSSI value D152 (as shown in FIG. 9B) from the first controller device 100 within 3D ambient space 302.

In some embodiments, in step S254, generating, via the display appliance 200, one or more video frames comprising a first virtual object 260 such that a second spatial feature (e.g., movement, orientation, location, altitude, direction, speed, etc.), of the first virtual object 260 on the display appliance 200, is based at least in part on the first spatial feature of the first controller device 100 within the 3D ambient space 302. In various alternate embodiments, the current step may be modified in part, in whole, and/or in combination with the operational steps described in FIGS. 12K, 12L, 12M, 12N, 12O, and/or 12P, which are discussed in the section titled "Method for Controller Device to Modify a Virtual Object." In some alternate embodiments, in the current step, generating, via the display appliance 200, one or more video frames comprising a first virtual object 260 such that a second spatial feature (e.g., movement, orientation, location, altitude, direction, speed, etc.), of the first virtual object 260 on the display appliance 200, is based at least in part on the RSSI value D152 (as shown in FIG. 9B) from the first controller device 100 within 3D ambient space 302.

In some embodiments, in step S255, in response to the one or more support virtual objects, via the display appliance 200, further comprising in the one or more video frames the one or more support virtual objects such that a third spatial feature (e.g., movement, orientation, location, altitude, direction, speed, etc.), of the one or more support virtual objects on the display appliance 200, is based at least in part on the first spatial feature of the first controller device 100 within the 3D ambient space 302. In the current step, if there are no support virtual objects implemented, the method skips the current step. In some alternate embodiments, the current step may be optional and not required. In various alternate embodiments, the current step may be modified in part, in whole, and/or in combination with the operational steps described in FIGS. 12K, 12L, 12M, 12N, 12O, and/or 12P, which are discussed in the section titled "Method for Display Appliance to Modify a Virtual Object."

In some embodiments, in step S256, generating, via the display appliance 200, one or more sound effects based at least in part on the first spatial feature of the first controller device 100 within the 3D ambient space 302. In various embodiments, the current step may be optional and not required.

In some embodiments, in step S257, generating, via the display appliance 200, one or more mechanical effects based at least in part on the first spatial feature of the first controller device 100 within the 3D ambient space 302. In various embodiments, the current step may be optional and not required.

In some embodiments, in step S258, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial calibrate in Real-time." In some alternate embodiments, the current step may not be required in the method.

Finally, in some embodiments, in step S259, in response to determining, via the display appliance 200, that the method is not done, the method goes back to step S250. Otherwise the method is done, so the method ends. In the current embodiment, determining if the method is done may be based at least in part on a substantially periodic time interval or a detected periodic state, wherein the method may be continuously executed (looping from step S259 back to step S250) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S259 back to step S250) in a substantially aperiodic or on a needed basis. In some alternative embodiments, the current step may not be required, or implemented elsewhere.

Method for Controller Device to Enable Arbitrarily Relocatable

Turning now to FIGS. 12C-12J while referencing FIGS. 1 and 3, there shown are flowcharts of various exemplary embodiments of a computer-implemented method for a first controller device that enables the first controller device to be arbitrarily relocatable within 3D ambient space, although alternative methods may also be considered.

In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some method embodiments, step S170 of FIG. 12C reads: operating, via a first relocatable translator 134 of the first controller device 100 and/or a second relocatable translator 234 of the display appliance 200, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 that is an unlimited type of physical object in the 3D ambient space 302, and the first controller device 100 is enabled to be arbitrarily located and arbitrarily oriented in the full extent of the 3D ambient space 302 in a 3D real-world space 303. Wherein, the method ends. In some embodiments, the current step in part, in whole, and/or in combination reads: the first controller device 100 is enabled to be arbitrarily located and arbitrarily oriented within the 3D ambient space 302 in a 3D real-world space 303. In some embodiments, the current step in part, in whole, and/or in combination reads: and the first controller device 100, display appliance 200, and/or the play system 300 is enabled to be unaware of the type of the first arbitrary physical object 250 in 3D ambient space 302. In some embodiments, the current step in part, in whole, and/or in combination reads: and the first controller device 100, display appliance 200, and/or the play system 300 is enabled to be unaware of the type of object that the first arbitrary physical object 250 embodies in 3D ambient space 302. In some embodiments, the current step in part, in whole, and/or in combination reads: and the first controller device 100, display appliance 200, and/or the play system 300 is enabled to be unaware of the characteristics or attributes of the first arbitrary physical object 250 in 3D ambient space 302. In some embodiments, the current step in part, in whole, and/or in combination reads: while the play system 300, display appliance 200, and/or controller device 100 is operating multimedia effects in real-time with play activity for one or more users.

In some method embodiments, step S171 of FIG. 12D reads: operating, via a first relocatable translator 134 of the first controller device 100 and/or a second relocatable translator 234 of the display appliance 200, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be moved in limitless direction and/or limitless distance such that the 3D ambient space 302 is movable in a 3D real-world space 303. Wherein, the method ends. In some embodiments, the current step in part, in whole, and/or in combination reads: while the play system 300, display appliance 200, and/or controller device 100 is operating multimedia effects in real-time with play activity for one or more users.

In some method embodiments, step S172 of FIG. 12E reads: operating, via a first relocatable translator 134 of the first controller device 100 and/or a second relocatable translator 234 of the display appliance 200, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented and capable of being wholly occluded from view (e.g., from all users) in the 3D ambient space 302 in a 3D real-world space 303. Wherein, the method ends. In some embodiments, the current step in part, in whole, and/or in combination reads: while the play system 300, display appliance 200, and/or controller device 100 is operating multimedia effects in real-time with play activity for one or more users.

In some method embodiments, step S173 of FIG. 12F reads: operating, via a first relocatable translator 134 of the first controller device 100 and/or a second relocatable translator 234 of the display appliance 200, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented relative to one or more display appliances in the 3D ambient space 302 in a 3D real-world space 303. Wherein, the method ends. In some embodiments, the current step in part, in whole, and/or in combination reads: while the play system 300, display appliance 200, and/or controller device 100 is operating multimedia effects in real-time with play activity for one or more users.

In some method embodiments, step S174 of FIG. 12G reads: operating, via a first relocatable translator 134 of the first controller device 100 and/or a second relocatable translator 234 of the display appliance 200, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and at least once a first orientation (and/or a first location), of the first controller device 100 in the 3D ambient space 302, is independently and arbitrarily adjustable in respect to a second orientation (and/or a second location) of a first virtual object 260, in a 3D virtual space 204, on the display appliance 200. Wherein, the method ends. In some embodiments, the current step in part, in whole, and/or in combination reads: while the play system 300, display appliance 200, and/or controller device 100 is operating multimedia effects in real-time with play activity for one or more users.

In some method embodiments, step S175 of FIG. 12H reads: operating, via a first relocatable translator 134 of the first controller device 100 and/or a second relocatable translator 234 of the display appliance 200, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 that is arbitrary and unspecified to the first controller device 100, display appliance 200, and/or play system 300. Wherein, the method ends. In some embodiments, the current step in part, in whole, and/or in combination reads: the type of the first arbitrary physical object 250 is arbitrary and unspecified to the first controller device 100, display appliance 200, and/or the play system 300. In some embodiments, the current step in part, in whole, and/or in combination reads: while the play system 300, display appliance 200, and/or controller device 100 is operating multimedia effects in real-time with play activity for one or more users.

In some method embodiments, step S176 of FIG. 12I reads: operating, via a first relocatable translator 134 of the first controller device 100 and/or a second relocatable translator 234 of the display appliance 200, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented within the 3D ambient space 302 such that the 3D ambient space 302 is movable in a 3D real-world space 303 while the play system 300 is operating multimedia effects in real-time. Wherein, the method ends. In some embodiments, the current step in part, in whole, and/or in combination reads: while the play system 300, display appliance 200, and/or controller device 100 is operating multimedia effects in real-time with play activity for one or more users.

In some method embodiments, step S177 of FIG. 12J reads: operating, via a first relocatable translator 134 of the first controller device 100 and/or a second relocatable translator 234 of the display appliance 200, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 that is arbitrarily selected (e.g., by a user) from a plurality of physical objects present within the 3D ambient space 302 in the 3D real-world space 303. Wherein, the method ends. In some embodiments, the current step in part, in whole, and/or in combination reads: while the play system 300, display appliance 200, and/or controller device 100 is operating multimedia effects in real-time with play activity for one or more users.

In some method embodiments, in part, in whole, and/or a combination of operational steps S170, S171, S172, S173, S174, S175, S176, and/or S177 of FIGS. 12C, 12D, 12E, 12F, 12G, 12H, 12I, 12J, or similar operations may be implemented.

Method for Display Appliance to Enable Arbitrarily Relocatable

Turning now to FIGS. 12C-12J while referencing FIGS. 1 and 5, there shown are flowcharts of exemplary embodiments of a computer-implemented method for a display appliance that enables one or more controller devices to be arbitrarily relocatable within 3D ambient space, although alternative methods may also be considered.

In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system 300 may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some method embodiments, in part, in whole, and/or a combination of operational steps S170, S171, S172, S173, S174, S175, S176, and/or S177 of FIGS. 12C, 12D, 12E, 12F, 12G, 12H, 12I, 12J, or similar operations may be implemented. For sake of brevity, the reader may refer to the previous section "Method for Controller Device to Enable Arbitrarily Relocatable" for detailed disclosure of the above mentioned steps and figures.

Method for Controller Device to Modify a Virtual Object

Turning now to FIGS. 12K-12P while referencing FIGS. 1 and 5, there shown are flowcharts of exemplary embodiments of a computer-implemented method for a controller device that "modifies" a virtual object, in a 3D virtual space, on a display appliance, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some method embodiments, step S274 of FIG. 12K reads: A second orientation, of the first virtual object 260 within a 3D virtual space 204 on the display appliance 200, is based at least in part on a first orientation of the first controller device 100 within the 3D ambient space 302. Wherein, the method ends.

In some method embodiments, step S275 of FIG. 12L reads: A second location, of the first virtual object 260 within a 3D virtual space 204 on the display appliance 200, is based at least in part on a first location of the first controller device 100 within the 3D ambient space 302. Wherein, the method ends.

In some method embodiments, step S276 of FIG. 12M reads: A second translational movement, of the first virtual object 260 within a 3D virtual space 204 on the display appliance 200, is based at least in part on a first translational movement of the first controller device 100 within the 3D ambient space 302. Wherein, the method ends. In an alternative embodiment of the current step: A second movement, of the first virtual object 260 within a 3D virtual space 204 on the display appliance 200, is based at least in part on a first movement of the first controller device 100 within the 3D ambient space 302. Wherein, the method ends. In an alternative embodiment of the current step: A second translational velocity, of the first virtual object 260 within a 3D virtual space 204 on the display appliance 200, is based at least in part on a first translational velocity of the first controller device 100 within the 3D ambient space 302. Wherein, the method ends.

In some method embodiments, step S277 of FIG. 12N reads: A second rotational movement, of the first virtual object 260 within a 3D virtual space 204 on the display appliance 200, is based at least in part on a first rotational movement of the first controller device 100 within the 3D ambient space 302. Wherein, the method ends. In an alternative embodiment of the current step: A second rotational velocity, of the first virtual object 260 within a 3D virtual space 204 on the display appliance 200, is based at least in part on a first rotational velocity of the first controller device 100 within the 3D ambient space 302. Wherein, the method ends.

In some method embodiments, step S278 of FIG. 12O reads: A movement, of the first virtual object 260 within a 3D virtual space 204 on the display appliance, is not based on or not necessarily based on the type of the first arbitrary physical object 250 within the 3D ambient space 302. Wherein, the method ends. In an alternative embodiment of the current step: All movements, of the first virtual object 260 within a 3D virtual space 204 on the display appliance, is not based on or not necessarily based on the type of the first arbitrary physical object 250 within the 3D ambient space 302. Wherein, the method ends. In an alternative embodiment of the current step reads: A second movement, of the first virtual object within a 3D virtual space on the display appliance, is based at least in part on a first movement, of the first controller device within the 3D ambient space, and the type of the first virtual object (e.g., racecar, turtle, etc.) on the display appliance. Wherein, the method ends.

In some method embodiments, step S279 of FIG. 12P reads: at least once a second orientation (and/or a second location), of the first virtual object 260 within a 3D virtual space 204 on the display appliance 200, is independently and arbitrarily adjustable in respect to a first orientation (and/or a first location) of the first controller device 100 within the 3D ambient space 302. Wherein, the method ends. In an alternative embodiment of the current step reads: at least once a first orientation (and/or a first location), of the first controller device 100 within the 3D ambient space 302, is independently and arbitrarily adjustable in respect to a second orientation (and/or a second location) of the first virtual object 260 within a 3D virtual space 204 on the display appliance 200. Wherein, the method ends.

In some method embodiments, in part, in whole, and/or a combination of operational steps of S274, S275, S276, S277, S278, and/or S279 in FIGS. 12K, 12L, 12M, 12N, 12O, 12P, or similar operations may be implemented.

Method for Display Appliance to Modify a Virtual Object

Turning again to FIGS. 12K-12P while referencing FIGS. 1 and 5, there shown are flowcharts of exemplary embodiments of a computer-implemented method for a display appliance that modifies a virtual object, in a 3D virtual space, on a display appliance, although alternative methods may also be considered.

In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

Figure 13:
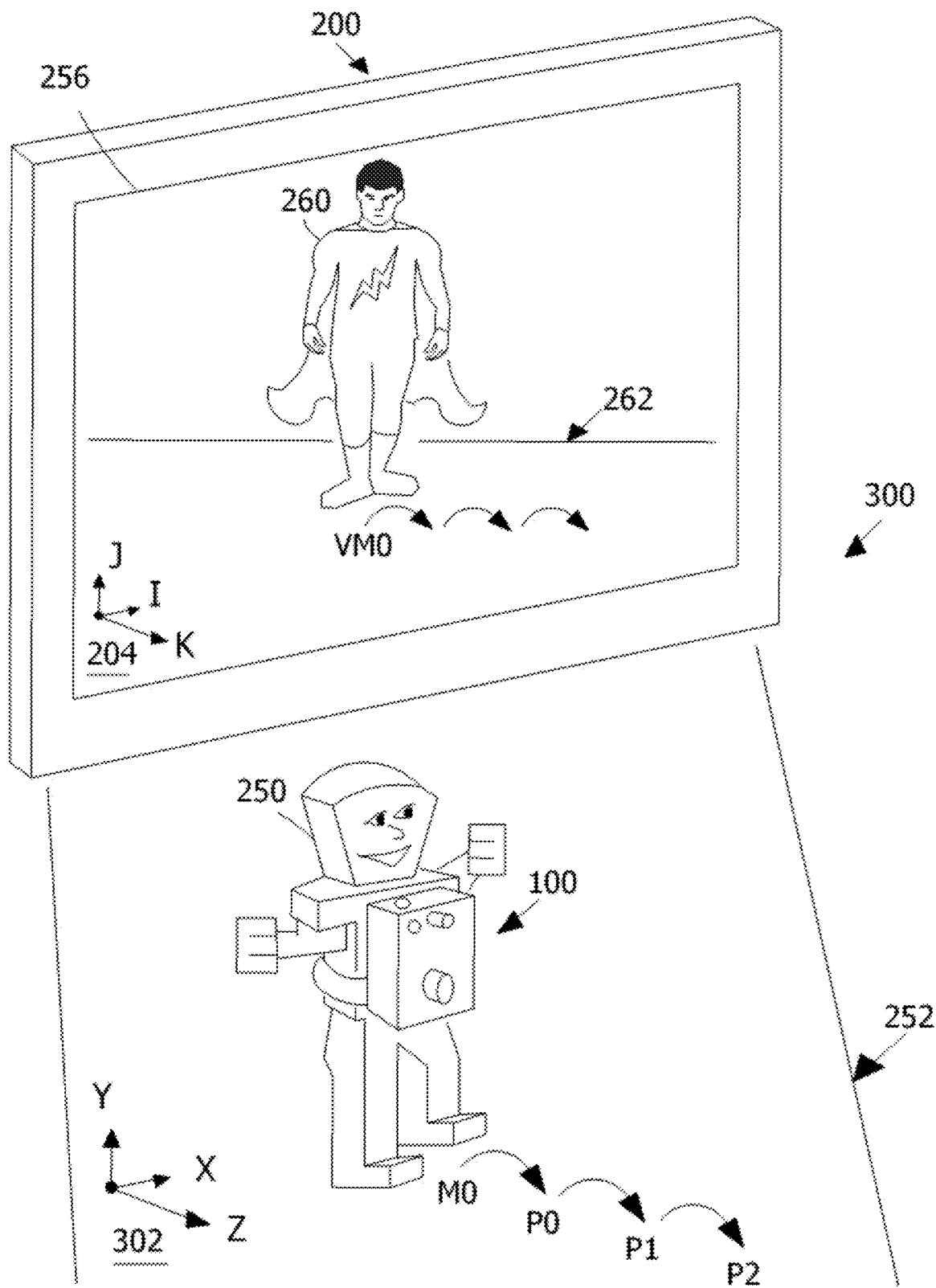
FIG. 13 is a perspective view for the play system of FIG. 1, which shows a toy walking gesture movement of a first controller device, and first arbitrary physical object, that is at least in part controlling a first virtual object on a display appliance.
Figure 14:
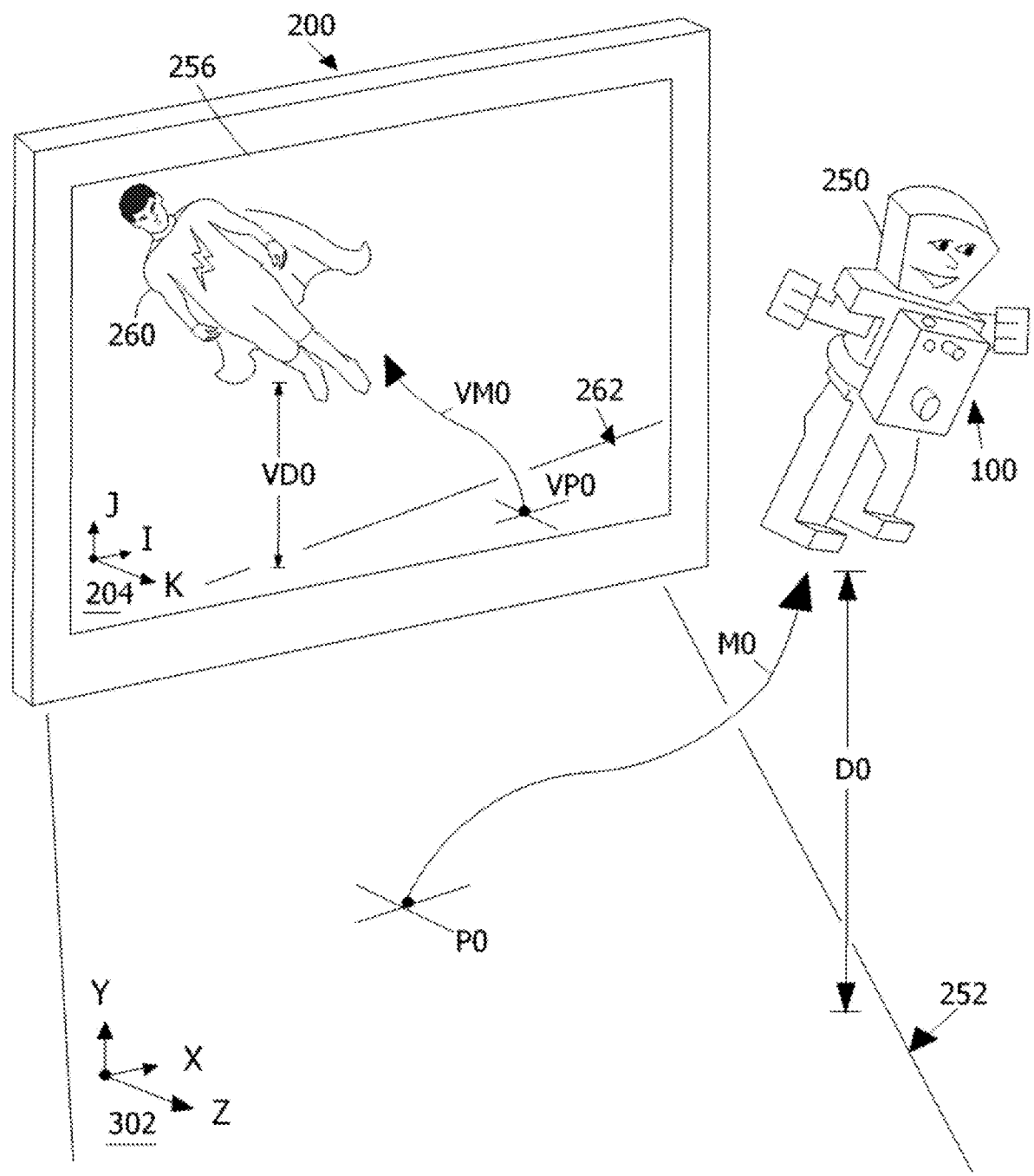
FIG. 14 is a perspective view for the play system of FIG. 1, which shows a toy takeoff gesture movement of a first controller device, and first arbitrary physical object, that is at least in part controlling a first virtual object on a display appliance.
Figure 15:
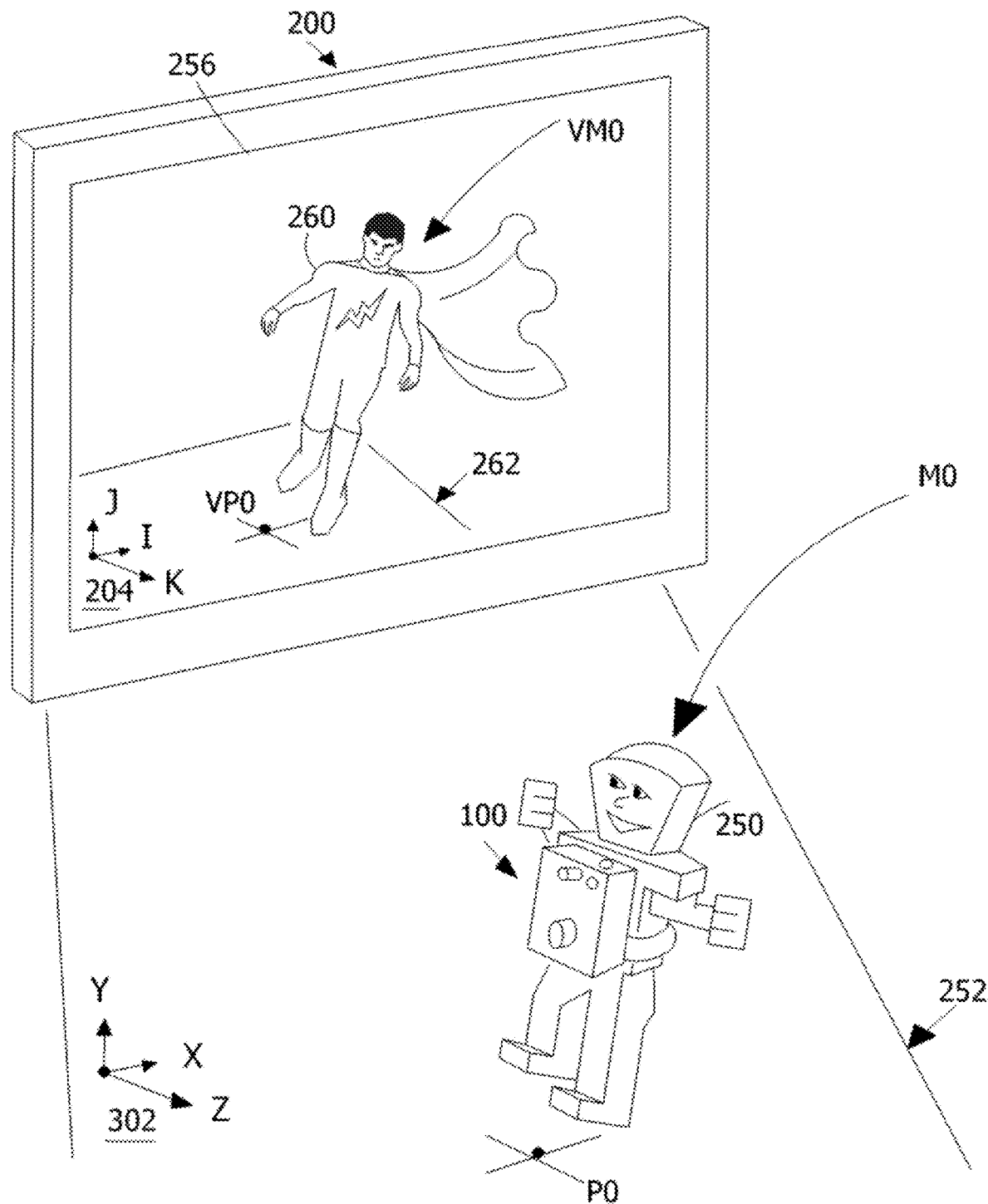
FIG. 15 is a perspective view for the play system of FIG. 1, which shows a toy landing gesture movement of a first controller device, and first arbitrary physical object, that is at least in part controlling a first virtual object on a display appliance.

So to begin, in some embodiments, a computer-implemented method may comprise: at a display appliance 200, including one or more control units 210 and a first memory 220, wherein the one or more control units 210 execute computer instructions performing first operations in a play system 300:

In some method embodiments, in part, in whole, and/or a combination of operational steps of S274, S275, S276, S277, S278, and/or S279 in FIGS. 12K, 12L, 12M, 12N, 12O, 12P, or similar operations may be implemented. For sake of brevity, the reader may refer to the previous section "Method for Controller Device to Modify a Virtual Object" for detailed disclosure of the above mentioned steps and figures.
Gesture Movements of Arbitrary Physical Objects and Virtual Objects As shown in FIGS. 13-15, there presented are some exemplary embodiments of play activity operations of the play system 300, which detect and respond to gesture movements of a controller device and an arbitrary physical object in 3D ambient space. The first controller device 100 is shown connected to the first arbitrary physical object 250. Moreover, the play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256.
"Toy Walking Gesture" Movement of an Arbitrary Physical Object and Virtual Object So turning first to FIG. 13, in some embodiments of play activity operations, the first arbitrary physical object 250 and first controller device 100 (which is connected) may be moved in a gesture movement in 3D ambient space 302 by a user/player (not shown). Whereupon, the first controller device 100 may operably detect a first gesture movement M0 (e.g., a toy walking gesture) of the first controller device 100 and the first arbitrary physical object 250 in 3D ambient space 302. Thereby the first controller device 100 may transmit a first control data, comprising information of the first gesture movement M0, to the display appliance 200. And accordingly, the first controller device 100 may be at least in part controlling a first virtual object 260 on the display appliance 200, such that an at least one movement VM0 (e.g., virtual walking movement), of the first virtual object 260 on the display appliance 200, may be based at least in part on the first gesture movement M0 (e.g., the toy walking gesture) of the first controller device 100 and the first arbitrary physical object 250 within 3D ambient space 302 of the play system 300. For a description of a "gesture movement," the reader may refer to the earlier discussion related to the gesture analyzers 137 and 237 in FIGS. 3 and 5 and elsewhere in this disclosure.

Further, in some embodiments, the first gesture movement M0 may be identified, via the play system 300, as a toy walking gesture. The toy walking gesture movement of an arbitrary physical object may be used to simulate a walking movement of, for example, a toy character, toy animal, or toy doll—typically made by a child or adult during play. Wherein, a player (not shown) may grip (e.g. handhold) and move the arbitrary physical object 250 and simulate a toy walking across a surface by the toy walking gesture (as suggested by points P0, P1, and P2) of the first arbitrary physical object 250 moving across the surface of a second arbitrary physical object 252, such as a table top or floor, in 3D ambient space 302. As shown, the first gesture movement M0 may be a toy walking gesture, which comprises, but not limited to: 1) a hopping movement (as suggested by points P0, P1, and P2), on or above a surface, of one or more hops having a spatial altitude of at least 10 mm (or 20 mm or 50 mm) above the surface within a five second time duration, and/or 2) a hopping movement, on or above a surface, of two or more hops that touch the surface at locations separated by a spatial distance of at least 10 mm (or 20 mm or 50 mm) within a five second time duration.

Whereby, in some embodiments, the play system 300 may enable the controller device 100 to be at least in part controlling the at least one movement VM0 of the first virtual object 260 on the display appliance 200. In some embodiments, the at least one movement VM0 may be a virtual walking movement: wherein the first virtual object 260 appears to walk across the surface of a second virtual object 262, on the display appliance 200, in 3D virtual space 204.
"Toy Takeoff Gesture" Movement of an Arbitrary Physical Object and Virtual Object Now turning to FIG. 14, in some embodiments of play activity operations, the first arbitrary physical object 250 and first controller device 100 (which is connected) may be moved in a gesture movement in 3D ambient space 302 by a user/player (not shown). Whereupon, the first controller device 100 may operably detect a first gesture movement M0 (e.g., a toy takeoff gesture) of the first controller device 100 and the first arbitrary physical object 250 in 3D ambient space 302. Thereby the first controller device 100 may transmit a first control data, comprising information of the first gesture movement M0, to the display appliance 200. And accordingly, the first controller device 100 may be at least in part controlling a first virtual object 260, on the display appliance 200, such that an at least one movement VM0 (e.g., virtual takeoff movement), of the first virtual object 260, may be based at least in part on the first gesture movement M0 (e.g., the toy takeoff gesture) of the first controller device 100 and the first arbitrary physical object 250 within 3D ambient space 302 of the play system 300. For a description of a "gesture movement," the reader may refer to the earlier discussion related to the gesture analyzers 137 and 237 in FIGS. 3 and 5 and elsewhere in this disclosure.

Also shown, in some embodiments of play activity operations, the first gesture movement M0 may be identified, via the play system 300, as a toy takeoff gesture. The toy takeoff gesture is a movement of an arbitrary physical object to simulate a takeoff movement of, for example, a toy character, toy action figure, toy aircraft, toy spaceship—typically made by a child or adult during play. Wherein, a player (not shown) may grip and move the arbitrary physical object 250 and simulate a toy taking off from a surface by the toy takeoff gesture. As shown, the first gesture movement M0 of the toy takeoff gesture may comprise a substantially brief movement (e.g., of 0 to 5 cm, or less than 100 cm starting at point P0) of the first arbitrary physical object 250 moving across the surface of a second arbitrary physical object 252, such as a tabletop or floor, in 3D ambient space 302. As an example, real-world airplanes often move down a runway in contact with the earth before lifting off. Whereupon, the first gesture movement M0 of the toy takeoff gesture may further comprise an upward movement of the arbitrary physical object 250 to an altitude DO (e.g., more than 0 cm and less than less than 180 cm, or as high as a player can reach) above the surface of the second arbitrary physical object 252 in 3D ambient space 302.

Also shown, in some embodiments of play activity operations, the play system may enable the controller device 100 to be at least in part controlling the at least one movement VM0 of the first virtual object 260 on the display appliance 200. Wherein, the at least one movement VM0 may be a virtual takeoff movement: wherein the first virtual object 260 appears to takeoff from the surface of a second virtual object 262 and move upwards to a virtual altitude VD0 (e.g., more than 0 units high) above the surface of the second virtual object 252, on the display appliance 200, in 3D virtual space 204.

"Toy Landing Gesture" Movement of an Arbitrary Physical Object and Virtual Object Now turning to FIG. 15, in some embodiments of play activity operations, the first arbitrary physical object 250 and first controller device 100 (which is connected) may be moved in a gesture movement in 3D ambient space 302 by a user/player (not shown). Whereupon, the first controller device 100 may operably detect a first gesture movement M0 (e.g., a toy landing gesture) of the first controller device 100 and the first arbitrary physical object 250 in 3D ambient space 302. Thereby the first controller device 100 may transmit a first control data, comprising information of the first gesture movement M0, to the display appliance 200. And accordingly, the first controller device 100 may be at least in part controlling a first virtual object 260, on the display appliance 200, such that an at least one movement VM0 (e.g., virtual landing movement), of the first virtual object 260, may be based at least in part on the first gesture movement M0 (e.g., the toy landing gesture) of the first controller device 100 and the first arbitrary physical object 250 within 3D ambient space 302 of the play system 300. For a description of a "gesture movement," the reader may refer to the earlier discussion related to the gesture analyzers 137 and 237 in FIGS. 3 and 5 and elsewhere in this disclosure.

Also shown, in some embodiments of play activity operations, the first gesture movement M0 may be identified, via the play system 300, as a toy landing gesture. The toy landing gesture is a movement of an arbitrary physical object to simulate a landing movement of a toy character, toy action figure, toy flying vehicle, toy aircraft, or toy spaceship-typically made by a child or adult during play. Wherein, a player (not shown) may grip and move the arbitrary physical object 250 and simulate a toy or object landing on a surface by the toy landing gesture. As shown, the first gesture movement M0 of the toy landing gesture may comprise a downward movement of the arbitrary physical object 250, from above a surface, to touchdown in contact with the surface of a second arbitrary physical object 252 in 3D ambient space 302. Whereupon, the first gesture movement M0 of the toy landing gesture may be further comprising a substantially brief movement (e.g., of 0 to 5 cm, or less than 100 cm starting at point P0) of the first arbitrary physical object 250 moving across the surface of a second arbitrary physical object 252, such as a tabletop or floor, in 3D ambient space 302. As an example, real-world airplanes often touchdown and move down a runway in contact with the earth before coming to rest.

Also shown, in some embodiments of play activity operations, the play system 300 may enable the controller device 100 to be at least in part controlling the at least one movement VM0 of the first virtual object 260 on the display appliance 200. Wherein, the at least one movement VM0 may be a virtual landing movement: wherein the first virtual object 260 appears to move downwards and land on the surface of a second virtual object 262, on the display appliance 200, in 3D virtual space 204.

Method for Controller Device to Detect a Gesture Movement

Figure 16:
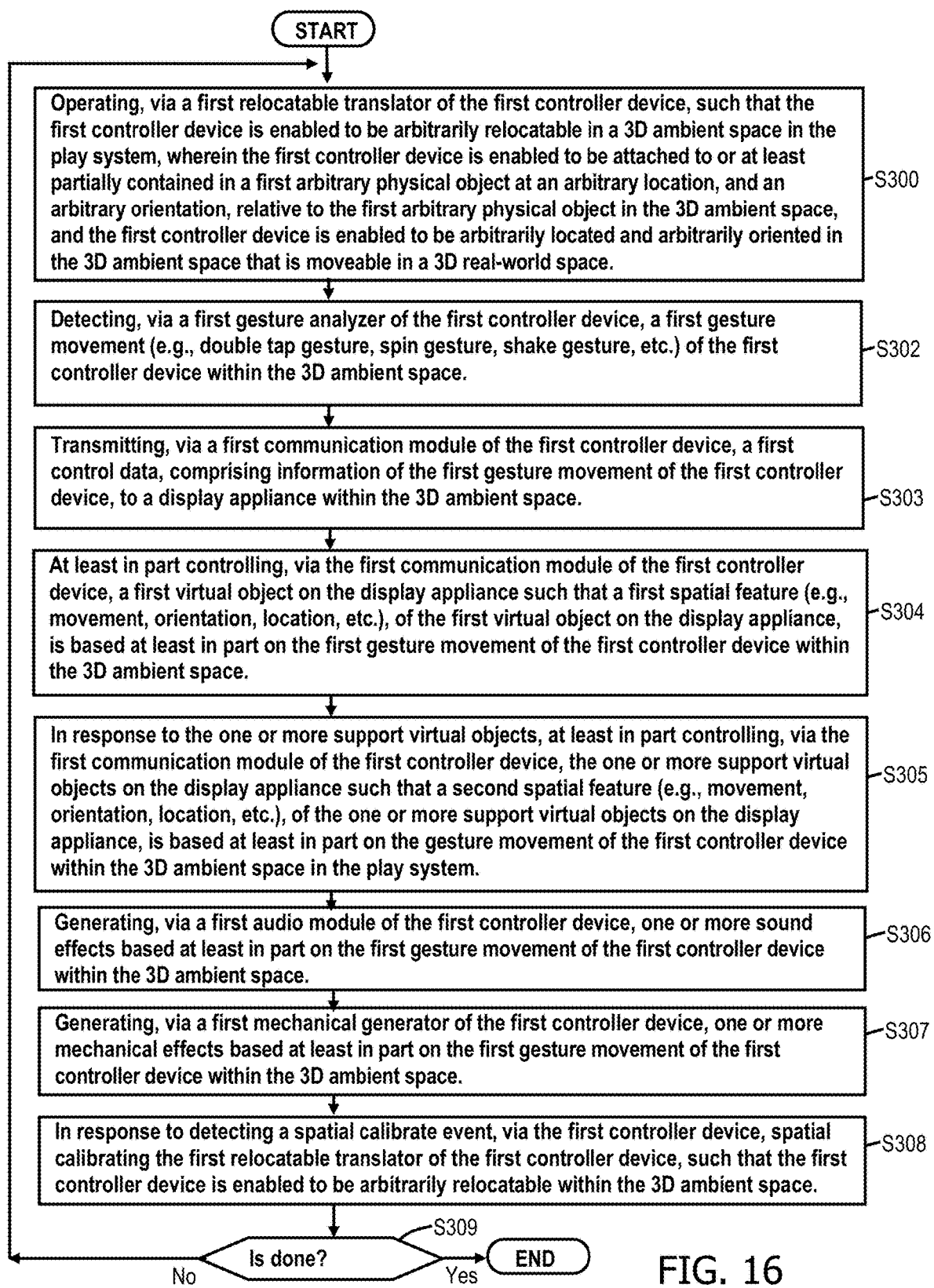
FIG. 16 is a flowchart for the play system of FIG. 1, of a method for a controller device, comprising operations for a gesture movement in the play system.

Turning now to FIG. 16 while referencing FIGS. 13-15, 1, and 3, there shown is a flowchart of an exemplary embodiment of a computer-implemented method for a controller device detecting a gesture movement in the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some embodiments, beginning with step S300, operating, via a first relocatable translator 134 of the first controller device 100, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S302, detecting, via a first gesture analyzer 137 of the first controller device 100, a first gesture movement M0 (e.g., double tap gesture, spin gesture, shake gesture, etc.) of the first controller device 100 within the 3D ambient space 302. For a description of a "gesture movement," the reader may refer to the gesture analyzer 137 in FIG. 3 and elsewhere in this disclosure.

In some embodiments, in step S303, transmitting, via a first communication module 118 of the first controller device 100, a first control data, comprising information of the first gesture movement M0 of the first controller device 100, to a display appliance 200 within the 3D ambient space in the play system 300.

In some embodiments, in step S304, at least in part controlling, via the first communication module 118 of the first controller device 100, a first virtual object 260 on the display appliance 200 such that a first spatial feature VM0 (e.g., movement, orientation, location, etc.), of the first virtual object 260 on the display appliance 200, is based at least in part on the first gesture movement M0 of the first controller device 100 within the 3D ambient space 302 in the play system 300. In various alternate embodiments, the current step may be modified in part, in whole, and/or in combination with the operational steps described in FIGS. 12K, 12L, 12M, 12N, 12O, and/or 12P, which are discussed in the section titled "Method for Controller Device to Modify a Virtual Object." For a description of a "spatial feature," the reader may refer to the motion module 119 in FIG. 3 and elsewhere in this disclosure.

In some embodiments, in step S305, In response to the one or more support virtual objects, at least in part controlling, via the first communication module 118 of the first controller device 100, the one or more support virtual objects on the display appliance 200 such that a second spatial feature (e.g., movement, orientation, location, etc.), of the one or more support virtual objects on the display appliance 200, is based at least in part on the first gesture movement M0 of the first controller device 100 within the 3D ambient space 302 in the play system 300. In some embodiments, if there are no support virtual objects enabled, the current step may be skipped. In various embodiments, the current step may be optional and not required. In various alternate embodiments, the current step may be modified in part, in whole, and/or in combination with the operational steps described in FIGS. 12K, 12L, 12M, 12N, 12O, and/or 12P, which are discussed in the section titled "Method for Controller Device to Modify a Virtual Object."

In some embodiments, in step S306, generating, via a first audio module 112 of the first controller device 100, one or more sound effects based at least in part on the first gesture movement M0 of the first controller device 100 within the 3D ambient space 302. In various embodiments, the current step may be optional and not required.

In some embodiments, in step S307, generating, via a first mechanical generator 114 of the first controller device 100, one or more mechanical effects based at least in part on the first gesture movement M0 of the first controller device 100 within the 3D ambient space 302. In various embodiments, the current step may be optional and not required.

In some embodiments, in step S308, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips to step S159. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial calibrate in Real-time." In some alternate embodiments, the current step may not be required in the method.

Finally, in some embodiments, in step S309, in response to determining, via the first controller device, that the method is not done, the method goes back to step S300. Otherwise the method is done, so the method ends. In the current embodiment, determining if the method is done may be based at least in part on a substantially periodic time interval or a detected periodic state, wherein the method may be continuously executed (looping from step S309 and back to step S300) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S309 and back to step S300) in a substantially aperiodic or on a needed basis. In other embodiments, the current step may not be required, or implemented elsewhere.

Method for Display Appliance to Detect Gesture Movements

Figure 17:
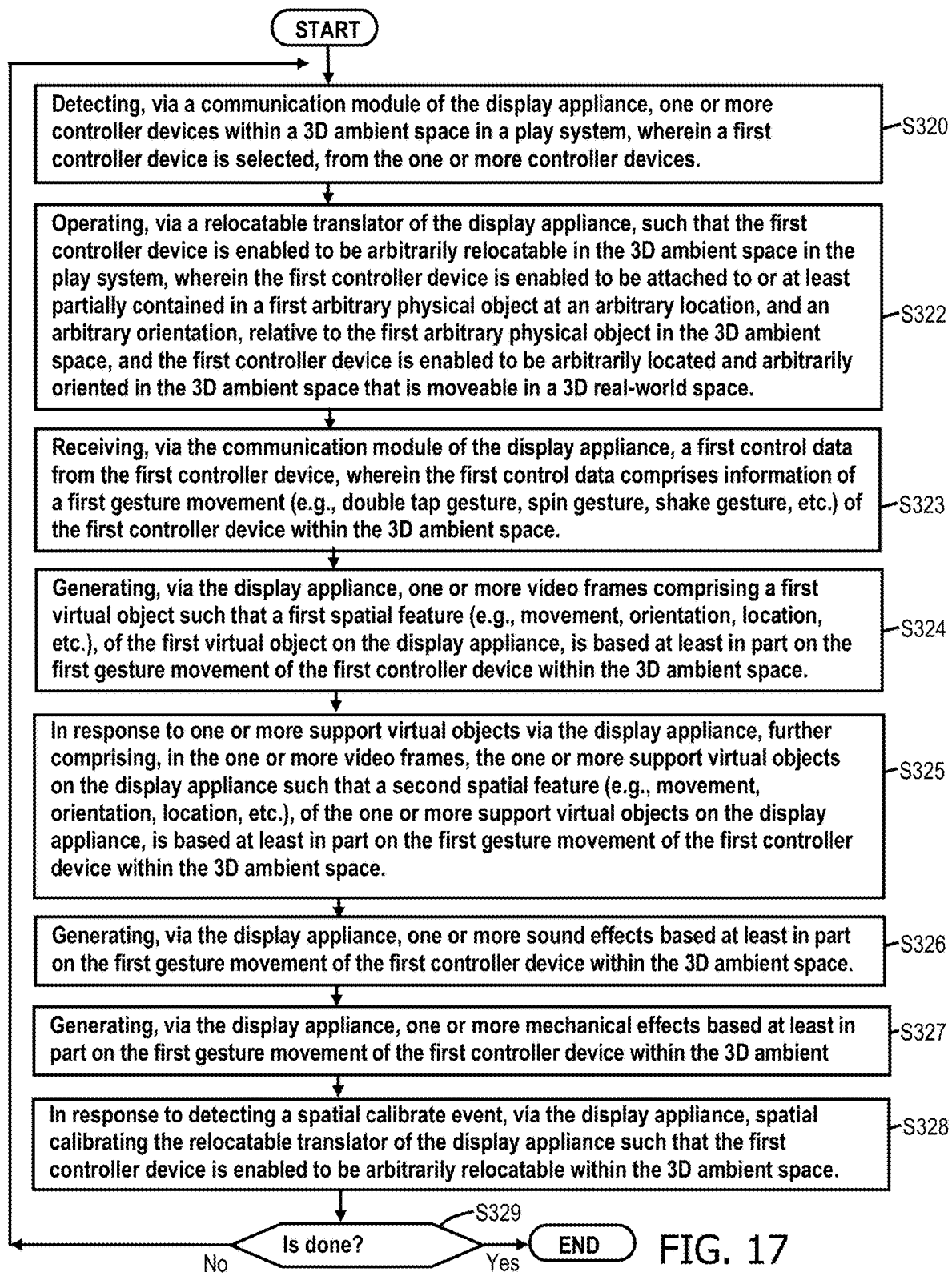
FIG. 17 is a flowchart for the play system of FIG. 1, of a method for a display appliance, comprising operations for a gesture movement in the play system.

Turning now to FIG. 17 while referencing FIGS. 13-15, 1, and 5, there shown is a flowchart of an exemplary embodiment of a computer-implemented method for a display appliance detecting one or more gesture movements of one or more controller devices in a play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S320, detecting, via a communication module 218 of the display appliance 200, one or more controller devices within a 3D ambient space 302 in the play system 300, wherein a first controller device 100 is selected, from the one or more controller devices. In the current embodiment, the first controller device 100 may be iteratively and sequentially selected, from the one or more controller devices detected in the play system 300, whenever the current step is executed. In alternate embodiments, the first controller device 100 may be arbitrarily selected from the one or more controller devices, detected in the play system 300, although other approaches may be considered as well.

In some embodiments, in step S322, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S323, receiving, via a communication module 218 of the display appliance 200, a first control data from the first controller device 100, wherein the first control data comprises information of a first gesture movement M0 (e.g., toy walking gesture, toy takeoff gesture, toy landing gesture, double tap gesture, etc.) of the first controller device 100 within the 3D ambient space 302 in the play system 300. For a description of a "gesture movement," the reader may refer to gesture analyzers 137 and 237 in FIGS. 3 and 5 and elsewhere in this disclosure.

In some embodiments, in step S324, generating, via the display appliance 200, one or more video frames comprising a first virtual object 260 such that a first spatial feature VM0 (e.g., movement, orientation, location, etc.), of the first virtual object 260 on the display appliance 200, is based at least in part on the first gesture movement M0 of the first controller device 100 within the 3D ambient space 302 in the play system 300. In various alternate embodiments, the current step may be modified in part, in whole, and/or in combination with the operational steps described in FIGS. 12K, 12L, 12M, 12N, 12O, and/or 12P, which are discussed in the section titled "Method for Display Appliance to Modify a Virtual Object." For a description of a "spatial feature," the reader may refer to the motion module 119 in FIG. 3 and elsewhere in this disclosure.

In some embodiments, in step S325, in response to one or more support virtual objects via the display appliance 200, further comprising, in the one or more video frames, the one or more support virtual objects on the display appliance 200 such that a second spatial feature (e.g., movement, orientation, location, etc.), of the one or more support virtual objects on the display appliance 200, is based at least in part on the first gesture movement M0 of the first controller device 100 within the 3D ambient space 302 in the play system 300. In some embodiments, if there are no support virtual objects enabled, the current step may be skipped. In various embodiments, the current step may be optional and not required. In various alternate embodiments, the current step may be modified in part, in whole, and/or in combination with the operational steps described in FIGS. 12K, 12L, 12M, 12N, 12O, and/or 12P, which are discussed in the section titled "Method for Display Appliance to Modify a Virtual Object."

In some embodiments, in step S326, generating, via the display appliance 200, one or more sound effects based at least in part on the first gesture movement of the first controller device 100 within the 3D ambient space 302. In various embodiments, the current step may be optional and not required.

In some embodiments, in step S327, generating, via the display appliance 200, one or more mechanical effects based at least in part on the first gesture movement of the first controller device 100 within the 3D ambient space 302. In various embodiments, the current step may be optional and not required.

In some embodiments, in step S328, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial calibrate in Real-time." In some alternate embodiments, the current step may not be required in the method.

Finally, in some embodiments, in step S329, in response to determining, via the display appliance 200, that the method is not done, the method goes back to step S320. Otherwise the method is done, so the method ends. In the current embodiment, determining if the method is done may be based at least in part on a substantially periodic time interval or a detected periodic state, wherein the method may be continuously executed (looping from step S329 back to step S320) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S329 back to step S320) in a substantially aperiodic or on a needed basis. In other embodiments, the current step may not be required, or implemented elsewhere.

Figure 18A:
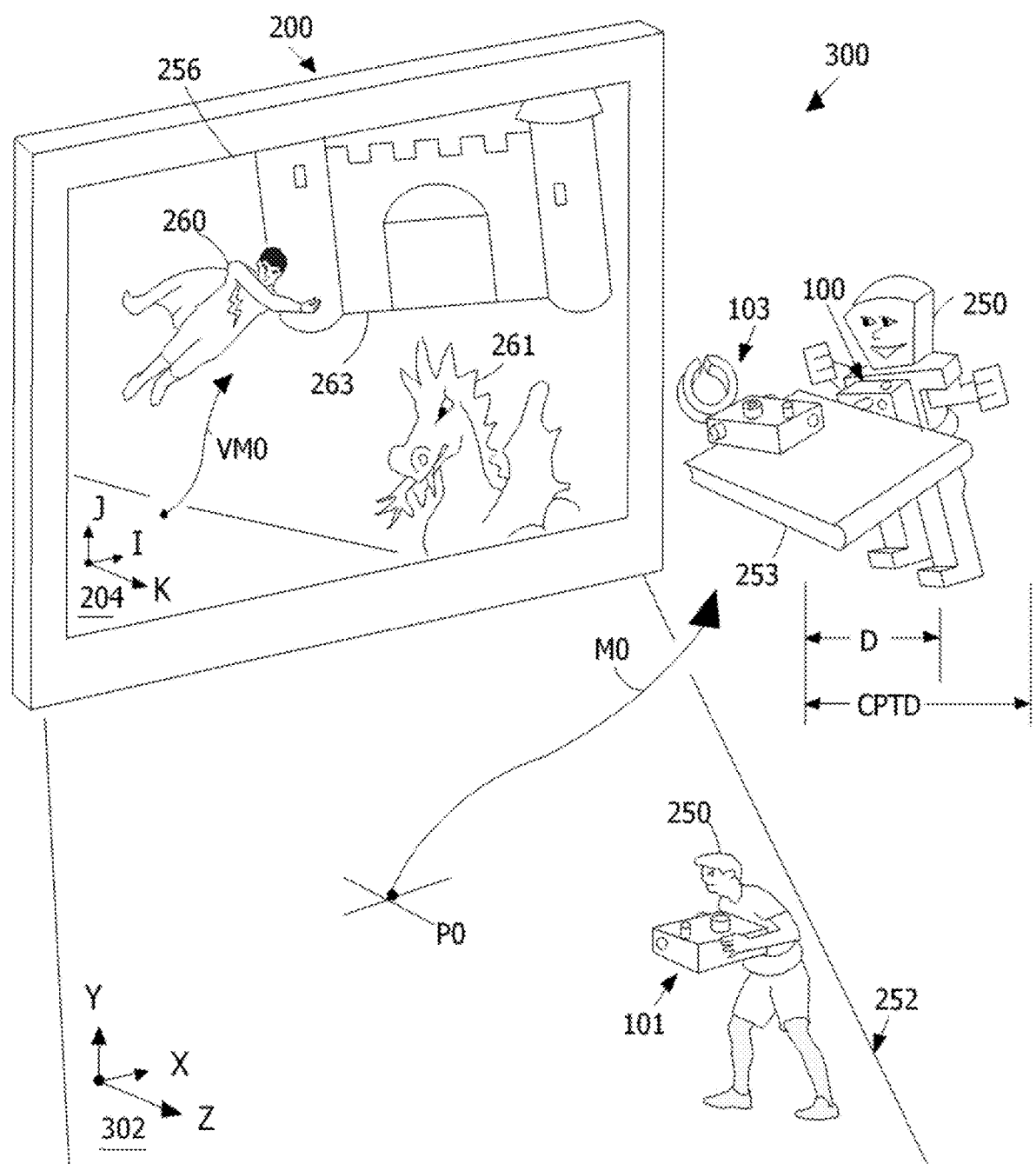
FIG. 18A is a perspective view for the play system of FIG. 1, which shows three controller devices, connected to three arbitrary physical objects, wherein there is a combined gesture movement of first and second controller devices.

"Combined Gesture" Movement of a Plurality of Arbitrary Physical Objects and Virtual Objects Turning now to FIG. 18A, there shown is an embodiment of play activity operations that enable the play system 300 to detect and respond to a combined gesture movement of a plurality of controller devices with arbitrary physical objects in 3D ambient space. Moreover, the play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256. A first controller device 100 is shown connected to a first arbitrary physical object 250 (e.g., a toy robot). A third controller device 101 is shown connected to a third arbitrary physical object 251 (e.g., a toy action figure). In addition, a second controller device 103 is shown connected to a second arbitrary physical object 253 (a paperback book). A fourth arbitrary physical object 252 may be, for example, a table top or floor.

So to begin the play activity operations, the first controller device 100 is enabled to be at least in part controlling a first virtual object 260 (e.g. a superhero) on the display appliance 200. The second controller device 103 is enabled to be at least in part controlling a second virtual object 263 (e.g. a castle building) on the display appliance 200. The third controller device 101 is enabled to be at least in part controlling a third virtual object 261 (e.g. a dragon) on the display appliance 200. Further, the first arbitrary physical object 250 (connected to the first controller device 100) and the second arbitrary physical object 253 (connected to the third controller device 103) are in close proximity and moved together in a combined gesture movement M0 (e.g., of a toy takeoff gesture) in 3D ambient space 302 by a user/player (not shown). For a description of a "gesture movement," the reader may refer to gesture analyzers 137 and 237 in FIGS. 3 and 5 and elsewhere in this disclosure. In various embodiments, detecting the combined gesture movement M0 may be based at least in part on the close proximity, of the first and second controller devices 100 and 103 within 3D ambient space 302. For example, a first and second controller device 100 and 103 in close proximity may be based at least in part on a spatial distance D, between the first and second controller devices 100 and 103 in 3D ambient space 302, is less than or equal to a close proximity threshold distance CPTD, although alternative means may be considered. For general information about "close proximity," the reader may refer to the collision analyzer 238 (in FIG. 5) and elsewhere in this disclosure.

Also shown, in some embodiments of play activity operations, the play system 300 may enable the controller devices 100 and 103 to be at least in part controlling an at least one combined movement VM0 of the first virtual object 260 and second virtual object 263 on the display appliance 200. Wherein, the at least one combined movement VM0 may be a virtual takeoff movement: wherein the first virtual object 260 and second virtual object 263, in close proximity and moving together in 3D ambient space 302, appear to takeoff from the surface of a fourth virtual object 262 and move upwards to a virtual altitude (e.g., more than 0 units high) above the surface of a fourth virtual object 252, on the display appliance 200, in 3D virtual space 204.

Method for Display Appliance to Detect "Combined Gesture Movement"

Figure 19A:
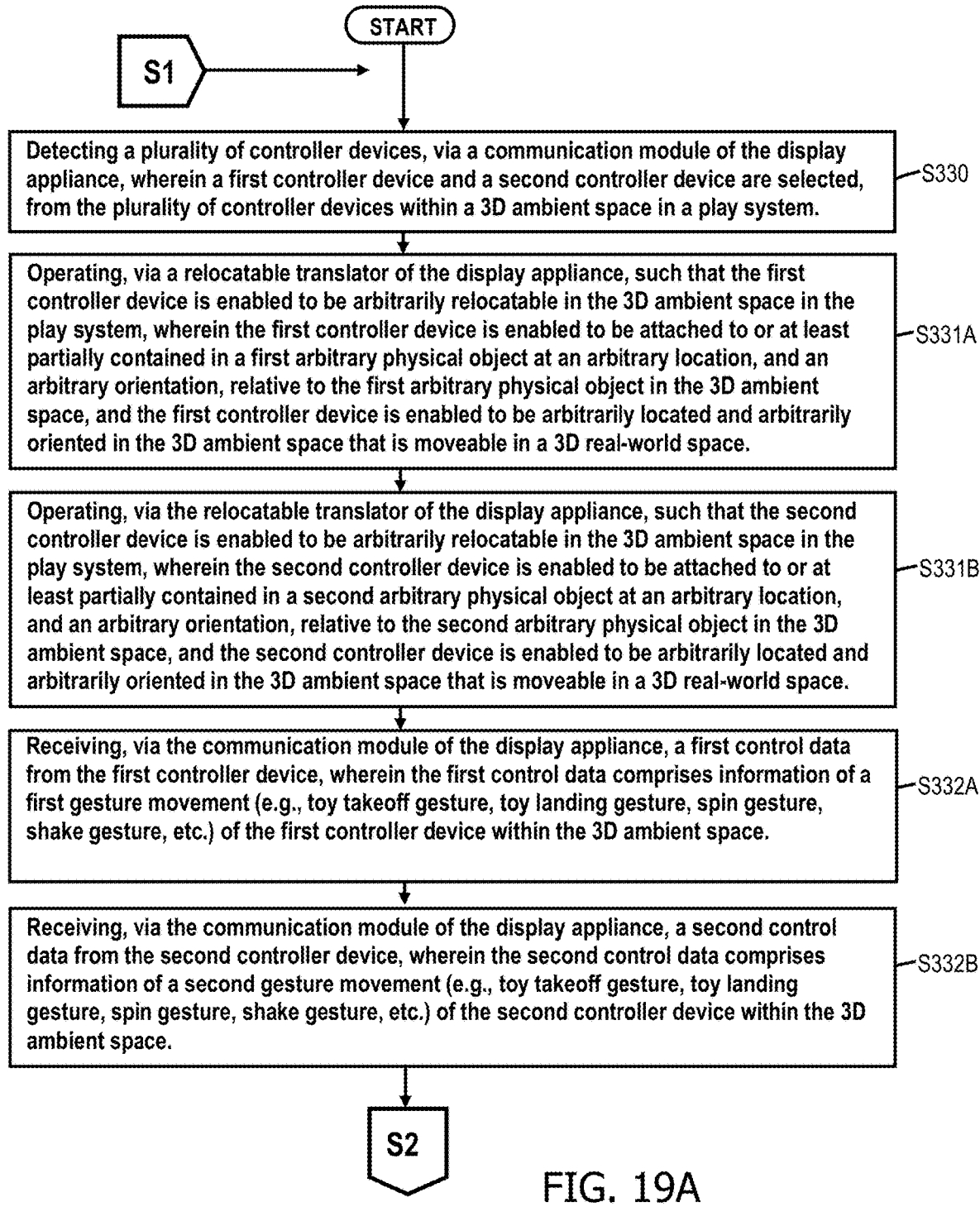
FIG. 19A is a first portion of a flowchart for the play system of FIG. 1, of a method for a display appliance, which enables a combined gesture movement operation.
Figure 19B:
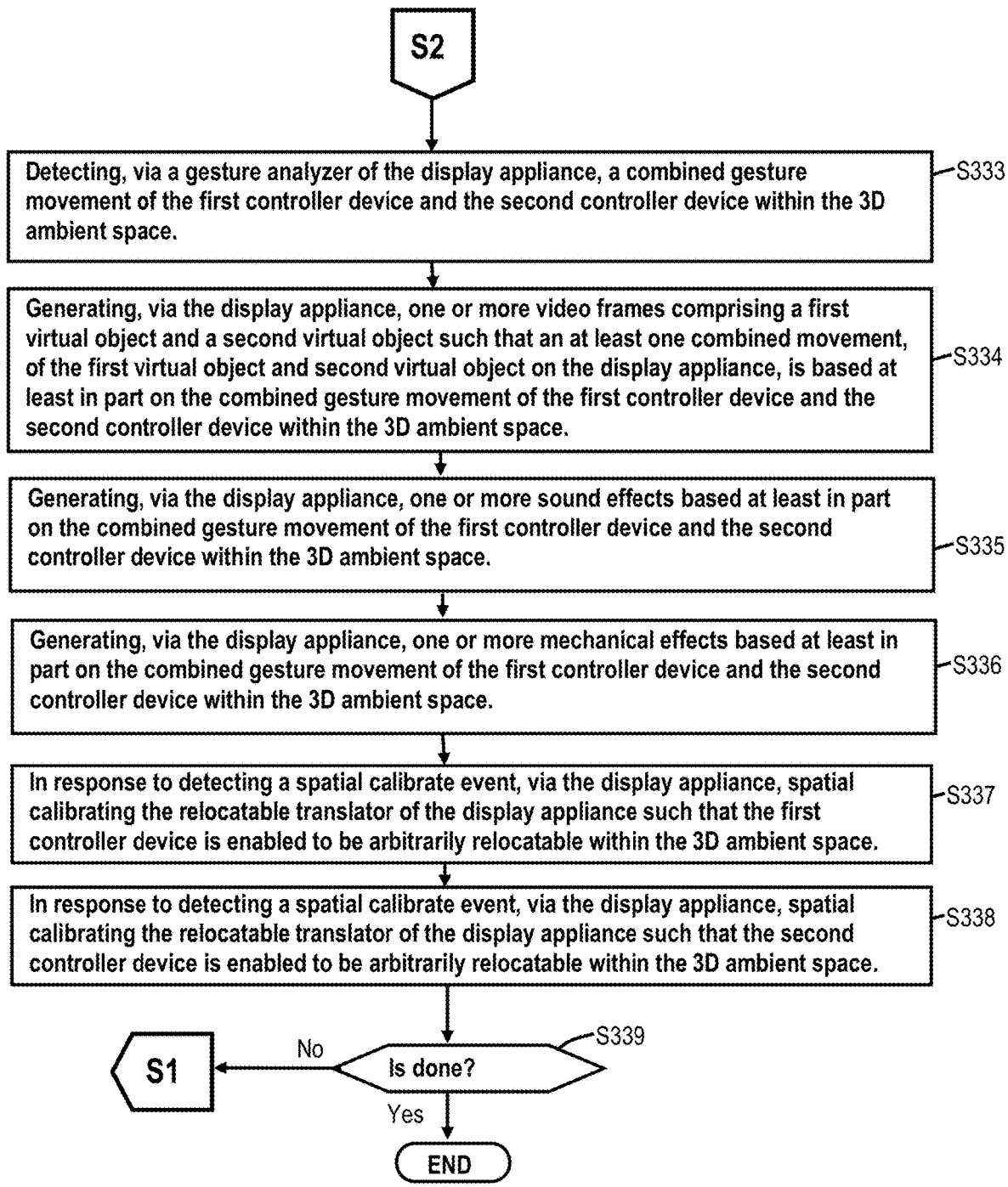
FIG. 19B is a second portion of a flowchart for the play system of FIG. 1, of a method for a display appliance, which enables a combined gesture movement.

Turning now to FIGS. 19A and 19B while referencing FIGS. 18A, 1, and 5, there shown is a first and second portion of a flowchart of an exemplary embodiment of a computer-implemented method for a display appliance, which detects a combined gesture movement of a plurality of controller devices in a play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S330, detecting a plurality of controller devices, via a communication module 218 of the display appliance 200, wherein a first controller device 100 and a second controller device 103 are selected, from the plurality of controller devices within a 3D ambient space 302. In the current embodiment, the first controller device 100 and second controller device 103 may be iteratively and sequentially selected, from the plurality of controller devices detected in the play system 300, whenever the current step is executed. In alternate embodiments, the first controller device 100 and second controller device 103 may be arbitrarily selected from the one or more controller devices, detected in the play system 300, although other approaches may be considered as well.

In some embodiments, in step S331A, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S331B, operating, via a relocatable translator 234 of the display appliance 200, such that the second controller device 103 is enabled to be arbitrarily relocatable in the 3D ambient space 302 of the play system 300, wherein the second controller device 103 is enabled to be attached to or at least partially contained in a second arbitrary physical object 253 at an arbitrary location, and an arbitrary orientation, relative to the second arbitrary physical object 253 in the 3D ambient space 302, and the second controller device 103 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S332A, receiving, via a communication module 218 of the display appliance 200, a first control data from the first controller device 100, wherein the first control data comprises information of a first gesture movement (e.g., toy walking gesture, toy takeoff gesture, toy landing gesture, double tap gesture, etc.) of the first controller device 100 within the 3D ambient space 302.

For a description of a "gesture movement," the reader may refer to gesture analyzers 137 and 237 in FIGS. 3 and 5 and elsewhere in this disclosure.

In some embodiments, in step S332B, receiving, via a communication module 218 of the display appliance 200, a second control data from the second controller device 103, wherein the second control data comprises information of a second gesture movement (e.g., toy walking gesture, toy takeoff gesture, toy landing gesture, double tap gesture, etc.) of the second controller device 103 within the 3D ambient space 302. For a description of a "gesture movement," the reader may refer to gesture analyzers 137 and 237 in FIGS. 3 and 5 and elsewhere in this disclosure.

The reader may now turn from the first portion of the flow chart in FIG. 19A (reference S2) to the second portion of the flowchart in FIG. 19B (reference S2), where the method continues.

In some embodiments, continuing with step S333, detecting a combined gesture movement, via a gesture analyzer 237 of the display appliance 200, of the first controller device 100 and the second controller device 103 within the 3D ambient space 302. In various embodiments, detecting a combined gesture movement may be based at least in part on the close proximity, of the first and second controller devices 100 and 103 within 3D ambient space, and/or the similarity of movement, of the first and second gesture movements of the first and second controller devices within 3D ambient space, although alternate operations may be considered as well. In various embodiments, a first and second controller device are in close proximity may be based at least in part on a spatial distance, between the first and second controller devices in 3D ambient space, is less than or equal to a close proximity threshold distance, although alternative operations for detecting close proximity may be considered as well. For general information about "close proximity," the reader may refer to the collision analyzer 238 (in FIG. 5) and elsewhere in this disclosure.

In some embodiments, in step S334, generating, via the display appliance 200, one or more video frames comprising a first virtual object 260 and a second virtual object 263 such that an at least one combined movement, of the first virtual object 260 and second virtual object 263 on the display appliance 200, is based at least in part on the combined gesture movement of the first controller device 100 and the second controller device 103 within the 3D ambient space 302.

In some embodiments, in step S335, generating, via the display appliance 200, one or more sound effects based at least in part on the combined gesture movement of the first controller device 100 and the second controller device 103 within the 3D ambient space 302. In various embodiments, the current step may be optional and not required in the method.

In some embodiments, in step S336, generating, via the display appliance 200, one or more mechanical effects based at least in part on the combined gesture movement of the first controller device 100 and the second controller device 103 within the 3D ambient space 302. In various embodiments, the current step may be optional and not required in the method.

In some embodiments, in step S337, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial calibrate in Real-time." In some alternate embodiments, the current step may not be required in the method.

In some embodiments, in step S338, in response to detecting a spatial calibrate event, via the display appliance 200, spatial calibrating the relocatable translator 234 of the display appliance 200, such that the second controller device 103 is enabled to be arbitrarily relocatable within the 3D ambient space 302, wherein the second controller device 103 is enabled to be attached to or at least partially contained in a second arbitrary physical object 253 at an arbitrary location, and an arbitrary orientation, relative to the second arbitrary physical object 253 within the 3D ambient space 302, and the second controller device 103 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial calibrate in Real-time." In some alternate embodiments, the current step may not be required in the method.

Finally, in some embodiments, in step S339, in response to determining, via the display appliance 200, that the method is not done, the method goes back to step S330 in FIG. 19A. Otherwise the method is done, so the method ends. In the current embodiment, determining if the method is done may be based at least in part on a substantially periodic time interval or a detected periodic state, wherein the method may be continuously executed (looping from step S339 and reference S1 back to step S330 and reference S1 in FIG. 19A) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S339 and reference S1 back to step S330 and reference S1 in FIG. 19A) in a substantially aperiodic or on a needed basis. In other embodiments, the current step may not be required, or implemented elsewhere. Close Proximity of Controller Devices, Arbitrary Physical Objects, and Virtual Objects Now turning to FIG. 20 while referencing FIGS. 1, 3, and 5, there shown are some embodiments of play activity operations of the play system 300, which detect and respond to close proximity of two or more controller devices and arbitrary physical objects in 3D ambient space. The play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256. A first controller device 101 is shown connected to a first arbitrary physical object 251 (e.g., a toy action figure). A second controller device 100 is shown connected to a second arbitrary physical object 250 (e.g., a toy robot). Wherein controller devices 100 and 101 may be configured with similar apparatus and functionality, as described earlier in FIGS. 2 and 3. Moreover, controller devices 100 and 101 have been connected, associated, and spatial calibrated with their respective arbitrary physical objects 250 and 251 as described in FIGS. 6A-6D.

So to begin, a user/player (not shown) may move the first arbitrary physical object 251 (connected to the first controller device 101) in a first movement M1 in 3D ambient space 302. Whereupon, in various embodiments, the first controller device 103 may detect a close proximity of the first controller device 101 (and the first arbitrary physical object 251) with the second controller device 100 (and the second arbitrary physical object 250) in 3D ambient space 302. Thereby the first controller device 103 may transmit a first control data, comprising information of the close proximity of the first controller device 101 with the second controller device 100, to the display appliance 200 in the 3D ambient space.

And accordingly, the first controller device 101 may be at least in part controlling a first virtual object 261 (e.g., dragon) on the display appliance 200 such that an at least one movement VM1 (e.g., dragon opening mouth), of the first virtual object 261 on the display appliance 200, is based at least in part on the close proximity of the first controller device 101 (and the first arbitrary physical object 251) with the second controller device 100 (and the second arbitrary physical object 250) within 3D ambient space 302 of the play system 300. In some embodiments, the first controller device 101 may be at least in part controlling the first virtual object 261 (e.g., dragon) on the display appliance 200 such that an at least one movement VM1 (e.g., dragon moves left), of the first virtual object 261 on the display appliance 200, causes the first virtual object 261 to move closer to a second virtual object 260 on the display appliance 200 in 3D virtual space 204.

Moreover, in some embodiments of play activity operations, the first controller device 101 may be at least in part controlling a second virtual object 260 (e.g., superhero) on the display appliance 200 such that an at least one movement VM0 (e.g., superhero tilts head), of the second virtual object 260 on the display appliance 200, is based at least in part on the close proximity of the first controller device 101 (and first arbitrary physical object 251) with the second controller device 100 (and the second arbitrary physical object 250) within 3D ambient space 302 of the play system 300. In some embodiments of play activity operations, the first controller device 101 may be at least in part controlling a third virtual object 262 (e.g., animated fire) on the display appliance 200 such that an at least one movement VM2 (animated fire moves towards superhero), of the third virtual object 262 on the display appliance 200, is based at least in part on the close proximity of the first controller device 101 (and the first arbitrary physical object 251) with the second controller device 100 (and the second arbitrary physical object 250) within 3D ambient space 302 of the play system 300.

In various embodiments of a play system, the first controller device 101 and the second controller device 100 are in close proximity, within 3D ambient space 302, may be based at least in part on a spatial distance D, between the first and second controller devices 101 and 100 in 3D ambient space 302, is less than or equal to a close proximity threshold distance CPTD, although alternative operations for detecting close proximity may be considered as well. For general information about "close proximity," the reader may refer to the collision analyzer 238 (in FIG. 5) and elsewhere in this disclosure.

Figure 20:
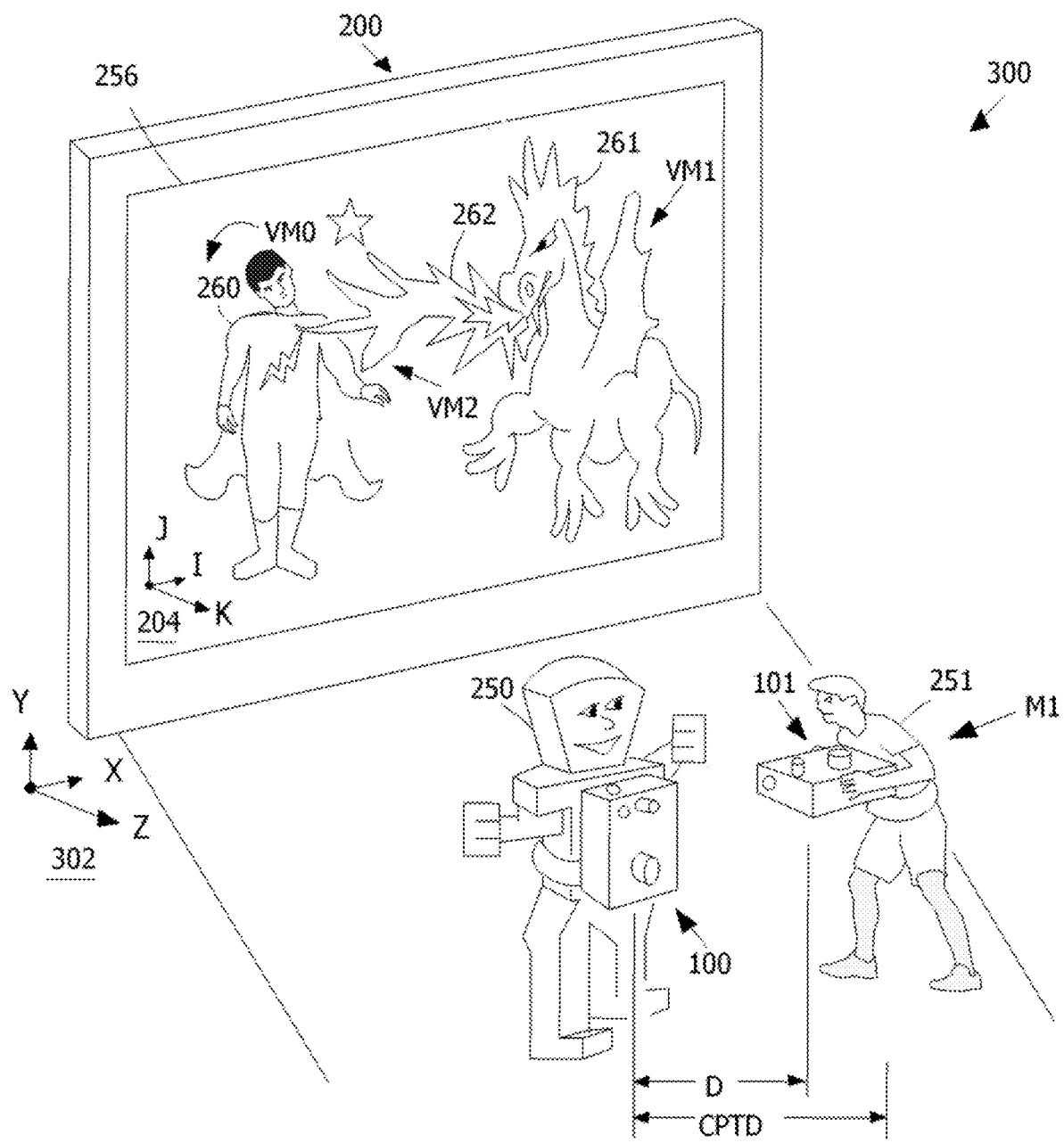
FIG. 20 is a perspective view for the play system of FIG. 1, which shows a close proximity of a first controller device, and first arbitrary physical object, with a second controller device.
Figure 21A:
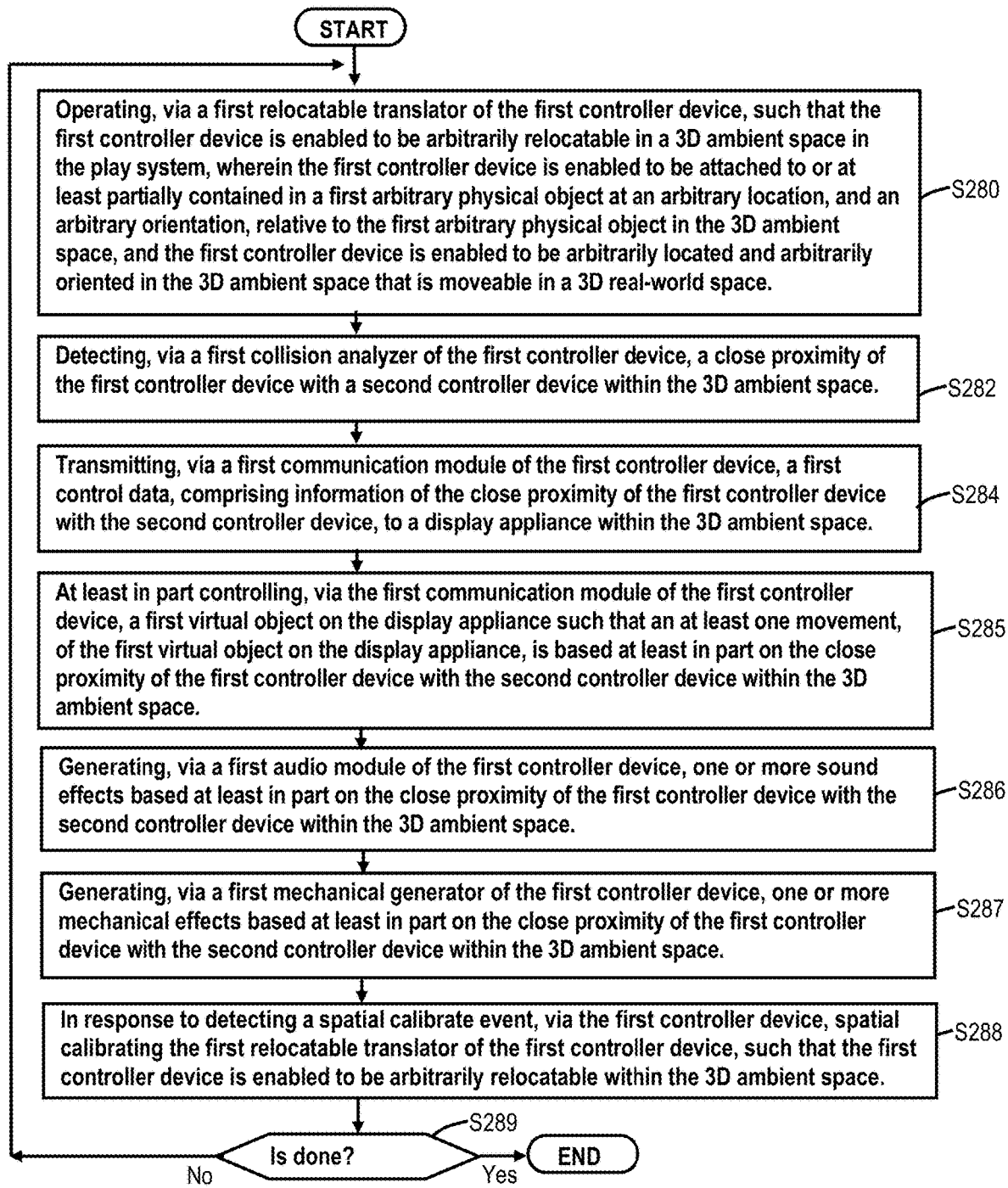
FIG. 21A is a flowchart for the play system of FIG. 1, of a method for a controller device, which enables detecting a close proximity of a first controller device, and first arbitrary physical object, with a second controller device.

Method for Controller Device to Detect Close Proximity of Two Controller Devices Turning now to FIG. 21A while referencing FIGS. 20, 1, and 3, there shown is a flowchart of an exemplary embodiment of a computer-implemented method for a first controller device that detects a close proximity with a second controller device in the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of a first controller device 103 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 101, including one or more control units 110 and a first memory 120, wherein the one or more control units 110 execute computer instructions performing first operations in a play system 300:

In some embodiments, beginning with step S280, operating, via a first relocatable translator 134 of the first controller device 101, such that the first controller device 101 is enabled to be arbitrarily relocatable in a 3D ambient space 302 of the play system 300, wherein the first controller device 101 is enabled to be attached to or at least partially contained in a first arbitrary physical object 251 at an arbitrary location, and an arbitrary orientation, relative to the first arbitrary physical object 251 in the 3D ambient space 302, and the first controller device 101 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S282, detecting, via a first collision analyzer 138 of the first controller device 101, a close proximity of the first controller device 101 with a second controller device 100 within 3D ambient space 302. For example, in various embodiments, the first controller device 101 and the second controller device 100 are in close proximity may be based at least in part on a spatial distance D, between the first and second controller devices 101 and 100 in 3D ambient space 302, is less than or equal to a close proximity threshold distance CPTD, although alternative operations for detecting close proximity may be considered as well. For general information about "close proximity," the reader may refer to the collision analyzer 238 (in FIG. 5) and elsewhere in this disclosure.

In some embodiments, in step S284, transmitting, via a first communication module 118 of the first controller device 101, a first control data, comprising information of the close proximity of the first controller device 101 with the second controller device 100, to a display appliance 200 within the 3D ambient space 302.

In some embodiments, in step S285, at least in part controlling, via the first communication module 118 of the first controller device 101, a first virtual object 261 (e.g., dragon) on the display appliance 200 such that an at least one movement VM1 (e.g., dragon opening mouth and creating fire), of the first virtual object 261 on the display appliance 200, is based at least in part on the close proximity of the first controller device 101 with the second controller device 100 within the 3D ambient space 302. In some alternative embodiments, the first controller device 101 may be at least in part controlling the first virtual object 261 (e.g., dragon) on the display appliance 200 such that an at least one movement VM1 (e.g., dragon moves left), of the first virtual object 261 on the display appliance 200, causes the first virtual object 261 to move closer to a second virtual object 260 on the display appliance 200 in 3D virtual space 204.

In some embodiments, in step S286, generating, via a first audio module 112 of the first controller device 100, one or more sound effects based at least in part on the close proximity of the first controller device 101 with the second controller device 100 within the 3D ambient space 302. In various embodiments, the current step may be optional and not required.

In some embodiments, in step S287, generating, via a first mechanical generator 114 of the first controller device 100, one or more mechanical effects based at least in part on the close proximity of the first controller device 101 with the second controller device 100 within the 3D ambient space 302. In various embodiments, the current step may be optional and not required.

In some embodiments, in step S288, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips this step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial calibrate in Real-time." In some alternate embodiments, the current step may not be required in the method.

Finally, in some embodiments, in step S289, in response to determining, via the first controller device 101, that the method is not done, the method goes back to step S280. Otherwise the method is done, so the method ends. In the current embodiment, determining if the method is done may be based at least in part on a substantially periodic time interval or a detected periodic state, wherein the method may be continuously executed (looping from step S289 and back to step S280) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S289 and back to step S280) in a substantially aperiodic or on a needed basis. In other embodiments, the current step may not be required, or implemented elsewhere.

Figure 21B:
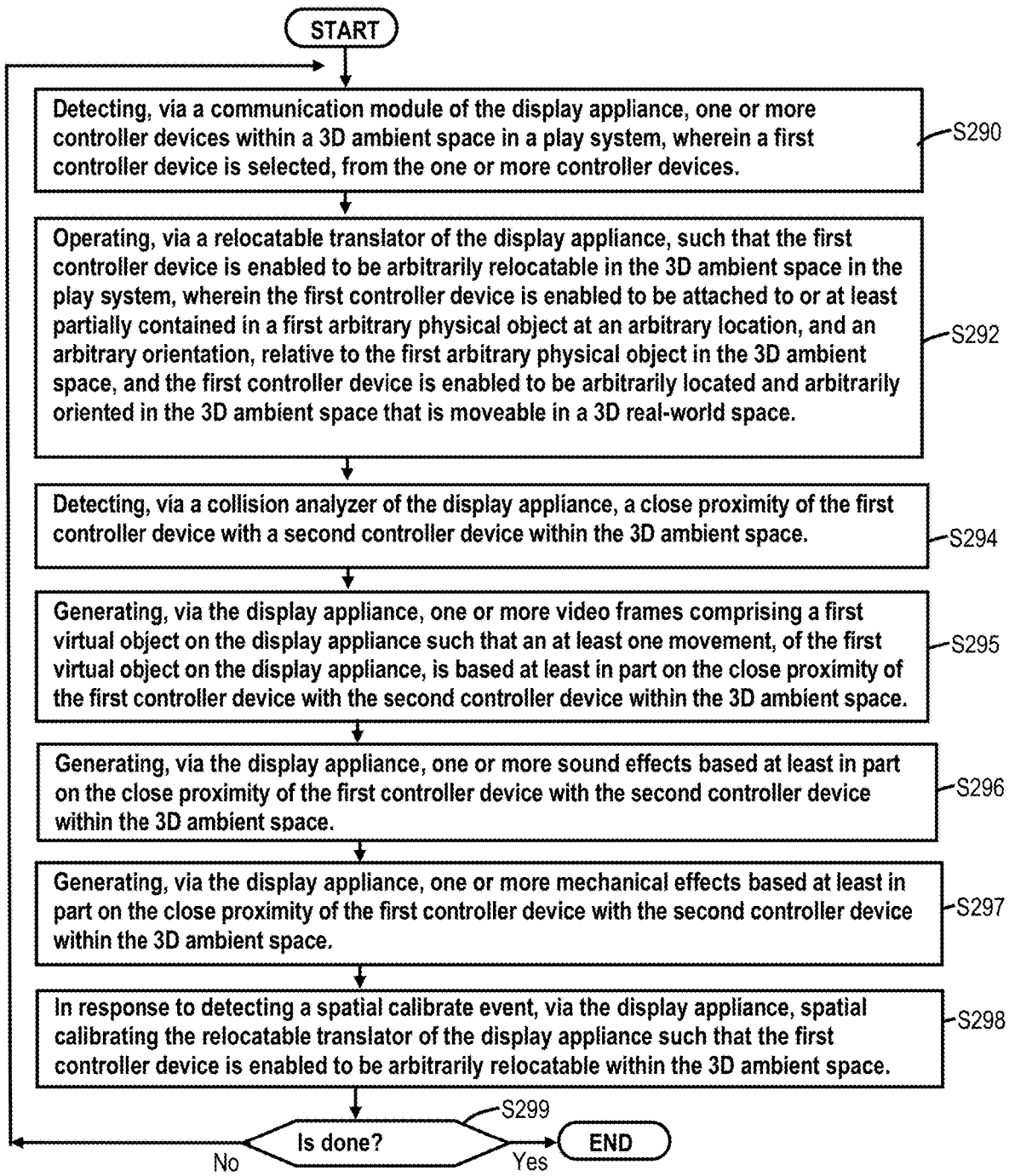
FIG. 21B is a flowchart for the play system of FIG. 1, of a method for a display appliance, which enables detecting a close proximity of a first controller device, and first arbitrary physical object, with a second controller device.

Method for Display Appliance to Detect Close Proximity of Two Controller Devices Turning now to FIG. 21B while referencing FIGS. 20, 1, and 5, there shown is a flowchart of an exemplary embodiment of a computer-implemented method for a display appliance detecting one or more close proximities of two or more controller devices in a play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S290, detecting one or more controller devices, via a communication module 218 of the display appliance 200, wherein a first controller device 101 is selected, from the one or more controller devices within a 3D ambient space 302. In the current embodiment, the first controller device 101 may be iteratively and sequentially selected, from the one or more controller devices detected in the play system 300, whenever the current step is executed. In alternate embodiments, the first controller device 101 may be arbitrarily selected from the one or more controller devices, detected in the play system 300, although other approaches may be considered as well.

In some embodiments, in step S292, operating, via a relocatable translator 234 of the display appliance 200, such that the first controller device 101 is enabled to be arbitrarily relocatable in the 3D ambient space 302 of the play system 300, wherein the first controller device 101 is enabled to be attached to or at least partially contained in a first arbitrary physical object 251 at an arbitrary location, and an arbitrary orientation, relative to the first arbitrary physical object 251 in the 3D ambient space 302, and the first controller device 101 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S294, detecting, via a collision analyzer 238 of the display appliance 200, a close proximity of the first controller device 101 with a second controller device 100 within 3D ambient space 302. For example, in various embodiments, the first controller device 101 and the second controller device 100 are in close proximity may be based at least in part on a spatial distance D, between the first and second controller devices 101 and 100 in 3D ambient space 302, is less than or equal to a close proximity threshold distance CPTD, although alternative operations for detecting close proximity may be considered as well. For general information about "close proximity," the reader may refer to the collision analyzer 238 (in FIG. 5) and elsewhere in this disclosure.

In some embodiments, in step S295, generating, via the display appliance 200, one or more video frames comprising a first virtual object 261 such that an at least one movement VM1, of the first virtual object 261 on the display appliance 200, is based at least in part on the close proximity of the first controller device 101 with the second controller device 100 within 3D ambient space 302. In some alternative embodiments, the first controller device 101 may be at least in part controlling the first virtual object 261 (e.g., dragon) on the display appliance 200 such that an at least one movement VM1 (e.g., dragon moves left), of the first virtual object 261 on the display appliance 200, causes the first virtual object 261 to move closer to a second virtual object 260 on the display appliance 200 in 3D virtual space 204.

In some embodiments, in step S296, generating, via the display appliance 200, one or more sound effects based at least in part on the close proximity of the first controller device 101 with the second controller device 100 within 3D ambient space 302. In various embodiments, the current step may be optional and not required.

In some embodiments, in step S297, generating, via the display appliance 200, one or more mechanical effects based at least in part on the close proximity of the first controller device 101 with the second controller device 100 within 3D ambient space 302. In various embodiments, the current step may be optional and not required.

In some embodiments, in step S298, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial calibrate in Real-time." In some alternate embodiments, the current step may not be required in the method.

Finally, in some embodiments, in step S299, in response to determining, via the display appliance 200, that the method is not done, the method goes back to step S290. Otherwise the method is done, so the method ends. In the current embodiment, determining if the method is done may be based at least in part on a substantially periodic time interval or a detected periodic state, wherein the method may be continuously executed (looping from step S299 back to step S290) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S299 back to step S290) in a substantially aperiodic or on a needed basis. In other embodiments, the current step may not be required, or implemented elsewhere.

Figure 18B:
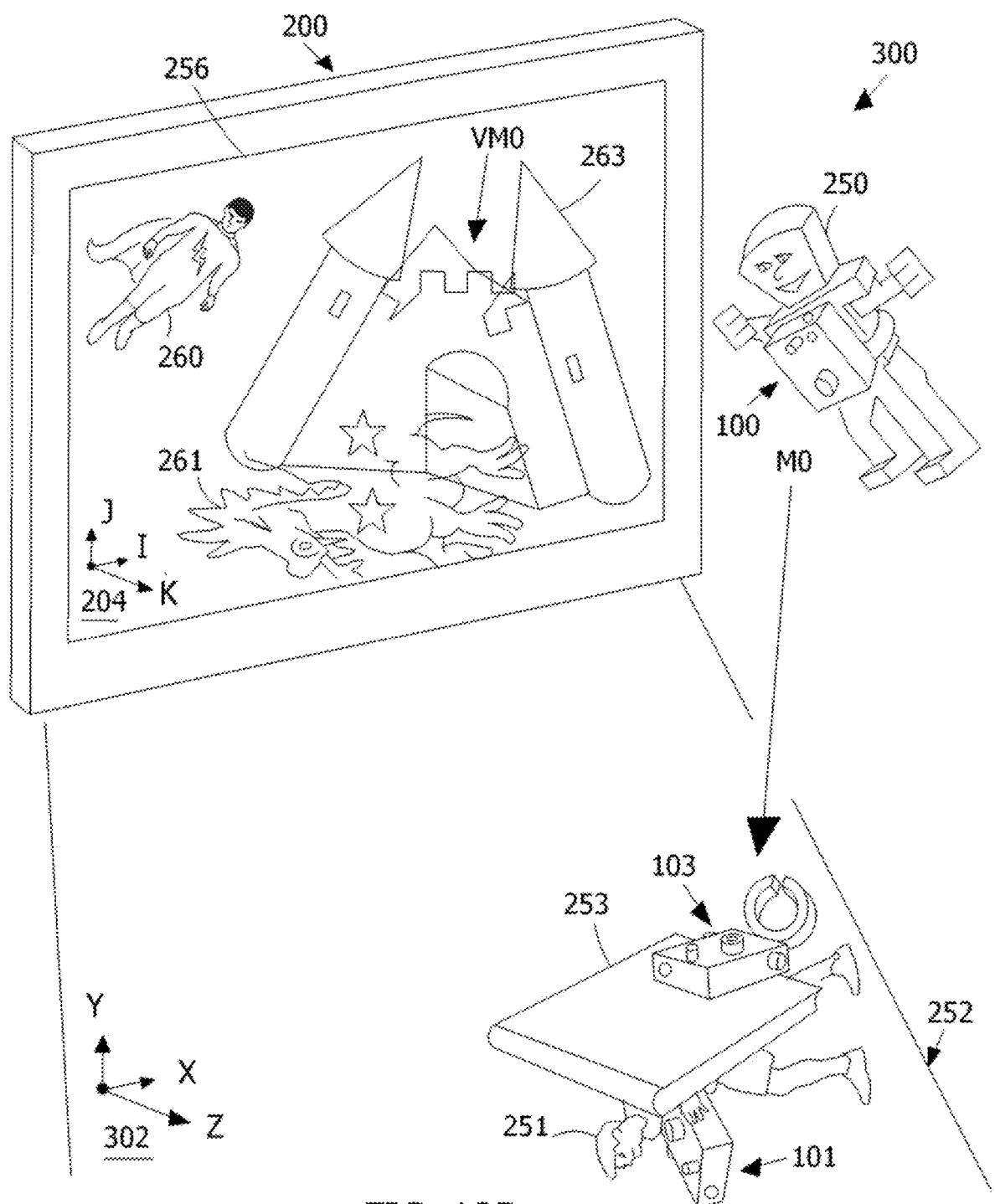
FIG. 18B is a perspective view for the play system of FIG. 1, which shows three controller devices, connected to three arbitrary physical objects, wherein there a first controller device has an at least indirect collision with a second controller device.
Figure 22:
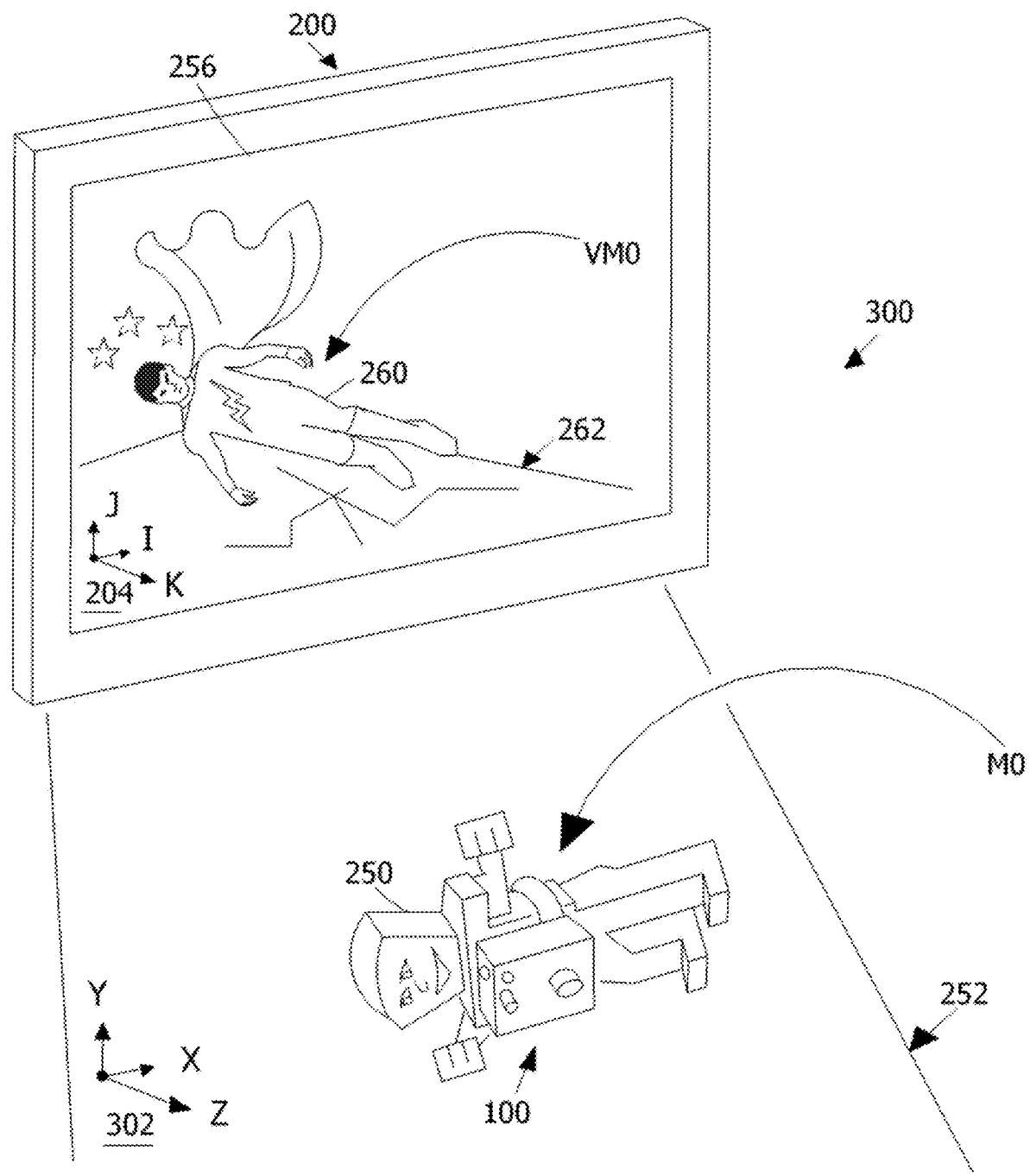
FIG. 22 is a perspective view for the play system of FIG. 1, which shows an at least indirect collision of a first controller device, and first arbitrary physical object, with a second arbitrary physical object.

Collisions of Controller Devices, Arbitrary Physical Objects, and Virtual Objects Now turning to FIGS. 22 and 18B, there presented are exemplary embodiments of play activity operations of the play system 300, which detect and respond to collisions of one or more controller devices and arbitrary physical objects in 3D ambient space. The play system 300 may implement a 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256. In many embodiments of a play system, collisions of arbitrary physical objects may be used to simulate, but not limited to, physical crashes, bumps, smack downs, kicks, and punches of arbitrary physical objects, such as, for example, toy action figures and toy vehicles.

Collision of a Controller Device with a Second Arbitrary Physical Object

So turning first to FIG. 22, there shown are embodiments of play activity operations that result in a collision of arbitrary physical objects. As depicted, there is a first controller device 100 and a first arbitrary physical object 250. Wherein the first controller device 100 may be configured with similar apparatus and functionality, as described earlier in FIGS. 2 and 3. And the first controller device 100 has already been arbitrarily located and connected, associated, and spatial calibrated with the first arbitrary physical object 250, as described in FIGS. 6A-6D.

So to begin, in various embodiments of play activity operations, a player/user (not shown) may grip the first arbitrary physical object 250 and controller device 100, and throw, move, or release into the air within the 3D ambient space. Whereby, the first controller device 100 and the first arbitrary physical object 250 may make a first movement M0 within 3D ambient space 302. As shown, the first movement M0 may comprise, but not limited to, a freefall movement, or forced movement resulting in an at least indirection collision of the controller device 100 and arbitrary physical object 250 with a second arbitrary physical object 252 in 3D ambient space 302. Wherein, the second arbitrary physical object 252 may be, but not limited to, a floor, tabletop, or outdoor lawn in the 3D ambient space 302. In the current embodiment, the second arbitrary physical object 252 is not connected or associated with any controller device.

Yet in various embodiments of play activity operations, the first controller device 100 may detect an at least indirect collision of the first controller device 100 (and the first arbitrary physical object 250) with the second arbitrary physical object 252 in 3D ambient space 302. Thereby the first controller device 100 may transmit a first control data, comprising information of the at least indirect collision of the first controller device 100 with the second arbitrary physical object 252, to the display appliance 200. And accordingly, the first controller device 100 may be at least in part controlling a first virtual object 260 on the display appliance 200 such that an at least one movement, of the first virtual object 260 on the display appliance 200, is based at least in part on the at least indirect collision of the first controller device 100 (and the first arbitrary physical object 250) with the second arbitrary physical object 252 within 3D ambient space 302 of the play system 300. For a description of "at least indirect collision," the reader may refer to definitions in the section "Detailed Description" and elsewhere in this disclosure.

Also shown, in some embodiments of play activity operations, the first movement M0 may be identified, via the play system 300, as a crash movement. The crash movement is a movement of an arbitrary physical object to simulate a bump or crash of, for example, a toy character, toy action figure, toy vehicle, toy flying vehicle, toy airplane, or toy spaceship-typically made by a child or adult during play. Wherein, a player (not shown) may grip the arbitrary physical object 250 and simulate a toy or object bumping or crashing on a surface by the crash movement. As shown, the first movement M0 may comprise, but not limited to, a freefall movement, or forced movement resulting in an at least indirection collision of the controller device 100 and arbitrary physical object 250 with a second arbitrary physical object 252, such as a table top or floor, in 3D ambient space 302.

Further shown, in some embodiments of play activity operations, the play system 300 may enable the controller device 100 to be at least in part controlling the at least one movement VM0 of the first virtual object 260 on the display appliance 200. Wherein, the at least one movement VM0 may be a virtual crash movement: wherein the first virtual object 260 appears to move and crash against or bump the second virtual object 262, on the display appliance 200, in 3D virtual space 204.

Collision of a Controller Device with a Second Controller Device

Now turning briefly back to FIG. 18B, there shown is are embodiments of play activity operations that enable the play system 300 to detect and respond to collisions of two controller devices with connected arbitrary physical objects in 3D ambient space. Moreover, the play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256.

A first controller device 103 is shown connected to a first arbitrary physical object 253 (e.g., a paperback book). A second controller device 101 is shown connected to a second arbitrary physical object 251 (e.g., a toy action figure). And a third controller device 100 is shown connected to a third arbitrary physical object 250 (e.g., a toy robot). Wherein controller devices 100, 101, and 103 may be configured with similar apparatus and functionality, as described earlier in FIGS. 2 and 3. Moreover, all controller devices 100, 101, and 103 have already been arbitrarily located and connected, associated, and spatial calibrated with their respective arbitrary physical objects 250, 251, and 253, as described in FIGS. 6A-6D. Finally, presented is a fourth arbitrary physical object 252 that may be, for example, a table top or floor-having no connected and associated controller device.

So to begin, some embodiments of play activity operations, wherein a player/user (not shown) may grip the first arbitrary physical object 253 and throw or release into the air, or move the first controller device 103 (connected to the first arbitrary physical object 253) in a first movement M0 within 3D ambient space 302. As shown, the first movement M0 may comprise, but not limited to, a freefall movement, or forced movement resulting in an at least indirection collision of the first controller device 103 (and first arbitrary physical object 253) with the second controller device 101 (and second arbitrary physical object 251) in 3D ambient space 302.

In some embodiments of play activity operations, the first controller device 103 may detect an at least indirect collision of the first controller device 103 (and the first arbitrary physical object 253) with the second controller device 101 (and the second arbitrary physical object 251) in 3D ambient space 302. Thereby the first controller device 103 may transmit a first control data, comprising information of the at least indirect collision of the first controller device 103 with the second controller device 101, to the display appliance 200. And accordingly, the first controller device 103 may be at least in part controlling a first virtual object 263 on the display appliance 200 such that an at least one movement, of the first virtual object 263 on the display appliance 200, is based at least in part on the at least indirect collision of the first controller device 103 (and the first arbitrary physical object 253) with the second controller device 101 (and the second arbitrary physical object 251) within 3D ambient space 302 of the play system 300. For a description of "at least indirect collision," the reader may refer to definitions in the section "Detailed Description" and elsewhere in this disclosure.

Also shown, in some embodiments of play activity operations, the first movement M0 may be identified, via the play system 300, as a crash movement. The crash movement is a movement of an arbitrary physical object to simulate a bump or crash of, for example, a toy character, toy action figure, toy vehicle, toy flying vehicle, toy airplane, or toy spaceship-typically made by a child or adult during play. Wherein, a player (not shown) may grip, throw, release, or move the arbitrary physical object 251 to simulate a toy or object bumping or crashing on a surface by the crash movement. As shown, the first collision movement M0 may comprise, but not limited to, a freefall movement, or forced movement resulting in an at least indirection collision of the first controller device 103 (and first arbitrary physical object 253) with the second controller device 251 (and the second arbitrary physical object 251) within 3D ambient space 302.

Further shown, in some embodiments of play activity operations, the play system 300 may enable the first controller device 103 to be at least in part controlling the at least one movement VM0 of the first virtual object 263 on the display appliance 200. Wherein, the at least one movement VM0 may be a virtual crash movement: wherein the first virtual object 263 appears to move and crash against or bump the second virtual object 261, on the display appliance 200, in 3D virtual space 204.

Method for Controller Device to Detect Collision of Arbitrary Physical Object

Figure 23A:
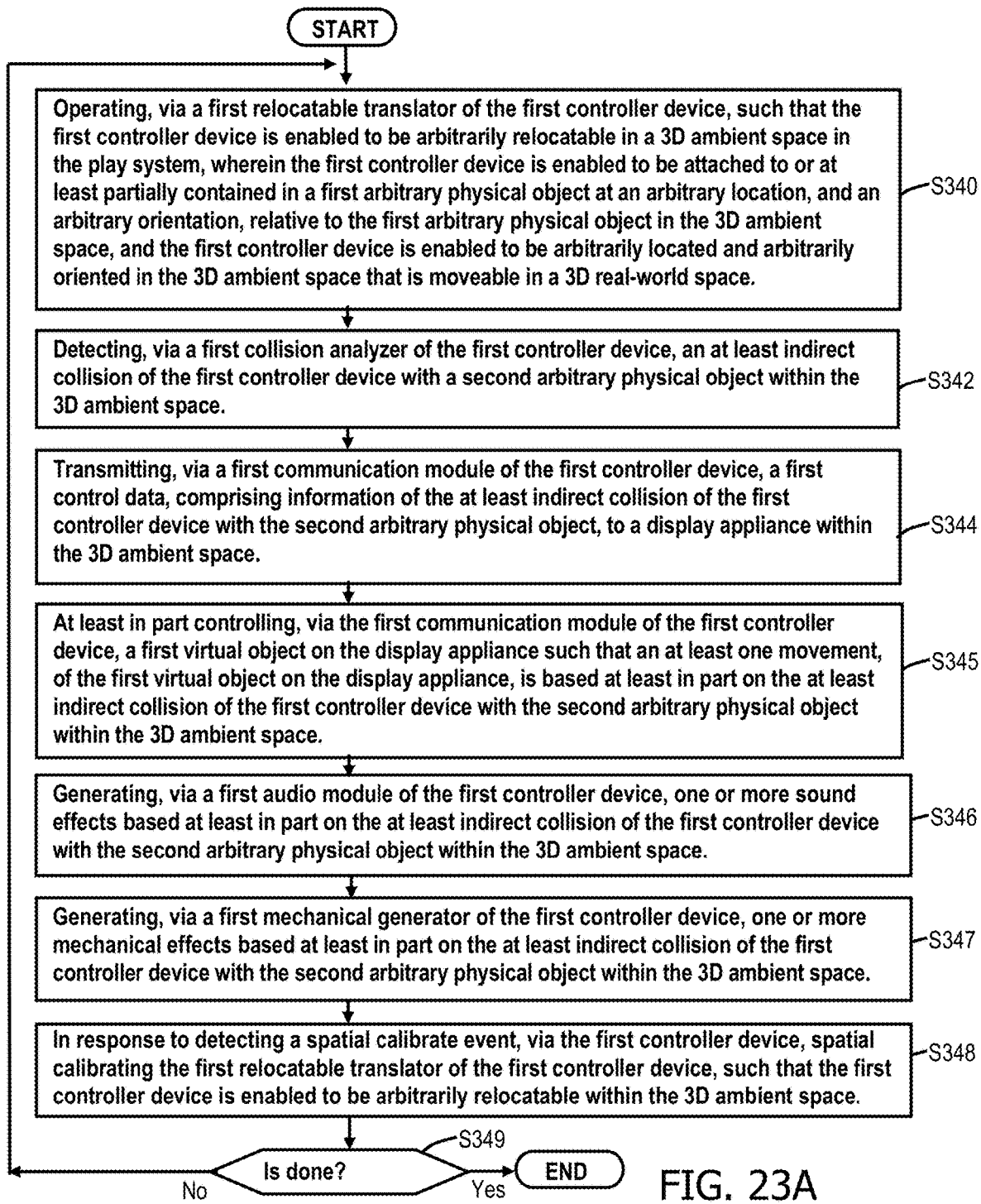
FIG. 23A is a flowchart for the play system of FIG. 1, of a method for a controller device, which enables detecting at least indirect collision of a first controller device, and first arbitrary physical object, with a second arbitrary physical object.

Turning now to FIG. 23A while referencing FIGS. 22, 1, and 3, there shown is a flowchart of an exemplary embodiment of a computer-implemented method for a controller device detecting a collision with an arbitrary physical object in the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some embodiments, beginning with step S340, operating, via a first relocatable translator 134 of the first controller device 100, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S342, detecting, via a first collision analyzer 138 of the first controller device 100, an at least indirect collision of the first controller device 100 with a second arbitrary physical object 252 within 3D ambient space 302.

In some embodiments, in step S344, transmitting, via a first communication module 118 of the first controller device 100, a first control data, comprising information of the at least indirect collision of the first controller device 100 with the second arbitrary physical object 252, to a display appliance 200 within the 3D ambient space 302.

In some embodiments, in step S345, at least in part controlling, via the first communication module 118 of the first controller device 100, a first virtual object 260 on the display appliance 200 such that an at least one movement, of the first virtual object 260 on the display appliance 200, is based at least in part on the at least indirection collision of the first controller device 100 with the second arbitrary physical object 252 within the 3D ambient space 302.

In some embodiments, in step S346, generating, via a first audio module 112 of the first controller device 100, one or more sound effects based at least in part on the at least indirection collision of the first controller device 100 with the second arbitrary physical object 252 within the 3D ambient space 302. In various embodiments, the current step may be optional and not required.

In some embodiments, in step S347, generating, via a first mechanical generator 114 of the first controller device 100, one or more mechanical effects based at least in part on the at least indirection collision of the first controller device 100 with the second arbitrary physical object 252 within the 3D ambient space 302. In various embodiments, the current step may be optional and not required.

In some embodiments, in step S348, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial calibrate in Real-time." In some alternate embodiments, the current step may not be required in the method.

Finally, in some embodiments, in step S349, in response to determining, via the first controller device, that the method is not done, the method goes back to step S340. Otherwise the method is done, so the method ends. In the current embodiment, determining if the method is done may be based at least in part on a substantially periodic time interval or a detected periodic state, wherein the method may be continuously executed (looping from step S349 and back to step S340) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S349 and back to step S340) in a substantially aperiodic or on a needed basis. In other embodiments, the current step may not be required, or implemented elsewhere.

Method for Display Appliance to Detect Collision of Arbitrary Physical Object

Figure 23B:
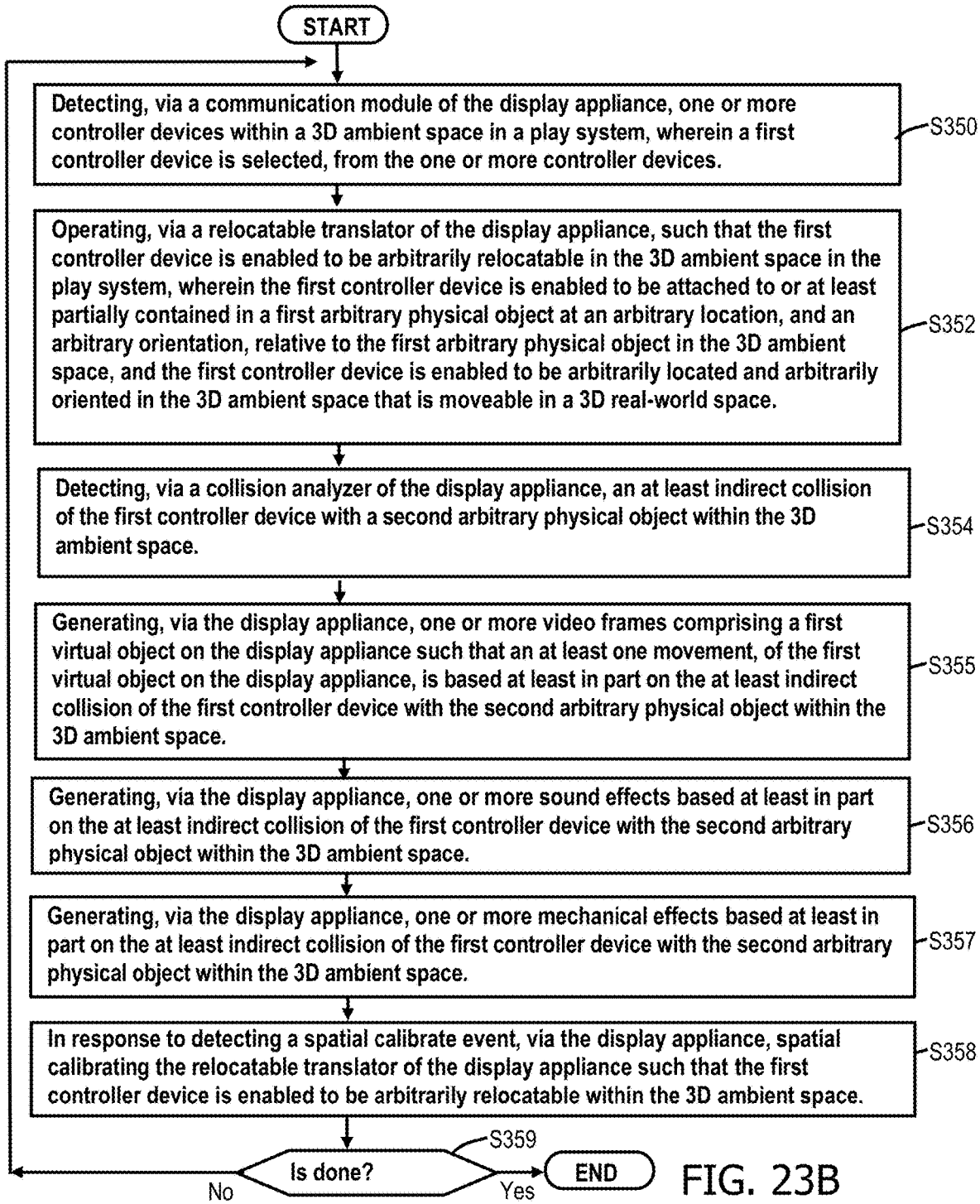
FIG. 23B is a flowchart for the play system of FIG. 1, of a method for a display appliance, which enables detecting an at least indirect collision of a first controller device, and first arbitrary physical object, with a second arbitrary physical object.

Turning now to FIG. 23B while referencing FIGS. 22, 1, and 5, there shown is a flowchart of an exemplary embodiment of a computer-implemented method for a display appliance detecting one or more gesture movements of one or more controller devices in a play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S350, detecting, via a communication module 218 of the display appliance 200, one or more controller devices within a 3D ambient space 302 in the play system 300, wherein a first controller device 100 is selected, from the one or more controller devices. In the current embodiment, the first controller device 100 may be iteratively and sequentially selected, from the one or more controller devices detected in the play system 300, whenever the current step is executed. In alternate embodiments, the first controller device 100 may be arbitrarily selected from the one or more controller devices, detected in the play system 300, although other approaches may be considered as well.

In some embodiments, in step S352, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S354, detecting, via a collision analyzer 238 of the display appliance 200, an at least an at least indirect collision of the first controller device 100 with a second arbitrary physical object 252 within 3D ambient space 302.

In some embodiments, in step S355, generating, via the display appliance 200, one or more video frames comprising a first virtual object 260 such that an at least one movement, of the first virtual object 260 on the display appliance 200, is based at least in part on the at least indirect collision of the first controller device 100 with the second arbitrary physical object 252 within 3D ambient space 302.

In some embodiments, in step S356, generating, via the display appliance 200, one or more sound effects based at least in part on the at least indirect collision of the first controller device 100 with the second arbitrary physical object 252 within 3D ambient space 302. In various embodiments, the current step may be optional and not required.

In some embodiments, in step S357, generating, via the display appliance 200, one or more mechanical effects based at least in part on the at least indirect collision of the first controller device 100 with the second arbitrary physical object 252 within 3D ambient space 302. In various embodiments, the current step may be optional and not required.

In some embodiments, in step S358, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial calibrate in Real-time." In some alternate embodiments, the current step may not be required in the method.

Finally, in some embodiments, in step S359, in response to determining, via the display appliance 200, that the method is not done, the method goes back to step S350. Otherwise the method is done, so the method ends. In the current embodiment, determining if the method is done may be based at least in part on a substantially periodic time interval or a detected periodic state, wherein the method may be continuously executed (looping from step S359 back to step S350) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S359 back to step S350) in a substantially aperiodic or on a needed basis. In other embodiments, the current step may not be required, or implemented elsewhere.

Method for Controller Device to Detect Collision of Two Controller Devices

Turning now to FIG. 24A while referencing FIGS. 18B, 1, and 3, there shown is a flowchart of an exemplary embodiment of a computer-implemented method for a first controller device that detects a collision with a second controller device in the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of a first controller device 103 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 103, including one or more control units 110 and a first memory 120, wherein the one or more control units 110 execute computer instructions performing first operations in a play system 300:

In some embodiments, beginning with step S360, operating, via a first relocatable translator 134 of the first controller device 103, such that the first controller device 103 is enabled to be arbitrarily relocatable in a 3D ambient space 302 of the play system 300, wherein the first controller device 103 is enabled to be attached to or at least partially contained in a first arbitrary physical object 253 at an arbitrary location, and an arbitrary orientation, relative to the first arbitrary physical object 253 in the 3D ambient space 302, and the first controller device 103 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S362, detecting, via a first collision analyzer 138 of the first controller device 103, an at least indirect collision of the first controller device 103 with a second controller device 101 within 3D ambient space 302.

In some embodiments, in step S364, transmitting, via a first communication module 118 of the first controller device 103, a first control data, comprising information of the at least indirect collision of the first controller device 103 with the second controller device 101, to a display appliance 200 within the 3D ambient space 302.

In some embodiments, in step S365, at least in part controlling, via the first communication module 118 of the first controller device 103, a first virtual object 263 on the display appliance 200 such that an at least one movement, of the first virtual object 263 on the display appliance 200, is based at least in part on the at least indirection collision of the first controller device 103 with the second controller device 101 within the 3D ambient space 302.

In some embodiments, in step S366, generating, via a first audio module 112 of the first controller device 103, one or more sound effects based at least in part on the at least indirection collision of the first controller device 103 with the second controller device 101 within the 3D ambient space 302. In various embodiments, the current step may be optional and not required.

In some embodiments, in step S367, generating, via a first mechanical generator 114 of the first controller device 103, one or more mechanical effects based at least in part on the at least indirection collision of the first controller device 103 with the second controller device 101 within the 3D ambient space 302. In various embodiments, the current step may be optional and not required.

In some embodiments, in step S368, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial calibrate in Real-time." In some alternate embodiments, the current step may not be required in the method.

Finally, in some embodiments, in step S369, in response to determining, via the first controller device, that the method is not done, the method goes back to step S360. Otherwise the method is done, so the method ends. In the current embodiment, determining if the method is done may be based at least in part on a substantially periodic time interval or a detected periodic state, wherein the method may be continuously executed (looping from step S369 and back to step S360) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S369 and back to step S360) in a substantially aperiodic or on a needed basis. In other embodiments, the current step may not be required, or implemented elsewhere.

Method for Display Appliance to Detect Collision of Two Controller Devices

Figure 24B:
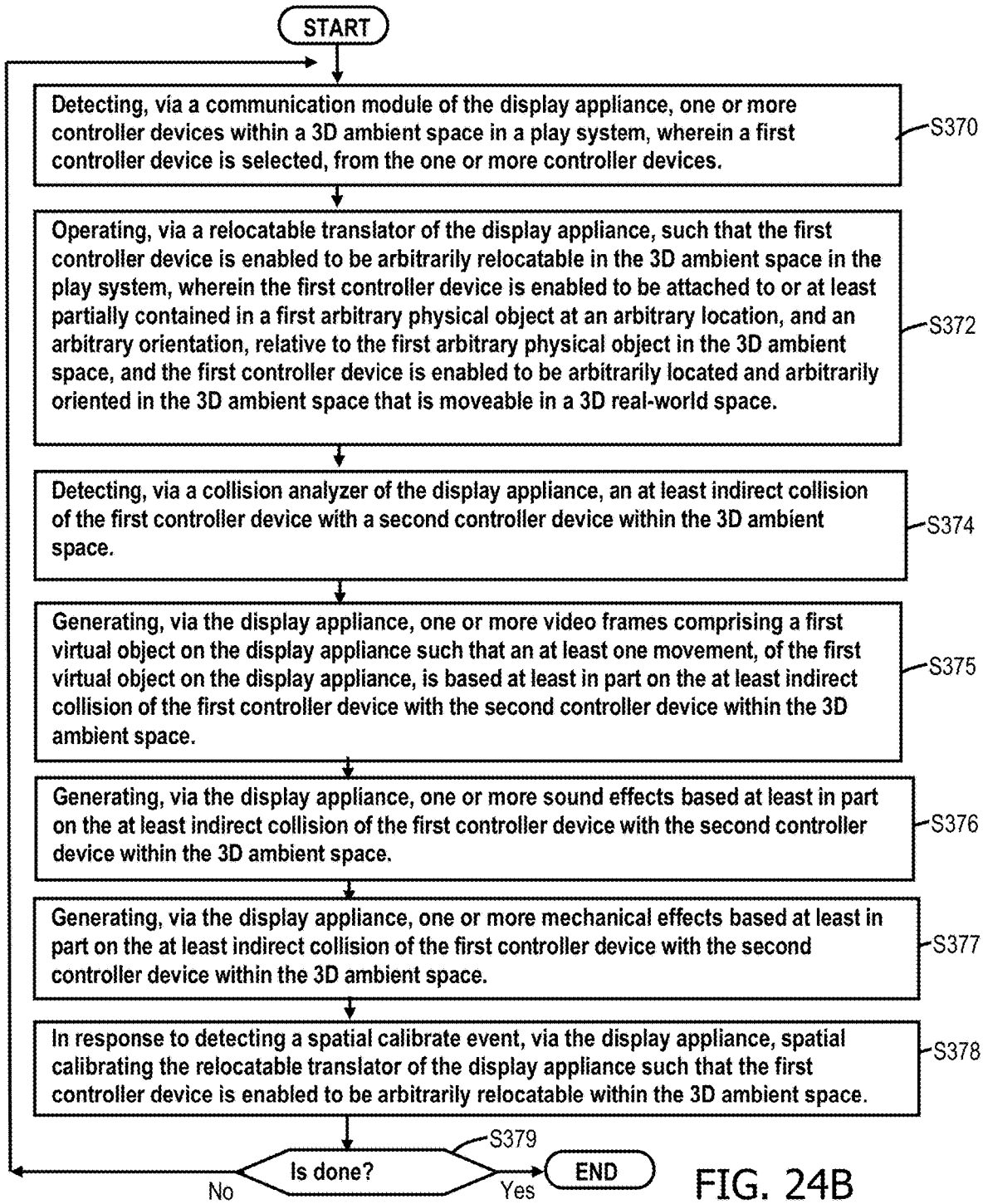
FIG. 24B is a flowchart for the play system of FIG. 1, of a method for a display appliance, which enables detecting an at least indirect collision of a first controller device, and first arbitrary physical object, with a second controller device.

Turning now to FIG. 24B while referencing FIGS. 18B, 1, and 5, there shown is a flowchart of an exemplary embodiment of a computer-implemented method for a display appliance detecting one or more gesture movements of one or more controller devices in a play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory

220, wherein the one or more control units 210 execute computer instructions performing first operations in a play system 300:

In some embodiments, beginning with step S370, detecting one or more controller devices, via a communication module 218 of the display appliance 200, wherein a first controller device 103 is selected, from the one or more controller devices within a 3D ambient space 302. In the current embodiment, the first controller device 103 may be iteratively and sequentially selected, from the one or more controller devices detected in the play system 300, whenever the current step is executed. In alternate embodiments, the first controller device 103 may be arbitrarily selected from the one or more controller devices, detected in the play system 300, although other approaches may be considered as well.

In some embodiments, in step S372, operating, via a relocatable translator 234 of the display appliance 200, such that the first controller device 103 is enabled to be arbitrarily relocatable in the 3D ambient space 302 of the play system 300, wherein the first controller device 103 is enabled to be attached to or at least partially contained in a first arbitrary physical object 253 at an arbitrary location, and an arbitrary orientation, relative to the first arbitrary physical object 253 in the 3D ambient space 302, and the first controller device 103 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S374, detecting, via a collision analyzer 238 of the display appliance 200, an at least an at least indirect collision of the first controller device 103 with a second controller device 101 within 3D ambient space 302.

In some embodiments, in step S375, generating, via the display appliance 200, one or more video frames comprising a first virtual object 263 such that an at least one movement, of the first virtual object 263 on the display appliance 200, is based at least in part on the at least indirect collision of the first controller device 103 with the second controller device 101 within 3D ambient space 302.

In some embodiments, in step S376, generating, via the display appliance 200, one or more sound effects based at least in part on the at least indirect collision of the first controller device 103 with the second controller device 101 within 3D ambient space 302. In various embodiments, the current step may be optional and not required.

In some embodiments, in step S377, generating, via the display appliance 200, one or more mechanical effects based at least in part on the at least indirect collision of the first controller device 103 with the second controller device 101 within 3D ambient space 302. In various embodiments, the current step may be optional and not required.

In some embodiments, in step S378, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial calibrate in Real-time." In some alternate embodiments, the current step may not be required in the method.

Finally, in some embodiments, in step S379, in response to determining, via the display appliance 200, that the method is not done, the method goes back to step S370. Otherwise the method is done, so the method ends. In the current embodiment, determining if the method is done may be based at least in part on a substantially periodic time interval or a detected periodic state, wherein the method may be continuously executed (looping from step S379 back to step S370) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S379 back to step S370) in a substantially aperiodic or on a needed basis. In other embodiments, the current step may not be required, or implemented elsewhere.

Launching, Close Proximity, and Collisions of Imaginary Objects

Figure 27:
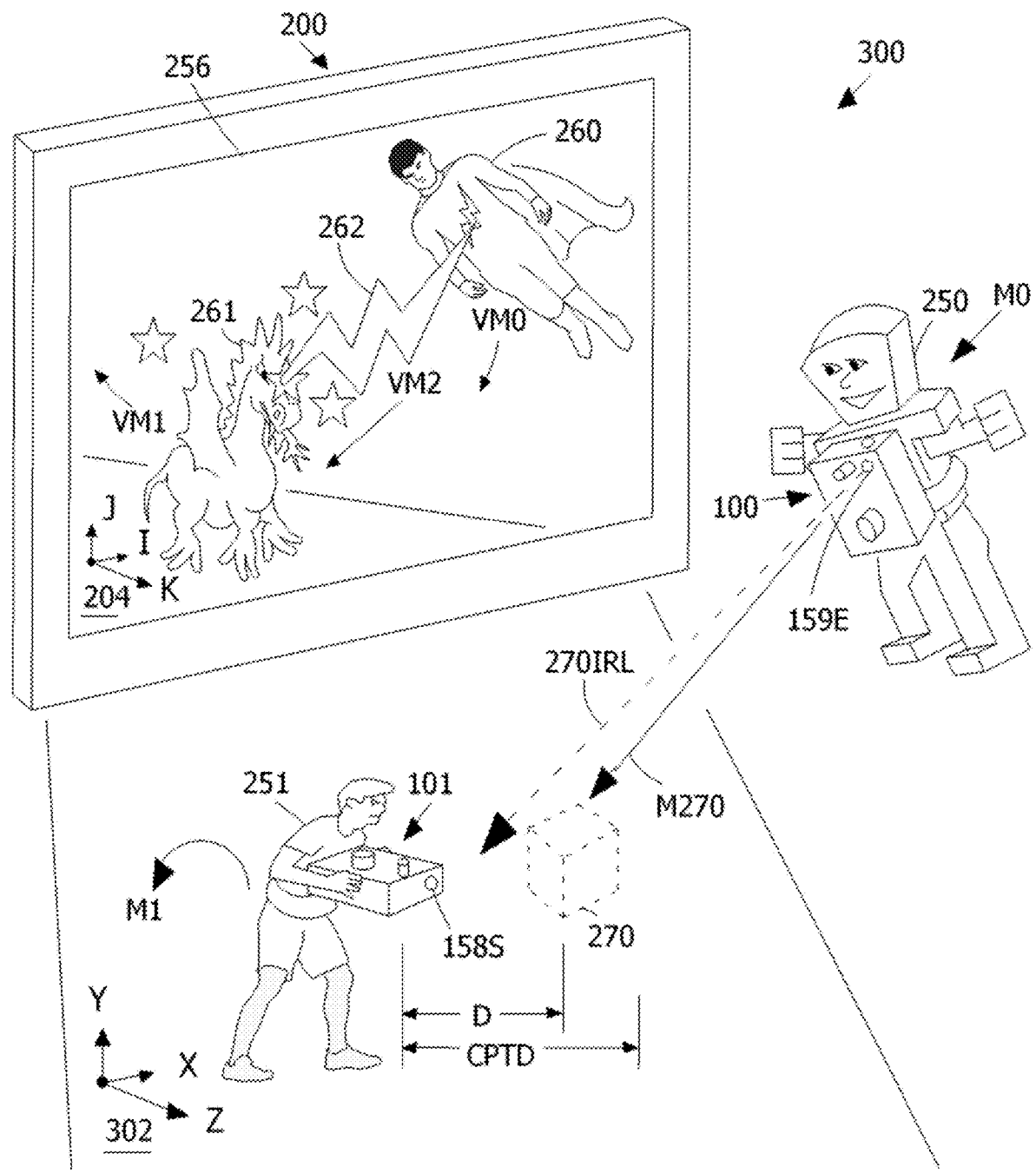
FIG. 27 is a perspective view for the play system of FIG. 1, which shows a first controller device, and a first arbitrary physical object, launching a first imaginary object that moves through 3D ambient space, and detecting an at least indirect collision of a second controller device, and second arbitrary physical object, with the first imaginary object.

Now turning to FIGS. 25 and 27, there presented are exemplary embodiments of play activity operations of the play system 300, which launch an imaginary object, detect close proximity, and/or detect collision of a controller device and arbitrary physical object with an imaginary object in 3D ambient space.

An imaginary object 270 (shown with a dashed outline in FIGS. 25A, 25B, and 27) may be hidden in the ambient space 302 by the play system 300. With remarkable fun and excitement, an "imaginary object" is an invisible and non-physical object (e.g., character, avatar, vehicle, path, etc.) that exists somewhere in a 3D ambient space of a play system. For example, the imaginary object 270 (e.g., representing a magical character, treasure chest, etc.) may be launched and remains at rest at a random location and orientation (as in FIGS. 25A and 25B) within 3D ambient space 302, such as hidden near a city park bench or a living room couch. Or the imaginary object 270 (e.g., representing a lightning bolt, rocket, etc.) may be launched like a projectile (as in FIG. 27), wherein the imaginary object 270 moves and lands somewhere in 3D ambient space 302. Yet a user with a controller device and arbitrary physical object, in the play system 300, may detect the presence of the imaginary object 270. Moreover, the play system 300 may present graphic effects (e.g., a virtual object of a magical character, or lightning bolt, etc.), sound effects (e.g., a twinkling sound), and mechanical effects, on the display appliance 200, based at least in part on the launching, collision, or detection of the imaginary object 270 within the 3D ambient space 302.

Close Proximity of Controller Device with "Hidden" Imaginary Object

In some embodiments of a play system, detecting close proximity of a controller device and arbitrary physical object with an imaginary object may be used to simulate search-and-find or search-and-rescue effects with non-visible, imaginary objects within 3D ambient space. Whereby, in some game application embodiments, a player/user may move arbitrary physical objects to search for one or more imaginary objects, which may have been previously hidden by another player, via user input to the play system, or may have been randomly hidden, via computer generation by the play system, somewhere within 3D ambient space. Wherein, an imaginary object may represent, but not limited to, a treasure chest to grow wealth, a magical character for extra powers, a first aid kit to reduce injury, an ammo supply to replenish weapons, a shield for protection, an enemy character, a remote character, or any other type of object may be considered to represent an imaginary object.

Figure 25A:
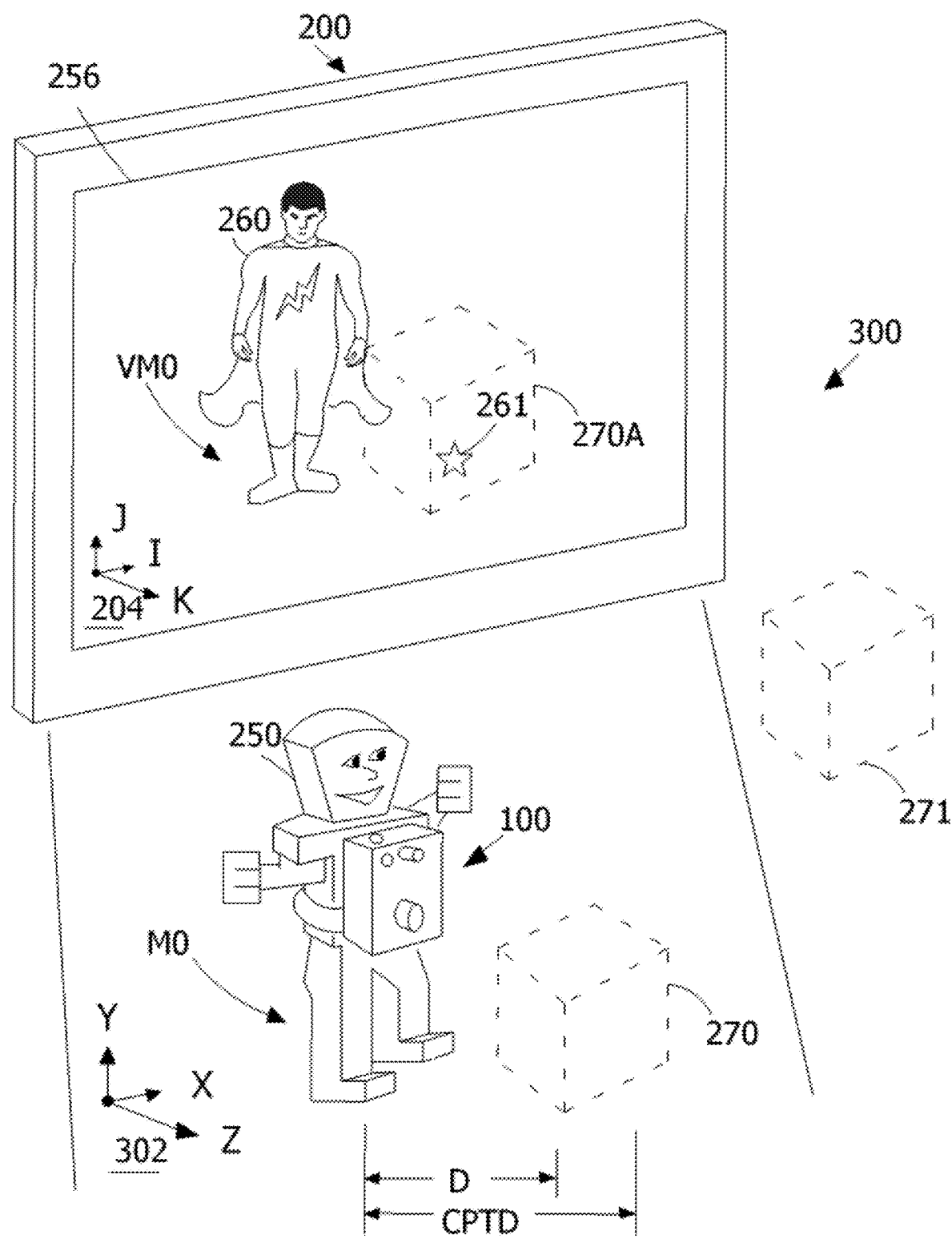
FIG. 25A is a perspective view for the play system of FIG. 1, which shows an at least indirect collision of a first controller device, and first arbitrary physical object, with a first imaginary object.
Figure 25B:
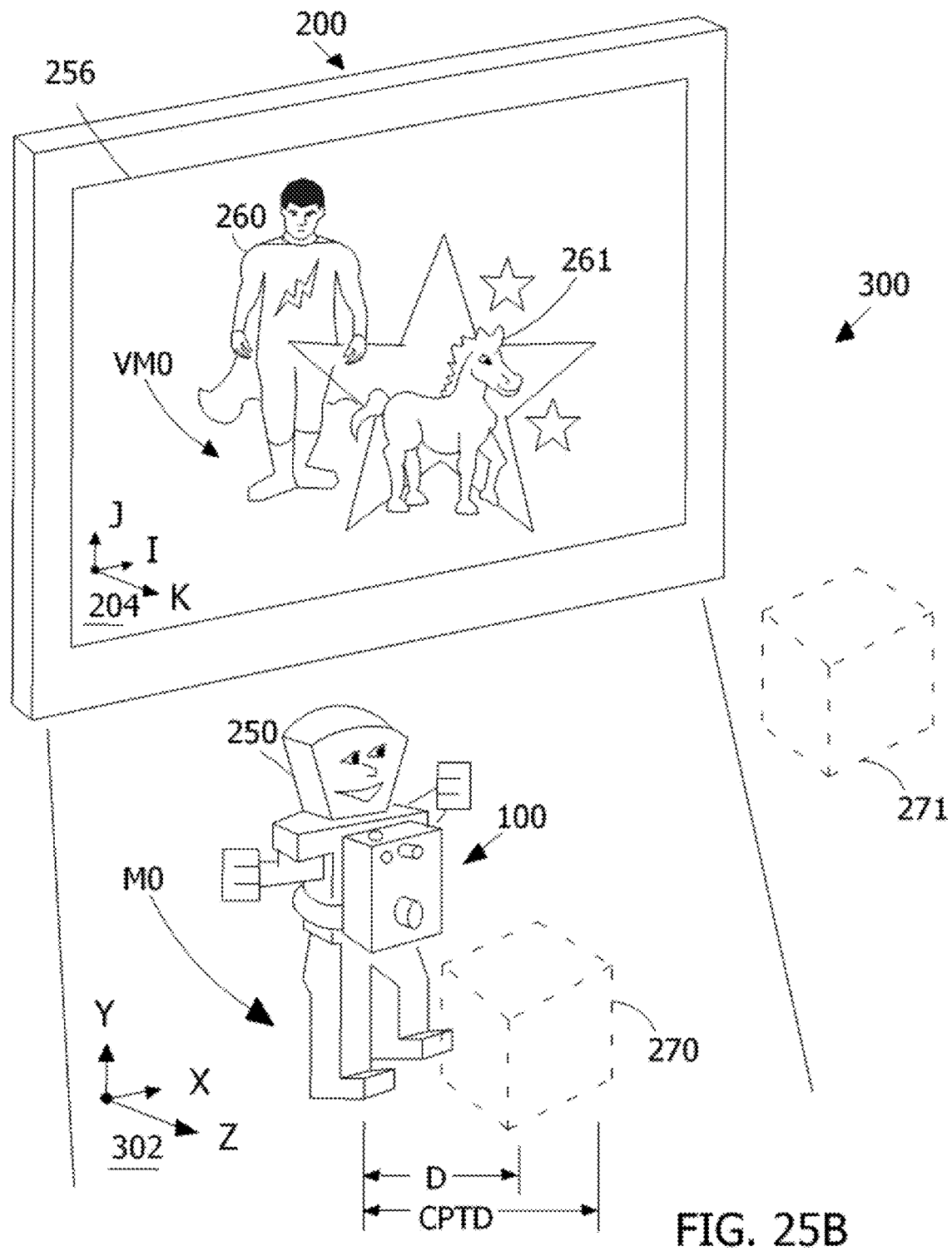
FIG. 25B is a flowchart for the play system of FIG. 1, of a method for a display appliance, which enables detecting an at least indirect collision of a first controller device, and first arbitrary physical object, with a first imaginary object.

So turning to FIG. 25A while referencing FIGS. 1, 3, and 5, there shown are various embodiments of play activity operations that result in detecting a close proximity of the controller device and arbitrary physical object with an imaginary object. The play system 300 may implement a 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256. Further shown are a first controller device 100 and a first arbitrary physical object 250 (e.g. a toy robot). Wherein, the first controller device 100 may be configured with similar apparatus and functionality, as described earlier in FIGS. 2 and 3. And the first controller device 100 may have been arbitrarily located and connected, associated, and spatial calibrated with the first arbitrary physical object 250, as described in FIGS. 6A-6D.

Also shown are a first imaginary object 270 (e.g., representing a magical character) and a second imaginary object 271 (e.g., representing a treasure chest) that that may be randomly located (e.g., via a control unit executing computer instructions) by the play system 300, display appliance 200, and game application 222 (in FIG. 5) within the 3D ambient space 302. For purposes of discussion, an exemplary third imaginary object 270A may be implemented in the 3D virtual space 204, which may alternatively be used for proximity detection, collision detection, and other similar operations as the imaginary object 270 implemented in the 3D ambient space 302.

So to begin, in various embodiments of play activity operations, a player/user (not shown) may grip (e.g. hand-hold) and move the first arbitrary physical object 250 and first controller device 100 through the 3D ambient space. Whereby, the first controller device 100 and the first arbitrary physical object 250 may make a first movement M0 within 3D ambient space 302. In some embodiments, the display appliance 200 may detect and select the first controller device 100 within the 3D ambient space 302 of the play system 300. Whereupon, the display appliance 200 may detect a close proximity of the first controller device 100 (and the first arbitrary physical object 250) with the first imaginary object 270 in 3D ambient space 302. Thereby, the display appliance 200 may be generating one or more video frames that are comprising a first virtual object 260 (e.g., superhero) on the display appliance 200 such that an at least one movement, of the first virtual object 260 on the display appliance 200, may be based at least in part on the close proximity of the first controller device 100 (and the first arbitrary physical object 250) with the first imaginary object 270 within 3D ambient space 302 of the play system 300.

In some embodiments, the display appliance 200 may be generating the one or more video frames comprising a second virtual object 261 (e.g., magic star) on the display appliance 200 such that an at least one movement, of the second virtual object 261 on the display appliance 200, is based at least in part on the close proximity of the first controller device 100 (and the first arbitrary physical object 250) with the first imaginary object 270 within 3D ambient space 302 of the play system 300.

In some embodiments, the first controller device 100 and/or the display appliance 200 may be generating one or more sound effects (e.g., spoken language of "Move Forward", "Move Left", "You're getting closer", beeping tone, etc.) that are based at least in part on the close proximity of the first controller device 100 (and the first arbitrary physical object 250) with the first imaginary object 270 within 3D ambient space 302 of the play system 300.

In some embodiments, the first controller device 100 and/or the display appliance 200 may be generating one or more sound effects (e.g., spoken language of "Move Forward", "Move Left", "You're getting closer", beeping tone, etc.) that are based at least in part on the close proximity of the first controller device 100 (and the first arbitrary physical object 250) with the first imaginary object 270 within 3D ambient space 302 of the play system 300.

In some embodiments, the first controller device 100 and/or the display appliance 200 may be generating one or more mechanical effects (e.g., one or more pulse vibrations) that are based at least in part on the close proximity of the first controller device 100 (and the first arbitrary physical object 250) with the first imaginary object 270 within 3D ambient space 302 of the play system 300.

In some embodiments of play activity operations, detecting a close proximity of the first controller device 100 (and the first arbitrary physical object 250) with the first imaginary object 270 in 3D ambient space 302 may be based at least in part on a spatial distance D, between the first controller device 100 and the first imaginary object 270, is less than or equal to a close proximity threshold distance CPTD in 3D ambient space 302, although alternative operations for detecting close proximity may be considered as well. For general information about "close proximity," the reader may refer to the collision analyzer 238 (in FIG. 5) and elsewhere in this disclosure.

Finally, in some embodiments of play activity operations, the play system 300 may provide helpful tips to one or more users and players. In various application embodiments, the play system 300 comprising one or more controller devices and display appliances may further generate video with graphic indicators, sound effects, human speech sound effects to guide a player/user to the location of an imaginary object. For example, video with graphic indicators may include, but not limited to, a graphic arrow or "X marks the spot" icon showing the way to the location of an imaginary object. Sound effects may include, but not limited to, a "ring tone,", "beeping tone," musical note, or music when a player is approaching the location of an imaginary object. Human speech sound effects may include user instructions, but not limited to, "Move Forward," "Turn left," "Walk four forward," and "Move up," etc. to guide a player to an imaginary object. Wherein, the play system 300 may be operable to generate visual, sound, and mechanical effects based on close proximity with an imaginary object within the 3D ambient space. For further details related to imaginary objects, the reader may refer to the section "Imaginary Objects in Ambient Space of the Play System" for FIG. 1 and elsewhere in this disclosure.

Figure 26A:
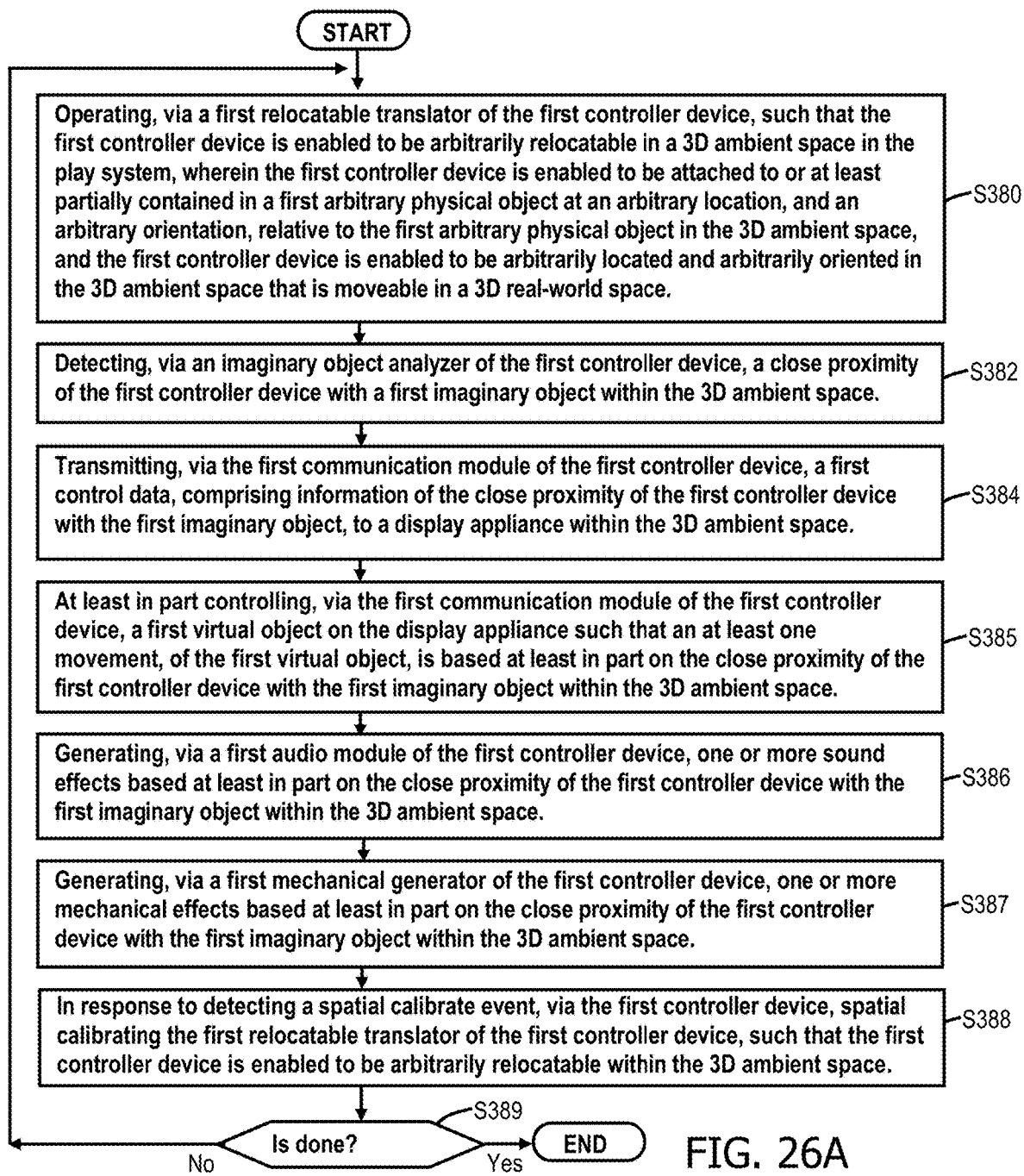
FIG. 26A is a flowchart for the play system of FIG. 1, of a method for a controller device, which enables detecting a close proximity of a first controller device, and first arbitrary physical object, with a first imaginary object.

Method for Controller Device to Detect Close Proximity of "Hidden" Imaginary Object Turning now to FIG. 26A while referencing FIGS. 25A, 1, 3, and 5, there shown is a flowchart of an exemplary embodiment of a computer-implemented method for a first controller device that detects a close proximity of the first controller device with a first imaginary object in the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of a first controller device 103 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some embodiments, beginning with step S380, operating, via a first relocatable translator 134 of the first controller device 100, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S382, detecting, via an imaginary object analyzer 139 of the first controller device 100, a close proximity of the first controller device 100 with the first imaginary object 270 within 3D ambient space 302.

In some embodiments, in step S384, transmitting, via a first communication module 118 of the first controller device 100, the first control data, comprising information of the close proximity of the first controller device 100 with the first imaginary object 270, to a display appliance 200 within the 3D ambient space 302.

In some embodiments, in step S385, at least in part controlling, via the first communication module 118 of the first controller device 100, a first virtual object 260 on the display appliance 200 such that an at least one movement, of the first virtual object 260 on the display appliance 200, is based at least in part on the close proximity of the first controller device 100 with the first imaginary object 270 within the 3D ambient space 302.

In some embodiments, in step S386, generating, via a first audio module 112 of the first controller device 100, one or more sound effects based at least in part on the close proximity of the first controller device 100 with the first imaginary object 270 within the 3D ambient space 302. In various embodiments, the current step may be optional and not required.

In some embodiments, in step S387, generating, via a first mechanical generator 114 of the first controller device 100, one or more mechanical effects based at least in part on the close proximity of the first controller device 100 with the first imaginary object 270 within the 3D ambient space 302. In various embodiments, the current step may be optional and not required.

In some embodiments, in step S388, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial calibrate in Real-time." In some alternate embodiments, the current step may not be required in the method.

Finally, in some embodiments, in step S389, in response to determining, via the first controller device, that the method is not done, the method goes back to step S380. Otherwise the method is done, so the method ends. In the current embodiment, determining if the method is done may be based at least in part on a substantially periodic time interval or a detected periodic state, wherein the method may be continuously executed (looping from step S389 and back to step S380) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S389 and back to step S380) in a substantially aperiodic or on a needed basis. In other embodiments, the current step may not be required, or implemented elsewhere.

Figure 26B:
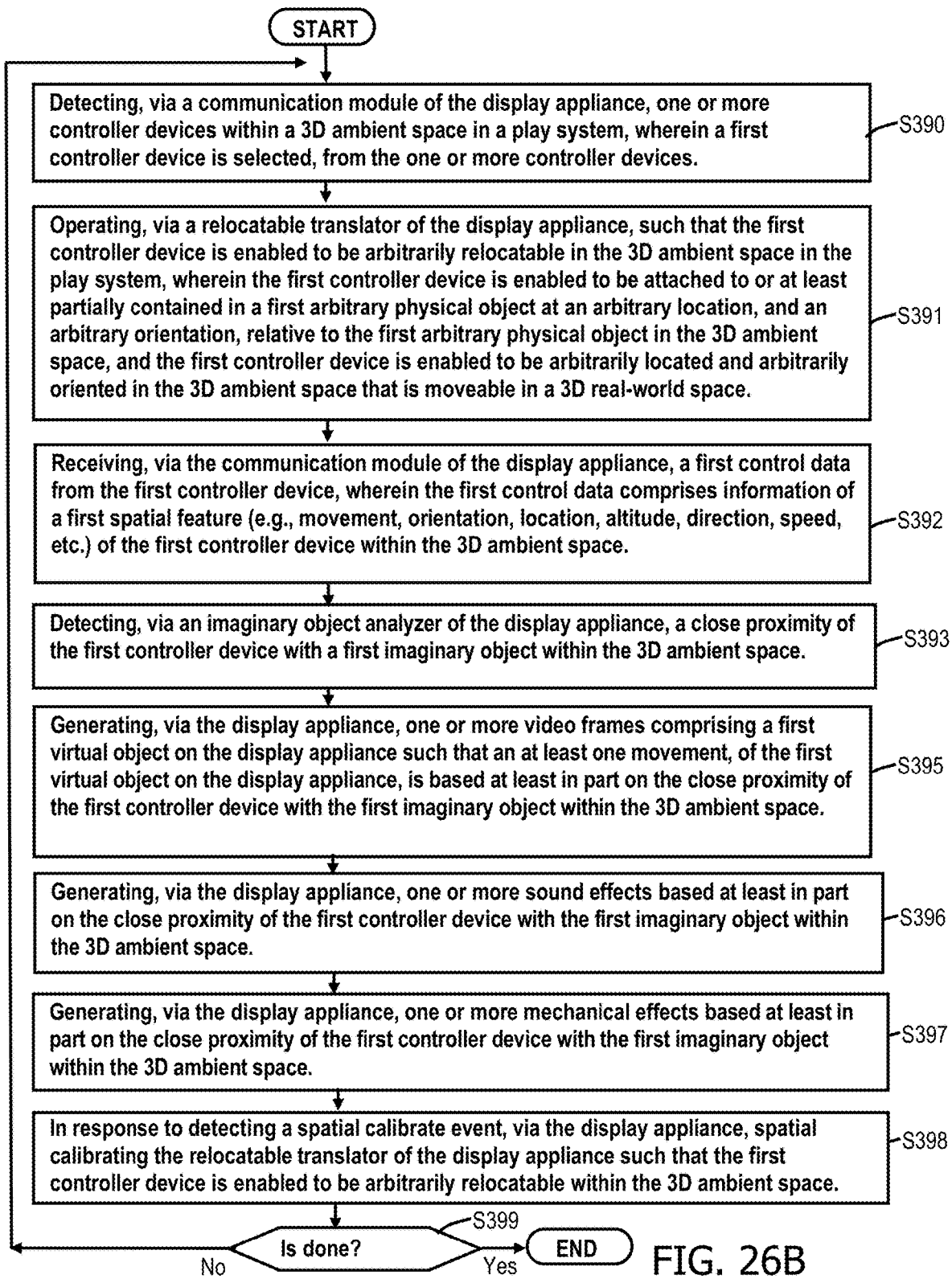
FIG. 26B is a flowchart for the play system of FIG. 1, of a method for a display appliance, which enables detecting a close proximity of a first controller device, and first arbitrary physical object, with a first imaginary object.

Method for Display Appliance to Detect Close Proximity of Controller Device with "Hidden" Imaginary Object Turning now to FIG. 26B while referencing FIGS. 25A, 1, 3, and 5, there shown is a flowchart of an exemplary embodiment of a computer-implemented method for a display appliance to detect close proximity of one or more controller devices with one or more imaginary objects in a play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S390, detecting, via a communication module 218 of the display appliance 200, one or more controller devices within a 3D ambient space 302 in the play system 300, wherein a first controller device 100 is selected, from the one or more controller devices. In the current embodiment, the first controller device 100 may be iteratively and sequentially selected, from the one or more controller devices detected in the play system 300, whenever the current step is executed. In alternate embodiments, the first controller device 100 may be arbitrarily selected from the one or more controller devices, detected in the play system 300, although other approaches may be considered as well.

In some embodiments, in step S391, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S392, receiving, via the communication module 218 of the display appliance 200, a first control data from the first controller device 100, wherein the first control data comprises information of a first spatial feature (e.g., movement, orientation, location, altitude, direction, speed, etc.) of the first controller device 100 within the 3D ambient space 302. For a description of a "spatial feature," the reader may refer to the motion module 119 in FIG. 3 and other sections of this disclosure.

In some embodiments, in step S393, detecting, via an imaginary object analyzer 239 of the display appliance 200, a close proximity of the first controller device 100 with a first imaginary object 270 within 3D ambient space 302. In some embodiments, the imaginary object analyzer 239 of the display appliance may detect a close proximity of the first controller device 100 (and the first arbitrary physical object 250) with the first imaginary object 270 in 3D ambient space 302 that is based at least in part on a spatial distance D, between the first controller device 100 and the first imaginary object 270, is less than or equal to a close proximity threshold distance CPTD in 3D ambient space 302, although alternative operations for detecting close proximity may be considered as well. For general information about "close proximity," the reader may refer to the collision analyzer 238 (in FIG. 5) and elsewhere in this disclosure.

In some embodiments, in step S395, generating, via the display appliance 200, one or more video frames comprising a first virtual object 260 such that an at least one movement, of the first virtual object 260 on the display appliance 200, is based at least in part on the close proximity of the first controller device 100 with the first imaginary object 270 within the 3D ambient space 302.

In some embodiments, in step S396, generating, via the display appliance 200, one or more sound effects based at least in part on the close proximity of the first controller device 100 with the first imaginary object 270 within the 3D ambient space 302. In various embodiments, the current step may be optional and not required.

In some embodiments, in step S397, generating, via the display appliance 200, one or more mechanical effects based at least in part on the close proximity of the first controller device 100 with the first imaginary object 270 within the 3D ambient space 302. In various embodiments, the current step may be optional and not required.

In some embodiments, in step S397, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial calibrate in Real-time." In some alternate embodiments, the current step may not be required in the method.

Finally, in some embodiments, in step S399, in response to determining, via the display appliance 200, that the method is not done, the method goes back to step S390. Otherwise the method is done, so the method ends. In the current embodiment, determining if the method is done may be based at least in part on a substantially periodic time interval or a detected periodic state, wherein the method may be continuously executed (looping from step S399 back to step S390) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S399 back to step S390) in a substantially aperiodic or on a needed basis. In other embodiments, the current step may not be required, or implemented elsewhere.

Collision of Controller Device with "Hidden" Imaginary Object

In some embodiments of a play system, collisions of controller devices and arbitrary physical objects with imaginary objects may be used to simulate search-and-find or search-and-rescue effects with non-visible, imaginary objects within the surrounding 3D ambient space. Whereby, in some game application embodiments, a player/user may move arbitrary physical objects to search for one or more imaginary objects, which may have been previously hidden by another player, via user input to the play system, or may have been randomly hidden, via computer generation by the play system, somewhere within 3D ambient space. An imaginary object may represent, but not limited to, a treasure chest to grow wealth, a magical character for extra powers, a first aid kit to reduce injury, an ammo supply to replenish weapons, a shield for protection, an enemy character, a remote character, or any other type of object may be considered.

So turning back to FIG. 25B while referencing FIGS. 1, 3, and 5, there shown are various embodiments of play activity operations that result in a collision of the controller device and arbitrary physical object with an imaginary object. The play system 300 may implement a 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256.

Further shown are a first controller device 100 and a first arbitrary physical object 250 (e.g. a toy robot). Wherein, the first controller device 100 may be configured with similar apparatus and functionality, as described earlier in FIGS. 2 and 3. And the first controller device 100 may have been arbitrarily located and connected, associated, and spatial calibrated with the first arbitrary physical object 250, as described in FIGS. 6A-6D.

Also shown are a first imaginary object 270 (e.g., representing a magical character) and a second imaginary object 271 (e.g., representing a treasure chest) that that may be randomly located (e.g., via a control unit executing computer instructions) by the play system 300, display appliance 200, and game application 222 (in FIG. 5) within the 3D ambient space 302.

So to begin, in various embodiments of play activity operations, a player/user (not shown) may grip (e.g. handhold) and move the first arbitrary physical object 250 and first controller device 100 through the 3D ambient space. Whereby, the first controller device 100 and the first arbitrary physical object 250 may make a first movement M0 within 3D ambient space 302. As shown, the first movement M0 may comprise, but not limited to, a freefall movement, or forced movement resulting in an at least indirection collision of the first controller device 100 and first arbitrary physical object 250 with the first imaginary object 270 in 3D ambient space 302.

Whereby, in some embodiments of play activity operations, the display appliance 200 may detect and select the first controller device 100 within the 3D ambient space 302 of the play system 300. Whereupon, the display appliance 200 may detect an at least indirect collision of the first controller device 100 (and the first arbitrary physical object 250) with the first imaginary object 270 in 3D ambient space 302. Thereby, in some embodiments, the display appliance 200 may be generating one or more video frames that are comprising a first virtual object 260 (e.g., superhero) on the display appliance 200 such that an at least one movement, of the first virtual object 260 on the display appliance 200, is based at least in part on the at least indirect collision of the first controller device 100 (and the first arbitrary physical object 250) with the first imaginary object 270 within 3D ambient space 302 of the play system 300.

In some embodiments, the display appliance 200 may be generating the one or more video frames comprising a second virtual object 261 (e.g., magical character) on the display appliance 200 such that an at least one movement, of the second virtual object 261 on the display appliance 200, is based at least in part on the at least indirect collision of the first controller device 100 (and the first arbitrary physical object 250) with the first imaginary object 270 within 3D ambient space 302 of the play system 300. For a description of "at least indirect collision," the reader may refer to definitions in the section "Detailed Description" and elsewhere in this disclosure.

In some embodiments, the first controller device 100 and/or the display appliance 200 may be generating one or more sound effects (e.g., spoken language of "You collided!", beeping tone, etc.) that are based at least in part on the at least indirect collision of the first controller device 100 (and the first arbitrary physical object 250) with the first imaginary object 270 within 3D ambient space 302 of the play system 300.

In some embodiments, the first controller device 100 and/or the display appliance 200 may be generating one or more mechanical effects (e.g., one or more pulse vibrations) that are based at least in part on the at least indirect collision of the first controller device 100 (and the first arbitrary physical object 250) with the first imaginary object 270 within 3D ambient space 302 of the play system 300.

In some embodiments of play activity operations, detecting an at least indirect collision of the first controller device 100 (and the first arbitrary physical object 250) with the first imaginary object 270 in 3D ambient space 302 may be based at least in part on a spatial distance D, between the first controller device 100 and the first imaginary object 270, is less than or equal to a close proximity threshold distance CPTD in 3D ambient space 302, although alternative operations for detecting close proximity may be considered as well. For general information about "close proximity," the reader may refer to the collision analyzer 238 (in FIG. 5) and elsewhere in this disclosure.

Also shown, in some embodiments of play activity operations, a player (not shown) may grip the arbitrary physical object 250 and simulate a toy or object triggering an action. As shown, the first movement M0 may comprise, but not limited to, a freefall movement, or forced movement resulting in an at least indirection collision of the controller device 100 and arbitrary physical object 250 with the first imaginary object 270 (e.g., representing a magical character), in 3D ambient space 302.

Further shown, in various embodiments of play activity operations, the play system 300 may enable the controller device 100 to be at least in part controlling the at least one movement VM0 of the first virtual object 260 on the display appliance 200. The at least one movement VM0 may be a virtual trigger movement: wherein the first virtual object 260 (e.g., superhero) appears to trigger an action of a second virtual object 261 (e.g., a magical character), on the display appliance 200, in 3D virtual space 204.

Finally, in some embodiments of play activity operations, the play system 300 may provide helpful tips to one or more users and players. In various application embodiments, the play system 300 comprising one or more controller devices and display appliances may further generate video with graphic indicators, sound effects, and/or human speech sound effects to guide a player/user to the location of an imaginary object. For example, video with graphic indicators may include, but not limited to, a graphic arrow or "X marks the spot" icon showing the way to the location of an imaginary object. Sound effects may include, but not limited to, a "ring tone,", "beeping tone," musical note, or music when a player is approaching the location of an imaginary object. Human speech sound effects may include language such as, but not limited to, "Turn left," "Walk forward," and "Move up," to guide a player to an imaginary object. Wherein, the play system 300 may be operable to generate visual, sound, and mechanical effects based on a collision with an imaginary object within the 3D ambient space. For further details related to imaginary objects, the reader may refer to the section "Imaginary Objects in Ambient Space of the Play System" for FIG. 1 and elsewhere in this disclosure.

Method for Controller Device to Detect Collision of "Hidden" Imaginary Object

Figure 26C:
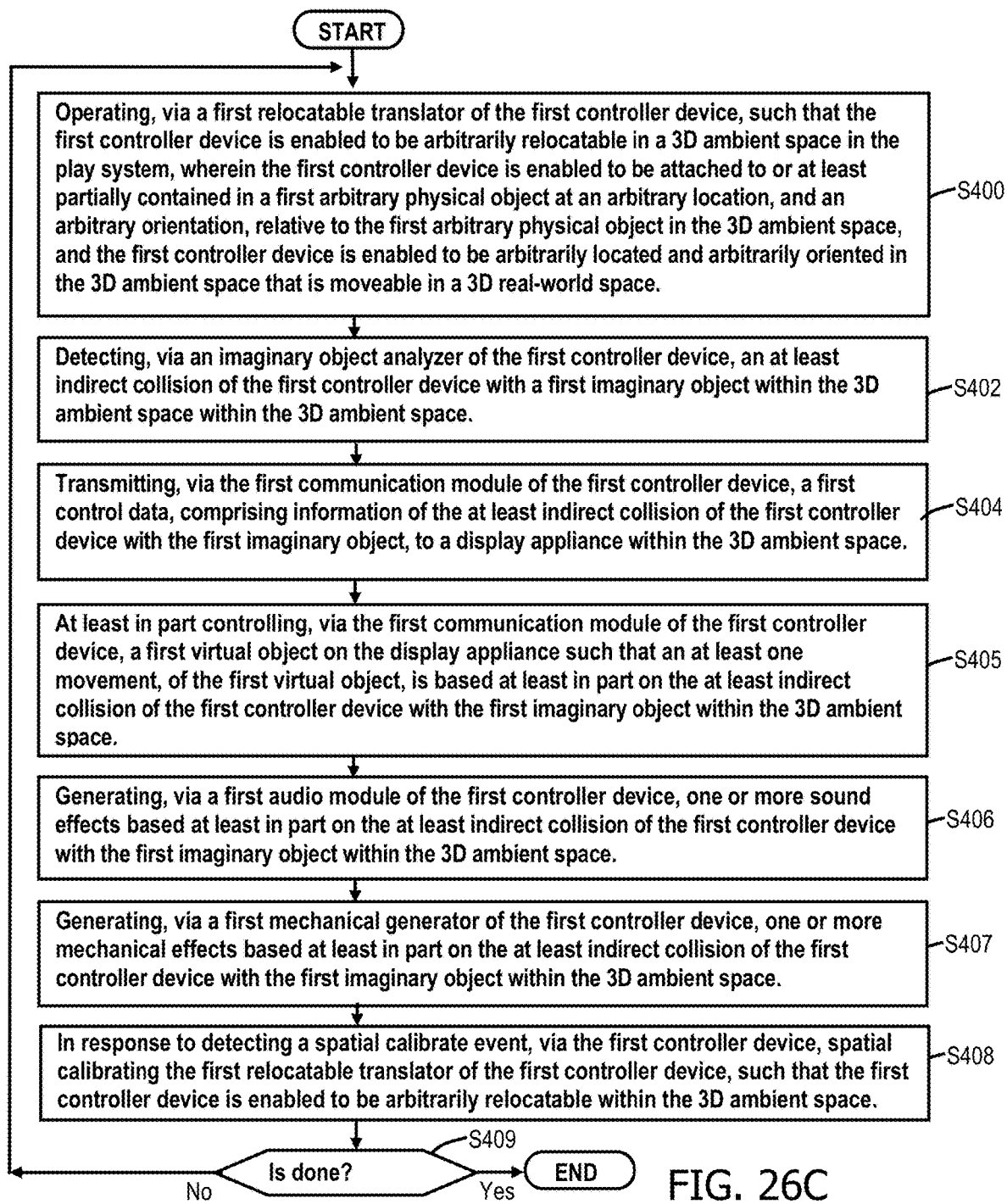
FIG. 26C is a flowchart for the play system of FIG. 1, of a method for a controller device, which enables detecting an at least indirect collision of a first controller device, and first arbitrary physical object, with a first imaginary object.

Turning now to FIG. 26C while referencing FIGS. 25B, 1, 3, and 5, there shown is a flowchart of an exemplary embodiment of a computer-implemented method for a first controller device that detects an at least indirect collision of the first controller device with a first imaginary object in the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of a first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some embodiments, beginning with step S400, operating, via a first relocatable translator 134 of the first controller device 100, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S402, detecting, via an imaginary object analyzer 139 of the first controller device 100, an at least indirect collision of the first controller device 100 with the first imaginary object 270 within 3D ambient space 302.

In some embodiments, in step S404, transmitting, via a first communication module 118 of the first controller device 100, a first control data, comprising information of the at least indirect collision of the first controller device 100 with the first imaginary object 270, to a display appliance 200 within the 3D ambient space 302.

In some embodiments, in step S405, at least in part controlling, via the first communication module 118 of the first controller device 100, a first virtual object 260 on the display appliance 200 such that an at least one movement, of the first virtual object 260 on the display appliance 200, is based at least in part on the at least indirect collision of the first controller device 100 with the first imaginary object 270 within the 3D ambient space 302.

In some embodiments, in step S406, generating, via a first audio module 112 of the first controller device 100, one or more sound effects based at least in part on the at least indirect collision of the first controller device 100 with the first imaginary object 270 within the 3D ambient space 302. In various embodiments, the current step may be optional and not required.

In some embodiments, in step S407, generating, via a first mechanical generator 114 of the first controller device 100, one or more mechanical effects based at least in part on the at least indirect collision of the first controller device 100 with the first imaginary object 270 within the 3D ambient space 302. In various embodiments, the current step may be optional and not required.

In some embodiments, in step S408, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial calibrate in Real-time." In some alternate embodiments, the current step may not be required in the method.

Finally, in some embodiments, in step S409, in response to determining, via the first controller device, that the method is not done, the method goes back to step S400. Otherwise the method is done, so the method ends. In the current embodiment, determining if the method is done may be based at least in part on a substantially periodic time interval or a detected periodic state, wherein the method may be continuously executed (looping from step S409 and back to step S400) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S409 and back to step S400) in a substantially aperiodic or on a needed basis. In other embodiments, the current step may not be required, or implemented elsewhere.

Figure 26D:
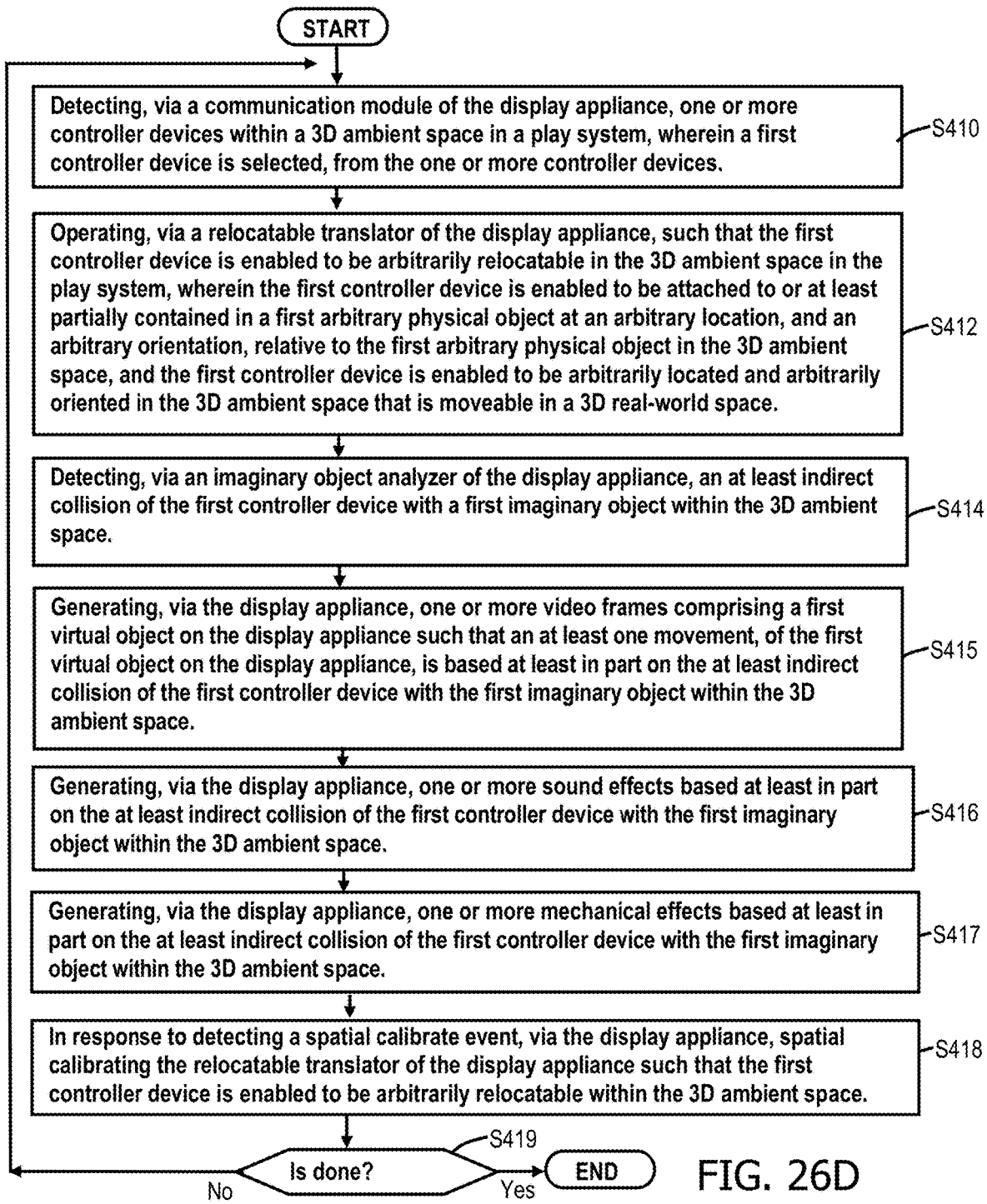
FIG. 26D is a flowchart for the play system of FIG. 1, of a method for a display appliance, which enables detecting an at least indirect collision of a first controller device, and first arbitrary physical object, with a first imaginary object.

Method for Display Appliance to Detect Collision of Controller Device with "Hidden" Imaginary Object Turning now to FIG. 26D while referencing FIGS. 25B, 1, 3, and 5, there shown is a flowchart of an exemplary embodiment of a computer-implemented method for a display appliance to detect collisions of one or more controller devices with one or more imaginary objects in a play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S410, detecting, via a communication module 218 of the display appliance 200, one or more controller devices within a 3D ambient space 302 in the play system 300, wherein a first controller device 100 is selected, from the one or more controller devices. In the current embodiment, the first controller device 100 may be iteratively and sequentially selected, from the one or more controller devices detected in the play system 300, whenever the current step is executed. In alternate embodiments, the first controller device 100 may be arbitrarily selected from the one or more controller devices, detected in the play system 300, although other approaches may be considered as well.

In some embodiments, in step S412, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S414, detecting, via an imaginary object analyzer 239 of the display appliance 200, an at least indirect collision of the first controller device 100 with a first imaginary object 270 within 3D ambient space 302. In some embodiments, the imaginary object analyzer 239 of the display appliance may detect an at least indirect collision of the first controller device 100 (and the first arbitrary physical object 250) with the first imaginary object 270 in 3D ambient space 302 may be based at least in part on a spatial distance D, between the first controller device 100 and the first imaginary object 270, is less than or equal to a close proximity threshold distance CPTD in 3D ambient space 302, although alternative operations for detecting close proximity may be considered as well. For general information about "close proximity," the reader may refer to the collision analyzer 238 (in FIG. 5) and elsewhere in this disclosure.

In some embodiments, in step S415, generating, via the display appliance 200, one or more video frames comprising a first virtual object 260 such that an at least one movement, of the first virtual object 260 on the display appliance 200, is based at least in part on the at least indirect collision of the first controller device 100 with the first imaginary object 270 within the 3D ambient space 302.

In some embodiments, in step S416, generating, via the display appliance 200, one or more sound effects based at least in part on the at least indirect collision of the first controller device 100 with the first imaginary object 270 within the 3D ambient space 302. In various embodiments, the current step may be optional and not required.

In some embodiments, in step S417, generating, via the display appliance 200, one or more mechanical effects based at least in part on the at least indirect collision of the first controller device 100 with the first imaginary object 270 within the 3D ambient space 302. In various embodiments, the current step may be optional and not required.

In some embodiments, in step S418, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may not be required in the method.

Finally, in some embodiments, in step S419, in response to determining, via the display appliance 200, that the method is not done, the method goes back to step S410. Otherwise the method is done, so the method ends. In the current embodiment, determining if the method is done may be based at least in part on a substantially periodic time interval or a detected periodic state, wherein the method may be continuously executed (looping from step S419 back to step S410) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S419 back to step S410) in a substantially aperiodic or on a needed basis. In other embodiments, the current step may not be required, or implemented elsewhere.

Launch "Projectile" Imaginary Object from Controller Device

In many embodiments of a play system, launching an imaginary object that is moving, from a controller device and arbitrary physical object, may simulate flying projectile effects within the 3D ambient space. In some embodiments, an imaginary object may launch, move across, and land within the 3D ambient space, much like a real-world projectile. Such an imaginary object may be referred to as a projectile imaginary object in this disclosure.

So in various game application embodiments, a first controller device (and first arbitrary physical object) may launch a first imaginary object, such as by a user/player, via user input to the play system, or may be randomly launched, via computer generation by the play system, within 3D ambient space. Whereupon, the first imaginary object may move across the 3D ambient space—resulting in an at least indirect collision of a controller device and arbitrary physical object with the first imaginary object within the 3D ambient space of the play system.

Thus, in various embodiments, a projectile imaginary object may represent, but not limited to, a rocket fired at another player's character, a lightning bolt to zap a villain, a protective shield that envelops a friendly character, a magic spell cast at another character or object, a time transforming event that sends a character forward or backward in virtual time within a game, a space transforming event that sends a character to another virtual location within a game, or any other type of object may be considered to represent an imaginary object.

Turning now to FIG. 27 while referencing FIGS. 1, 3, and 5, there shown is an embodiment of play activity operations that results in launching a first imaginary object 270, which is a projectile imaginary object, from a first controller device 100 (and first arbitrary physical object 100) within a 3D ambient space 302. The play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256.

Further shown are the first controller device 100 and a first arbitrary physical object 250 (e.g., a toy robot). And a second controller device 101 and a second arbitrary physical object 251 (e.g., a toy action figure). Wherein, the controller devices 100 and 101 may be configured with similar apparatus and functionality, as described earlier in FIGS. 2 and 3. And the controller devices 100 and 101 may be already arbitrarily located and connected, associated, and spatial calibrated with their respective arbitrary physical objects 250 and 251, as described earlier in FIGS. 6A-6D.

Also shown, the first controller device 100 may be configured with a light emitter 159E, as discussed earlier (in FIGS. 2A and 3). Wherein the first controller device 100 and the light emitter 159E may be configured to emit a modulated (infrared, visible, or ultraviolet) light 270IRL outward into the 3D ambient space 302. Also shown, the second controller device 101 may be configured with a light sensor 158S, as discussed earlier (in FIGS. 2 and 3). Wherein, the second controller device 101 and the light sensor 158S may be configured to detect a modulated (infrared, visible, or ultraviolet) light 270IRL within the 3D ambient space.

So to begin, in some embodiments of play activity operations, a player/user (not shown) may pick up (e.g. handhold) and make a first gesture movement M0 with the first controller device 100 and first arbitrary physical object 250 within the 3D ambient space. In various embodiments, the first gesture movement M0 may comprise, but not limited to, a double tap gesture movement, a single tap gesture movement, spin gesture movement, or shake gesture movement. In the current embodiment, the first gesture movement M0 may be a double tap gesture movement made by the user/player. In some embodiments, a double tap gesture movement may be caused by a user's finger or hand that taps or bumps twice, within a two second time duration, the first controller device 100 and the first arbitrary physical object 250 (e.g., a toy robot). In some alternate embodiments, the first gesture movement M0 may be a single tap gesture movement caused by a user's finger or hand that taps or bumps once, within a two second time duration, the first controller device 100 and the first arbitrary physical object 250.

Whereby, in some embodiments of play activity operations, the first controller device 100 may detect a first gesture movement M0 of the first controller device 100 (and the first arbitrary physical object 250) in 3D ambient space 302. Then in response to the gesture movement M0, the first controller device 100, via the light emitter 159E, may be emitting a modulated (infrared, visible, or ultraviolet) light 270IRL, into the 3D ambient space.

Thereby, in some embodiments, the first controller device 100 may transmit a first control data to the display appliance 200, where the first control data comprises information of the first gesture movement M0 and the modulated light 270IRL emitted by the first controller device within the 3D ambient space. And accordingly, the first controller device 100 may be at least in part controlling a second virtual object 262 (e.g., lightning bolt) on the display appliance 200 such that an at least one movement VM2, of the second virtual object 262 on the display appliance 200, is based at least in part on the first gesture movement M0 of the first controller device 100 (and the first arbitrary physical object 250) and the modulated light 270IRL emitted by the first controller device 100 within 3D ambient space 302 of the play system 300. Moreover, in various embodiments, the first controller device 100 may be at least in part controlling a first virtual object 260 (e.g., superhero) on the display appliance 200 such that an at least one movement VM0, of the first virtual object 260 on the display appliance 200, is based at least in part on the first gesture movement M0 of the first controller device 100 (and the first arbitrary physical object 250) and the modulated light 270IRL emitted by the first controller device 100 within 3D ambient space 302 of the play system 300.

Further depicted, the first controller device 100 may be enabled to launch the first imaginary object 270 within the 3D ambient space 302. Subsequently, the first imaginary object 270 may be operable to make a first object movement M270 through the 3D ambient space 302. In various embodiments, the imaginary object 270 may move through 3D ambient space 302 with a speed of less than 0.1 meter per second, or less than 0.5 meter per second, or less than 1.1 meter per second, or less than 5 meters per second, although alternative speeds through 3D ambient space may be considered as well.

Whereupon, in some embodiments, the second controller device 101 may be configured to detect the modulated light 270IRL, via the light sensor 158S of the second controller device 101, within the 3D ambient space 302, and accordingly, the second controller device 101 may respond by generating one or more mechanical effects or mechanical movements M1, via the mechanical generator 114 (in FIG. 3) of the controller device 101, based at least in part on the modulated light 270IRL detected by second controller device 101 in the 3D ambient space 302. For example, the second controller device 101 and the second arbitrary physical object 251 may make a mechanical movement M1 in 3D ambient space 302, such that the device 101 and arbitrary physical object 251 may flip over on its side, pop-up, roll, flip upside down, or freely fly (e.g., one meter above the table) within the 3D ambient space 302.

Finally, in some embodiments, during play activity operations of the play system 300, helpful tips may be provided to one or more users and players. In various application embodiments, the play system 300 comprising one or more controller devices and display appliances may further generate video with graphic indicators, sound effects, and or human speech sound effects to guide a player/user to the location of an imaginary object. For example, video with graphic indicators may include, but not limited to, a graphic arrow or "X marks the spot" icon showing the way to the location of an imaginary object. Sound effects may include, but not limited to, a "ring tone,", "beeping tone," musical note, or music when a player is approaching the location of an imaginary object. Human speech sound effects may include, but not limited to, "Turn left," "Walk forward," and "Look down," to guide a player to an imaginary object. Wherein, the play system 300 may be operable to generate visual, sound, and mechanical effects based on the location of an imaginary object within the 3D ambient space. For further details related to imaginary objects, the reader may refer to the section "Imaginary Objects in Ambient Space of the Play System" for FIG. 1 and elsewhere in this disclosure.

Method for Controller Device to Launch "Projectile" Imaginary Object

Figure 28A:
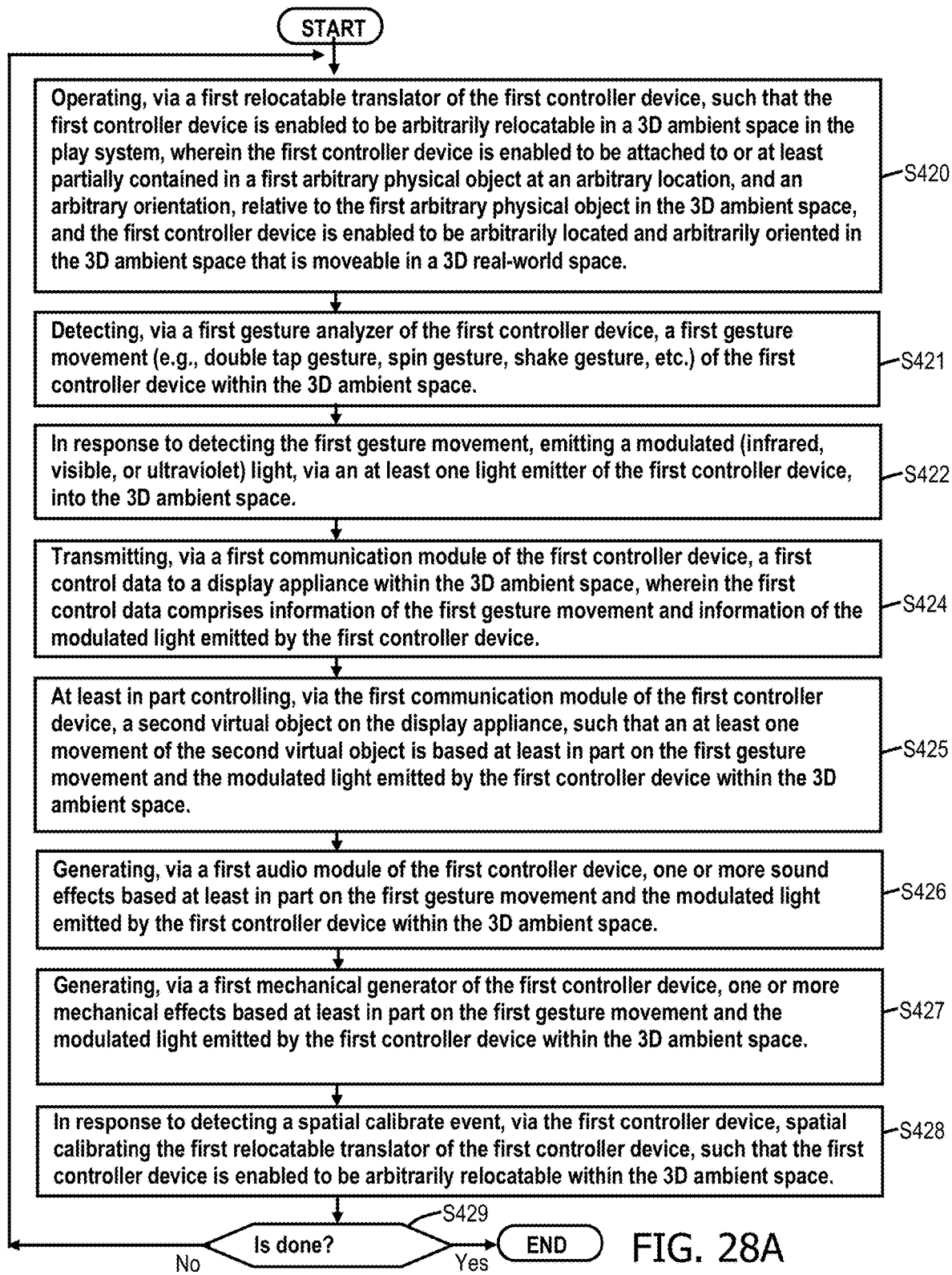
FIG. 28A is a flowchart for the play system of FIG. 1, of a method for a first controller device, which enables detecting a gesture movement and emitting a modulated (infrared, visible, or ultraviolet) light into 3D ambient space.

Turning now to FIG. 28A while referencing FIGS. 27, 1, 3, and 5, there shown is a flowchart of an exemplary embodiment of a computer-implemented method for a controller device to launch an imaginary object within the 3D ambient space of the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some embodiments, beginning with step S420, operating, via a first relocatable translator 134 of the first controller device 100, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S421, detecting, via a first gesture analyzer 137 of the first controller device 100, a first gesture movement M0 (e.g., double tap gesture, spin gesture, shake gesture, etc.) of the first controller device 100 within the 3D ambient space 302. For a description of a "gesture movement," the reader may refer to the gesture analyzer 137 in FIG. 3 and elsewhere in this disclosure.

In some embodiments, in step S422, in response to detecting the first gesture movement M0, emitting a modulated (infrared, visible, or ultraviolet) light 270IRL, via an at least one light emitter 159E of the first controller device 100, into the 3D ambient space 302.

In some embodiments, in step S424, transmitting, via a first communication module 118 of the first controller device 100, a first control data to a display appliance 200 within the 3D ambient space 302, wherein the first control data comprises information of the first gesture movement M0 and information of the modulated light 270IRL emitted by the first controller device 100.

In some embodiments, in step S425, at least in part controlling, via the first communication module 118 of the first controller device 100, a second virtual object 262 on the display appliance 200 such that an at least one movement, of the second virtual object 262 on the display appliance 200, is based at least in part on the first gesture movement M0 and the modulated light 270IRL emitted by the first controller device 100 within the 3D ambient space 302.

In some embodiments, in step S426, generating, via a first audio module 112 of the first controller device 100, one or more sound effects based at least in part on the first gesture movement M0 and the modulated light 270IRL emitted by the first controller device 100 within the 3D ambient space 302. In various embodiments, the current step may be optional and not required.

In some embodiments, in step S427, generating, via a first mechanical generator 114 of the first controller device 100, one or more mechanical effects based at least in part on the first gesture movement M0 and the modulated light 270IRL emitted by the first controller device 100 within the 3D ambient space 302. In various embodiments, the current step may be optional and not required.

In some embodiments, in step S428, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial Calibrate in Real-time." In some alternate embodiments, the current step may not be required in the method.

Finally, in some embodiments, in step S429, in response to determining, via the first controller device 100, that the method is not done, the method goes back to step S420. Otherwise the method is done, so the method ends. In the current embodiment, determining if the method is done may be based at least in part on a substantially periodic time interval or a detected periodic state, wherein the method may be continuously executed (looping from step S429 and back to step S420) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S429 and back to step S420) in a substantially aperiodic or on a needed basis. In other embodiments, the current step may not be required, or implemented elsewhere.

Figure 28B:
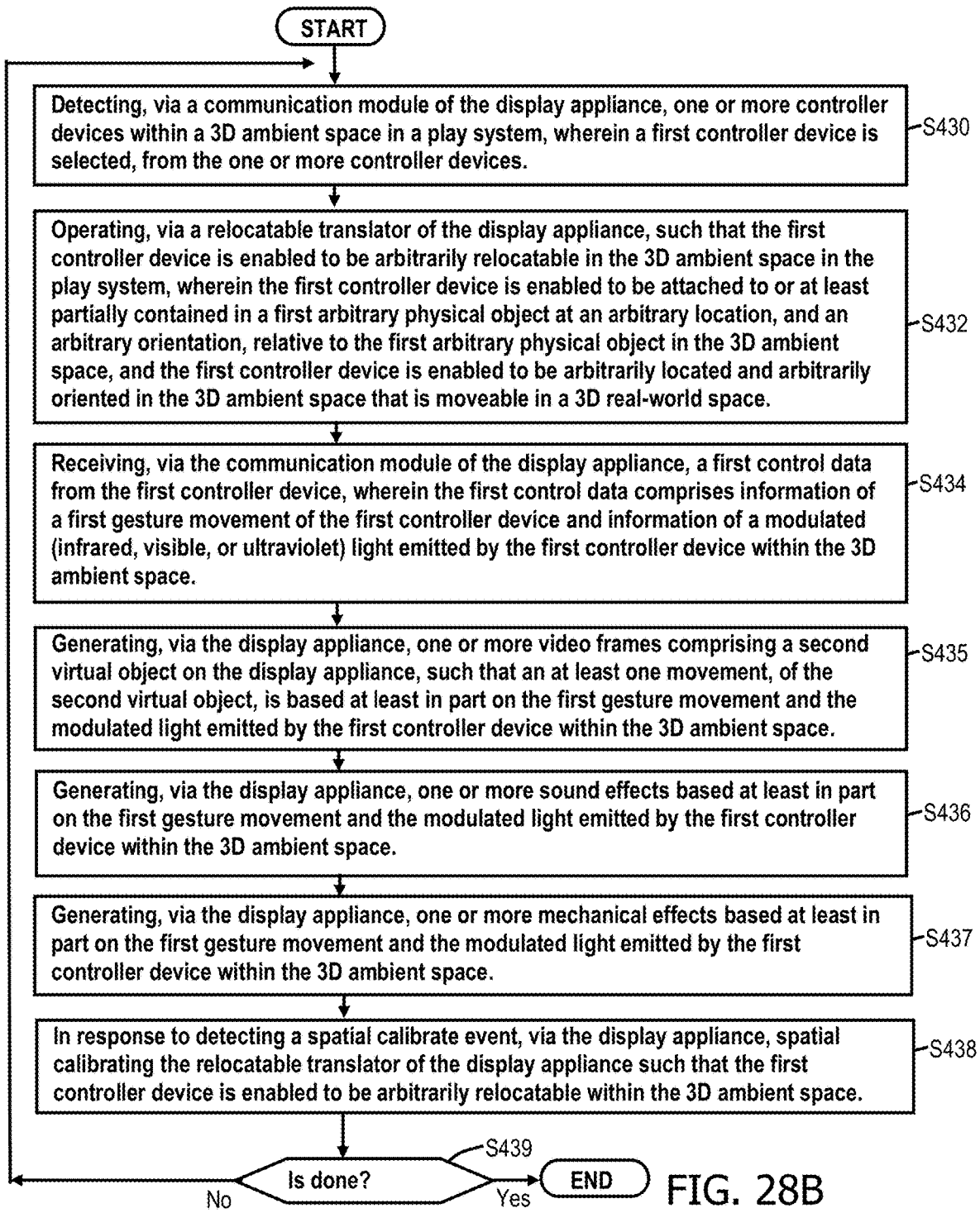
FIG. 28B is a flowchart for the play system of FIG. 1, of a method for a display appliance, which enables responding to a first controller device detecting a gesture movement and emitting a modulated (infrared, visible, or ultraviolet) light into 3D ambient space.

Method for a Display Appliance to Detect Launch of "Projectile" Imaginary Object from Controller Device Turning now to FIG. 28B while referencing FIGS. 27, 1, 3, and 5, there shown is a flowchart of an exemplary embodiment of a computer-implemented method for a display appliance to launch one or more imaginary objects from one or more controller devices within the 3D ambient space of the play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S430, detecting, via a communication module 218 of the display appliance 200, one or more controller devices within a 3D ambient space 302 in the play system 300, wherein a first controller device 100 is selected, from the one or more controller devices. In the current embodiment, the first controller device 100 may be iteratively and sequentially selected, from the one or more controller devices detected in the play system 300, whenever the current step is executed. In alternate embodiments, the first controller device 100 may be arbitrarily selected from the one or more controller devices, detected in the play system 300, although other approaches may be considered as well.

In some embodiments, in step S432, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S434, receiving, via a communication module 218 of the display appliance 200, a first control data from the first controller device 100, wherein the first control data comprises information of a first gesture movement M0 (e.g., toy walking gesture, toy takeoff gesture, toy landing gesture, double tap gesture, etc.) of the first controller device 100 and information of a modulated (infrared, visible, or ultraviolet) light 270IRL emitted by the first controller device 100 within the 3D ambient space 302. For a description of a "gesture movement," the reader may refer to gesture analyzers 137 and 237 in FIGS. 3 and 5 and elsewhere in this disclosure.

In some embodiments, in step S435, generating, via the display appliance 200, one or more video frames comprising a second virtual object 262 such that an at least one movement, of the second virtual object 262 on the display appliance 200, is based at least in part on the first gesture movement M0 and the modulated light 270IRL emitted by the first controller device 100 within the 3D ambient space 302.

In some embodiments, in step S436, generating, via the display appliance 200, one or more sound effects based at least in part on the first gesture movement M0 and the modulated light 270IRL emitted by the first controller device 100 within the 3D ambient space 302. In various embodiments, the current step may be optional and not required.

In some embodiments, in step S437, generating, via the display appliance 200, one or more mechanical effects based at least in part on the first gesture movement M0 and the modulated light 270IRL emitted by the first controller device 100 within the 3D ambient space 302. In various embodiments, the current step may be optional and not required.

In some embodiments, in step S438, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may not be required in the method.

Finally, in some embodiments, in step S439, in response to determining, via the display appliance 200, that the method is not done, the method goes back to step S430. Otherwise the method is done, so the method ends. In the current embodiment, determining if the method is done may be based at least in part on a substantially periodic time interval or a detected periodic state, wherein the method may be continuously executed (looping from step S439 back to step S430) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S439 back to step S430) in a substantially aperiodic or on a needed basis. In other embodiments, the current step may not be required, or implemented elsewhere.

Figure 29A:
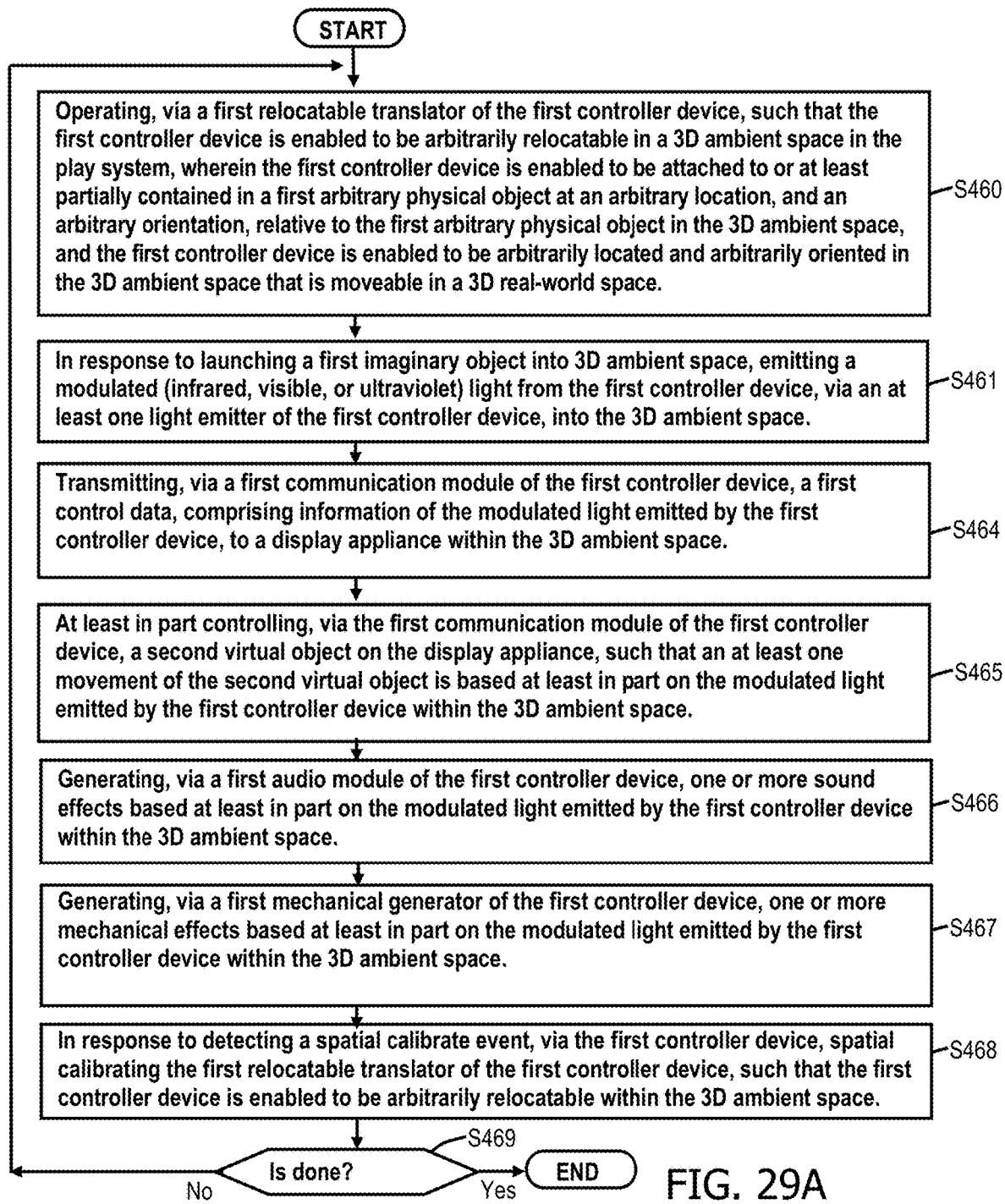
FIG. 29A is an alternative flowchart for the play system of FIG. 1, of a method for a first controller device, which enables launching a first imaginary object by emitting a modulated (infrared, visible, or ultraviolet) light into 3D ambient space.

Alternative Method for Controller Device to Launch "Projectile" Imaginary Object Turning now to FIG. 29A while referencing FIGS. 27, 1, 3, and 5, there shown is an alternative exemplary embodiment of a flowchart of a computer-implemented method for a controller device to launch an imaginary object within the 3D ambient space of the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 300:

In some embodiments, beginning with step S460, operating, via a first relocatable translator 134 of the first controller device 100, such that the first controller device 100 is enabled to be arbitrarily relocatable in a 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S461, in response to launching a first imaginary object 270 into 3D ambient space 302, emitting a modulated (infrared, visible, or ultraviolet) light 270IRL, via an at least one light emitter 159E of the first controller device 100, into the 3D ambient space 302.

In some embodiments, in step S464, transmitting, via a first communication module 118 of the first controller device 100, a first control data, comprising information of the modulated light 270IRL emitted by the first controller device 100, to a display appliance 200 within the 3D ambient space 302.

In some embodiments, in step S465, at least in part controlling, via the first communication module 118 of the first controller device 100, a second virtual object 262 on the display appliance 200 such that an at least one movement, of the second virtual object 262 on the display appliance 200, is based at least in part on the modulated light 270IRL emitted by the first controller device 100 within the 3D ambient space 302.

In some embodiments, in step S466, generating, via a first audio module 112 of the first controller device 100, one or more sound effects based at least in part on the modulated light 270IRL emitted by the first controller device 100 within the 3D ambient space 302. In various embodiments, the current step may be optional and not required.

In some embodiments, in step S467, generating, via a first mechanical generator 114 of the first controller device 100, one or more mechanical effects based at least in part on the modulated light 270IRL emitted by the first controller device 100 within the 3D ambient space 302. In various embodiments, the current step may be optional and not required.

In some embodiments, in step S468, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial Calibrate in Real-time." In some alternate embodiments, the current step may not be required in the method.

Finally, in some embodiments, in step S469, in response to determining, via the first controller device 100, that the method is not done, the method goes back to step S460. Otherwise the method is done, so the method ends. In the current embodiment, determining if the method is done may be based at least in part on a substantially periodic time interval or a detected periodic state, wherein the method may be continuously executed (looping from step S469 and back to step S460) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S469 and back to step S460) in a substantially aperiodic or on a needed basis. In other embodiments, the current step may not be required, or implemented elsewhere.

Figure 29B:
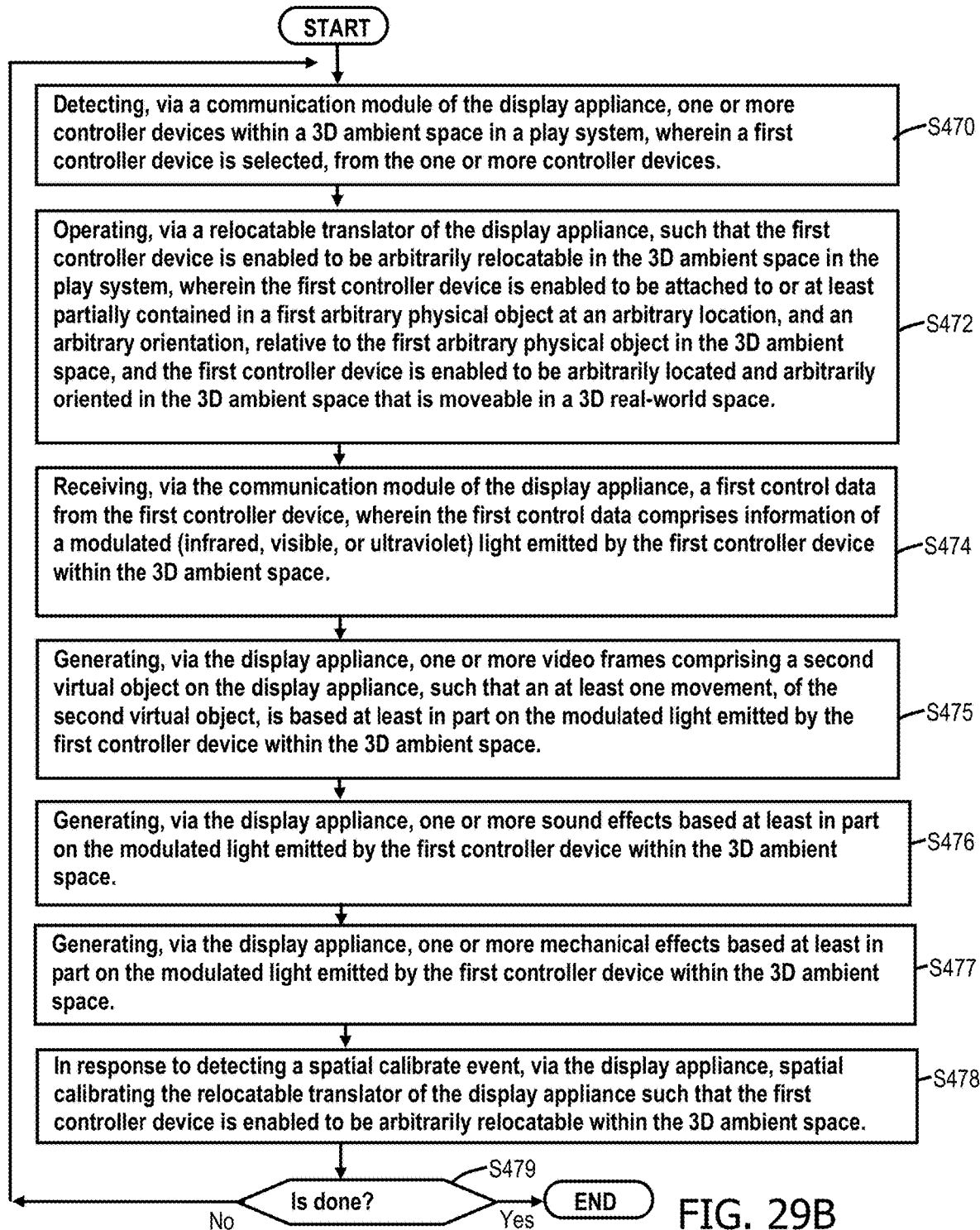
FIG. 29B is an alternative flowchart for the play system of FIG. 1, of a method for a display appliance, which enables a first controller device launching a first imaginary object by emitting a modulated (infrared, visible, or ultraviolet) light into 3D ambient space.

Alternative Method for Display Appliance to Launch "Projectile" Imaginary Object from Controller Device Turning now to FIG. 29B while referencing FIGS. 27, 1, 3, and 5, there shown is a flowchart of an exemplary embodiment of a computer-implemented method for a display appliance to launch one or more imaginary objects from one or more controller devices within the 3D ambient space of the play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S470, detecting, via a communication module 218 of the display appliance 200, one or more controller devices within a 3D ambient space 302 in the play system 300, wherein a first controller device 100 is selected, from the one or more controller devices. In the current embodiment, the first controller device 100 may be iteratively and sequentially selected from the one or more controller devices detected in the play system 300. In alternate embodiments, the first controller device 100 may be arbitrarily selected from the one or more controller devices detected in the play system 300, although other approaches may be considered as well.

In some embodiments, in step S472, operating, via a relocatable translator 234 of the display appliance 200, such that the first controller device 100 is enabled to be arbitrarily relocatable in the 3D ambient space 302 of the play system 300, wherein the first controller device 100 is enabled to be attached to or at least partially contained in a first arbitrary physical object 250 at an arbitrary location, and an arbitrary orientation, relative to the first arbitrary physical object 250 in the 3D ambient space 302, and the first controller device 100 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S474, receiving, via a communication module 218 of the display appliance 200, a first control data wherein the first control data comprises information of a modulated (infrared, visible, or ultraviolet) light 270IRL emitted by the first controller device 100 within the 3D ambient space 302.

In some embodiments, in step S475, generating, via the display appliance 200, one or more video frames comprising a second virtual object 262 such that an at least one movement, of the second virtual object 262 on the display appliance 200, is based at least in part on the modulated light 270IRL emitted by the first controller device 100 within the 3D ambient space 302.

In some embodiments, in step S476, generating, via the display appliance 200, one or more sound effects based at least in part on the modulated light 270IRL emitted by the first controller device 100 within the 3D ambient space 302. In various embodiments, the current step may be optional and not required.

In some embodiments, in step S477, generating, via the display appliance 200, one or more mechanical effects based at least in part on the modulated light 270IRL emitted by the first controller device 100 within the 3D ambient space 302. In various embodiments, the current step may be optional and not required.

In some embodiments, in step S478, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may not be required in the method.

Finally, in some embodiments, in step S479, in response to determining, via the display appliance 200, that the method is not done, the method goes back to step S470. Otherwise the method is done, so the method ends. In the current embodiment, determining if the method is done may be based at least in part on a substantially periodic time interval or a detected periodic state, wherein the method may be continuously executed (looping from step S479 back to step S470) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S479 back to step S470) in a substantially aperiodic or on a needed basis. In other embodiments, the current step may not be required, or implemented elsewhere.

Collision of Controller Device with "Projectile" Imaginary Object

In many embodiments of a play system, a moving imaginary object, upon colliding with a controller device and arbitrary physical object, may simulate a projectile hit and crash effect in the 3D ambient space. In some embodiments, an imaginary object may launch, move across 3D ambient space, and collide with one or more controller devices and arbitrary physical objects within the 3D ambient space, much like a real-world projectile. Such an imaginary object may be referred to as a projectile imaginary object in this disclosure.

So in various game application embodiments, a second controller device (and second arbitrary physical object) may launch a first imaginary object, such as by a user/player, via user input to the play system, or may be randomly launched, via computer generation by the play system, within 3D ambient space. Whereupon, the first imaginary object may move across the 3D ambient space—resulting in an at least indirect collision of a first controller device and first arbitrary physical object with the first imaginary object within the 3D ambient space of the play system.

Thus, in various embodiments, a projectile imaginary object may represent, but not limited to, a rocket fired at another player's character, a lightning bolt to zap a villain, a protective shield that envelops a friendly character, a magic spell cast at another character or object, a time transforming event that sends a character forward or backward in virtual time within a game, a space transforming event that sends a character to another virtual location within a game, or any other type of object may be considered to represent an imaginary object.

So turning briefly back to FIG. 27 while referencing FIGS. 1, 3, and 5, there shown is an embodiment of play activity operations that results in an indirect collision of a first imaginary object 270, which is a projectile imaginary object, with a first controller device 101 and first arbitrary physical object 101 within a 3D ambient space 302. The play system 300 may implement the 3D ambient space 302 defined by spatial axis X, Y, and Z. And the play system 300 may implement a 3D virtual space 204 defined by spatial axis I, J, and K. As depicted, at least a portion of the virtual space 204 is visually presented on a display appliance 200 that includes a video display 256.

Note that for discussion purposes, the controller devices have been reversed in order from the previous discussion of "Launching a Projectile Imaginary Object from a Controller Device." Whereby, as shown are the first controller device 101 and first arbitrary physical object 251 (e.g., a toy action figure). And a second controller device 100 and a second arbitrary physical object 250 (e.g., a toy robot). Wherein, the controller devices 100 and 101 may be configured with similar apparatus and functionality, as described earlier in FIGS. 2 and 3. And the controller devices 100 and 101 may be already arbitrarily located and connected, associated, and spatial calibrated with their respective arbitrary physical objects 250 and 251, as described earlier in FIGS. 6A-6D.

Also shown, the first controller device 101 may be configured with a light sensor 158S, as discussed earlier (in FIGS. 2 and 3). Wherein, the first controller device 101 and the light sensor 158S may be configured to detect a modulated (infrared, visible, or ultraviolet) light 270IRL within the 3D ambient space. Also shown, the second controller device 100 may be configured with a light emitter 159E, as discussed earlier (in FIGS. 2 and 3). Wherein the second controller device 100 and the light emitter 159E may be configured to emit a modulated (infrared, visible, or ultraviolet) light 270IRL outward into the 3D ambient space 302.

So to begin, in some embodiments of play activity operations, a player/user (not shown) may pick up (e.g. handhold) and make a first gesture movement M0 with the second controller device 101 and second arbitrary physical object 250 within the 3D ambient space. Whereupon, in response to the gesture movement M0, the second controller device 101, via the light emitter 159E, may be emitting a modulated (infrared, visible, or ultraviolet) light 270IRL, into the 3D ambient space 302.

Whereupon, in some embodiments of play activity operations, the first controller device 101 may detect, via the at least one light sensor 158S, a modulated (infrared, visible, or ultraviolet) light 270IRL within the 3D ambient space. The first controller device 101 may transmit a first control data, comprising information of the modulated light 270IRL detected by the first controller device 101, to the display appliance 200 within 3D ambient space 302. And accordingly, in some embodiments, the first controller device 101 may be at least in part controlling a first virtual object 261 (e.g., a dragon) on the display appliance 200 such that an at least one movement VM1, of the first virtual object 261 on the display appliance 200, is based at least in part on the modulated light 270IRL detected by the first controller device 101 within 3D ambient space 302 of the play system 300.

Further, in some embodiments of play activity operations, the first controller device 101 may be enabled to detect an at least indirect collision of the first controller device 101 (and the first arbitrary physical object 250) with the first imaginary object 270 (e.g., representing a lightning bolt) within the 3D ambient space 302.

Moreover, in various embodiments of play activity operations, the display appliance 200 may be enabled to detect an at least indirect collision of the first controller device 101 (and the first arbitrary physical object 251) with the first imaginary object 270 (e.g., representing a lightning bolt) within the 3D ambient space 302. For example, in various embodiments of play activity operations, detecting an at least indirect collision of the first controller device 101 (and the first arbitrary physical object 251) with the first imaginary object 270 in 3D ambient space 302 may be based at least in part on a spatial distance D, between the first controller device 100 and the first imaginary object 270, is less than or equal to a close proximity threshold distance CPTD in 3D ambient space 302, although alternative operations for detecting close proximity may be considered as well. For general information about "close proximity," the reader may refer to the collision analyzer 238 (in FIG. 5) and elsewhere in this disclosure.

Finally, in some embodiments of play activity operations, the play system 300 may provide helpful tips to one or more users and players. In various application embodiments, the play system 300 comprising one or more controller devices and display appliances may further generate video with graphic indicators, sound effects, and/or human speech sound effects to convey to a player/user a collision with an imaginary object. For example, video with graphic indicators may include, but not limited to, a graphic arrow or "X marks the spot" icon showing the collision of an imaginary object. Sound effects may include, but not limited to, an "explosion," "zapping," or "crunch" sound effect is generated when collision with an imaginary object has occurred. Human speech sound effects may include user instructions, but not limited to, "Object is hit!" "Object is destroyed!" or "Rocket hit Dragon!" to describe the collision with an imaginary object. Wherein, the play system 300 may be operable to generate visual, sound, and mechanical effects based on an indirect collision with an imaginary object within the 3D ambient space. For further details related to imaginary objects, the reader may refer to the section "Imaginary Objects in Ambient Space of the Play System" for FIG. 1 and elsewhere in this disclosure.

Figure 30A:
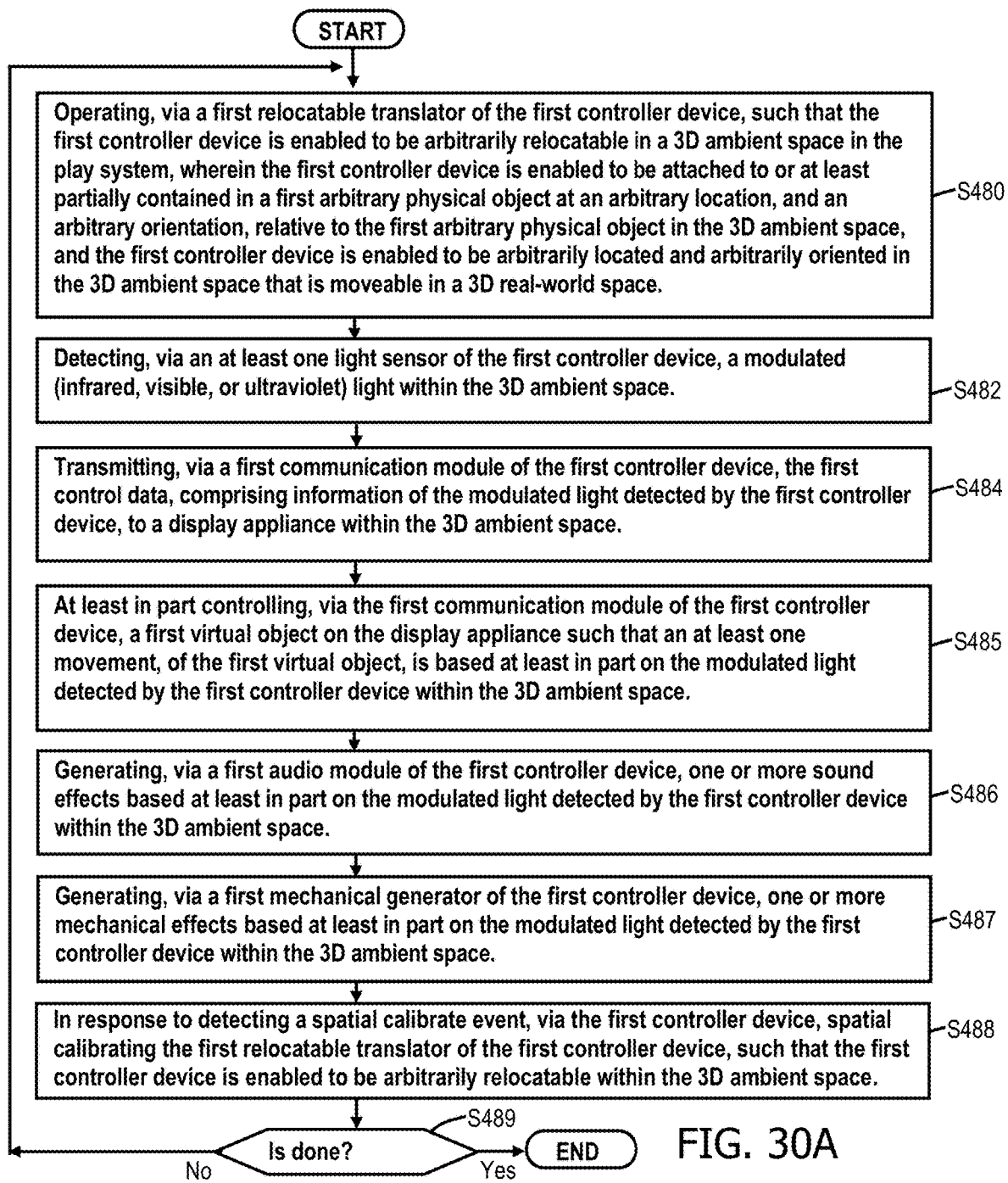
FIG. 30A is a flowchart for the play system of FIG. 1, of a method for a first controller device, which enables detecting a modulated (infrared, visible, or ultraviolet) light within the 3D ambient space.

Method for Controller Device to Detect Collision with "Projectile" Imaginary Object Turning now to FIG. 30A while referencing FIGS. 27, 1, 3, and 5, there shown is a flowchart of an exemplary embodiment of a computer-implemented method for a controller device that detects an imaginary object within the 3D ambient space of the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 101 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 101, including one or more control units 110 and a first memory 120, wherein the one or more control units 110 execute computer instructions performing first operations in a play system 300:

In some embodiments, beginning with step S480, operating, via a first relocatable translator 134 of the first controller device 101, such that the first controller device 101 is enabled to be arbitrarily relocatable in a 3D ambient space 302 of the play system 300, wherein the first controller device 101 is enabled to be attached to or at least partially contained in a first arbitrary physical object 251 at an arbitrary location, and an arbitrary orientation, relative to the first arbitrary physical object 251 in the 3D ambient space 302, and the first controller device 101 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S482, detecting, via an at least one light sensor 158S of the first controller device 101, a modulated (infrared, visible, or ultraviolet) light 270IRL within the 3D ambient space 302.

In some embodiments, in step S484, transmitting, via a first communication module 118 of the first controller device 101, a first control data, comprising information of the modulated light 270IRL detected by the first controller device 101, to a display appliance 200 within the 3D ambient space 302.

In some embodiments, in step S485, at least in part controlling, via the first communication module 118 of the first controller device 101, a first virtual object 261 on the display appliance 200 such that an at least one movement, of the first virtual object 261 on the display appliance 200, is based at least in part on the modulated light 270IRL detected by the first controller device 101 within the 3D ambient space 302.

In some embodiments, in step S486, generating, via a first audio module 112 of the first controller device 101, one or more sound effects based at least in part on the modulated light 270IRL detected by the first controller device 101 within the 3D ambient space 302. In various embodiments, the current step may be optional and not required.

In some embodiments, in step S487, generating, via a first mechanical generator 114 of the first controller device 101, one or more mechanical effects based at least in part on the modulated light 270IRL detected by the first controller device 101 within the 3D ambient space 302. In various embodiments, the current step may be optional and not required.

In some embodiments, in step S488, in response to detecting a spatial calibrate event, via the first controller device 100, spatial calibrating the relocatable translator 134 of the first controller device 100, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial Calibrate in Real-time." In some alternate embodiments, the current step may not be required in the method.

Finally, in some embodiments, in step S489, in response to determining, via the first controller device, that the method is not done, the method goes back to step S480. Otherwise the method is done, so the method ends. In the current embodiment, determining if the method is done may be based at least in part on a substantially periodic time interval or a detected periodic state, wherein the method may be continuously executed (looping from step S489 and back to step S480) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S489 and back to step S480) in a substantially aperiodic or on a needed basis. In other embodiments, the current step may not be required, or implemented elsewhere.

Figure 30B:
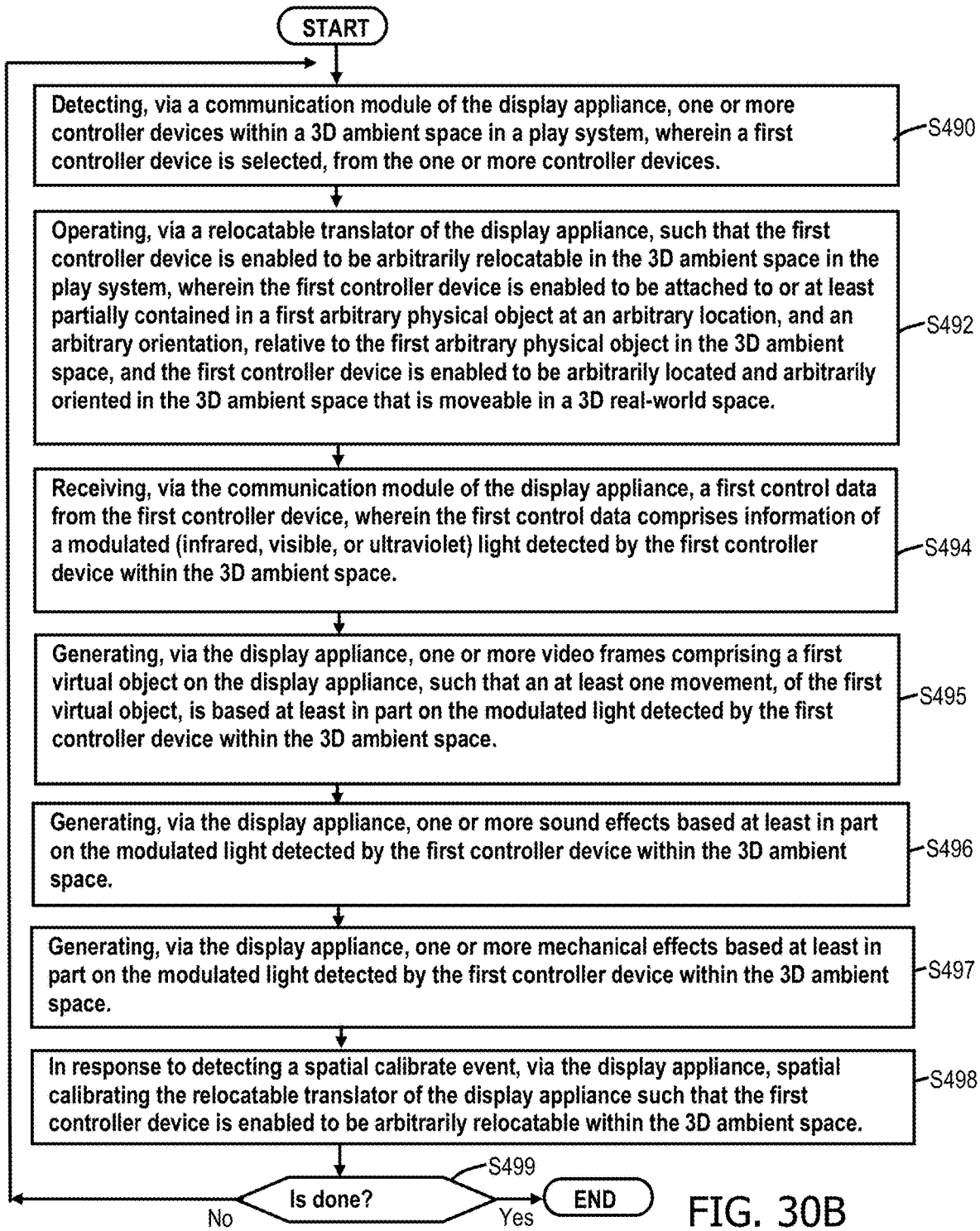
FIG. 30B is a flowchart for the play system of FIG. 1, of a method for a display appliance, which enables a first controller device detecting a modulated (infrared, visible, or ultraviolet) light within the 3D ambient space.

Method for Display Appliance to Detect Collision of Controller Device with "Projectile" Imaginary Object Turning now to FIG. 30B while referencing FIGS. 27, 1, 3, and 5, there shown is a flowchart of an exemplary embodiment of a computer-implemented method for a display appliance that detects collisions of one or more controller devices with imaginary objects within the 3D ambient space of the play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S490, detecting one or more controller devices, via a communication module 218 of the display appliance 200, wherein a first controller device 101 is selected, from the one or more controller devices within a 3D ambient space 302. In the current embodiment, the first controller device 101 may be iteratively and sequentially selected, from the one or more controller devices detected in the play system 300, whenever the current step is executed. In alternate embodiments, the first controller device 101 may be arbitrarily selected from the one or more controller devices, detected in the play system 300, although other approaches may be considered as well.

In some embodiments, in step S492, operating, via a relocatable translator 234 of the display appliance 200, such that the first controller device 101 is enabled to be arbitrarily relocatable in the 3D ambient space 302 of the play system 300, wherein the first controller device 101 is enabled to be attached to or at least partially contained in a first arbitrary physical object 251 at an arbitrary location, and an arbitrary orientation, relative to the first arbitrary physical object 251 in the 3D ambient space 302, and the first controller device 101 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S494, receiving, via a communication module 218 of the display appliance 200, a first control data from the first controller device 101, wherein the first control data comprises information of a modulated (infrared, visible, or ultraviolet) light 270IRL detected by the first controller device 101 within the 3D ambient space 302.

In some embodiments, in step S495, generating, via the display appliance 200, one or more video frames comprising a first virtual object 261 on the display appliance 200 such that an at least one movement, of the first virtual object 261, is based at least in part on the modulated light 270IRL detected by the first controller device 101 within the 3D ambient space 302.

In some embodiments, in step S496, generating, via the display appliance 200, one or more sound effects based at least in part on the modulated light 270IRL detected by the first controller device 101 within the 3D ambient space 302. In various embodiments, the current step may be optional and not required.

In some embodiments, in step S497, generating, via the display appliance 200, one or more mechanical effects based at least in part on the modulated light 270IRL detected by the first controller device 101 within the 3D ambient space 302. In various embodiments, the current step may be optional and not required.

In some embodiments, in step S498, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may not be required in the method.

Finally, in some embodiments, in step S499, in response to determining, via the display appliance 200, that the method is not done, the method goes back to step S490. Otherwise the method is done, so the method ends. In the current embodiment, determining if the method is done may be based at least in part on a substantially periodic time interval or a detected periodic state, wherein the method may be continuously executed (looping from step S499 back to step S490) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S499 back to step S490) in a substantially aperiodic or on a needed basis. In other embodiments, the current step may not be required, or implemented elsewhere.

Figure 31A:
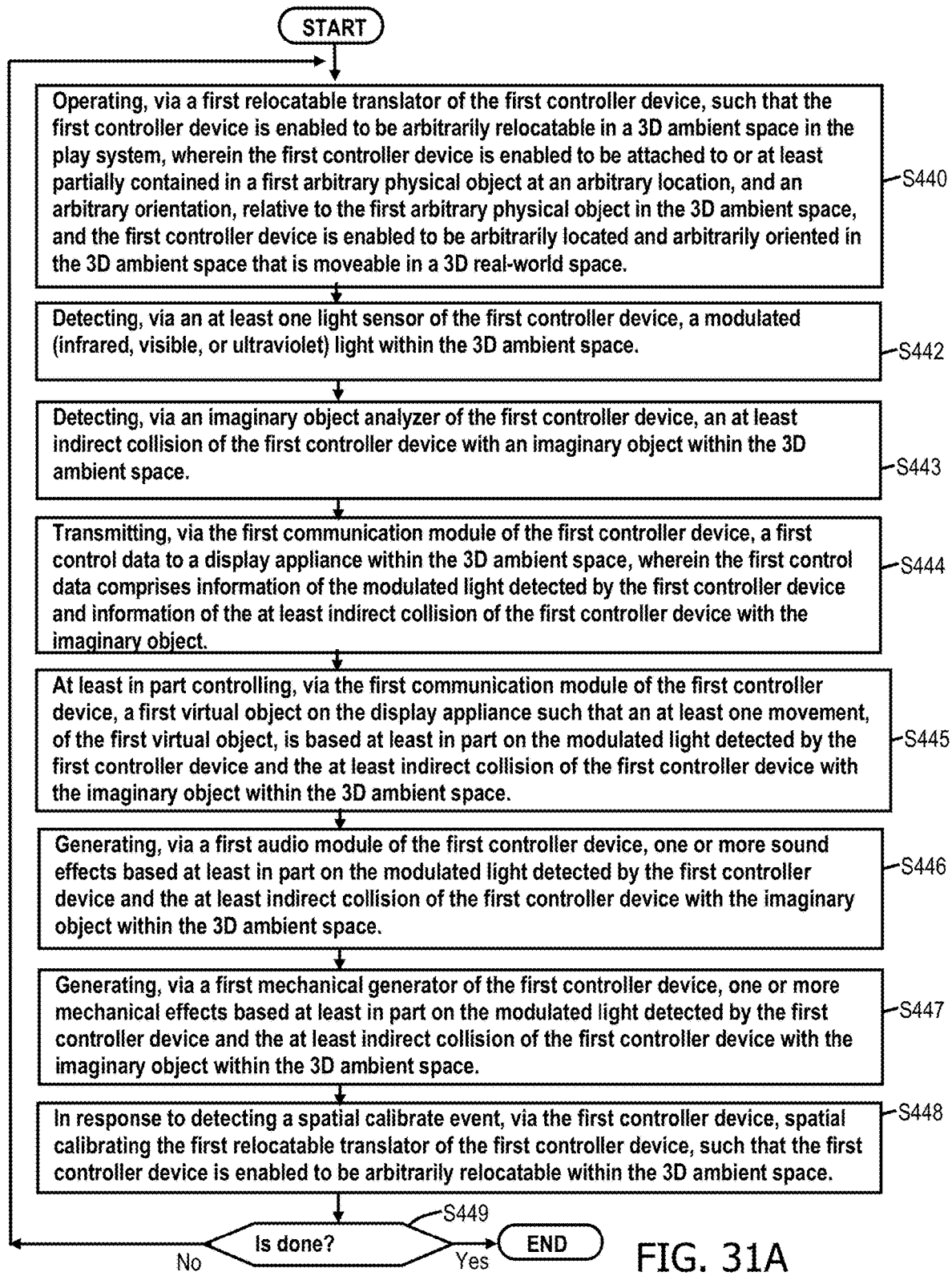
FIG. 31A is an alternative flowchart for the play system of FIG. 1, of a method for a first controller device, for detecting a modulated (infrared, visible, or ultraviolet) light and an at least indirect collision of the first controller device, and first arbitrary physical object, with a first imaginary object.

Alternative Method for Controller Device to Detect Collision with "Projectile" Imaginary Object Turning now to FIG. 31A while referencing FIGS. 27, 1, 3, and 5, there shown is a flowchart of an exemplary embodiment of a computer-implemented method for a controller device that detects an imaginary object within the 3D ambient space of the play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 101 of the play system 300. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 101, including one or more control units 110 and a first memory 120, wherein the one or more control units 110 execute computer instructions performing first operations in a play system 300:

In some embodiments, beginning with step S440, operating, via a first relocatable translator 134 of the first controller device 101, such that the first controller device 101 is enabled to be arbitrarily relocatable in a 3D ambient space 302 of the play system 300, wherein the first controller device 101 is enabled to be attached to or at least partially contained in a first arbitrary physical object 251 at an arbitrary location, and an arbitrary orientation, relative to the first arbitrary physical object 251 in the 3D ambient space 302, and the first controller device 101 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S442, detecting, via an at least one light sensor 158S of the first controller device 101, a modulated (infrared, visible, or ultraviolet) light 270IRL within the 3D ambient space 302.

In some embodiments, in step S443, detecting, via an imaginary object analyzer of the first controller device 101, an at least indirect collision of the first controller device 101 with an imaginary object 270 in the 3D ambient space 302.

In some embodiments, in step S444, transmitting, via a first communication module 118 of the first controller device 101, a first control data to a display appliance 200 within the 3D ambient space 302, wherein the first control data comprises information of the modulated light detected by the first controller device 101 and information of the at least indirect collision of the first controller device 101 with the imaginary object 270 within 3D ambient space.

In some embodiments, in step S445, at least in part controlling, via the first communication module 118 of the first controller device 101, a first virtual object 261 on the display appliance 200 such that an at least one movement VM1, of the first virtual object 261 on the display appliance 200, is based at least in part on the modulated light 270IRL detected by the first controller device 101 and the at least indirect collision of the first controller device 101 with the imaginary object 270 in the 3D ambient space 302.

In some embodiments, in step S446, generating, via a first audio module 112 of the first controller device 101, one or more sound effects based at least in part on the modulated light 270IRL detected by the first controller device 101 and the at least indirect collision of the first controller device 101 with the imaginary object 270 in the 3D ambient space 302. In various embodiments, the current step may be optional and not required.

In some embodiments, in step S447, generating, via a first mechanical generator 114 of the first controller device 101, one or more mechanical effects based at least in part on the modulated light 270IRL detected by the first controller device 101 and the at least indirect collision of the first controller device 101 with the imaginary object 270 in the 3D ambient space 302. In various embodiments, the current step may be optional and not required.

In some embodiments, in step S448, in response to detecting a spatial calibrate event, via the first controller device 101, spatial calibrating the relocatable translator 134 of the first controller device 101, such that the first controller device 101 is enabled to be arbitrarily relocatable within the 3D ambient space 302, wherein the first controller device 101 is enabled to be attached to or at least partially contained in a first arbitrary physical object 251 at an arbitrary location, and an arbitrary orientation, relative to the arbitrary physical object 251 within the 3D ambient space 302, and the first controller device 101 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial Calibrate in Real-time." In some alternate embodiments, the current step may not be required in the method.

Finally, in some embodiments, in step S449, in response to determining, via the first controller device, that the method is not done, the method goes back to step S440. Otherwise the method is done, so the method ends. In the current embodiment, determining if the method is done may be based at least in part on a substantially periodic time interval or a detected periodic state, wherein the method may be continuously executed (looping from step S449 and back to step S440) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S449 and back to step S440) in a substantially aperiodic or on a needed basis. In other embodiments, the current step may not be required, or implemented elsewhere.

Figure 31B:
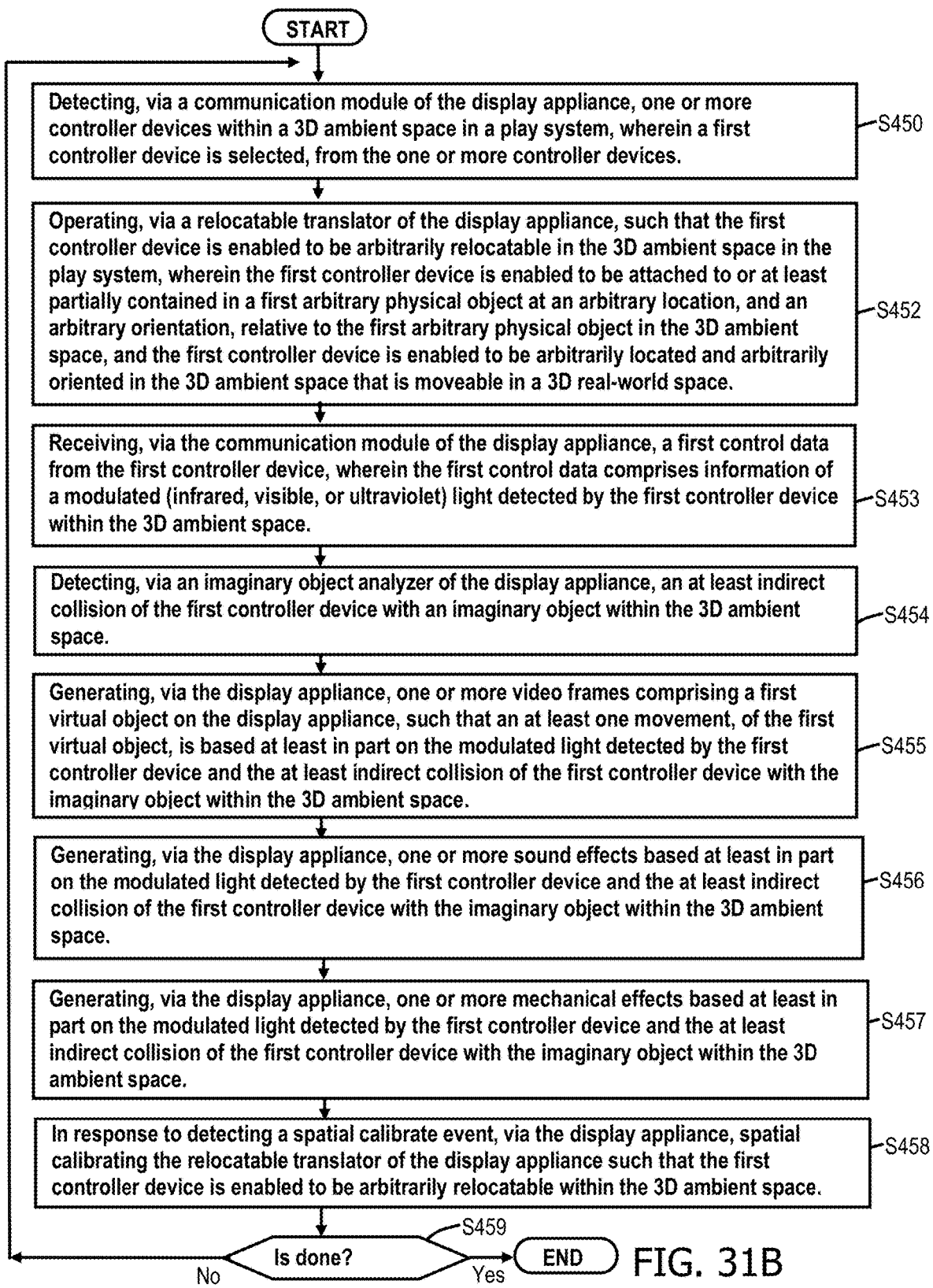
FIG. 31B is an alternative flowchart for the play system of FIG. 1, of a method for a display appliance, which enables a first controller device detecting a modulated (infrared, visible, or ultraviolet) light and an at least indirect collision of the first controller device, and first arbitrary physical object, with a first imaginary object.

Alternative Method for Display Appliance to Detect Collision of Controller Device with "Projectile" Imaginary Object Turning now to FIG. 31B while referencing FIGS. 27, 1, 3, and 5, there shown is a flowchart of an exemplary embodiment of a computer-implemented method for a display appliance that detects collisions of one or more controller devices with imaginary objects within the 3D ambient space of the play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 200 of the play system 300. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 200, including one or more control units 210 and a first memory 220, wherein the one or more control units 210 execute computer instructions performing first operations in a play system 300:

In some embodiments, beginning with step S450, detecting one or more controller devices, via a communication module 218 of the display appliance 200, wherein a first controller device 101 is selected, from the one or more controller devices within a 3D ambient space 302. In the current embodiment, the first controller device 101 may be iteratively and sequentially selected, from the one or more controller devices detected in the play system 300, whenever the current step is executed. In alternate embodiments, the first controller device 101 may be arbitrarily selected from the one or more controller devices, detected in the play system 300, although other approaches may be considered as well.

In some embodiments, in step S452, operating, via a relocatable translator 234 of the display appliance 200, such that the first controller device 101 is enabled to be arbitrarily relocatable in the 3D ambient space 302 of the play system 300, wherein the first controller device 101 is enabled to be attached to or at least partially contained in a first arbitrary physical object 251 at an arbitrary location, and an arbitrary orientation, relative to the first arbitrary physical object 251 in the 3D ambient space 302, and the first controller device 101 is enabled to be arbitrarily located and arbitrarily oriented in the 3D ambient space 302 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S453, receiving, via a communication module 218 of the display appliance 200, a first control data from the first controller device 101 within 3D ambient space, wherein the first control data comprises information of a modulated (infrared, visible, or ultraviolet) light 270IRL detected by the first controller device 101 within the 3D ambient space 302.

In some embodiments, in step S454, detecting, via an imaginary object analyzer of the display appliance 200, an at least indirect collision of the first controller device 101 with an imaginary object 270 in the 3D ambient space 302.

In some embodiments, in step S455, generating, via the display appliance 200, one or more video frames comprising a first virtual object 261 on the display appliance 200 such that an at least one movement VM1, of the first virtual object 261, is based at least in part on the modulated light 270IRL detected by the first controller device 101 and the at least indirect collision of the first controller device 101 with the imaginary object 270 in the 3D ambient space 302.

In some embodiments, in step S456, generating, via the display appliance 200, one or more sound effects based at least in part on the modulated light 270IRL detected by the first controller device 101 and the at least indirect collision of the first controller device 101 with the imaginary object 270 in the 3D ambient space 302. In various embodiments, the current step may be optional and not required.

In some embodiments, in step S457, generating, via the display appliance 200, one or more mechanical effects based at least in part on the modulated light 270IRL detected by the first controller device 101 and the at least indirect collision of the first controller device 101 with the imaginary object 270 in the 3D ambient space 302. In various embodiments, the current step may be optional and not required.

In some embodiments, in step S458, in response to detecting a spatial calibrate event, via the display appliance 200, spatial calibrating the relocatable translator 234 of the display appliance 200, such that the first controller device 100 is enabled to be arbitrarily relocatable within the 3D ambient space 302, wherein the first controller device 100 is enabled to be attached to or at least partially contained in a first arbitrary physical object 250 at an arbitrary location, and an arbitrary orientation, relative to the arbitrary physical object 250 within the 3D ambient space 302, and the first controller device 100 is enabled to be arbitrarily located and arbitrarily oriented in the 3D ambient space 302 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may not be required in the method.

Finally, in some embodiments, in step S459, in response to determining, via the display appliance 200, that the method is not done, the method goes back to step S450. Otherwise the method is done, so the method ends. In the current embodiment, determining if the method is done may be based at least in part on a substantially periodic time interval or a detected periodic state, wherein the method may be continuously executed (looping from step S459 back to step S450) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S459 back to step S450) in a substantially aperiodic or on a needed basis. In other embodiments, the current step may not be required, or implemented elsewhere.

Multiple Play Systems with First Person Game Application

Figure 32:
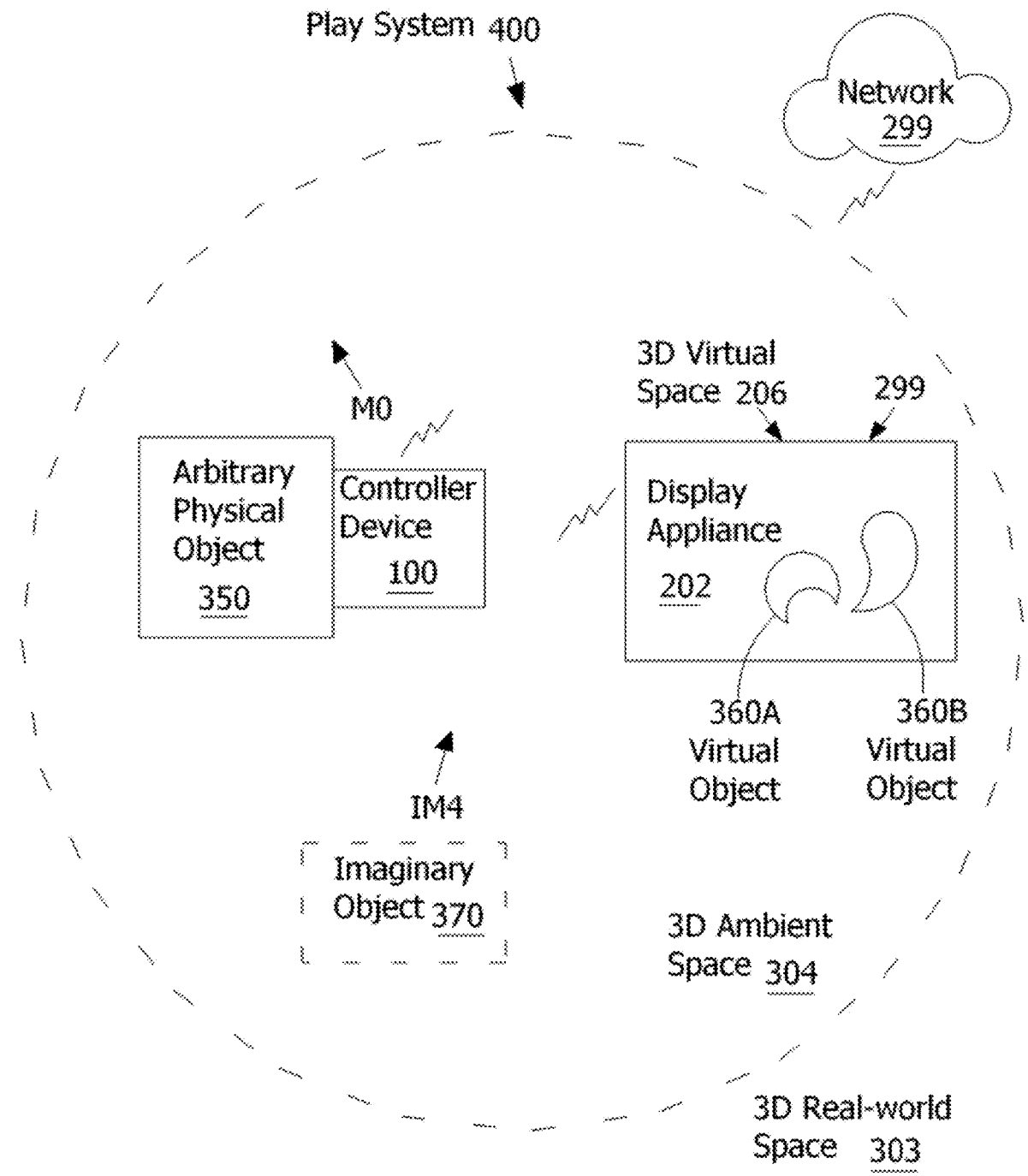
FIG. 32 is a block diagram of a second embodiment of a local play system, which comprises a controller device, an arbitrary physical object, an imaginary object, and a display appliance within a 3D ambient space.
Figure 35:
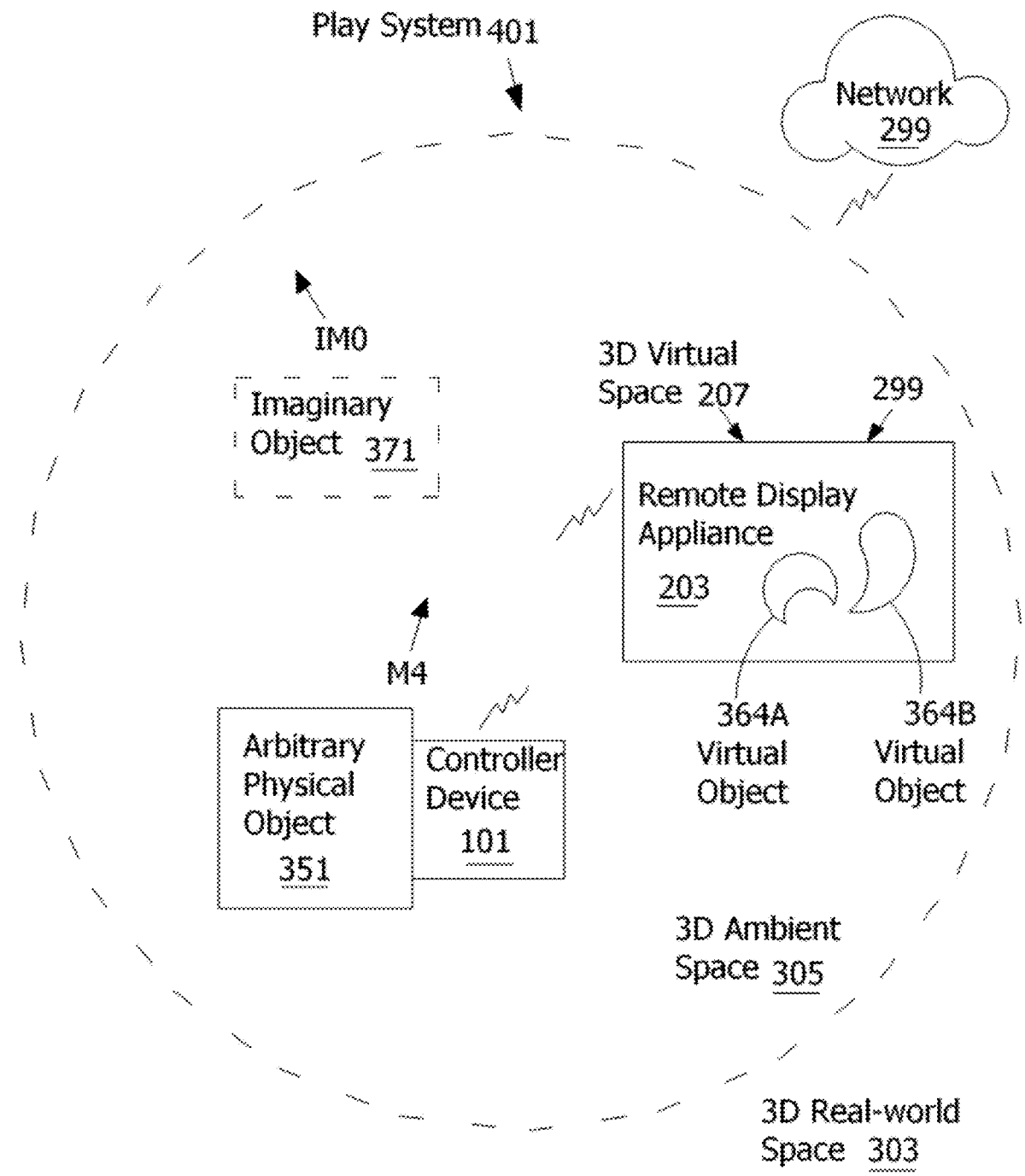
FIG. 35 is a block diagram of a third embodiment of a remote play system, which comprises a controller device, an arbitrary physical object, an imaginary object, and a display appliance within a 3D ambient space.

Turning now to FIGS. 32 and 35, there shown are embodiments of a plurality of play systems, presented as block diagrams referred to as a local play system 400 in FIG. 32 and a remote play system 401 in FIG. 35. Wherein, the local play system 400 and the remote play system 401 may be located at the same location or separated in a 3D real-world space 303 by a spatial distance (e.g., one meter to thousands of kilometers) apart. Yet the local play system 400 and the remote play system 401 may be configured to communicate with each other such that the systems 400 and 401 remain interactive. Further, the play systems 400 and 401 may have similar apparatus and functionality as the previously disclosed play system 300 (in FIGS. 1 through 31B), wherein the reader may refer to the previous description for details. However, the play systems 400 and 401 do have some differences relative to previously discussed play system, which will be described below.

Local Play System Setup

So turning to FIG. 32, the local play system 400 may be configured to communicate, via a computer network 299 (e.g., wideband computer network, cloud network, etc.), and interact with one or more remote play systems. For example, the local play system 400 may communicate and interact with the remote play system 401 (shown in FIG. 35), which may be located at the same location or separated by a spatial distance (e.g., one meter to thousands of kilometers) in a real-world space 303 anywhere in the world.

The 3D ambient space 304 (as outlined by a circular dashed line) may be considered the play region existing in the 3D real-world space 303, which naturally surrounds the users of the play system 400 at a single site or location. The 3D ambient space 304 may be configured similar to previously disclosed embodiments (e.g., such as ambient space 302 of FIG. 1), wherein the reader may refer to such discussions.

One or more controller devices, such as a first controller device 100, may be included in the local play system 400. The controller device 100 may be configured similar to previously disclosed embodiments (e.g., such as controller device 100 of FIGS. 1, 2A-2D, and 3), wherein the reader may refer to such discussions. The first controller device 100 may be configured to connect to a first arbitrary physical object 350 within a three-dimensional (3D) ambient space 304 by a player or user (not shown). The first controller device 100 and first arbitrary physical object 350 may be configured similar to previously disclosed embodiments (e.g., such as controller device 100 and arbitrary physical object 350 of FIG. 1), wherein the reader may refer to such discussions.

Figure 34A:
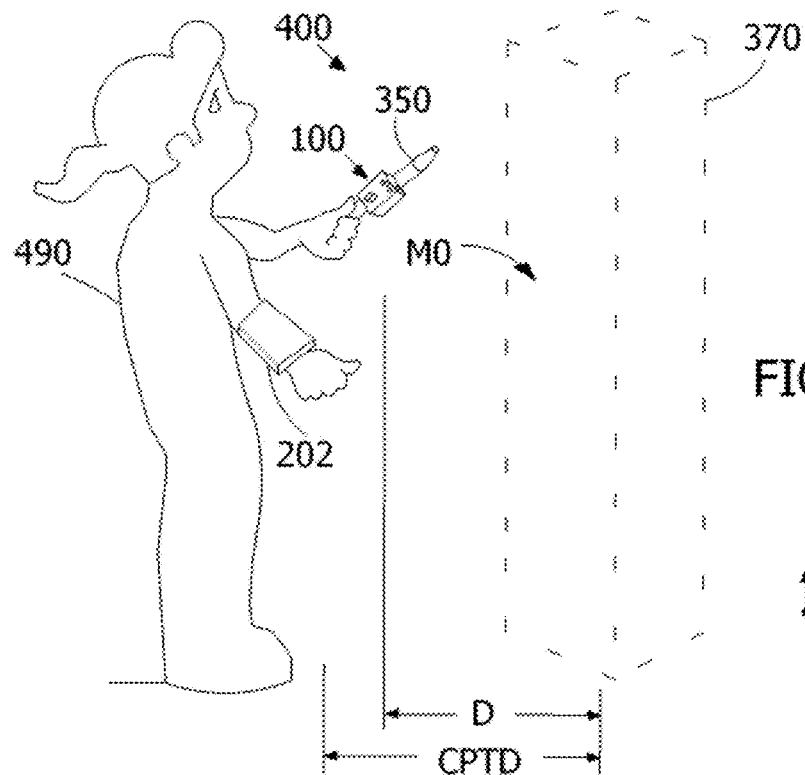
FIG. 34A is a perspective view for the play system of FIG. 32, where a controller device and arbitrarily physical object are moved and rotated in 3D ambient space by a user, with a display appliance attached to the arm of the user.
Figure 34B:
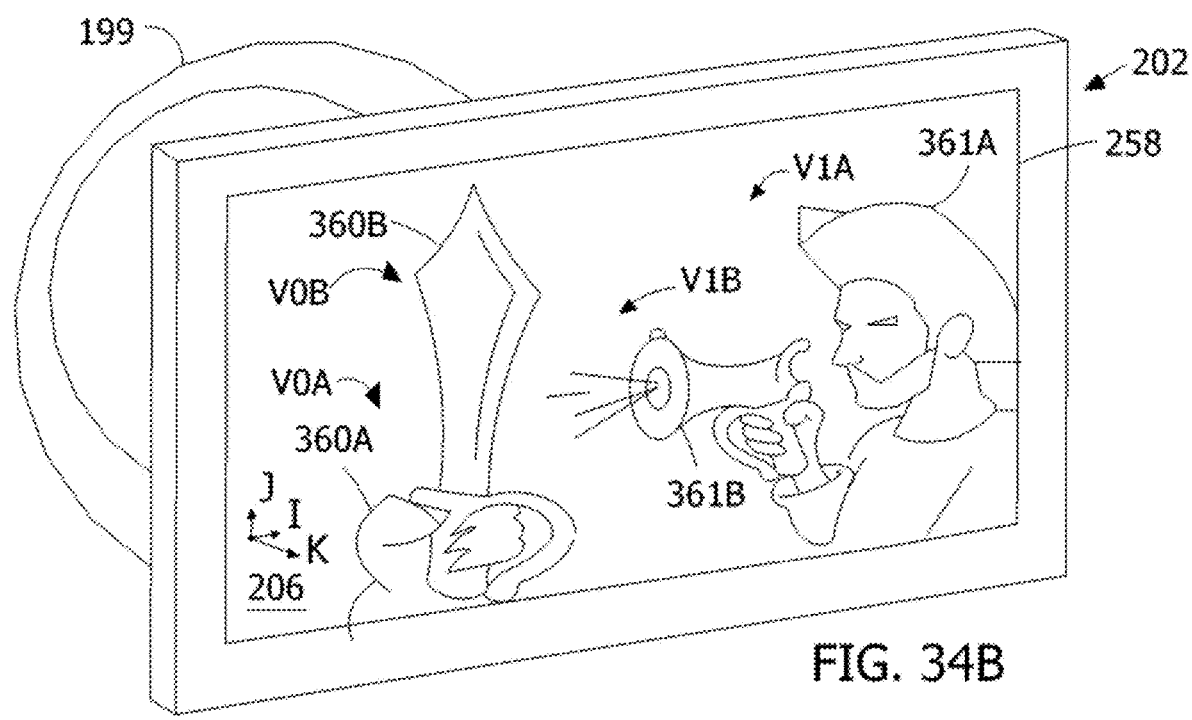
FIG. 34B is a perspective view for the play system of FIG. 32, of a display appliance.

One more display appliances, such as a display appliance 202, may be included in the local play system 400. Display appliance 202 may be, for example, a smartphone for compactness and mobility with a flexible strap 199 attachable to the local user 490 (as shown in FIGS. 34A and 34B). The display appliance 202 may be configured similar to previously disclosed embodiments (e.g., such as display appliance 200 of FIGS. 1, 4, and 5), wherein the reader may refer to such discussions. The display appliance 202 may be configured with a first person game application within its memory. Wherein, the first person game application may be configured similar to previously disclosed embodiments (e.g., as game application 222 in memory 220 of FIG. 5), wherein the reader may refer to such discussions.

One or more virtual objects may appear on a video display, such as a first virtual object 360A and the one or more support virtual objects 360B on the display appliance 202 of the play system 400. The virtual objects 360A and 360B on the display appliance 202 may be configured similar to previously disclosed embodiments (e.g., such as virtual object 260 of FIG. 1), wherein the reader may refer to such discussions.

One or more imaginary objects 370 (shown with a dashed outline) may be hidden in the 3D ambient space 304 by the play system 400. The imaginary object 370 may be configured similar to previously disclosed embodiments (e.g., such as imaginary object 270 of FIG. 1), wherein the reader may refer to such discussions.

Finally, the local play system 400 may also be configured, with apparatus and functionality, such that the play system 400 can communicate with a computer network 299 (e.g., wideband network, cloud network, etc.). For example, the controller device 100 and display appliance 202 may be configured similar to previously disclosed embodiments (e.g., such as communication module 118 of controller device 100 of FIG. 3 and/or communication module 218 of the display appliance 200 of FIG. 5), wherein the reader may refer to such discussions. The computer network 299 may comprise, for example, one or more controller devices 100 and/or display appliances 202 comprising communication modules configured to wirelessly transmit and receive signals or data across a computer network 299. Whereby, the local play system 400 can communicate across the computer network 299 and interact with one or more remote play systems 401 (shown in FIG. 35), which may be located at the same location or separated by a spatial distance (e.g., one meter to thousands of kilometers) in a real-world space 303 anywhere in the world.

Connecting First Controller Device to First Arbitrary Physical Object

Figure 33A:
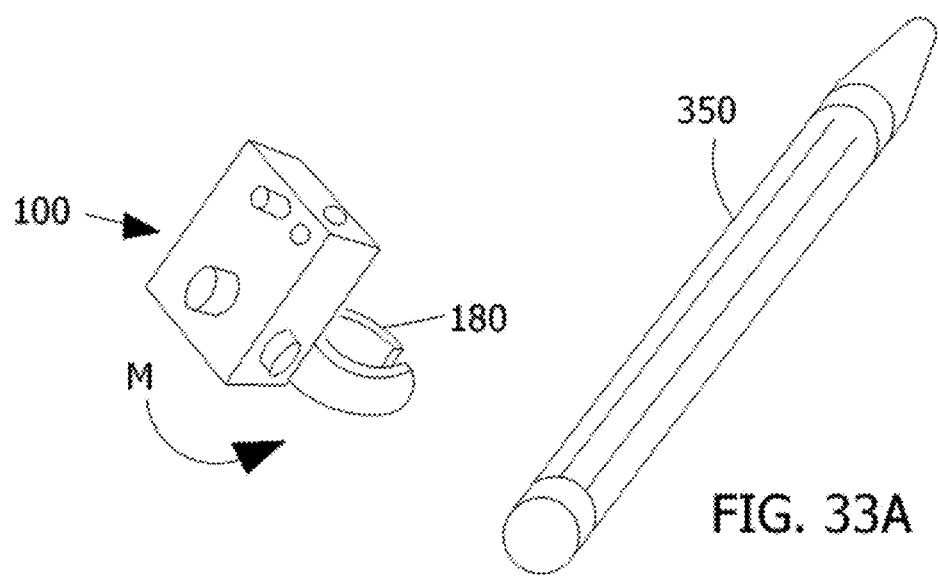
FIG. 33A is a perspective view for the play system of FIG. 32, of a first controller device and a first arbitrary physical object, prior to connecting.
Figure 33B:
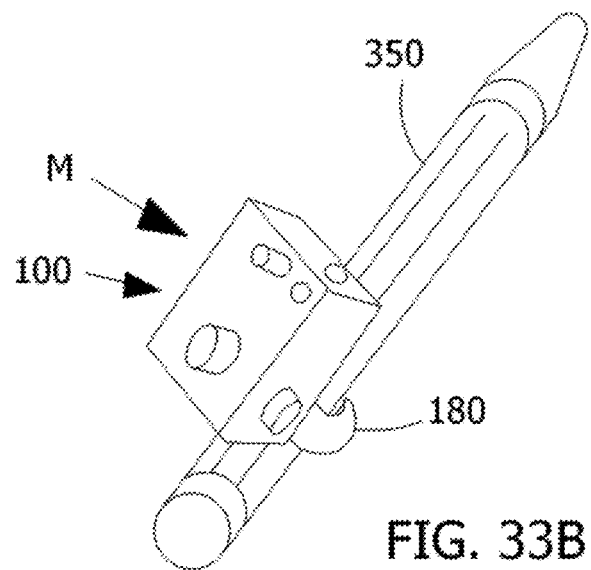
FIG. 33B is a perspective view for the play system of FIG. 32, of a first controller device and a first arbitrary physical object, after connecting.

Now turning to FIGS. 33A and 33B while referencing FIG. 32, there shown are perspective views of an operation related to connecting the first controller device 100 with the first arbitrary physical object 350 in the play system 400.

In FIG. 33A, presented is the first controller device 100 with the first arbitrary physical object 350, which may be, for example, a "writing pen" found in the 3D ambient space 304 (in FIG. 32). The first arbitrary physical object 350 may be selected (e.g. picked up in the hand) from the 3D ambient space by a local user (not shown). Whereupon, the user may grip (e.g. handhold) the first controller device 100 and rotate its clip object connector 180 in an inward direction M, as shown in FIG. 33A.

Then in FIG. 33B, the user (not shown) may grip and move the first controller device 100 through 3D ambient space until pressed against the first arbitrary physical object 350 in a direction M until the clip object connector 180 opens up and grips around the first arbitrary physical object 350. Thus, the first controller device 100 is connected to the first arbitrary physical object 350. Since the clip object connector 180 comprises, for example, flexible plastic or rubber, the controller device 100 may be held tight (e.g., using a friction fit) to the surface of the first arbitrary physical object 350. Whereby, for example, a player/user (not shown) may now grip, make gesture movements, rotate, and move the first arbitrary physical object 350 with device 100 as a single physical unit through 3D ambient space.

Selecting First Virtual Object and Support Virtual Objects

So now turning to FIGS. 34A and 34B while referencing FIG. 32, the play system 400 is shown with the first controller device 100, first arbitrary physical object 350, and the display appliance 202 in operation for the selection of a first virtual object 360A (e.g., a toothed monster) and the one or more support virtual objects 360B (e.g., large saber) by a local user 490. Wherein, for sake of brevity, the reader may refer to the earlier similar description in sections "Selecting First Virtual Object" for FIG. 6C and "Method for Display Appliance to Select, Associate, and Spatial Calibrate Controller Device" for FIG. 10A.

Creating First Virtual Object Description

Whereupon, continuing with FIGS. 34A and 34B while referencing FIG. 32, the play system 400, display appliance 202, and control unit (e.g., similar to control unit 210 executing computer instructions in FIG. 5) may create a virtual object description data (e.g., similar to virtual object description data D300 in FIG. 9A) based at least in part on the first virtual object 360A and the one or more support virtual objects 360B selected by the user 490, and store the virtual object description data in a virtual object description database (e.g., similar to database 226 in FIG. 5) for future reference. Wherein, for sake of brevity, the reader may refer to the earlier similar description in sections "Creating First Virtual Object Description" for FIG. 6C and the section "Method for Display Appliance to Select, Associate, and Spatial Calibrate Controller Device" for FIG. 10A.

Detecting Spatial Calibrate Event for First Controller Device

So continuing with FIGS. 34A and 34B while referencing FIG. 32, the play system 400 is presented with the first controller device 100, first arbitrary physical object 350, display appliance 202, first virtual object 360A, and one or more support virtual objects 360B during detection of a spatial calibrate event for the first controller device 100 within 3D ambient space 304. Wherein, for sake of brevity, the reader may refer to the earlier similar description in sections "Detecting Spatial Calibrate Event for First Controller Device" for FIG. 6D and "Method for Display Appliance to Select, Associate, and Spatial Calibrate Controller Device" for FIG. 10A.

Associating First Controller Device with First Virtual Object and Support Virtual Objects Continuing with FIGS. 34A and 34B while referencing FIG. 32, the play system 400 is presented with the first controller device 100, first arbitrary physical object 350, display appliance 202, first virtual object 360A, and one or more support virtual objects 360B during an association process. Wherein, for sake of brevity, the reader may refer to the earlier similar description in sections "Associating the First Controller Device with the First Virtual Object" for FIG. 6D and "Method for Display Appliance to Select, Associate, and Spatial Calibrate Controller Device" for FIG. 10A.

Spatial Calibrating First Controller Device with First Virtual Object and Support Virtual Objects So continuing with FIGS. 34A and 34B while referencing FIG. 32, the play system 400 is presented with the first controller device 100, first arbitrary physical object 350, display appliance 202, first virtual object 360A, and one or more support virtual objects 360B during a spatial calibration process. Wherein, for sake of brevity, the reader may refer to the earlier similar description in sections "Spatial Calibrating the First Controller Device with the First Virtual Object" for FIG. 6D and "Method for Display Appliance to Select, Associate, and Spatial Calibrate Controller Device" for FIG. 10A.

Remote Play System Setup

So now turning to FIG. 35, there shown is the remote play system 401 that may be configured to communicate, via the computer network 299 (e.g., wideband computer network, cloud network, etc.), and interact with one or more play systems. For example, the remote play system 401 may communicate and interact with the local play system 400 (shown in FIG. 32), which may be located at the same location or separated by a spatial distance (e.g., one meter to thousands of kilometers) in the 3D real-world space 303 anywhere in the world.

The remote 3D ambient space 305 (as outlined by a circular dashed line) may be considered the play region existing in the 3D real-world space 303, which naturally surrounds the users of the remote play system 401 at a single site or location. The remote 3D ambient space 305 may be configured similar to previously disclosed embodiments (e.g., such as ambient space 302 of FIG. 1), wherein the reader may refer to such discussions.

One or more controller devices, such as a remote controller device 101, may be included in the remote play system 401. The remote controller device 101 may be configured similar to previously disclosed embodiments (e.g., such as controller device 100 of FIGS. 1, 2A-2D, and 3), wherein the reader may refer to such discussions. The remote controller device 101 may be configured to connect to a remote arbitrary physical object 351 within the 3D ambient space 305 by a player or user (not shown). The remote controller device 101 and remote arbitrary physical object 351 may be configured similar to previously disclosed embodiments (e.g., such as controller device 100 and arbitrary physical object 250 of FIG. 1), wherein the reader may refer to such discussions.

Figure 37A:
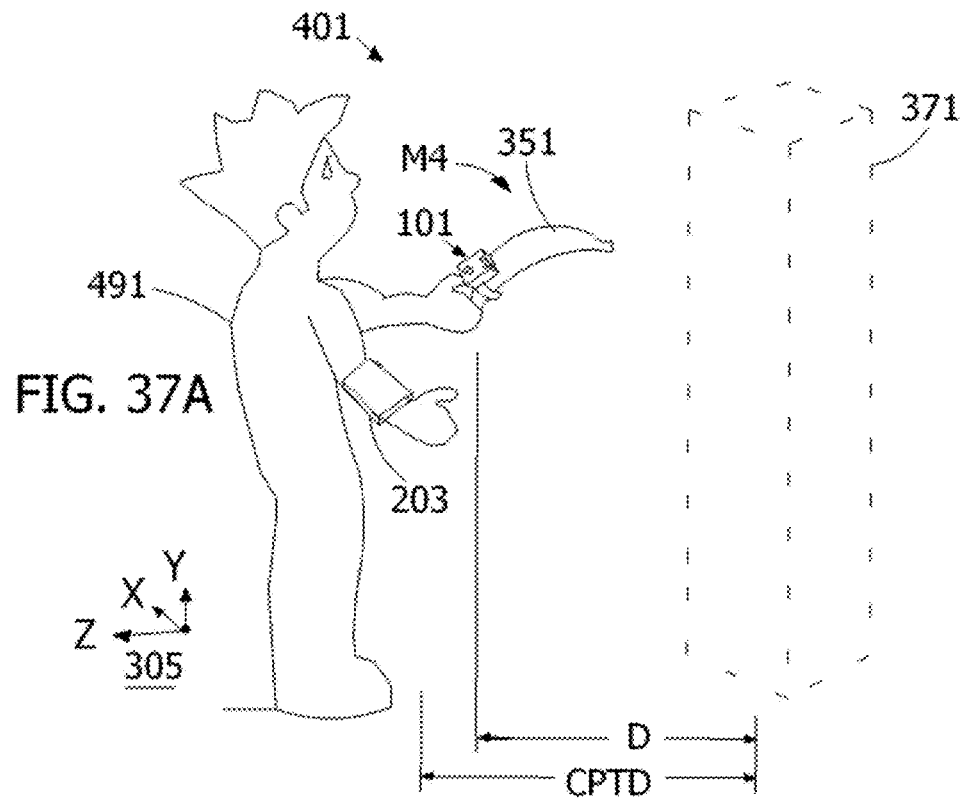
FIG. 37A is a perspective view for the play system of FIG. 35, where a controller device and arbitrarily physical object are moved and rotated in 3D ambient space by a user, with a display appliance attached to the arm of the user.
Figure 37B:
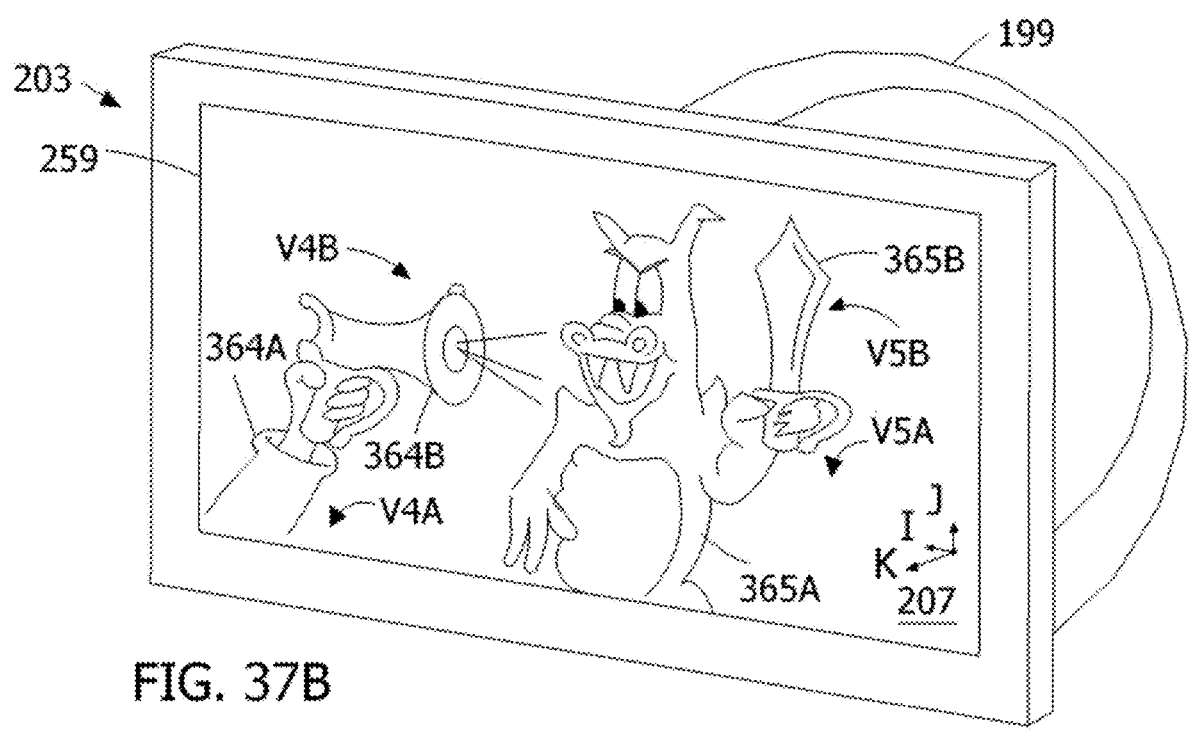
FIG. 37B is a perspective view for the play system of FIG. 35, which shows a close-up view of a display appliance with a flexible strap for attaching to a user.

One more display appliances, such as a remote display appliance 203, may be included in the remote play system 401. Display appliance 203 may be, for example, a smartphone for compactness and mobility with a flexible strap 199 attachable to a remote user 491 (as shown in FIGS. 37A and 37B). The remote display appliance 203 may be configured similar to previously disclosed embodiments (e.g., such as display appliance 200 of FIGS. 1, 4, and 5), wherein the reader may refer to such discussions. Display appliance 203 may also be configured with a first person game application within its memory. Wherein, the first person game application may be configured similar to previously disclosed embodiments (e.g., as game application 222 in memory 220 of FIG. 5), wherein the reader may refer to such discussions.

One or more virtual objects may appear on a video display, such as a remote virtual object 364A and the one or more remote support virtual objects 364B on the remote display appliance 203 of the remote play system 401. The virtual objects 364A and 365B on the remote display appliance 203 may be configured similar to previously disclosed embodiments (e.g., such as virtual object 260 of FIG. 1), wherein the reader may refer to such discussions.

One or more remote imaginary objects 371 (shown with a dashed outline) may be hidden in the ambient space 305 by the play system 401. The remote imaginary object 371 may be configured similar to previously disclosed embodiments (e.g., such as imaginary object 270 of FIG. 1), wherein the reader may refer to such discussions.

Finally, the remote play system 401 may be configured, with apparatus and functionality, such that the remote play system 401 can communicate with a computer network 299 (e.g., wideband network, cloud network, etc.). For example, the remote controller device 101 and remote display appliance 203 may be configured similar to previously disclosed embodiments (e.g., such as communication module 118 of controller device 100 of FIG. 3 and/or communication module 218 of the display appliance 200 of FIG. 5), wherein the reader may refer to such discussions. The computer network 299 may comprise, for example, one or more remote controller devices 101 and/or remote display appliances 203 comprising communication modules configured to wirelessly transmit and receive signals or data across a computer network 299. Whereby, the remote play system 401 can communicate across the computer network 299 and interact with one or more local play systems 401 (shown in FIG. 32), which may be located at the same location or separated by a spatial distance (e.g., one meter to thousands of kilometers) in the real-world space 303 anywhere in the world.

Connecting Remote Controller Device to a Remote Arbitrary Physical Object

Figure 36A:
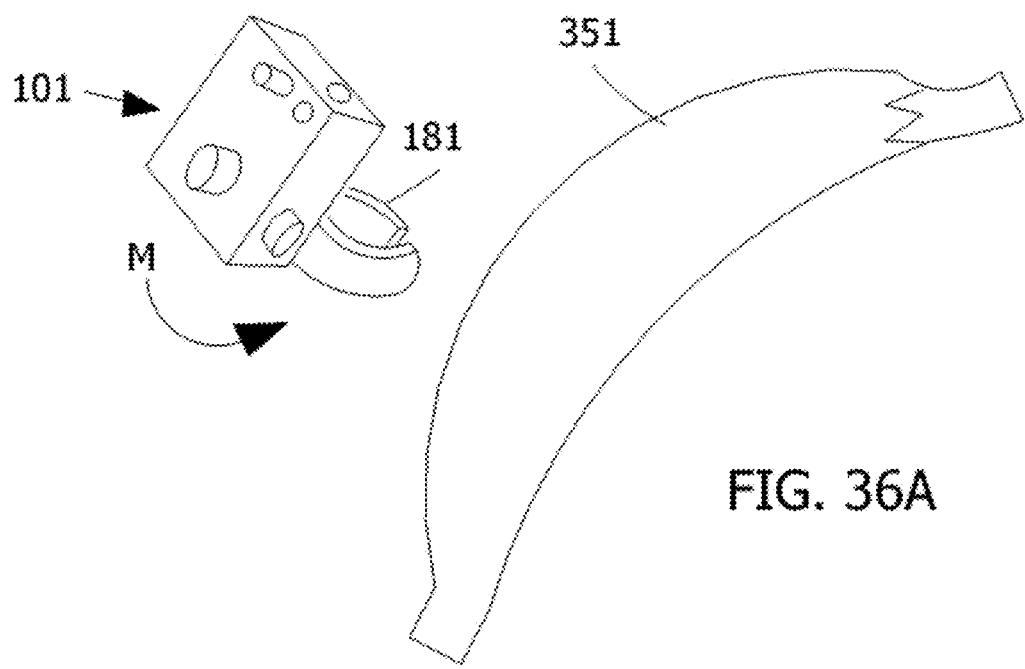
FIG. 36A is a perspective view for the play system of FIG. 35, of a controller device and arbitrary physical object, prior to connecting.
Figure 36B:
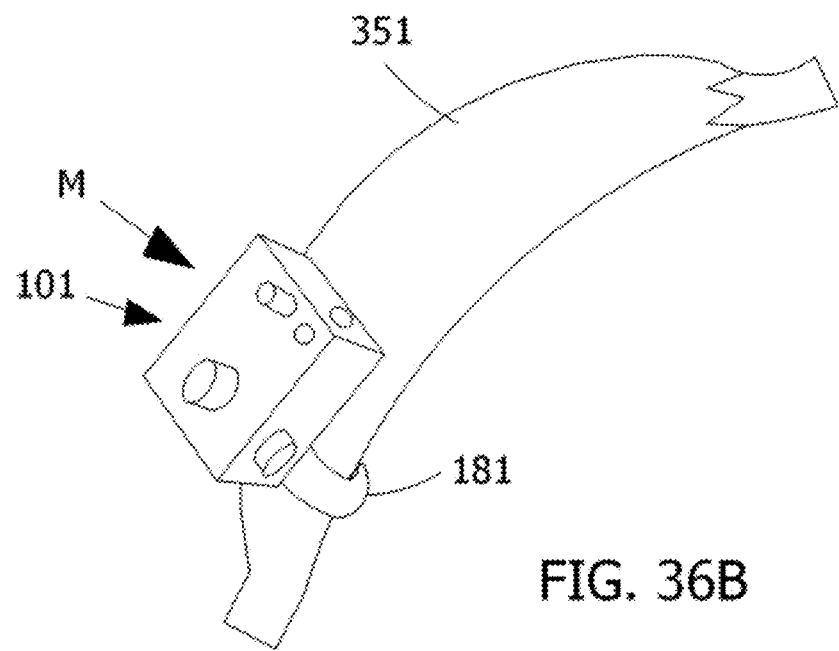
FIG. 36B is a perspective view for the play system of FIG. 35, of a controller device and arbitrary physical object, after connecting.

Now turning to FIGS. 36A and 36B while referencing FIG. 35, there shown are perspective views of an operation related to connecting the remote controller device 101 with the remote arbitrary physical object 351 in the remote play system 401.

In FIG. 36A, presented is the remote controller device 101 with the remote arbitrary physical object 351, which may be, for example, an edible banana fruit found in the remote 3D ambient space 305 (in FIG. 35). The remote arbitrary physical object 351 may be selected (e.g. picked up in the hand) from the remote 3D ambient space by a user/player (not shown). Whereupon, the user may grip (e.g. handhold) the remote controller device 101 and rotate its clip object connector 181 in an inward direction M, as shown in FIG. 36A.

Then in FIG. 36B, the user (not shown) may grip and move the remote controller device 101 through ambient space until pressed against the arbitrary physical object 351 in a direction M until the clip object connector 181 opens up and grips around the arbitrary physical object 351. Thus, the remote controller device 101 is connected to the arbitrary physical object 351. Since the clip object connector 181 may comprise, for example, flexible plastic or rubber, the controller device 101 may be held tight (e.g., using a friction fit) to the surface of the arbitrary physical object 351. Whereby, for example, the user (not shown) may now grip, make gesture movements, rotate, and move the remote arbitrary physical object 351 with device 101 as a single physical unit through 3D ambient space.

Selecting Remote Virtual Object and Remote Support Virtual Objects

So now turning to FIGS. 37A and 37B while referencing FIG. 35, the remote play system 401 is shown with the remote controller device 101, remote arbitrary physical object 351, and remote display appliance 203 in operation for the selection of a remote virtual object 364A (e.g., a seafaring pirate, as more fully depicted in FIG. 34B) and the one or more remote support virtual objects 364B (e.g., a pirate gun) by a remote user 491. Wherein, for sake of brevity, the reader may refer to the earlier similar description in sections "Selecting First Virtual Object" for FIG. 6C and "Method for Display Appliance to Select, Associate, and Spatial Calibrate Controller Device" for FIG. 10A.

Creating Remote Virtual Object Description

Whereupon, continuing with FIGS. 37A and 37B while referencing FIG. 34, the remote play system 401, remote display appliance 203, and control unit (e.g., similar to control unit 210 executing computer instructions in FIG. 5) may create a virtual object description data (e.g., similar to virtual object description data D300 in FIG. 9A) based at least in part on the remote virtual object 364A and the one or more remote support virtual objects 364B selected by the user 491, and store the virtual object description data in a virtual object description database (e.g., similar to database 226 in FIG. 5) for future reference. Wherein, for sake of brevity, the reader may refer to the earlier similar description in sections "Creating First Virtual Object Description" for FIG. 6C and the section "Method for Display Appliance to Select, Associate, and Spatial Calibrate Controller Device" for FIG. 10A.

Detecting Spatial Calibrate Event for the Remote Controller Device

So continuing with FIGS. 37A and 37B while referencing FIG. 35, the remote play system 401 is presented with the remote controller device 101, remote arbitrary physical object 351, remote display appliance 203, remote virtual object 364A, and one or more remote support virtual objects 364B during detection of a spatial calibrate event for the remote controller device 101 within remote 3D ambient space 305. Wherein, for sake of brevity, the reader may refer to the earlier similar description in sections "Detecting Spatial Calibrate Event for First Controller Device" for FIG. 6D and "Method for Display Appliance to Select, Associate, and Spatial Calibrate Controller Device" for FIG. 10A.

Associating Remote Controller Device with the Remote Virtual Object and Support Virtual Objects Continuing with FIGS. 37A and 37B while referencing FIG. 35, the remote play system 401 is presented with the remote controller device 101, remote arbitrary physical object 351, remote display appliance 203, remote virtual object 364A, and one or more remote support virtual objects 364B during an association process. Wherein, for sake of brevity, the reader may refer to the earlier similar description in sections "Associating the First Controller Device with the First Virtual Object" for FIG. 6D and "Method for Display Appliance to Select, Associate, and Spatial Calibrate Controller Device" for FIG. 10A.

Spatial Calibrating Remote Controller Device with the Remote Virtual Object and Support Virtual Objects So continuing with FIGS. 37A and 37B while referencing FIG. 35, the remote play system 401 is presented with the remote controller device 101, remote arbitrary physical object 351, remote display appliance 203, remote virtual object 364A, and one or more remote support virtual objects 364B during a spatial calibration process. Wherein, for sake of brevity, the reader may refer to the earlier similar description in sections "Spatial Calibrating the First Controller Device with the First Virtual Object" for FIG. 6D and "Method for Display Appliance to Select, Associate, and Spatial Calibrate Controller Device" for FIG. 10A.

Multiple Play Systems with Spatial Features Using Arbitrary Physical Objects

So now turning to FIGS. 34A, 34B, 37A, and 37B, there presented are some embodiments of play activities for the local player 490 using the local play system 400, and play activities for the remote player 491 using the remote play system 401, wherein the play systems 400 and 401 may be, but not limited to, located thousands of kilometers apart. Moreover, the local play system 400 (in FIG. 34A) may be configured to communicate and interact with the remote play system 401 (in FIG. 37A), and vice versa, using controller devices 100 and 101, arbitrary physical objects 350 and 351, and display appliances 202 and 203 from the 3D ambient spaces 304 and 305, respectively.

As depicted in FIG. 34A, the local play system 400 may comprise the first controller device 100 connected to the first arbitrary physical object 350, which is a writing pen, held by the local user 490. Moreover, the play system 400 may implement the 3D ambient space 304 defined by spatial axis X, Y, and Z. Then in FIG. 34B, the local play system 400 may implement a 3D virtual space 206 defined by spatial axis I, J, and K. At least a portion of the virtual space 206 is visually presented on the display appliance 202 that includes a video display 258. In some embodiments, the display appliance 202 may comprise a wrist strap 199, enabling the display appliance 202 to be worn by the user 490, as shown in FIG. 34A.

Similarly depicted in FIG. 37A, the remote play system 400 may comprise the remote controller device 101 connected to the remote arbitrary physical object 351, which is an edible banana fruit, held by the remote user 491. Moreover, the remote play system 401 may implement the remote 3D ambient space 305 defined by spatial axis X, Y, and Z. Then in FIG. 37B, the remote play system 401 may implement a 3D virtual space 207 defined by spatial axis I, J, and K. At least a portion of the virtual space 207 is visually presented on the remote display appliance 203 that includes a video display 259. In some embodiments, the display appliance 203 may comprise a wrist strap 199, enabling the remote display appliance 203 to be worn by the user 491, as shown in FIG. 37A.

Then in FIGS. 34A, 34B, 37A, and 37B, the local user 490 (in FIG. 34A) and remote user 491 (in FIG. 37A) may appear in a game of seafaring pirates engaged in a saber and gun battle using arbitrary physical objects 350 and 351 in the 3D ambient spaces 304 and 305, respectively. So turning first to FIGS. 34A and 34B showing the local play system 400, the first arbitrary physical object 350 and attached first controller device 100 may be moved (e.g., rapidly swung in an arc) in 3D ambient space 304 by the user 490. Whereupon, the first controller device 100 may operably detect a first spatial feature M0 (e.g., movement, orientation, location, altitude, direction, and/or speed, etc.) of the first controller device 100 and the first arbitrary physical object 350 in 3D ambient space 304. Thereby the first controller device 100 may transmit a first control data, comprising information of the first spatial feature M0, to the display appliance 202. And accordingly, the first controller device 100 may be at least in part controlling a first virtual object 360A, on the display appliance 202, such that a second spatial feature V0A (e.g., movement, orientation, location, altitude, direction, and/or speed, etc.), of the first virtual object 360A, may be based at least in part on the first spatial feature M0 of the first controller device 100 and the first arbitrary physical object 350 within 3D ambient space 304 of the play system 400. Also, in some embodiments, the first controller device 100 may be at least in part controlling one or more support virtual objects 360B, on the display appliance 202, such that a third spatial feature V0B (e.g., movement, orientation, location, altitude, direction, and/or speed, etc.), of the one or more support virtual objects 360B, may be based at least in part on the first spatial feature M0 of the first controller device 100 and the first arbitrary physical object 350 within 3D ambient space 304 of the play system 400.

In addition, in some embodiments, the first controller device 100 (in FIG. 34A) may transmit the first control data, comprising information of the first spatial feature M0, across a computer network 299 (in FIGS. 32 and 35) to the remote display appliance 203 in the remote play system 401 (shown in FIGS. 37A and 37B). And accordingly, the first controller device 100 (in FIG. 34A) may be at least in part controlling across a computer network 299 a remote virtual object 365A (in FIGS. 37A and 37B), on the remote display appliance 203 in the remote play system 401, such that a fourth spatial feature V5A (e.g., movement, orientation, location, altitude, direction, and/or speed, etc.), of the remote virtual object 365A on the remote display appliance 203, may be based at least in part on the first spatial feature M0 of the first controller device 100 and the first arbitrary physical object 350 within 3D ambient space 304 of the play system 400 (in FIGS. 34A and 34B). In addition, in some embodiments, the first controller device 100 may be at least in part controlling one or more remote support virtual objects 365B, on the remote display appliance 203, such that a fifth spatial feature V5B (e.g., movement, orientation, location, altitude, direction, and/or speed, etc.), of the one or more remote support virtual objects 365B on the remote display appliance 203, may be based at least in part on the first spatial feature M0 of the first controller device 100 and the first arbitrary physical object 350 within 3D ambient space 304 of the play system 400. For a description of a "spatial feature," the reader may refer to the earlier discussion related to the motion module 119 in FIG. 3 and elsewhere in this disclosure.

In some embodiments, the first controller device 100 may be at least in part controlling across the computer network 299, one or more remote sound effects (e.g., saber woosh, gunfire, human speech sound effects, etc.), on the remote display appliance 203 in the remote play system 401, based at least in part on the first spatial feature M0 of the first controller device 100 within the 3D ambient space 304 in the play system 400.

In some embodiments, the first controller device 100 may be at least in part controlling across the computer network 299, one or more remote mechanical effects (e.g., vibratory movements), on the remote display appliance 203 in the remote play system 401, based at least in part on the first spatial feature M0 of the first controller device 100 within the 3D ambient space 304 in the play system 400.

Further, in some embodiments, the fourth spatial feature V5A, of the remote virtual object 365A on the remote display appliance 203 in the remote play system 401, correlates at least in part with the first spatial feature M0 of the first controller device 100 and/or the first arbitrary physical object 350 within the 3D ambient space 304 in the play system 400. Also, in some embodiments, the fifth spatial feature V5B, of the one or more remote support virtual objects 365B on the remote display appliance 203 in the remote play system 401, correlates at least in part with the first spatial feature M0 of the first controller device 100 and/or the first arbitrary physical object 350 within the 3D ambient space 304 in the play system 400.

Also shown in FIGS. 34A and 34B, in various embodiments of play activity operations, the first arbitrary physical object 350 and first controller device 100 (which is connected) may be moved (e.g., rapidly swung in an arc) in 3D ambient space 304 by the user 490. Whereupon, the first controller device 100 may operably detect a first movement M0 (e.g., translational movement, rotational movement, etc.) of the first controller device 100 and the first arbitrary physical object 350 in 3D ambient space 304. Thereby the first controller device 100 may transmit a first control data, comprising information of the first movement M0, to the display appliance 202. And accordingly, the first controller device 100 may be at least in part controlling a first virtual object 360A and/or the one or more support virtual objects 360B, on the display appliance 202, such that a second movement V0A, of the first virtual object 360A, may be based at least in part on the first movement M0 of the first controller device 100 and the first arbitrary physical object 350 within 3D ambient space 304 of the play system 400.

In addition, in some embodiments, the first controller device 100 may transmit the first control data, comprising information of the first movement M0, across a computer network 299 (in FIGS. 32 and 35) to the remote display appliance 203 in the remote play system 401 (shown in FIGS. 37A and 37B). And accordingly, the first controller device 100 may be at least in part controlling a remote virtual object 365A and/or the one or more remote support virtual objects 365B (in FIGS. 37A and 37B), on the remote display appliance 203 in the remote play system 401, such that a third movement V5A, of the remote virtual object 365A and/or the one or more remote support virtual objects 365B, may be based at least in part on the first movement M0 of the first controller device 100 and the first arbitrary physical object 350 within 3D ambient space 304 of the play system 400 (in FIGS. 34A and 34B). In some embodiments, the computer network 299 may comprise one or more display appliances, such as display appliance 202 and remote display appliance 203. Thereby, in some embodiments, the first controller device 100 may transmit the first control data, comprising information of the first movement M0, across a computer network 299 (in FIGS. 32 and 35), which comprises the local display appliance 202 and/or other devices, such that the first control data is transmitted to the remote display appliance 203, via the local display appliance 202 and/or the other devices. In some alternate embodiments, the first controller device 100 may transmit the first control data, comprising information of the first movement M0, across a computer network 299 (in FIGS. 32 and 35) to the remote display appliance 203, without passing through the local display appliance 202.

In some embodiments, the first controller device 100 may be generating, via an audio module (e.g., similar to audio module 112 in FIG. 3) of the first controller device 100, one or more sound effects (e.g., saber woosh, gunfire, human speech sound effects, etc.) based at least in part on the first movement M0 of the first controller device 100 within the 3D ambient space 304.

In some embodiments, the first controller device 100 may be generating, via a mechanical generator (e.g., similar to mechanical generator 114 in FIG. 3) of the first controller device 100, one or more mechanical effects (e.g., mechanical movements) based at least in part on the first movement M0 of the first controller device 100 within the 3D ambient space 304.

Further, in some embodiments, the third movement V5A, of the remote virtual object 365A on the remote display appliance 203 in the remote play system 401, correlates at least in part with the first movement M0, of the first controller device 100 and first arbitrary physical object 350 within 3D ambient space in the play system 400.

Also shown in FIGS. 34A and 34B, in some embodiments of play activity operations, the first arbitrary physical object 350 and first controller device 100 (which is connected) may be rotated in 3D ambient space 304 by the user 490. Whereupon, the first controller device 100 may operably detect a first rotational movement M0 of the first controller device 100 and the first arbitrary physical object 350 in 3D ambient space 304. Thereby the first controller device 100 may transmit a first control data, comprising information of the first rotational movement M0, to the display appliance 202. And accordingly, the first controller device 100 may be at least in part controlling a first virtual object 360A and/or the one or more support virtual objects 360B, on the display appliance 202, such that a second rotational movement V0A, of the first virtual object 360A and/or the one or more support virtual objects 360B, may be based at least in part on the first rotational movement M0 of the first controller device 100 and the first arbitrary physical object 350 within 3D ambient space 304 of the local play system 400.

In addition, in some embodiments, the first controller device 100 may transmit the first control data, comprising information of the first rotational movement M0, across a computer network 299 (in FIGS. 32 and 35) to the remote display appliance 203 in the remote play system 401 (shown in FIGS. 37A and 37B). And accordingly, the first controller device 100 may be at least in part controlling a remote virtual object 365A and/or the one or more remote support virtual objects 365B (in FIGS. 37A and 37B), on the remote display appliance 203 in the remote play system 401, such that a third movement V5A, of the remote virtual object 365A and/or the one or more remote support virtual objects 365B, may be based at least in part on the first rotational movement M0 of the first controller device 100 and the first arbitrary physical object 350 within 3D ambient space 304 of the play system 400 (in FIGS. 34A and 34B).

In some embodiments, the first controller device 100 may be generating one or more sound effects, via an audio module 112 of the first controller device 100, based at least in part on the first rotational movement M0 of the first controller device 100 within the 3D ambient space 304.

In some embodiments, the first controller device 100 may be generating one or more mechanical effects, via a mechanical generator 114 of the first controller device 100, based at least in part on the first rotational movement M0 of the first controller device 100 within the 3D ambient space 304.

Further, in some embodiments, the first rotational movement M0, of the first controller device 100 and first arbitrary physical object 350, may correlate at least in part with the second rotational movement V0A of the first virtual object 360A and/or the one or more support virtual objects 360B on the display appliance 202.

Further, in some embodiments, the rotational movement M0, of the first controller device 100 and first arbitrary physical object 350, may exist on one axis Y of 3D ambient space 304, and correspondingly, the rotational movement V0A, of the first virtual object 360A, may exist on one axis J of 3D virtual space 206.

Further, in some embodiments, the rotational movement M0, of the first controller device 100 and first arbitrary physical object 350, may exist on one axis Y of 3D ambient space 304, and correspondingly, the rotational movement V0A, of the first virtual object 360A, may exist on one axis J of 3D virtual space 206, wherein the axis Y and axis J are substantially parallel.

Further, in some embodiments, the rotational movement M0 may cause the first controller device 100 and the first arbitrary physical object 350 to rotate between 170 to 190 degrees on one axis Y within 3D ambient space 304, and correspondingly, the rotational movement V0A may cause the virtual object 360A to rotate between 170 to 190 degrees on one axis J within 3D virtual space 206.

Also shown in FIGS. 34A and 34B, in some embodiments of play activity operations, the first arbitrary physical object 350 and first controller device 100 (which is connected) may be oriented in 3D ambient space 304 by the user 490. Whereupon, the first controller device 100 may operably detect a first orientation M0 of the first controller device 100 and the first arbitrary physical object 350 in 3D ambient space 304. Thereby the first controller device 100 may transmit a first control data, comprising information of the first orientation M0, to the display appliance 202. And accordingly, the first controller device 100 may be at least in part controlling a first virtual object 360A and/or the one or more support virtual objects 360B, on the display appliance 202, such that a second orientation V0A, of the first virtual object 360A and/or the one or more support virtual objects 360B, may be based at least in part on the first orientation M0 of the first controller device 100 and the first arbitrary physical object 350 within 3D ambient space 304 of the play system 400.

In addition, in some embodiments, the first controller device 100 may transmit a first control data, comprising information of the first orientation M0, across a computer network 299 (in FIGS. 32 and 35) to the remote display appliance 203 in the remote play system 401 (shown in FIGS. 37A and 37B). And accordingly, the first controller device 100 may be at least in part controlling a remote virtual object 365A and/or the one or more remote support virtual objects 365B (in FIGS. 37A and 37B), on the remote display appliance 203 in the remote play system 401, such that a third movement V5A, of the remote virtual object 365A and/or the one or more remote support virtual objects 365B, may be based at least in part on the first orientation M0 of the first controller device 100 and the first arbitrary physical object 350 within 3D ambient space 304 of the play system 400 (in FIGS. 34A and 34B).

In some embodiments, the first controller device 100 may be generating one or more sound effects, via an audio module 112 of the first controller device 100, based at least in part on the first orientation M0 of the first controller device 100 within the 3D ambient space 304.

In some embodiments, the first controller device 100 may be generating one or more mechanical effects, via a mechanical generator 114 of the first controller device 100, based at least in part on the first orientation M0 of the first controller device 100 within the 3D ambient space 304.

Further, in some embodiments, the first orientation M0, of the first controller device 100 and first arbitrary physical object 350, may correlate at least in part with the second orientation V0A of the first virtual object 360A and/or the one or more support virtual objects 360B on the display appliance 202.

Also shown in FIGS. 34A and 34B, in some embodiments of play activity operations, the first arbitrary physical object 350 and first controller device 100 (which is connected) may be located in 3D ambient space 304 by the user 490. Whereupon, the first controller device 100 may operably detect a first location M0 of the first controller device 100 and the first arbitrary physical object 350 in 3D ambient space 304. Thereby the first controller device 100 may transmit a first control data, comprising information of the first location M0, to the display appliance 202. And accordingly, the first controller device 100 may be at least in part controlling a first virtual object 360A, on the display appliance 202, such that a second location V0A, of the first virtual object 360A, may be based at least in part on the first location M0 of the first controller device 100 and the first arbitrary physical object 350 within 3D ambient space 304 of the play system 400.

In addition, in some embodiments, the first controller device 100 may transmit a first control data, comprising the first location M0, across a computer network 299 (in FIGS. 32 and 35) to the remote display appliance 203 in the remote play system 401 (shown in FIGS. 37A and 37B). And accordingly, the first controller device 100 may be at least in part controlling a remote virtual object 365A and/or the one or more remote support virtual objects 365B (in FIGS. 37A and 37B), on the remote display appliance 203 in the remote play system 401, such that a third movement V5A, of the remote virtual object 365A and/or the one or more remote support virtual objects 365B, may be based at least in part on the first location M0 of the first controller device 100 and the first arbitrary physical object 350 within 3D ambient space 304 of the play system 400 (in FIGS. 34A and 34B).

In some embodiments, the first controller device 100 may be generating one or more sound effects, via an audio module 112 of the first controller device 100, based at least in part on the first location M0 of the first controller device 100 within the 3D ambient space 304.

In some embodiments, the first controller device 100 may be generating one or more mechanical effects, via a mechanical generator 114 of the first controller device 100, based at least in part on the first location M0 of the first controller device 100 within the 3D ambient space 304.

Further, in some embodiments, the first location M0, of the first controller device 100 and first arbitrary physical object 350, may correlate at least in part with the second location V0A of the first virtual object 360A on the display appliance 202.

Also shown in FIGS. 34A and 34B, in some embodiments of play activity operations, the first arbitrary physical object 350 and first controller device 100 (which is connected) may be moved in 3D ambient space 304 by the user 490. Whereupon, the first controller device 100 may operably detect a first translational movement M0 of the first controller device 100 and the first arbitrary physical object 350 in 3D ambient space 304. Thereby the first controller device 100 may transmit a first control data, comprising information of the first translational movement M0, to the display appliance 202. And accordingly, the first controller device 100 may be at least in part controlling a first virtual object 360A, on the display appliance 202, such that a second translational movement V0A, of the first virtual object 360A, may be based at least in part on the first translational movement M0 of the first controller device 100 and the first arbitrary physical object 350 within 3D ambient space 304 of the play system 400.

In addition, in some embodiments, the first controller device 100 may transmit the first control data, comprising information of the first translational movement M0, across a computer network 299 (in FIGS. 32 and 35) to the remote display appliance 203 in the remote play system 401 (shown in FIGS. 37A and 37B). And accordingly, the first controller device 100 may be at least in part controlling a remote virtual object 365A and/or the one or more remote support virtual objects 365B (in FIGS. 37A and 37B), on the remote display appliance 203 in the remote play system 401, such that a third movement V5A, of the remote virtual object 365A and/or the one or more remote support virtual objects 365B, may be based at least in part on the first translational movement M0 of the first controller device 100 and the first arbitrary physical object 350 within 3D ambient space 304 of the play system 400 (in FIGS. 34A and 34B).

In some embodiments, the first controller device 100 may be generating one or more sound effects, via an audio module 112 of the first controller device 100, based at least in part on the first translational M0 of the first controller device 100 within the 3D ambient space 304.

In some embodiments, the first controller device 100 may be generating one or more mechanical effects, via a mechanical generator 114 of the first controller device 100, based at least in part on the first translational movement M0 of the first controller device 100 within the 3D ambient space 304.

Further, in some embodiments, the first translational movement M0, of the first controller device 100 and first arbitrary physical object 350, may correlate at least in part with the second translational movement V0A of the first virtual object 360A on the display appliance 200.

Further, in some embodiments, the first translational movement M0 may exist on one axis Z of 3D ambient space 304, and correspondingly, the second translational movement V0A may exist on one axis K of 3D virtual space 206.

Also shown in FIGS. 34A and 34B, in various embodiments of play activity operations, the first arbitrary physical object 350 and first controller device 100 (which is connected) may be gesture moved (e.g., double tap gesture, shake gesture, etc.) in 3D ambient space 304 by the user 490. Whereupon, the first controller device 100 may operably detect a first gesture movement M0 (e.g., double tap gesture, shake gesture, etc.) of the first controller device 100 and the first arbitrary physical object 350 in 3D ambient space 304. Thereby the first controller device 100 may transmit a first control data, comprising information of the first gesture movement M0, to the display appliance 202. And accordingly, the first controller device 100 may be at least in part controlling a first virtual object 360A and/or the one or more support virtual objects 360B, on the display appliance 202, such that a second movement V0A, of the first virtual object 360A, may be based at least in part on the first gesture movement M0 of the first controller device 100 and the first arbitrary physical object 350 within 3D ambient space 304 of the play system 400.

In addition, in some embodiments, the first controller device 100 may transmit the first control data, comprising the first gesture movement M0 (e.g., double tap gesture, shake gesture, etc.), across a computer network 299 (in FIGS. 32 and 35) to the remote display appliance 203 in the remote play system 401 (shown in FIGS. 37A and 37B). And accordingly, the first controller device 100 may be at least in part controlling a remote virtual object 365A and/or the one or more remote support virtual objects 365B (in FIGS. 37A and 37B), on the remote display appliance 203 in the remote play system 401, such that a third movement V5A, of the remote virtual object 365A and/or the one or more remote support virtual objects 365B, may be based at least in part on the first gesture movement M0 of the first controller device 100 and the first arbitrary physical object 350 within 3D ambient space 304 of the play system 400 (in FIGS. 34A and 34B).

Further, in some embodiments, the first gesture movement M0, of the first controller device 100 and first arbitrary physical object 350, may correlate at least in part with the third movement V5A of the remote virtual object 365A and/or the one or more support virtual objects 365B on the remote display appliance 203 in the remote play system 401.

For a description of various "gesture movements," the reader may refer to the earlier discussion related to the gesture analyzer 137 in FIG. 3 and elsewhere in this disclosure.

Method for Controller Device to Control a Remote Virtual Object

Figure 38A:
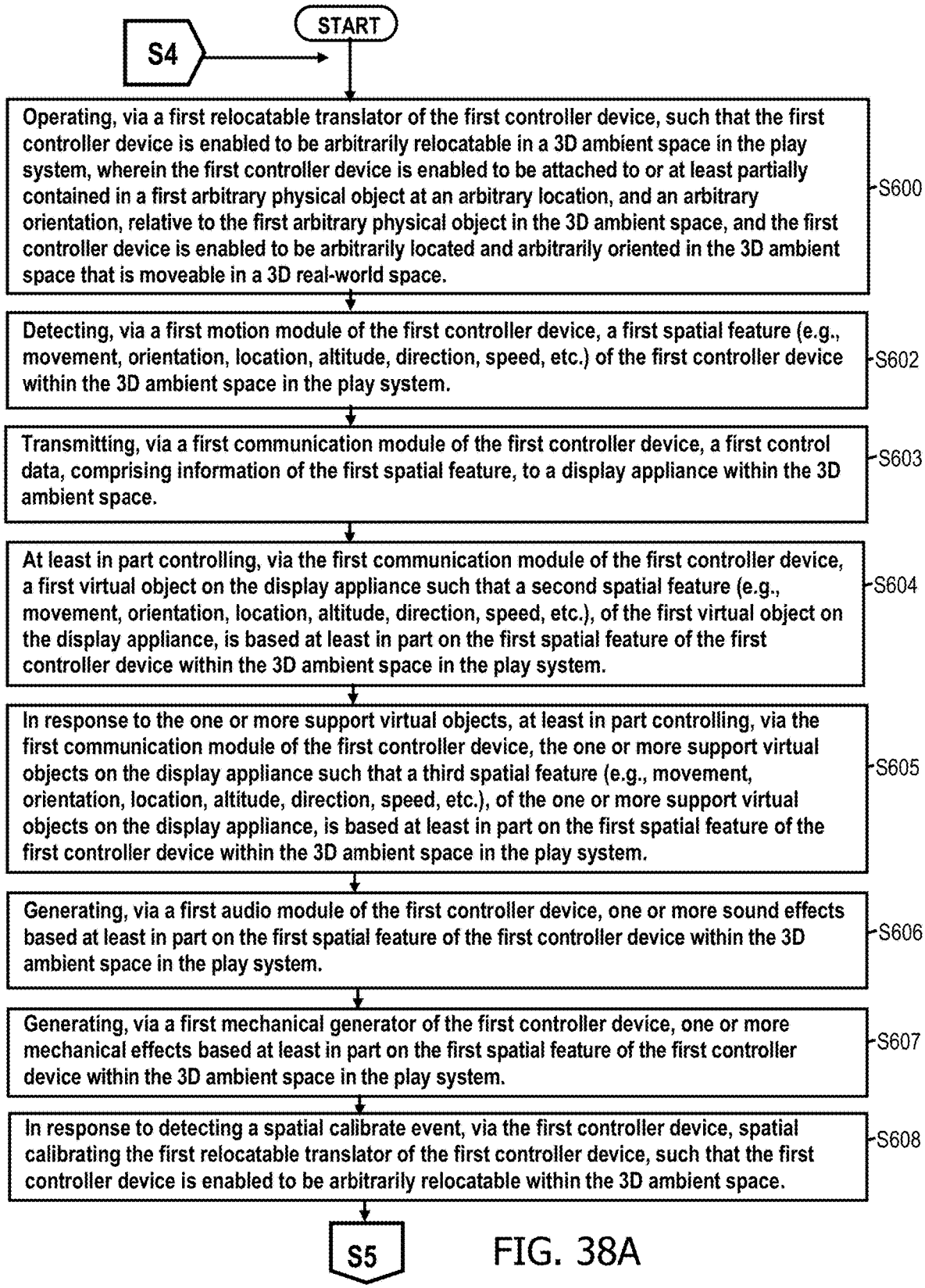
FIG. 38A is a first portion of a flowchart for the local play system of FIG. 32 and the remote play system of FIG. 35, showing a method for a first controller device at least in part controlling a virtual object, on a display appliance, based on the first controller device in the local play system.
Figure 38B:
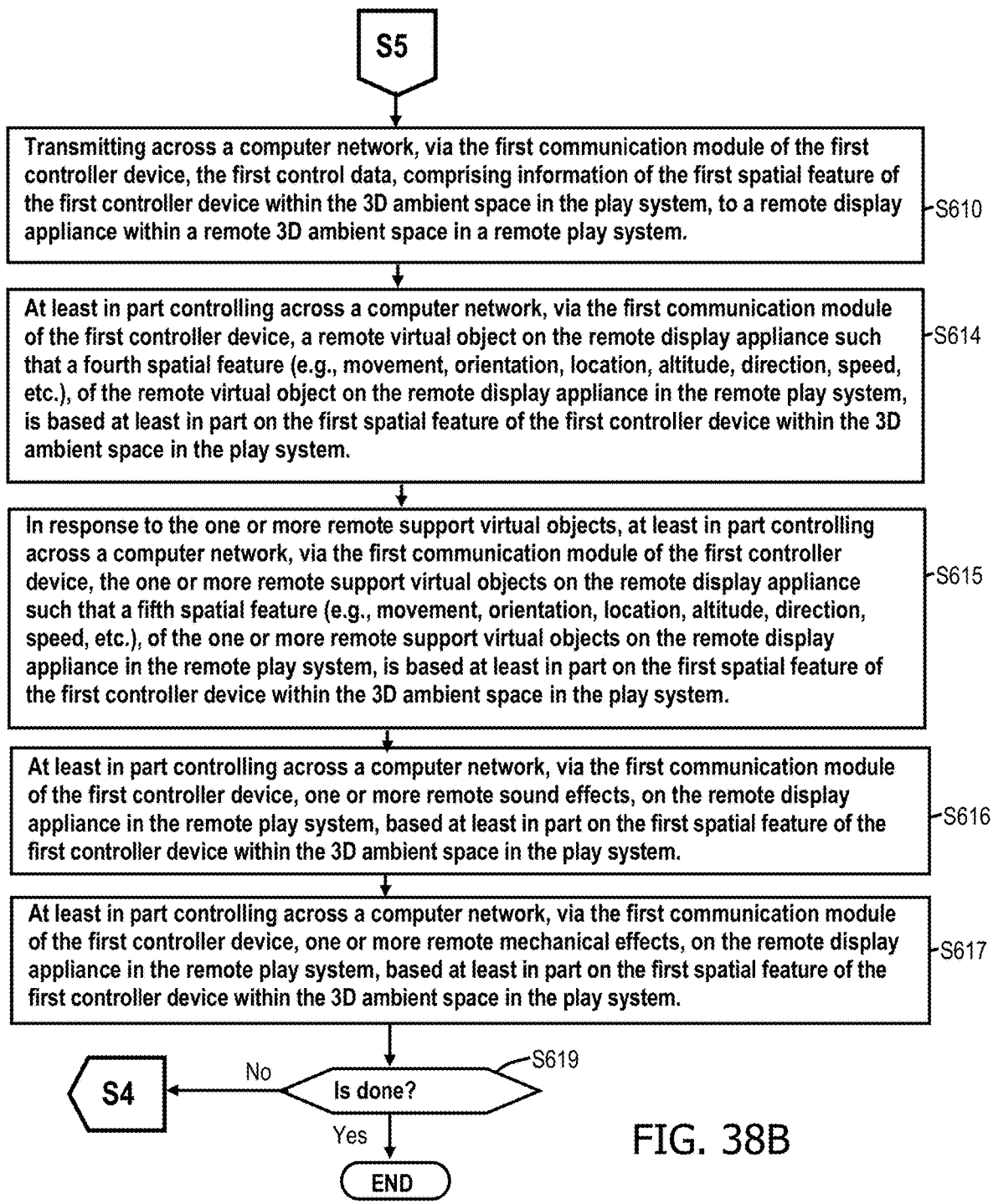
FIG. 38B is a second portion of a flowchart for the local play system of FIG. 32 and the remote play system of FIG. 35, showing a method for a first controller device at least in part controlling a remote virtual object, on a remote display appliance in the remote play system, based on the first controller device in the local play system.

Turning now to FIGS. 38A and 38B while referencing FIGS. 34A, 34B, 37A, 37B, 32, and 35, there shown is a first and second portion of a flowchart of an exemplary embodiment of a computer-implemented method for a first controller device, in a local play system, to control a remote virtual object on a remote display appliance in a remote play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 400. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 400 (in FIGS. 34A and 34B):

In some embodiments, beginning with step S600, operating, via a first relocatable translator 134 of the first controller device 100 (in FIG. 34A), such that the first controller device 100 is enabled to be arbitrarily relocatable in a 3D ambient space 304 of the play system 400, wherein the first controller device 100 is enabled to be attached to or at least partially contained in a first arbitrary physical object 350 at an arbitrary location, and an arbitrary orientation, relative to the first arbitrary physical object 350 in the 3D ambient space 304, and the first controller device 100 is enabled to be arbitrarily located and arbitrarily oriented in the 3D ambient space 304 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable."

In some embodiments, in step S602, detecting, via a first motion module 119 of the first controller device 100 (in FIG. 34A), a first spatial feature M0 (e.g., movement, orientation, location, altitude, direction, and/or speed, etc.) of the first controller device 100 within the 3D ambient space 304 in the play system 400. For a description of a "spatial feature," the reader may refer to the motion module 119 in FIG. 3 and elsewhere in this disclosure.

In some embodiments, in step S603, transmitting, via a first communication module 118 of the first controller device 100 (in FIG. 34A), the first control data, comprising information of the first spatial feature M0 of the first controller device 100, to a display appliance 202 within the 3D ambient space 304. In some alternate embodiments, the current step and step S610 (in FIG. 38B) may be combined and replaced the following: transmitting, via a first communication module 118 of the first controller device 100, the first control data, comprising information of the first spatial feature M0 of the first controller device 100, to a display appliance 202 in the play system 400, and further transmitting the first control data across a computer network 299 to a remote display appliance 203 in a remote play system 401.

In some embodiments, in step S604, at least in part controlling, via the first communication module 118 of the first controller device 100 (in FIG. 34A), a first virtual object 360A on the display appliance 202 such that a second spatial feature V0A (e.g., movement, orientation, location, altitude, direction, speed, etc.), of the first virtual object 360A on the display appliance 202, is based at least in part on the first spatial feature M0 of the first controller device 100 within the 3D ambient space 304.

In some embodiments, in step S605, in response to the one or more support virtual objects 360B, at least in part controlling, via the first communication module 118 of the first controller device 100 (in FIG. 34A), the one or more support virtual objects 360B on the display appliance 202 such that a third spatial feature V0B (e.g., movement, orientation, location, altitude, direction, speed, etc.), of the one or more support virtual objects 360B on the display appliance 202, is based at least in part on the first spatial feature M0 of the first controller device 100 within the 3D ambient space 304. In the current step, if there are no support virtual objects implemented, the method skips the current step. In some alternate embodiments that do not implement support virtual objects, the current step may be optional and not required.

In some embodiments, in step S606, generating, via a first audio module 112 of the first controller device 100 (in FIG. 34A), one or more sound effects (e.g., saber woosh, gunfire, human speech sound effects, etc.) based at least in part on the first spatial feature M0 of the first controller device 100 within the 3D ambient space 304 in the play system 400. In various embodiments, the current step may be optional and not required.

In some embodiments, in step S607, generating, via a first mechanical generator 114 of the first controller device 100 (in FIG. 34A), one or more mechanical effects (e.g., mechanical movements) based at least in part on the first spatial feature M0 of the first controller device 100 within the 3D ambient space 304 in the play system 400. In various embodiments, the current step may be optional and not required.

In some embodiments, in step S608, in response to detecting a spatial calibrate event, via the first controller device 100 (in FIG. 34A), spatial calibrating the relocatable translator 134 of the first controller device 100, such that the first controller device 100 is enabled to be arbitrarily relocatable within the 3D ambient space 304, wherein the first controller device 100 is enabled to be attached to or at least partially contained in a first arbitrary physical object 350 at an arbitrary location, and an arbitrary orientation, relative to the arbitrary physical object 350 within the 3D ambient space 304, and the first controller device 100 is enabled to be arbitrarily located and arbitrarily oriented in the 3D ambient space 304 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial Calibrate in Realtime." In some alternate embodiments, the current step may not be required in the method.

The reader may now turn to the second portion of the flowchart in FIG. 38B (reference S5), where the method continues.

In some embodiments, in step S610, transmitting across a computer network 299, via the first communication module 118 of the first controller device 100 (in FIG. 34A), the first control data, comprising information of the first spatial feature M0 of the first controller device 100, to a remote display appliance 203 in a remote play system 401 (in FIGS. 37A and 37B). In some embodiments, the current step may be combined and replaced with step S603, as discussed above.

In some embodiments, in step S614, at least in part controlling across a computer network 299, via the first communication module 118 of the first controller device 100 (in FIG. 34A), a remote virtual object 365A on the remote display appliance 203 (in FIG. 37A) such that a fourth spatial feature V5A (e.g., movement, orientation, location, altitude, direction, and/or speed, etc.), of the remote virtual object 365A on the remote display appliance 203 in the remote play system 401, is based at least in part on the first spatial feature M0 of the first controller device 100 within the 3D ambient space 304 in the play system 400 (in FIG. 34A).

In some embodiments, in step S615, in response to the one or more remote support virtual objects, at least in part controlling across a computer network 299, via the first communication module 118 of the first controller device 100 (in FIG. 34A), the one or more remote support virtual objects 365B on the remote display appliance 203 (in FIG. 37A) such that a fifth spatial feature V5B (e.g., movement, orientation, location, altitude, direction, speed, etc.), of the one or more remote support virtual objects 365B on the remote display appliance 203 in the remote play system 401, is based at least in part on the first spatial feature M0 of the first controller device 100 within the 3D ambient space 304 in the play system 400 (in FIG. 34A). In the current step, if there are no remote support virtual objects implemented, the method skips the current step. In some alternate embodiments that do not implement remote support virtual objects, the current step may be optional and not required.

In some embodiments, in step S616, at least in part controlling across a computer network 299, via the first communication module 118 of the first controller device 100, one or more remote sound effects (e.g., saber woosh, gunfire, human speech sound effects, etc.), on the remote display appliance 205 in the remote play system 401 (in FIG. 37A), based at least in part on the first spatial feature M0 of the first controller device 100 within the 3D ambient space 304 in the play system 400 (in FIG. 34A).

In some embodiments, in step S617, at least in part controlling across a computer network 299, via the first communication module 118 of the first controller device 100, one or more remote mechanical effects (e.g. vibratory movement), on the remote display appliance 205 in the remote play system 401 (in FIG. 37A), based at least in part on the first spatial feature M0 of the first controller device 100 within the 3D ambient space 304 in the play system 400 (in FIG. 34A).

Finally, in some embodiments, in step S619, in response to determining, via the first controller device 100 (in FIG. 34A), that the method is not done, the method goes back to step S600 (near reference S4 in FIG. 38A). Otherwise the method is done, so the method ends. In the current embodiment, determining if the method is done may be based at least in part on a substantially periodic time interval or a detected periodic state, wherein the method may be continuously executed (looping from step S619 and back to step S600) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S619 and back to step S600) in a substantially aperiodic or on a needed basis. In other embodiments, the current step may not be required, or implemented elsewhere.

Figure 38C:
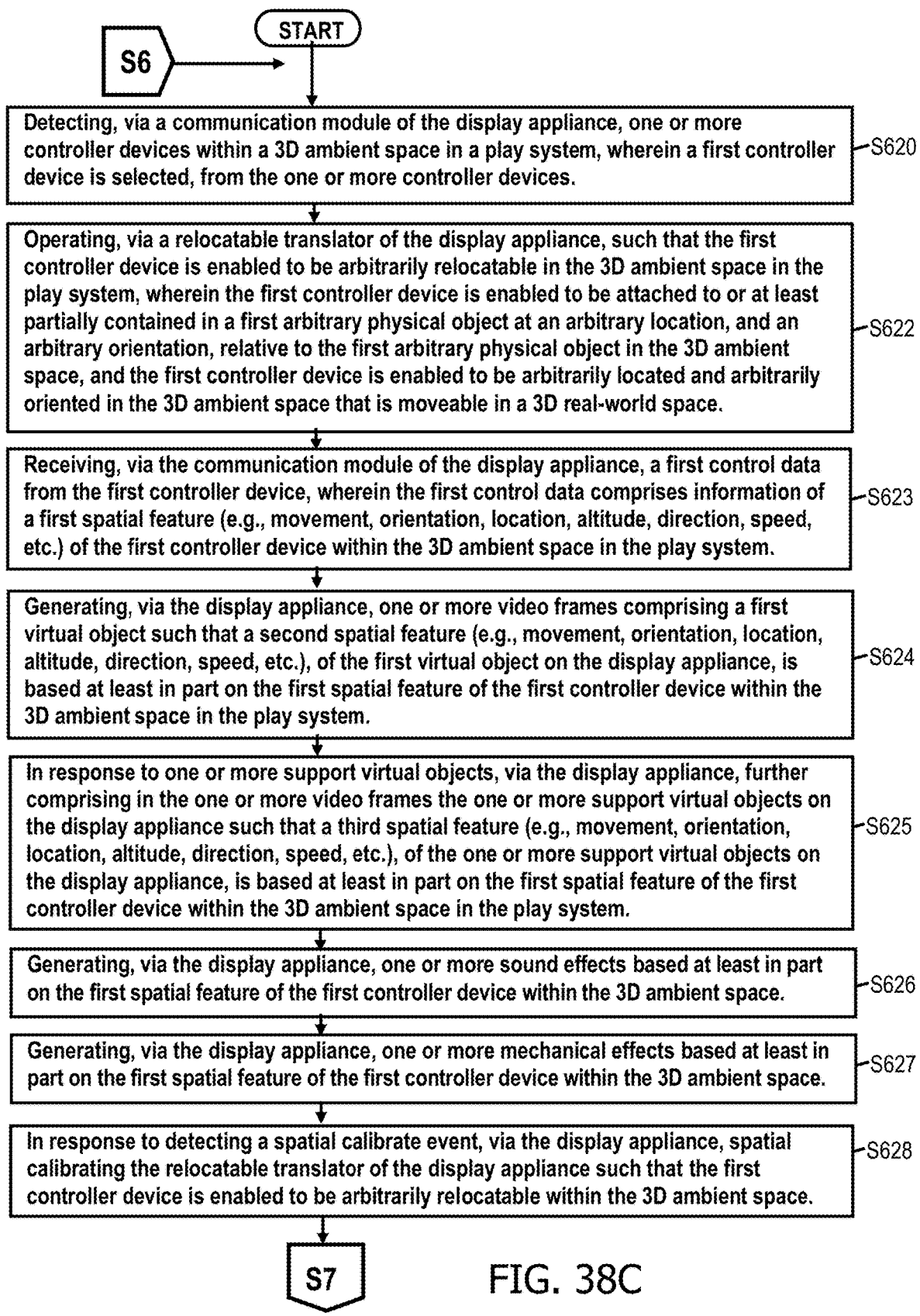
FIG. 38C is a first portion of a flowchart for the local play system of FIG. 32 and the remote play system of FIG. 35, showing a method for a display appliance, for generating one or more video frames comprising a virtual object based on a first controller device in the local play system.
Figure 38D:
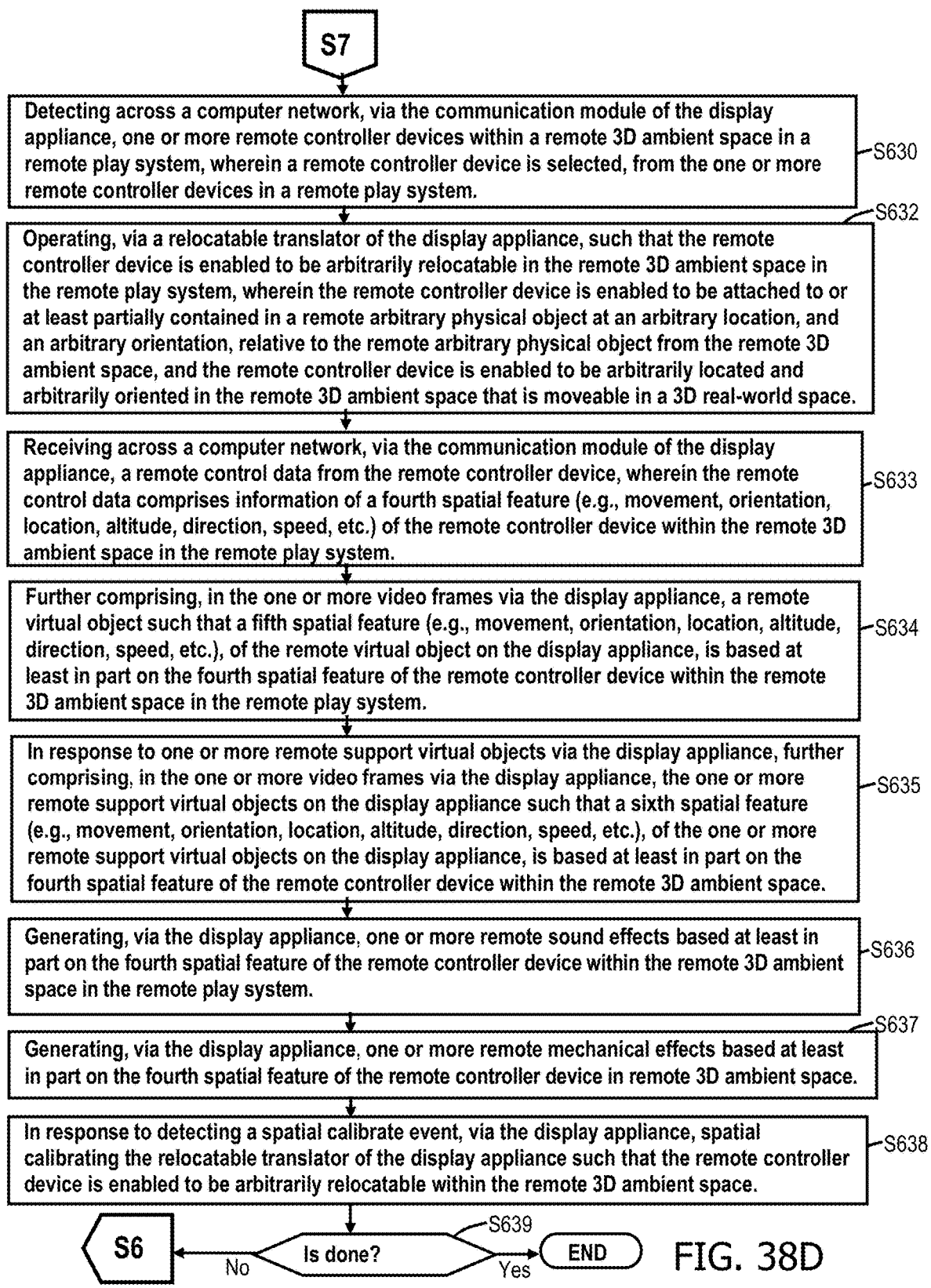
FIG. 38D is a second portion of a flowchart for the local play system of FIG. 32 and the remote play system of FIG. 35, showing a method for a display appliance, for further comprising, in one or more video frames on the display appliance, a remote virtual object based on a remote controller device in the remote play system.

Method for Display Appliance to Generate a Virtual Object Controlled by a Remote Controller Device Turning now to FIGS. 38C and 38D while referencing FIGS. 34A, 34B, 37A, 37B, 32, and 35, there shown is a first and second portion of a flowchart of an exemplary embodiment of a computer-implemented method for a display appliance, in a local play system, for generating one or more video frames comprising a remote virtual object based on a spatial feature of a remote controller device in a remote play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 202 of the play system 400. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 202, including one or more control units 210 and a first memory 220, wherein the one or more control units 210 execute computer instructions performing first operations in a play system 400 (in FIGS. 34A and 34B):

In some embodiments, beginning with step S620, detecting, via a communication module 218 of the display appliance 202 (in FIG. 34A), one or more controller devices within a 3D ambient space 304 in the play system 400, wherein a first controller device 100 is selected, from the one or more controller devices. In the current embodiment, the first controller device 100 may be iteratively and sequentially selected, from the one or more controller devices detected in the play system 400, whenever the current step is executed. In alternate embodiments, the first controller device 100 may be arbitrarily selected from the one or more controller devices, detected in the play system 400, although other approaches may be considered as well.

In some embodiments, in step S622, operating, via a relocatable translator 234 of the display appliance 202 (in FIG. 34A), such that the first controller device 100 is enabled to be arbitrarily relocatable in the 3D ambient space 304 of the play system 400, wherein the first controller device 100 is enabled to be attached to or at least partially contained in a first arbitrary physical object 350 at an arbitrary location, and an arbitrary orientation, relative to the first arbitrary physical object 350 in the 3D ambient space 304, and the first controller device 100 is enabled to be arbitrarily located and arbitrarily oriented in the 3D ambient space 304 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S623, receiving, via a communication module 218 of the display appliance 202 (in FIG. 34A), a first control data from the first controller device 100, wherein the first control data comprises information of a first spatial feature M0 (e.g., movement, orientation, location, altitude, direction, and/or speed, etc.) of the first controller device 100 within the 3D ambient space 304 in the play system 400. For a description of a "spatial feature," the reader may refer to the motion module 119 in FIG. 3 and elsewhere in this disclosure.

In some embodiments, in step S624, generating, via the display appliance 202 (in FIG. 34A), one or more video frames comprising a first virtual object 360A such that a second spatial feature V0A (e.g., movement, orientation, location, altitude, direction, speed, etc.), of the first virtual object 360A on the display appliance 202, is based at least in part on the first spatial feature M0 of the first controller device 100 within the 3D ambient space 304 in the play system 400. In various alternate embodiments, the current step may be modified in part, in whole, and/or in combination with the operational steps described in FIGS. 12K, 12L, 12M, 12N, 12O, and/or 12P, which are discussed in the section titled "Method for Controller Device to Modify a Virtual Object."

In some embodiments, in step S625, in response to the one or more support virtual objects 360B, via the display appliance 202 (in FIG. 34A), further comprising in the one or more video frames the one or more support virtual objects 360B such that a third spatial feature V0B (e.g., movement, orientation, location, altitude, direction, speed, etc.), of the one or more support virtual objects 360B on the display appliance 202, is based at least in part on the first spatial feature M0 of the first controller device 100 within the 3D ambient space 304 in the play system 400. In the current step, if there are no support virtual objects implemented, the method skips the current step. In some alternate embodiments, the current step may be optional and not required. In various alternate embodiments, the current step may be modified in part, in whole, and/or in combination with the operational steps described in FIGS. 12K, 12L, 12M, 12N, 12O, and/or 12P, which are discussed in the section titled "Method for Display Appliance to Modify a Virtual Object."

In some embodiments, in step S626, generating, via the display appliance 202 (in FIG. 34A), one or more sound effects (e.g., saber woosh, gunfire, human speech sound effects, etc.) based at least in part on the first spatial feature M0 of the first controller device 100 within the 3D ambient space 304 in the play system 400. In various embodiments, the current step may be optional and not required.

In some embodiments, in step S627, generating, via the display appliance 202, one or more mechanical effects (e.g., vibratory movements) based at least in part on the first spatial feature M0 of the first controller device 100 within the 3D ambient space 304 in the play system 400. In various embodiments, the current step may be optional and not required.

In some embodiments, in step S628, in response to detecting a spatial calibrate event, via the display appliance 202 (in FIG. 34A), spatial calibrating the relocatable translator 234 of the display appliance 202, such that the first controller device 100 is enabled to be arbitrarily relocatable within the 3D ambient space 304, wherein the first controller device 100 is enabled to be attached to or at least partially contained in a first arbitrary physical object 350 at an arbitrary location, and an arbitrary orientation, relative to the arbitrary physical object 350 within the 3D ambient space 304, and the first controller device 100 is enabled to be arbitrarily located and arbitrarily oriented in the 3D ambient space 304 that is movable in the 3D real-world space 303.

Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may not be required in the method.

The reader may now turn to the second portion of the flowchart in FIG. 38D (reference S7), where the method continues.

In some embodiments, beginning with step S630, detecting across a computer network 299, via a communication module 218 of the display appliance 202 (in FIG. 34A), one or more remote controller devices, wherein a remote controller device 101 is selected, from the one or more remote controller devices in a remote play system 401 (in FIG. 37A). In the current embodiment, the remote controller device 101 may be iteratively and sequentially selected, from the one or more remote controller devices detected in the remote play system 401, whenever the current step is executed. In alternate embodiments, the remote controller device 101 may be arbitrarily selected from the one or more remote controller devices, detected in the remote play system 401, although other approaches may be considered as well.

In some embodiments, in step S632, operating, via a relocatable translator 234 of the display appliance 202 (in FIG. 34A), such that the remote controller device 101 is enabled to be arbitrarily relocatable in a remote 3D ambient space 305 of the remote play system 401 (in FIG. 37A), wherein the first controller device 101 is enabled to be attached to or at least partially contained in a remote arbitrary physical object 351 at an arbitrary location, and an arbitrary orientation, relative to the remote arbitrary physical object 351 in the remote 3D ambient space 305, and the remote controller device 101 is enabled to be arbitrarily located and arbitrarily oriented in the remote 3D ambient space 305 that is movable in a 3D real-world space 303. In some alternate embodiments, the current step may be optional and not required. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S633, receiving across a computer network 299, via the communication module 218 of the display appliance 202 (in FIG. 34A), a remote control data from the remote controller device 101, wherein the remote control data comprises information of a fourth spatial feature M4 (e.g., movement, orientation, location, altitude, direction, and/or speed, etc.) of the remote controller device 101 within the remote 3D ambient space 305 of the remote play system 401 (in FIG. 37A). For a description of a "spatial feature," the reader may refer to the motion module 119 in FIG. 3 and elsewhere in this disclosure.

In some embodiments, in step S634, further comprising in the one or video frames, via the display appliance 202 in the play system 400 (in FIG. 34A), a remote virtual object 361A such that a fifth spatial feature V1A, of the remote virtual object 361A on the display appliance 202, is based at least in part on the fourth spatial feature M4 of the remote controller device 101 within the remote 3D ambient space 305 of the remote play system 401 (in FIG. 37A).

In some embodiments, in step S635, in response to the one or more remote support virtual objects via the display appliance 202 in the play system 400 (in FIG. 34A), further comprising in the one or more video frames the one or more remote support virtual objects 361B such that a sixth spatial feature V1B (e.g., movement, orientation, location, altitude, direction, speed, etc.), of the one or more remote support virtual objects 361B on the display appliance 202, is based at least in part on the fourth spatial feature M4 of the remote controller device 101 within the remote 3D ambient space 305 in the remote play system 401 (in FIG. 37A). In the current step, if there are no support virtual objects implemented, the method skips the current step. In some alternate embodiments, the current step may be optional and not required. In various alternate embodiments, the current step may be modified in part, in whole, and/or in combination with the operational steps described in FIGS. 12K, 12L, 12M, 12N, 12O, and/or 12P, which are discussed in the section titled "Method for Display Appliance to Modify a Virtual Object."

In some embodiments, in step S636, generating, via the display appliance 202 (in FIG. 34A), one or more remote sound effects (e.g., saber woosh, gunfire, human speech sound effects, etc.) based at least in part on the fourth spatial feature M4 of the remote controller device 101 within the remote 3D ambient space 305 of the remote play system 401 (in FIG. 37A). In various embodiments, the current step may be optional and not required.

In some embodiments, in step S637, generating, via the display appliance 202 (in FIG. 34A), one or more remote mechanical effects (e.g., vibratory movements) based at least in part on the fourth spatial feature M4 of the remote controller device 101 within the remote 3D ambient space 305 of the remote play system 401 (in FIG. 37A). In various embodiments, the current step may be optional and not required.

In some embodiments, in step S638, in response to detecting a spatial calibrate event, via the display appliance 202 in the play system 400 (in FIG. 34A), spatial calibrating the relocatable translator 234 of the display appliance 202, such that the remote controller device 101 is enabled to be arbitrarily relocatable within the remote 3D ambient space 305, wherein the remote controller device 101 is enabled to be attached to or at least partially contained in a arbitrary physical object 351 at an arbitrary location, and an arbitrary orientation, relative to the arbitrary physical object 351 within the remote 3D ambient space 305, and the remote controller device 101 is enabled to be arbitrarily located and arbitrarily oriented in the remote 3D ambient space 305 that is movable in the 3D real-world space 303. Otherwise if no detection of the spatial calibrate event occurred, the method skips the current step. In various embodiments, a spatial calibrate event may be based on, but not limited to, a spatial feature, user input, and/or gesture movement of the controller device 101 and/or the display appliance 202. In some alternate embodiments, the current step may be optional and not required. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may not be required in the method.

Finally, in some embodiments, in step S639, in response to determining, via the display appliance 202 (in FIG. 34A), that the method is not done, the method goes back to step S620 (near reference S6 in FIG. 38C). Otherwise the method is done, so the method ends. In the current embodiment, determining if the method is done may be based at least in part on a substantially periodic time interval or a detected periodic state, wherein the method may be continuously executed (looping from step S639 back to step S620) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S639 back to step S620) in a substantially aperiodic or on a needed basis. In other embodiments, the current step may not be required, or implemented elsewhere.

Multiple Play Systems with Gesture Movements of Arbitrary Physical Objects

So turning to FIGS. 39A, 39B, 40A, and 40B, there presented are some embodiments of gesture movements within a plurality of play systems 400 and 401 that may be located, but not limited to, thousands of kilometers apart. Further, the local play system 400 (in FIG. 39A) may be configured to interact with the remote play system 401 (in FIG. 40A), and vice versa, using arbitrary physical objects from 3D ambient spaces.

Figure 39A:
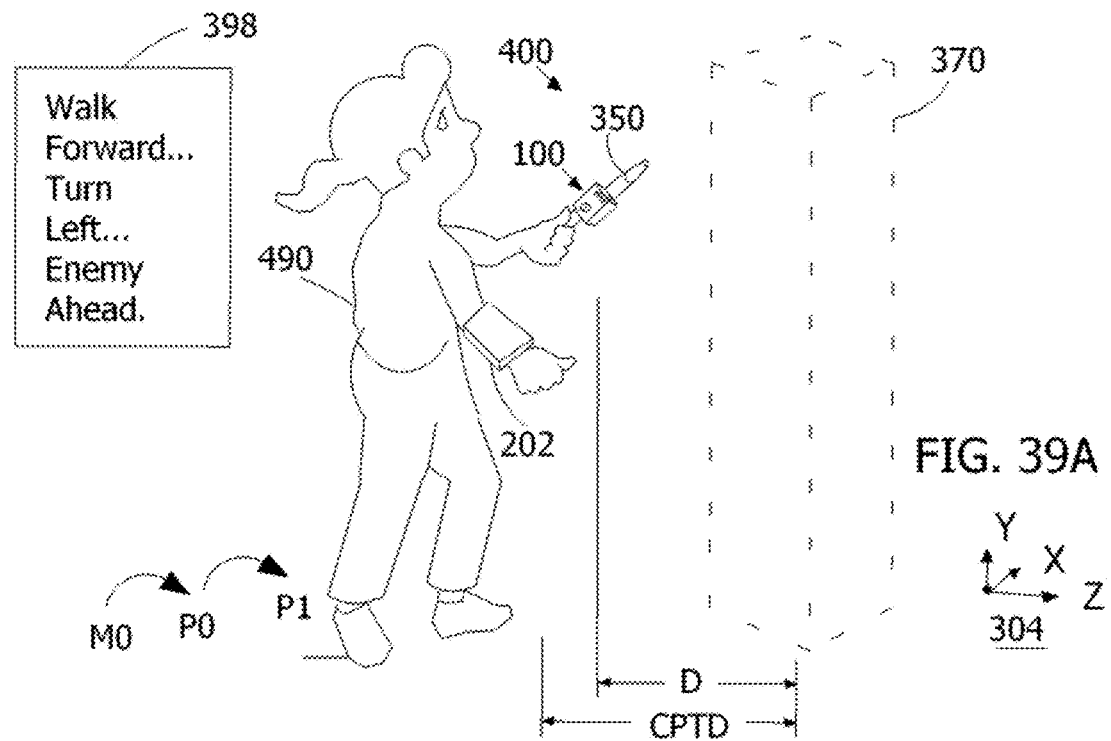
FIG. 39A is a perspective view for the play system of FIG. 32, where a controller device, connected to an arbitrarily physical object, detects a user walk gesture movement made by a user in a 3D ambient space, wherein a display appliance is attached to the arm of the user.

As depicted in FIG. 39A, the local play system 400 may comprise the first controller device 100 connected to the first arbitrary physical object 350, which is a writing pen, held by a user 490. Moreover, the play system 400 may implement the 3D ambient space 304 defined by spatial axis X, Y, and Z. Then in FIG. 39B, the local play system 400 may implement a 3D virtual space 206 defined by spatial axis I, J, and K. At least a portion of the virtual space 206 is visually presented on the display appliance 202 that includes a video display 258. In some embodiments, the display appliance 202 may comprise a wrist strap 199, enabling the display appliance 202 to be worn by the user 490, as shown in FIG. 39A.

Figure 40A:
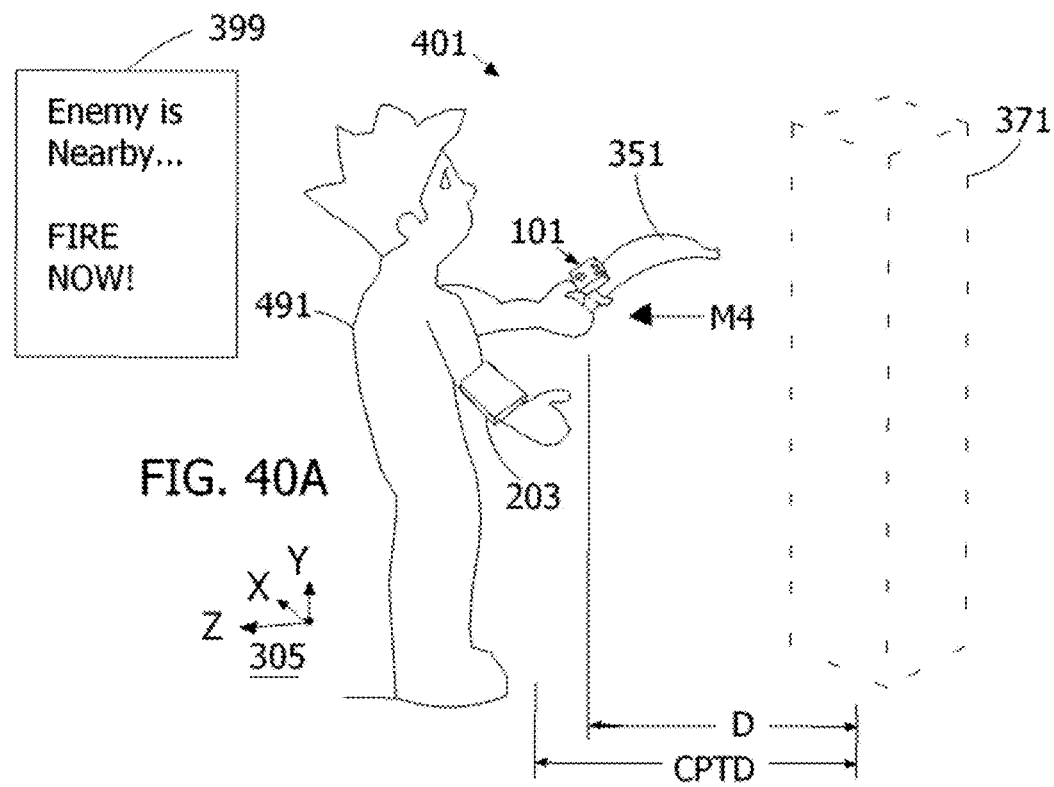
FIG. 40A is a perspective view for the play system of FIG. 35, where a controller device, connected to an arbitrarily physical object, detects a user walk gesture movement made by a user in a 3D ambient space, wherein a display appliance is attached to the arm of the user.
Figure 40B:
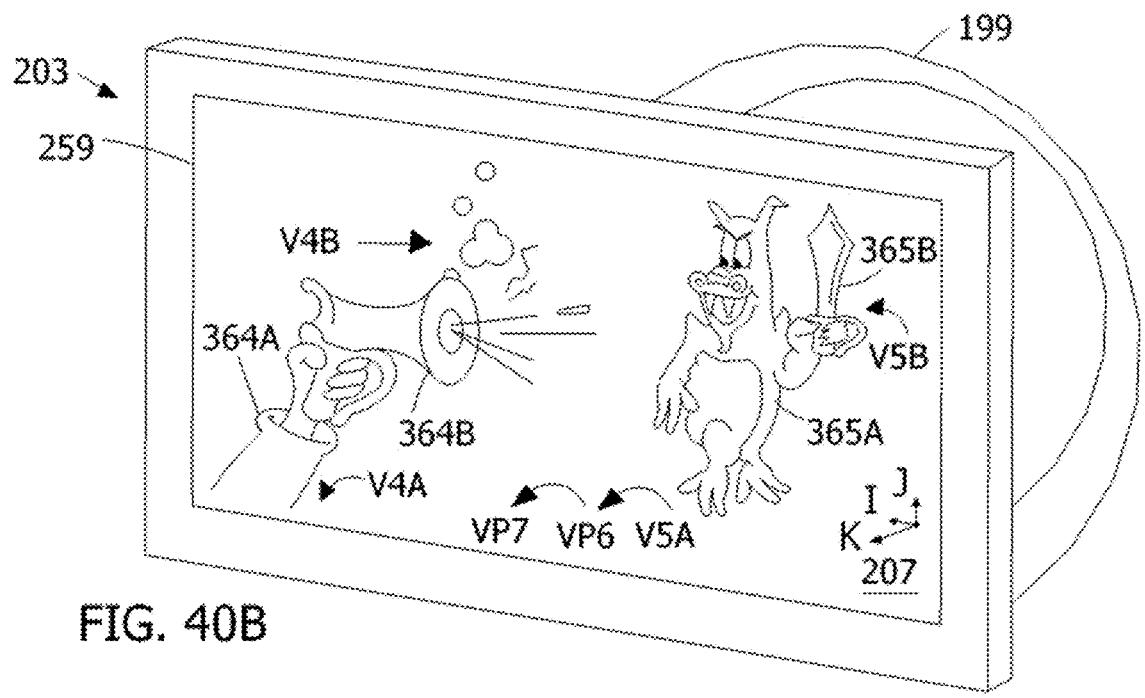
FIG. 40B is a perspective view for the play system of FIG. 35 and FIG. 39A, of a remote display appliance.

Similarly depicted in FIG. 40A, the remote play system 400 may comprise the remote controller device 101 connected to the remote arbitrary physical object 351, which is an edible banana fruit, held by a remote user 491. Moreover, the remote play system 401 may implement the remote 3D ambient space 305 defined by spatial axis X, Y, and Z. In FIG. 40B, the remote play system 401 may implement a 3D virtual space 207 defined by spatial axis I, J, and K. At least a portion of the virtual space 207 is visually presented on the remote display appliance 203 that includes a video display 259. In some embodiments, the display appliance 203 may comprise a wrist strap 199, enabling the remote display appliance 203 to be worn by the user 491, as shown in FIG. 40A.

Figure 39B:
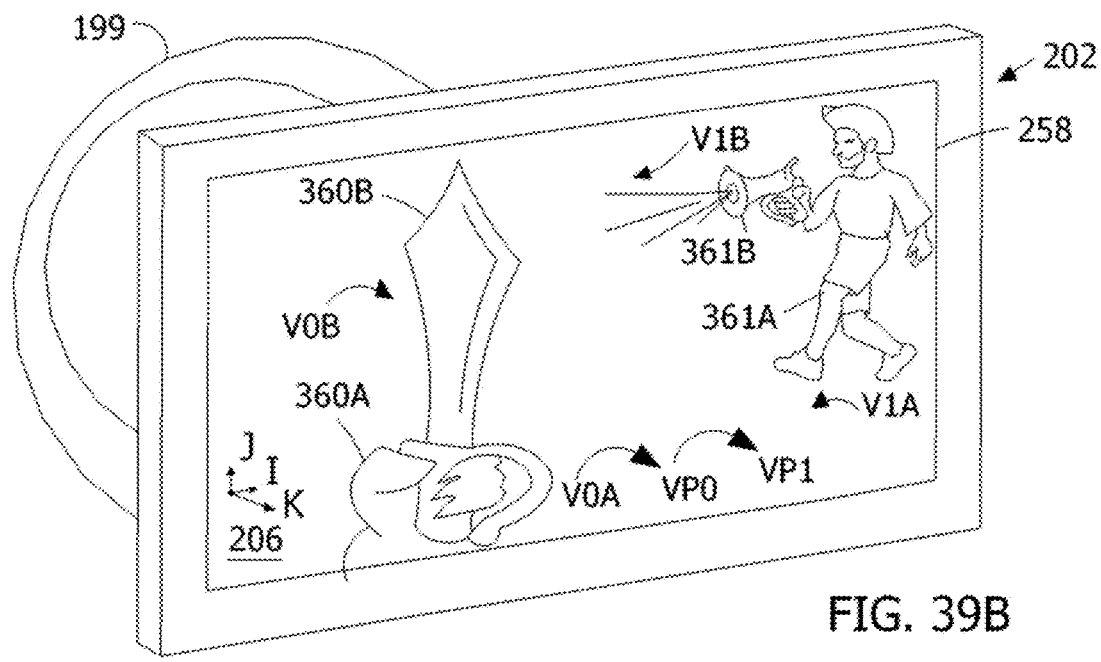
FIG. 39B is a perspective view for the play system of FIG. 32 and FIG. 39A, which shows a close-up view of a display appliance with a flexible strap for attaching to a user.

So now turning to FIGS. 39A, 39B, 40A, and 40B, some embodiments of play activity with gesture movements may begin. Whereby, the local user 490 (in FIG. 39A) and remote user 491 (in FIG. 40A) may create gesture movements using arbitrary physical objects 350 and 351 in the 3D ambient spaces 304 and 305. Turning first to FIGS. 39A and 39B of the local play system 400, the first controller device 100, attached to first arbitrary physical object 350, may be configured to detect gesture movements (e.g., human walking gesture, human running gesture, human jumping gesture, etc.) in 3D ambient space 304. As shown, a first gesture movement M0 may be a human walking gesture, which comprises, but not limited to: 1) a walking movement (as suggested by points P0, P1), on or above a surface, of one or more steps or hops having a spatial altitude of at least 20 mm (or 40 mm or 60 mm) above the surface within a five second time duration, and/or 2) a walking movement, across a surface, of two or more steps or hops that touch the surface at locations separated by at least a 20 mm (or 40 mm or 60 mm) spatial distance within a five second time duration. For a description of various "gesture movements," the reader may refer to the earlier discussion related to the gesture analyzer 137 in FIG. 3 and elsewhere in this disclosure.

For example, a user 490 may be walking in place or walking across a surface, creating a gesture movement M0 in the 3D ambient space 304 of the play system 400. Whereupon, the first controller device 100 may operably detect a first gesture movement M0 (e.g., human walking gesture, human running gesture, human jumping gesture, etc.) of the first controller device 100 and the first arbitrary physical object 350 in 3D ambient space 304. Thereby the first controller device 100 may transmit a first control data, comprising information of the first gesture movement M0, to the display appliance 202. And accordingly, the first controller device 100 may be at least in part controlling a first virtual object 360A and/or the one or more support virtual objects 360B, on the display appliance 202, such that a second movement V0A (as defined by points VP0 and VP1), of the first virtual object 360A, may be based at least in part on the first gesture movement M0 of the first controller device 100 and the first arbitrary physical object 350 within 3D ambient space 304 of the play system 400.

In addition, in some embodiments, the first controller device 100 may transmit the first control data, comprising the first gesture movement M0, across a computer network 299 (in FIGS. 32 and 35) to the remote display appliance 203 in the remote play system 401 (shown in FIGS. 40A and 40B). And accordingly, the first controller device 100 may be at least in part controlling a remote virtual object 365A and/or the one or more remote support virtual objects 365B (in FIGS. 40A and 40B), on the remote display appliance 203 in the remote play system 401, such that a third movement V5A (as defined by points VP6 and VP7), of the remote virtual object 365A and/or the one or more remote support virtual objects 365B, may be based at least in part on the first gesture movement M0 of the first controller device 100 and the first arbitrary physical object 350 within 3D ambient space 304 of the play system 400 (in FIGS. 39A and 39B). In some embodiments, the first gesture movement M0, of the first controller device 100 and first arbitrary physical object 350 in the play system 400, at least in part correlates with the third movement V5A, of the remote virtual object 365A and/or the one or more support virtual objects 365B on the remote display appliance 203 in the remote play system 401.

In some embodiments, the first controller device 100 may be at least in part controlling, via a communication module of the first controller device 100, one or more sound effects 398 (e.g., human speech sound effects with user instructions to move, swing, fire, launch, etc.) based at least in part on the first gesture movement M0 of the first controller device 100 within the 3D ambient space 304. The one or more sound effects 398 (in FIG. 39A) and 399 (in FIG. 40A) may comprise, but not limited to, human speech sound effects with user instructions to walk forward, walk left, walk right, turn around, swing, aim, fire, etc.

In some embodiments, the first controller device 100 may be generating, via a mechanical generator (e.g., similar to mechanical generator 114 in FIG. 3) of the first controller device 100, one or more mechanical effects based at least in part on the first gesture movement M0 of the first controller device 100 within the 3D ambient space 304.

Now turning to FIGS. 40A and 40B, there shown are embodiments of gesture operations of the remote play system 401. The remote controller device 101, coupled to remote arbitrary physical object 351, may be configured to detect gesture movements (e.g., gun trigger gesture, etc.), such as a second gesture movement M2 in the remote 3D ambient space 305 (e.g., caused by movement of the user 491). The second gesture movement M2 may be a gun trigger gesture, which may comprise, but not limited to: 1) two taps, two bump movements, or two simulated trigger pull movements of the controller device 101 and/or remote arbitrary physical object 351 within a three second time duration (e.g., via a finger or hand of the user 491), and/or 2) one or more taps, one or more bump movements, or one or more simulated trigger pull movements of the controller device 101 and/or remote arbitrary physical object 351 within a three second time duration (e.g., via a finger or hand of the user 491). For a description of various "gesture movements," the reader may refer to the earlier discussion related to the gesture analyzer 137 in FIG. 3 and elsewhere in this disclosure.

Moreover, in FIG. 40B, in response to detecting the second gesture movement M2, the remote controller device 101 may transmit a second control data, comprising information of the second gesture movement M2, to the remote display appliance 203. And accordingly, the remote controller device 101 may be at least in part controlling a remote virtual object 364A and/or the one or more remote support virtual objects 364B, on the remote display appliance 203, such that a fourth movement V4A, of the remote virtual object 364A, and a fifth movement V4B, of the one or more remote support virtual objects 364B, is based at least in part on the second gesture movement M2 of the remote controller device 101 and the remote arbitrary physical object 351 within remote 3D ambient space 305 of the remote play system 401. In some embodiments, in response to determining the second gesture movement M2 is a gun trigger gesture, the display appliance 203 generates one or more video frames comprised of the remote virtual object 364A and/or support virtual objects 364B that fire a gun, launch a projectile, or aim at a target, in the 3D virtual space 207, on the remote display appliance 203 in the remote play system 401.

In some embodiments, the remote controller device 101 may be at least in part controlling, via a communication module of the remote controller device 101, one or more sound effects 399 (e.g., human speech sound effects with user instructions to move, fire, launch, gun fire sound effects, "Blam!" etc.) based at least in part on the second gesture movement M2 of the remote controller device 101 within the remote 3D ambient space 305.

In some embodiments, the remote controller device 101 may be at least in part controlling, via a communication module of the remote controller device 101, one or more mechanical effects based at least in part on the second gesture movement M2 of the remote controller device 101 within the remote 3D ambient space 305.

Method for Controller Device to Gesture Control a Remote Virtual Object

Figure 41A:
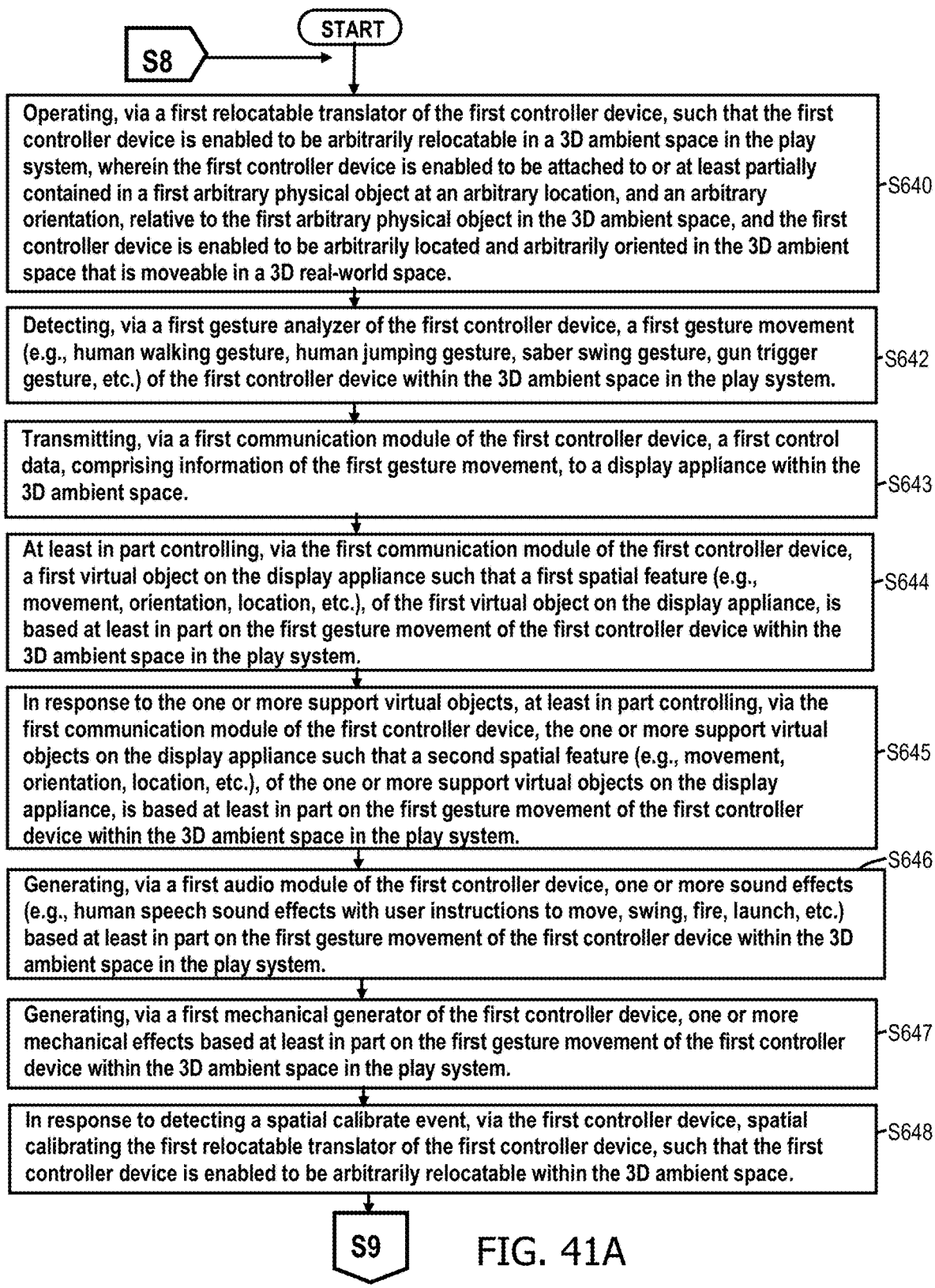
FIG. 41A is a first portion of a flowchart for the local play system of FIG. 32 and the remote play system of FIG. 35, showing a method for a first controller device at least in part controlling a virtual object, on a display appliance, based on a gesture movement of the first controller device in the local play system.
Figure 41B:
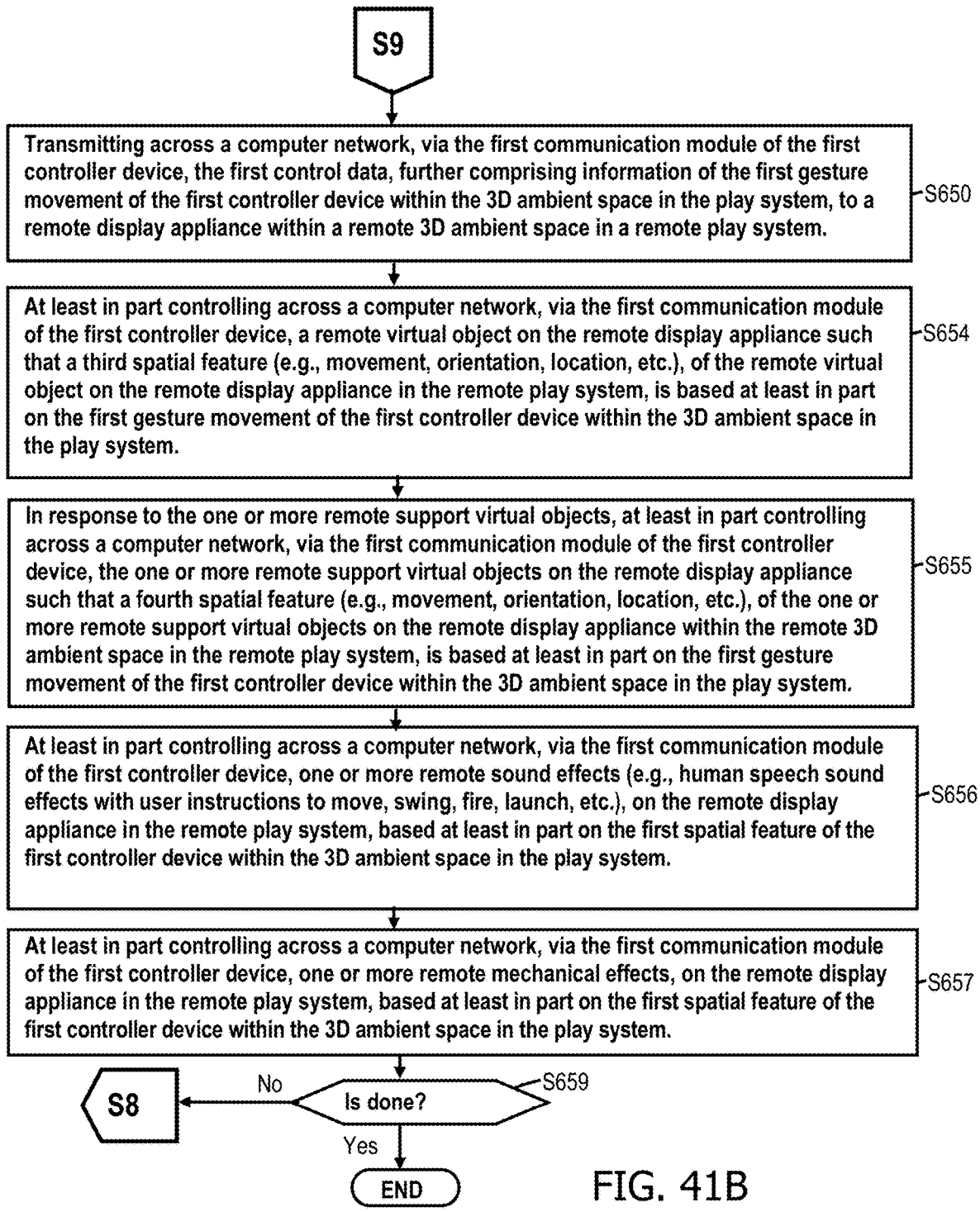
FIG. 41B is a second portion of a flowchart for the local play system of FIG. 32 and the remote play system of FIG. 35, showing a method for a first controller device at least in part controlling a remote virtual object, on a remote display appliance in the remote play system, based on a gesture movement of the first controller device in the local play system.

Turning now to FIGS. 41A and 41B while referencing FIGS. 39A, 39B, 40A, 40B, 32, and 35, there shown are first and second portions of a flowchart of an exemplary embodiment of a computer-implemented method for a first controller device with gesture movements in a local play system and a remote play system, although alternative methods may also be considered. In the current embodiment, the computable aspects of the method may be implemented in memory (e.g., memory 120 in FIG. 3) storing computer instructions (e.g., relocatable translator 134 and controller application 122) that, when executed by one or more control units (e.g., control unit 110), perform operations of the first controller device 100 of the play system 400. In some embodiments, the computer-implemented method may be implemented in one or more non-transitory computer-readable storage media (e.g., memory 120). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a first controller device 100, including one or more control units 110 and a first memory 120, wherein the one or more control units 110 execute computer instructions performing first operations in a play system 400:

In some embodiments, beginning with step S640, operating, via a first relocatable translator 134 of the first controller device 100, such that the first controller device 100 is enabled to be arbitrarily relocatable in a 3D ambient space 304 of the play system 400, wherein the first controller device 100 is enabled to be attached to or at least partially contained in a first arbitrary physical object 350 at an arbitrary location, and an arbitrary orientation, relative to the first arbitrary physical object 350 in the 3D ambient space 304, and the first controller device 100 is enabled to be arbitrarily located and arbitrarily oriented in the 3D ambient space 304 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Controller Device to Enable Arbitrarily Relocatable" or elsewhere herein.

In some embodiments, in step S642, detecting, via a first gesture analyzer 137 of the first controller device 100, a first gesture movement M0 (e.g., human walking gesture, human jumping gesture, saber swing gesture, gun trigger gesture, etc.) of the first controller device 100 within the 3D ambient space 304 in the play system 400. For a description of various "gesture movements," the reader may refer to the gesture analyzer 137 in FIG. 3 and elsewhere in this disclosure.

In some embodiments, in step S643, transmitting, via a first communication module 118 of the first controller device 100, a first control data, comprising information of the first gesture movement M0 of the first controller device 100, to a display appliance 202 in the play system 400.

In some embodiments, in step S644, at least in part controlling, via the first communication module 118 of the first controller device 100, a first virtual object 360A on the display appliance 202 such that a first spatial feature V0A (e.g., movement, orientation, location, etc.), of the first virtual object 360A on the display appliance 202, is based at least in part on the first gesture movement M0 of the first controller device 100 within the 3D ambient space 304 of the play system 400. For a description of a "spatial feature," the reader may refer to the motion module 119 in FIG. 3 and elsewhere in this disclosure.

In some embodiments, in step S645, in response to the one or more support virtual objects 360B, at least in part controlling, via the first communication module 118 of the first controller device 100, the one or more support virtual objects 360B on the display appliance 202 such that a second spatial feature V0B (e.g., movement, orientation, location, etc.), of the one or more support virtual objects 360B on the display appliance 202, is based at least in part on the first gesture movement M0 of the first controller device 100 within the 3D ambient space 304 in the play system 400.

In some embodiments, in step S646, generating, via a first audio module 112 of the first controller device 100, one or more sound effects 398 (e.g., human speech sound effects with user instructions to move, swing, fire, launch, etc.) based at least in part on the first gesture movement M0 of the first controller device 100 within the 3D ambient space 304 in the play system 400. In various embodiments, the current step may be optional and not required.

In some embodiments, in step S647, generating, via a first mechanical generator 114 of the first controller device 100, one or more mechanical effects (e.g., mechanical movements) based at least in part on the gesture movement M0 of the first controller device 100 within the 3D ambient space 304 in the play system 400. In various embodiments, the current step may be optional and not required.

In some embodiments, in step S648, in response to detecting a spatial calibrate event, via the first controller device 100, spatial calibrating the relocatable translator 134 of the first controller device 100, such that the first controller device 100 is enabled to be arbitrarily relocatable within the 3D ambient space 304, wherein the first controller device 100 is enabled to be attached to or at least partially contained in a first arbitrary physical object 350 at an arbitrary location, and an arbitrary orientation, relative to the arbitrary physical object 350 within the 3D ambient space 304, and the first controller device 100 is enabled to be arbitrarily located and arbitrarily oriented in the 3D ambient space 304 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10B, 10C, 10D, 10E, 10F, and/or 10G, which are discussed in the section titled "Method for Controller Device to Spatial Calibrate in Realtime." In some alternate embodiments, the current step may not be required in the method.

The reader may now turn to the second portion of the flowchart in FIG. 41B (reference S9), where the method continues.

In some embodiments, in step S650, transmitting across a computer network 299, via a first communication module 118 of the first controller device 100, the first control data, comprising information of the first gesture movement M0 of the first controller device 100 within the 3D ambient space 304 in the play system 400, to a remote display appliance 203 within a remote 3D ambient space 305 in a remote play system 401.

In some embodiments, in step S654, at least in part controlling across a computer network 299, via the first communication module 118 of the first controller device 100, a remote virtual object 365A on the remote display appliance 203 such that a third spatial feature V5A (e.g., movement, orientation, location, etc.), of the remote virtual object 365A on the remote display appliance 203 in the remote play system 401, is based at least in part on the first gesture movement M0 of the first controller device 100 within the 3D ambient space 304 in the play system 400.

In some embodiments, in step S655, in response to the one or more remote support virtual objects 365B, at least in part controlling across a computer network 299, via the first communication module 118 of the first controller device 100, the one or more remote support virtual objects 365B on the remote display appliance 203 such that a fourth spatial feature V5B (e.g., movement, orientation, location, etc.), of the one or more remote support virtual objects 365B on the remote display appliance 203 within the remote 3D ambient space 305 in the remote play system 401, is based at least in part on the first gesture movement M0 of the first controller device 100 within the 3D ambient space 304 in the play system 400.

In some embodiments, in step S656, at least in part controlling across a computer network 299, via the first communication module 118 of the first controller device 100, one or more remote sound effects 399 (e.g., human speech sound effects with user instructions to move, swing, fire, launch, etc.), on the remote display appliance 205 in the remote play system 401 (in FIG. 37A), based at least in part on the first gesture movement M0 of the first controller device 100 within the 3D ambient space 304 in the play system 400 (in FIG. 34A).

In some embodiments, in step S657, at least in part controlling across a computer network 299, via the first communication module 118 of the first controller device 100, one or more remote mechanical effects (e.g. vibratory movements), on the remote display appliance 205 in the remote play system 401 (in FIG. 37A), based at least in part on the first gesture movement M0 of the first controller device 100 within the 3D ambient space 304 in the play system 400 (in FIG. 34A).

Finally, in some embodiments, in step S659, in response to determining, via the first controller device 100, that the method is not done, the method goes back to step S640 (via reference S8 in FIG. 41A). Otherwise the method is done, so the method ends. In the current embodiment, determining if the method is done may be based at least in part on a substantially periodic time interval or a detected periodic state, wherein the method may be continuously executed (looping from step S659 and back to step S640) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S659 and back to step S640) in a substantially aperiodic or on a needed basis. In other embodiments, the current step may not be required, or implemented elsewhere.

Figure 41D:
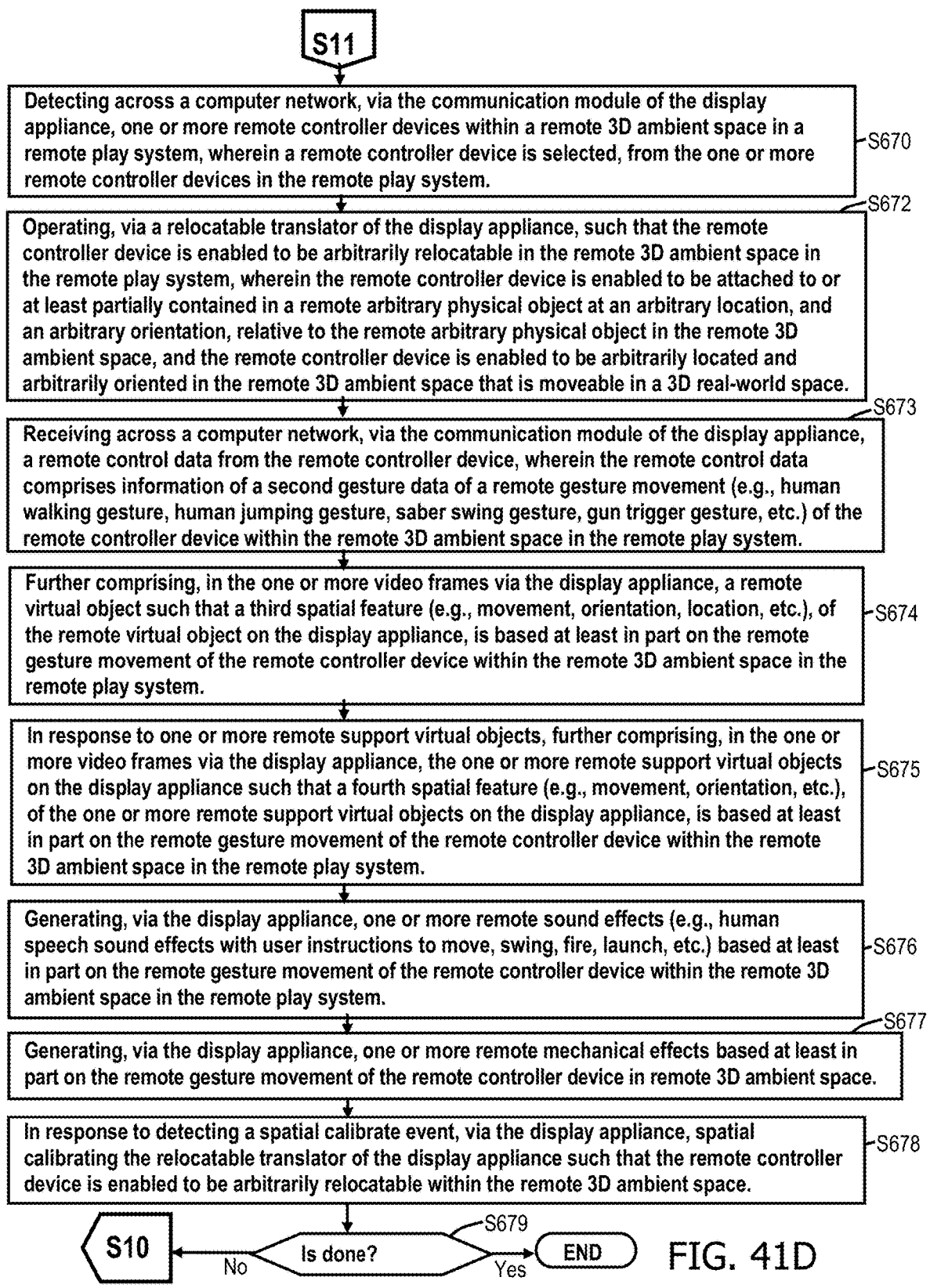
FIG. 41D is a second portion of a flowchart for the local play system of FIG. 32 and the remote play system of FIG. 35, showing a method for a display appliance, for further comprising, in one or more video frames on the display appliance, a remote virtual object based on a remote gesture movement of a remote controller device in the remote play system.

Method for Display Appliance to Generate a Virtual Object that is Gesture Controlled by Controller Device Turning now to FIGS. 41C and 41D while referencing FIGS. 39A, 39B, 40A, 40B, 32, and 35, there shown are first and second portions of a flowchart of an exemplary embodiment of a computer-implemented method for a display appliance that generates one or more virtual objects based on gesture movements of controller devices in a local play system and a remote play system, although alternative methods may also be considered. In the current embodiment, the computable aspects of the method may be implemented in memory (e.g., memory 220 in FIG. 5) storing computer instructions (e.g., relocatable translator 234 and application 222) that, when executed by one or more control units (e.g., control unit 210), perform operations of the display appliance 202 of the play system 400. In some embodiments, the computer-implemented method may be implemented in one or more non-transitory computer-readable storage media (e.g., memory 220). In various embodiments, the computer implemented method may be continuously and periodically executed in a time interval (e.g., every 0.03 seconds) or continually executed on a needed basis. Whereby, play system may be operating multimedia effects in real-time with play activity for one or more users.

So to begin, in some embodiments, a computer-implemented method may comprise: at a display appliance 202, including one or more control units 210 and a first memory 220, wherein the one or more control units 210 execute computer instructions performing first operations in a play system 400:

In some embodiments, beginning with step S660, detecting, via a communication module 218 of the display appliance 202, one or more controller devices within a 3D ambient space 304 in the play system 400, wherein a first controller device 100 is selected, from the one or more controller devices. In the current embodiment, the first controller device 100 may be iteratively and sequentially selected, from the one or more controller devices detected in the play system 400, whenever the current step is executed. In alternate embodiments, the first controller device 100 may be arbitrarily selected from the one or more controller devices, detected in the play system 400, although other approaches may be considered as well.

In some embodiments, in step S662, operating, via a relocatable translator 234 of the display appliance 202, such that the first controller device 100 is enabled to be arbitrarily relocatable in the 3D ambient space 304 of the play system 400, wherein the first controller device 100 is enabled to be attached to or at least partially contained in a first arbitrary physical object 350 at an arbitrary location, and an arbitrary orientation, relative to the first arbitrary physical object 350 in the 3D ambient space 304, and the first controller device 100 is enabled to be arbitrarily located and arbitrarily oriented in the 3D ambient space 304 that is movable in a 3D real-world space 303. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S663, receiving, via a communication module 218 of the display appliance 202, a first control data comprising information of a first gesture movement M0 (e.g., toy walking gesture, toy takeoff gesture, toy landing gesture, double tap gesture, etc.) of the first controller device 100 within the 3D ambient space 304 in the play system 400. For a description of a "gesture movement," the reader may refer to gesture analyzers 137 and 237 in FIGS. 3 and 5 and elsewhere in this disclosure.

In some embodiments, in step S664, generating, via the display appliance 202, one or more video frames comprising a first virtual object 360A such that a first spatial feature V0A (e.g., movement, orientation, location, etc.), of the first virtual object 360A on the display appliance 202, is based at least in part on the first gesture movement M0 of the first controller device 100 within the 3D ambient space 304 in the play system 400. In various alternate embodiments, the current step may be modified in part, in whole, and/or in combination with the operational steps described in FIGS. 12K, 12L, 12M, 12N, 12O, and/or 12P, which are discussed in the section titled "Method for Display Appliance to Modify a Virtual Object." For a description of a "spatial feature," the reader may refer to the motion module 119 in FIG. 3 and elsewhere in this disclosure.

In some embodiments, in step S665, in response to one or more support virtual objects 360B via the display appliance 202, further comprising, in the one or more video frames, the one or more support virtual objects 360B on the display appliance 202 such that a second spatial feature V0B (e.g., movement, orientation, location, etc.), of the one or more support virtual objects 360B on the display appliance 202, is based at least in part on the first gesture movement M0 of the first controller device 100 within the 3D ambient space 304 in the play system 400. In some embodiments, if there are no support virtual objects enabled, the current step may be skipped. In various embodiments, the current step may be optional and not required. In various alternate embodiments, the current step may be modified in part, in whole, and/or in combination with the operational steps described in FIGS. 12K, 12L, 12M, 12N, 12O, and/or 12P, which are discussed in the section titled "Method for Display Appliance to Modify a Virtual Object."

In some embodiments, in step S666, generating, via the display appliance 202, one or more sound effects 398 (e.g., human speech sound effects with user instructions to move, swing, fire, launch, etc.) based at least in part on the first gesture movement M0 of the first controller device 100 within the 3D ambient space 304 in the play system 400. In various embodiments, the current step may be optional and not required.

In some embodiments, in step S667, generating, via the display appliance 202, one or more mechanical effects based at least in part on the first gesture movement M0 of the first controller device 100 within the 3D ambient space 304 in the play system 400. In various embodiments, the current step may be optional and not required.

In some embodiments, in step S668, in response to detecting a spatial calibrate event, via the display appliance 202, spatial calibrating the relocatable translator 234 of the display appliance 200, such that the first controller device 100 is enabled to be arbitrarily relocatable within the 3D ambient space 304, wherein the first controller device 100 is enabled to be attached to or at least partially contained in a first arbitrary physical object 350 at an arbitrary location, and an arbitrary orientation, relative to the arbitrary physical object 350 within the 3D ambient space 304, and the first controller device 100 is enabled to be arbitrarily located and arbitrarily oriented in the 3D ambient space 304 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may not be required in the method.

The reader may now turn to the second portion of the flowchart in FIG. 41D (reference S11), where the method continues.

In some embodiments, beginning with step S670, detecting across a computer network 299, via the communication module 218 of the display appliance 202, one or more remote controller devices within a remote 3D ambient space 305 in a remote play system 401, wherein a remote controller device 101 is selected, from the one or more remote controller devices in the remote play system 401. In the current embodiment, the remote controller device 101 may be iteratively and sequentially selected, from the one or more remote controller devices detected in the remote play system 401, whenever the current step is executed. In alternate embodiments, the remote controller device 101 may be arbitrarily selected from the one or more remote controller devices, detected in the remote play system 401, although other approaches may be considered as well.

In some embodiments, in step S672, operating, via a relocatable translator 234 of the display appliance 202, such that the remote controller device 101 is enabled to be arbitrarily relocatable in the remote 3D ambient space 305 of the remote play system 401, wherein the first controller device 101 is enabled to be attached to or at least partially contained in a remote arbitrary physical object 351 at an arbitrary location, and an arbitrary orientation, relative to the remote arbitrary physical object 351 in the remote 3D ambient space 305, and the remote controller device 101 is enabled to be arbitrarily located and arbitrarily oriented within the remote 3D ambient space 305 that is movable in a 3D real-world space 303. In some alternate embodiments, the current step may be optional and not required. In some alternate embodiments, the current step may be replaced in part, in whole, and/or in combination with the operational steps of FIGS. 12C, 12D, 12E, 12F, 12G, 12H, 12I, and/or 12J, or similar operations, which are discussed in the section titled "Method for Display Appliance to Enable Arbitrarily Relocatable."

In some embodiments, in step S673, receiving across a computer network 299, via the communication module 218 of the display appliance 202 (in FIG. 39A), a remote control data from the remote controller device 101, wherein the remote control data comprises information of a remote gesture movement M2 (e.g., human walking gesture, human jumping gesture, saber swing gesture, gun trigger gesture, etc.) of the remote controller device 101 within the remote 3D ambient space 305 in the remote play system 401 (in FIG. 40A). For a description of various "gesture movements," the reader may refer to the gesture analyzer 137 in FIG. 3 and elsewhere in this disclosure.

In some embodiments, in step S674, further comprising, in the one or more video frames via the display appliance 202, a remote virtual object 361A such that a second spatial feature V1A (e.g., movement, orientation, location, etc.), of the remote virtual object 361A on the display appliance 202, is based at least in part on the remote gesture movement M2 of the remote controller device 101 within the remote 3D ambient space 305 in the remote play system 401. For a description of a "spatial feature," the reader may refer to the motion module 119 in FIG. 3 and elsewhere in this disclosure.

in some embodiments, in step S675, in response to one or more remote support virtual objects, further comprising, in the one or more video frames via the display appliance 202, the one or more remote support virtual objects 361B on the display appliance 202 such that a fourth spatial feature V1B (e.g., movement, orientation, location etc.), of the one or more remote support virtual objects 361B on the display appliance 202, is based at least in part on the remote gesture movement M2 of the remote controller device 101 within the remote 3D ambient space 305 in the remote play system 401.

In some embodiments, in step S676, generating, via the display appliance 202, one or more remote sound effects (e.g., human speech sound effects with user instructions to move, swing, fire, launch, etc.) based at least in part on the remote gesture movement M2 of the remote controller device 101 within the remote 3D ambient space 305 of the remote play system 401. In various embodiments, the current step may be optional and not required.

In some embodiments, in step S677, generating, via the display appliance 202, one or more remote mechanical effects (e.g., vibratory movements) based at least in part on the remote gesture movement M2 of the remote controller device 101 within the remote 3D ambient space 305 of the remote play system 401. In various embodiments, the current step may be optional and not required.

In some embodiments, in step S678, in response to detecting a spatial calibrate event, via the display appliance 202, spatial calibrating the relocatable translator 234 of the display appliance 202, such that the remote controller device 101 is enabled to be arbitrarily relocatable within the remote 3D ambient space 305 in the remote play system 401, wherein the remote controller device 101 is enabled to be attached to or at least partially contained in the remote arbitrary physical object 351 at an arbitrary location, and an arbitrary orientation, relative to the remote arbitrary physical object 351 within the remote 3D ambient space 305, and the remote controller device 101 is enabled to be arbitrarily located and arbitrarily oriented in the remote 3D ambient space 305 that is movable in the 3D real-world space 303. Otherwise if no detection of the spatial calibrate event occurred, the method skips the current step. In various embodiments, a spatial calibrate event may be based on, but not limited to, a spatial feature, user input, spatial distance between a controller device and a display appliance, and/or gesture movement of a controller device or a display appliance. In various alternate embodiments, the current step may be replaced in part, in whole, and/or in combination with the operational steps described in FIGS. 10H, 10I, 10J, 10K, 10L, and/or 10M, which are discussed in the section titled "Method for Display Appliance to Spatial Calibrate in Real-time." In some alternate embodiments, the current step may be optional and not required.

Finally, in some embodiments, in step S679, in response to determining, via the display appliance 202, that the method is not done, the method goes back to step S660 (via reference S10 in FIG. 41C). Otherwise the method is done, so the method ends. In the current embodiment, determining if the method is done may be based at least in part on a substantially periodic time interval or a detected periodic state, wherein the method may be continuously executed (looping from step S679 back to step S660) in a substantially periodic time interval (e.g., every 0.03 seconds, or every video frame). In some alternate embodiments, determining if the method is done may be based at least in part on sporadic time intervals or a detected needed state, wherein the method may be continually executed (looping from step S679 back to step S660) in a substantially aperiodic or on a needed basis. In other embodiments, the current step may not be required, or implemented elsewhere.

Alternative Play Systems

In some alternative embodiments, a play system may comprise a controller device that may be integrated with, installed in, or pre-attached to an arbitrary physical object that is, but not limited to, a toy, action figure, doll, vehicle, toy gun (or toy blaster), handheld shield, handheld saber, fishing pole, user-wearable wrist bracelet, ring, pendant, necklace, ankle bracelet, or crown.

Figure 42:
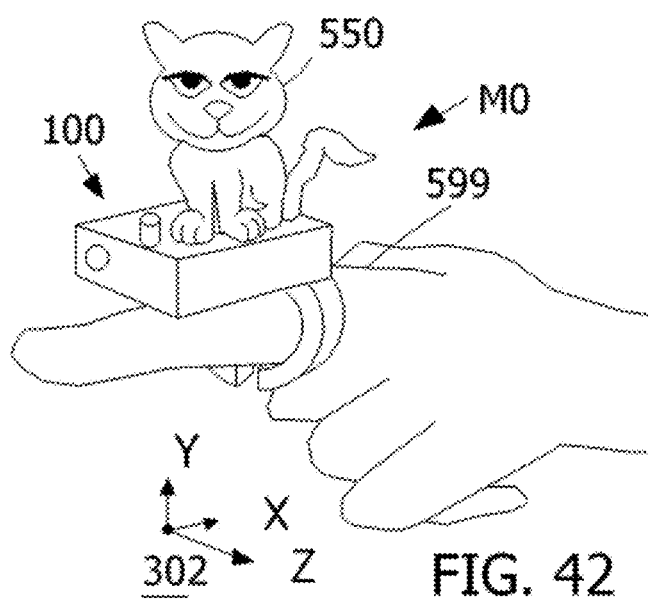
FIG. 42 is a perspective view of an alternate embodiment of a controller device, wherein the controller device is attached to a user and an arbitrary physical object.

In some alternate embodiments, FIG. 42 shows a play system may comprise a controller device 100 configured to be attached to a user 599 and further attached to or at least partially contained in an arbitrary physical object 550 within a 3D ambient space 302 in a play system. That is, the controller device 100 (constructed similar to controller device 100 of FIGS. 2A-2D and 3) may be configured to be attached to the user 599, via a first object connector 181, such as on a user finger or wrist. And the controller device 100 may be further attached, via a second object connector (similar to peg object connector 185B in FIG. 2A), to the arbitrary physical object 550 that has a peg hole in its base (not shown). Yet the controller device 100 may provide all of the functionality previously disclosed (in FIGS. 1-41D), including detecting a gesture movement M0 in 3D ambient space 302, and responding accordingly.

Figure 43:
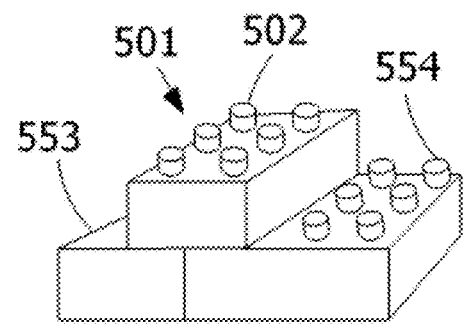
FIG. 43 is a perspective view of an alternate embodiment of a controller device, wherein the controller device is coupled to a plurality of arbitrary physical objects.

In various alternate embodiments, FIG. 43 shows a play system may comprise a controller device 501 (similar to device 100 of FIG. 3) configured to couple or attach to a plurality of arbitrary physical objects 553 and 554 that are, but not limited to, blocks, modular elements, or components of a toy construction set or construction set. In some embodiments, controller device 501 may include one or more object connectors 502 comprising a plurality of peg object connectors 502 (similar to peg object connector 185A in FIG. 2A) and peg hole object connectors (similar to peg hole object connector 185D in FIG. 2A) disposed on the underside (not shown) of the controller device 501. Whereby, controller device 501 can couple, via the object connectors 502, to the plurality of arbitrary physical objects 553 and 554.

Figure 44A:
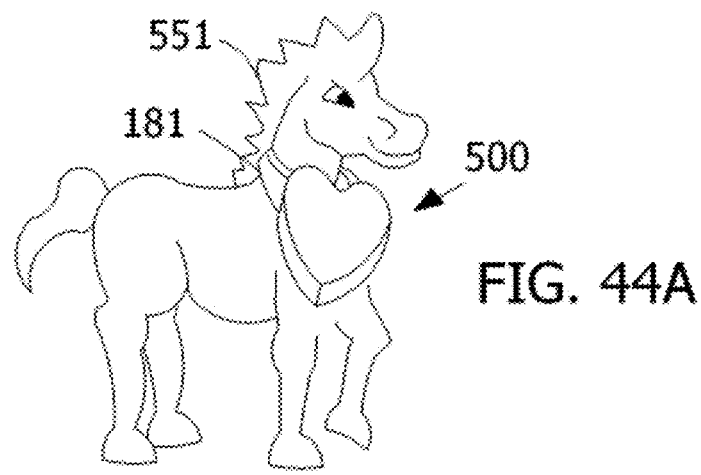
FIG. 44A is a perspective view of an alternate embodiment of a controller device, wherein the controller device physically transforms to a pendant for a toy horse.
Figure 44B:
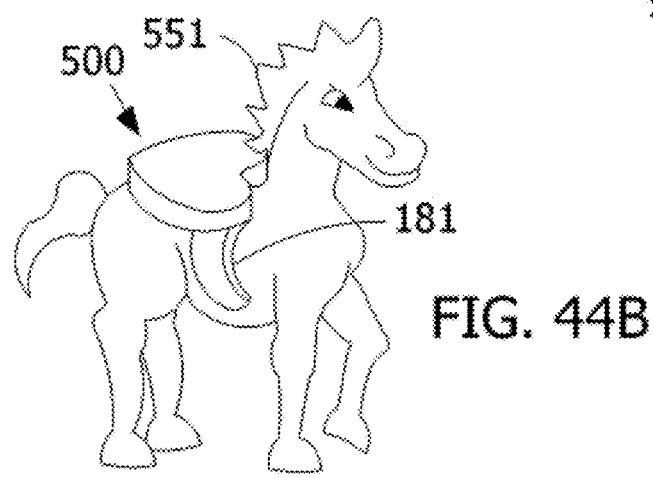
FIG. 44B is a perspective view of the controller device of FIG. 43A, wherein the controller device physically transforms to a saddle for a toy horse.
Figure 44C:
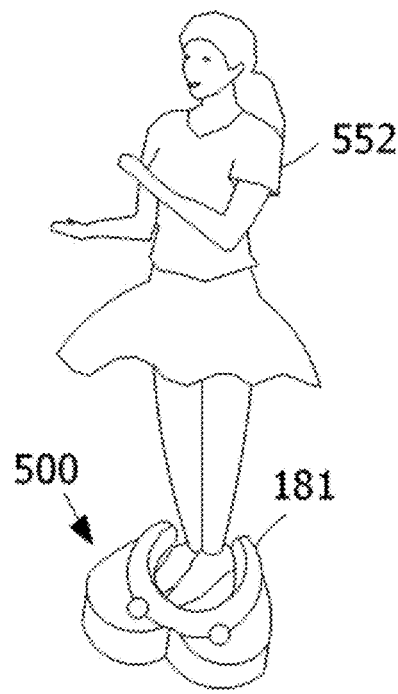
FIG. 44C is a perspective view of the controller device of FIG. 43A, wherein the controller device physically transforms to a support stand for a toy doll.

In some alternate embodiments, FIGS. 44A-44C show a play system may comprise a controller device configured to physically transform or is deformable between two or more functional shapes while coupled to arbitrary physical objects. In FIG. 44A there shown is a controller device 500 (configured similar to controller device 100 of FIG. 3) that is physically transformed to a first functional shape (of a pendant) and coupled, via an object connector 181, to the neck of a first arbitrary physical object 551 that is a toy horse, and in FIG. 44B the controller device 500 is physically transformed to a second functional shape (of a saddle) and coupled to the back of the first arbitrary physical object 551 of the toy horse, and in FIG. 44C the controller device 500 is physically transformed to a support stand and coupled to the base of a second arbitrary physical object 552 that is a toy doll, toy action figure, or toy character, as examples.

Finally, this entire document discloses embodiments that are not necessarily mutually exclusive, for some alternative embodiments may be constructed that combine, in whole or part, aspects of the disclosed embodiments. Various alternatives and embodiments are contemplated as being within the scope of the following claims particularly pointing out and distinctly claiming the subject matter regarded as the invention.

I claim:

1. A first controller device for a play system, the first controller device comprising:
    a first housing, comprising:
        a first object connector disposed on the first housing such that the first controller device is configured to be attached to or at least partially contained in a first arbitrary physical object within a 3D ambient space of the play system;
    a first control unit coupled to the first housing, wherein the first control unit is configured to execute computer instructions;
    a first motion module operatively coupled to the first control unit;
    a first communication module operatively coupled to the first control unit;
    a first memory operatively coupled to the first control unit, comprising:
        a first relocatable translator, wherein the first memory is configured with computer instructions that, when executed by the first control unit, cause the first controller device to perform first operations comprising:
            operating, via the first relocatable translator, such that the first controller device is enabled to be arbitrarily relocatable in the 3D ambient space of the play system, wherein the first controller device is enabled to be attached to or at least partially contained in the first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in a 3D real-world space;
            detecting, via the first motion module, a first orientation of the first controller device within the 3D ambient space;
            transmitting, via the first communication module, a first control data, comprising information of the first orientation, to a display appliance within the 3D ambient space; and
            at least in part controlling, via the first communication module of the first controller device, a first virtual object on the display appliance such that a second orientation, of the first virtual object on the display appliance, is based at least in part on the first orientation of the first controller device within the 3D ambient space of the play system.

2. The first controller device of claim 1, the first operations further comprising:
    in response to detecting a spatial calibrate event, via the first controller device, based at least in part on the first controller device is located at a spatial distance, from the display appliance, that is less than or equal to a spatial calibrate threshold distance within the 3D ambient space, the response comprising:
        spatial calibrating the first relocatable translator of the first controller device such that the first controller device is enabled to be arbitrarily relocatable within the 3D ambient space, wherein the first controller device is enabled to be attached to or at least partially contained in the first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in the 3D real-world space.

3. The first controller device of claim 1, the first memory further comprising:
    a first gesture analyzer; and
    the first operations further comprising:
        detecting, via the first gesture analyzer, a first gesture movement of the first controller device within the 3D ambient space;
        transmitting, via the first communication module, the first control data, further comprising information of the first gesture movement, to the display appliance within the 3D ambient space; and at least in part controlling, via the first communication module of the first controller device, the first virtual object on the display appliance such that an at least one movement, of the first virtual object on the display appliance, is based at least in part on the first gesture movement of the first controller device within the 3D ambient space.

4. The first controller device of claim 1, the first memory further comprising:
 a collision analyzer; and
 the first operations further comprising:
 detecting, via the collision analyzer, an at least indirect collision of the first controller device with a second arbitrary physical object within the 3D ambient space;
 transmitting, via the first communication module, the first control data, further comprising information of the at least indirect collision of the first controller device with the second arbitrary physical object, to the display appliance within the 3D ambient space; and
 at least in part controlling, via the first communication module of the first controller device, the first virtual object on the display appliance such that an at least one movement, of the first virtual object on the display appliance, is based at least in part on the at least indirect collision of the first controller device with the second arbitrary physical object within the 3D ambient space.

5. The first controller device of claim 1, the first memory further comprising:
 a collision analyzer; and
 the first operations further comprising:
 detecting, via the collision analyzer, an at least indirect collision of the first controller device with a second controller device within the 3D ambient space;
 transmitting, via the first communication module, the first control data, further comprising information of the at least indirect collision of the first controller device with the second controller device, to the display appliance within the 3D ambient space; and
 at least in part controlling, via the first communication module of the first controller device, the first virtual object on the display appliance such that an at least one movement, of the first virtual object on the display appliance, is based at least in part on the at least indirect collision of the first controller device with the second controller device within the 3D ambient space.

6. The first controller device of claim 1, further comprising:
 an at least one light sensor operatively coupled to the first control unit;
 the first memory further comprising:
 an imaginary object analyzer; and
 the first operations further comprising:
 detecting, via the at least one light sensor, a modulated light by the first controller device within the 3D ambient space;
 transmitting, via the first communication module, the first control data to the display appliance within the 3D ambient space, wherein the first control data further comprises information of the modulated light detected by the first controller device; and
 at least in part controlling, via the first communication module of the first controller device, a second virtual object, on the display appliance, based at least in part on the modulated light detected by the first controller device within the 3D ambient space.

7. The first controller device of claim 1, further comprising:
 an at least one light emitter operatively coupled to the first control unit;
 the first memory further comprising:
 a first gesture analyzer; and
 the first operations further comprising:
 detecting, via the first gesture analyzer, a first gesture movement of the first controller device within the 3D ambient space; and
 in response to detecting the first gesture movement, emitting a modulated light, via the at least one light emitter, into the 3D ambient space.

8. The first controller device of claim 1, wherein the first arbitrary physical object is an unlimited type of physical object in the 3D ambient space.

9. The first controller device of claim 1, wherein: the first object connector is a clip object connector that is substantially ring-shaped.

10. The first controller device of claim 1, wherein: the first object connector is a peg object connector configured to connect to one or more arbitrary physical objects.

11. The first controller device of claim 1, the first object connector further comprising: a connector hinge, wherein the first object connector is configured to pivot between at least two positions in the 3D ambient space.

12. The first controller device of claim 1, the first housing further comprising: a plurality of object connectors, wherein at least two object connectors are different types of object connectors.

13. The first controller device of claim 1, the first operations of the at least in part controlling further comprising:
 at least once the first orientation, of the first controller device in the 3D ambient space, is independently and arbitrarily adjustable in respect to the second orientation of the first virtual object, in a 3D virtual space, on the display appliance.

14. The first controller device of claim 1, the first operations further comprising:
 detecting, via the first motion module, a first rotational movement of the first controller device within the 3D ambient space;
 transmitting, via the first communication module, the first control data, further comprising information of the first rotational movement, to the display appliance within the 3D ambient space;
 at least in part controlling, via the first communication module of the first controller device, the first virtual object on the display appliance such that a second rotational movement, of the first virtual object, is based at least in part on the first rotational movement of the first controller device within the 3D ambient space.

15. The first controller device of claim 1, the first operations further comprising:
 detecting, via the first motion module, a first translational movement of the first controller device within the 3D ambient space;
 transmitting, via the first communication module, the first control data further comprising information of the first translational movement, to the display appliance within the 3D ambient space;
 at least in part controlling, via the first communication module of the first controller device, the first virtual object on the display appliance such that a second translational movement, of the first virtual object, is based at least in part on the first translational movement of the first controller device within the 3D ambient space.

16. The first controller device of claim 1, the first operations further comprising:
receiving, via the first communication module, a second control data from a second controller device within the 3D ambient space;
detecting, via the first communication module, a RSSI value related to the second control data received by the first controller device;
transmitting, via the first communication module, the first control data, further comprising the RSSI value, to the display appliance within the 3D ambient space; and
at least in part controlling, via the first communication module of the first controller device, the first virtual object on the display appliance such that a first distance, between the first virtual object and a second virtual object on the display appliance, is based at least in part on a second distance between the first controller device and the second controller device within the 3D ambient space.

17. The first controller device of claim 1, the first operations further comprising:
at least once transmitting, via the first communication module, the first control data, further comprising a virtual object description data, to the display appliance within the 3D ambient space; and
at least in part controlling, via the first communication module of the first controller device, the first virtual object on the display appliance such that the first virtual object is based at least in part on the virtual object description data.

18. The first controller device of claim 1, the first operations further comprising:
transmitting across a computer network, via the first communication module, the first control data, comprising information of the first orientation of the first controller device within the 3D ambient space, to a remote display appliance in a remote play system; and
at least in part controlling, via the first communication module of the first controller device, a remote virtual object on the remote display appliance such that a remote orientation, of the remote virtual object on the remote display appliance, is based at least in part on the first orientation of the first controller device within the 3D ambient space.

19. The first controller device of claim 1, the first memory further comprising:
a first gesture analyzer; and
the first operations further comprising:
detecting, via the first gesture analyzer, a first gesture movement of the first controller device within the 3D ambient space;
in a response to detecting the first gesture movement, the response comprising:
transmitting across a computer network, via the first communication module, the first control data, further comprising information of the first gesture movement of the first controller device, to a remote display appliance in a remote play system; and
at least in part controlling, via the first communication module of the first controller device, a remote virtual object on the remote display appliance such that an at least one movement, of the remote virtual object on the remote display appliance, is based at least in part on the first gesture movement of the first controller device within the 3D ambient space.

20. One or more non-transitory computer-readable storage media storing computer instructions that, when processed by one or more control units, perform operations of a first controller device for a play system, the operations comprising:
operating, via a first relocatable translator of the first controller device, such that the first controller device is enabled to be arbitrarily relocatable in a 3D ambient space of the play system, wherein the first controller device is enabled to be attached to or at least partially contained in a first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in a 3D real-world space;
detecting, via a first motion module of the first controller device, a first orientation of the first controller device within the 3D ambient space;
transmitting, via a first communication module of the first controller device, a first control data, comprising information of the first orientation, to a display appliance within the 3D ambient space; and
at least in part controlling, via the first communication module of the first controller device, a first virtual object on the display appliance such that a second orientation, of the first virtual object on the display appliance, is based at least in part on the first orientation of the first controller device within the 3D ambient space of the play system.

21. The one or more non-transitory computer-readable storage media of claim 20, further comprising:
in response to detecting a spatial calibrate event, via the first controller device, based at least in part on the first controller device is located at a spatial distance, from the display appliance, that is less than or equal to a spatial calibrate threshold distance within the 3D ambient space, the response comprising:
spatial calibrating the first relocatable translator of the first controller device such that the first controller device is enabled to be arbitrarily relocatable within the 3D ambient space, wherein the first controller device is enabled to be attached to or at least partially contained in the first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in the 3D real-world space.

22. The one or more non-transitory computer-readable storage media of claim 20, further comprising:
transmitting, across a computer network via the first communication module of the first controller device, at least the first control data to a remote display appliance in a remote play system, wherein the first control data comprises information of the first orientation of the first controller device in the 3D ambient space; and
at least in part controlling, via the first communication module of the first controller device, a remote virtual object on the remote display appliance such that a remote orientation, of the remote virtual object on the remote display appliance, is based at least in part on the first orientation of the first controller device within the 3D ambient space.

23. The one or more non-transitory computer-readable storage media of claim 20, further comprising:
   detecting, via a first gesture analyzer of the first controller device, a first gesture movement of the first controller device within the 3D ambient space; and
   in response to detecting the first gesture movement, emitting a modulated light, via an at least one light emitter of the first controller device, within the 3D ambient space.

24. The one or more non-transitory computer-readable storage media of claim 20, wherein: the first arbitrary physical object is an unlimited type of physical object in the 3D ambient space.

25. A computer-implemented method, comprising: at a display appliance, with one or more control units and memory, for a play system:
   detecting, via a communication module of the display appliance, one or more controller devices within a 3D ambient space of the play system, wherein a first controller device is selected, from the one or more controller devices;
   operating, via a relocatable translator of the display appliance, such that the first controller device is enabled to be arbitrarily relocatable in the 3D ambient space of the play system, wherein the first controller device is enabled to be attached to or at least partially contained in a first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in a 3D real-world space;
   receiving a first control data, via a communication module of the display appliance, from the first controller device, wherein the first control data comprises information of a first orientation of the first controller device within the 3D ambient space; and
   generating one or more video frames, on the display appliance, comprising a first virtual object such that a second orientation, of the first virtual object on the display appliance, is based at least in part on the first orientation of the first controller device within the 3D ambient space of the play system.

26. The computer-implemented method of claim 25, further comprising:
   receiving the first control data further comprising information of a first gesture movement of the first controller device in the 3D ambient space; and
   wherein the generating one or more video frames, via the display appliance, comprising the first virtual object such that an at least one movement, of the first virtual object on the display appliance, is based at least in part on the first gesture movement of the first controller device within the 3D ambient space.

27. The computer-implemented method of claim 25, further comprising:
   in response to detecting a spatial calibrate event, via the display appliance, based at least in part on the first controller device is located at a spatial distance, from the display appliance, that is less than or equal to a spatial calibrate threshold distance within the 3D ambient space, the response comprising:
      spatial calibrating the relocatable translator of the display appliance such that the first controller device is enabled to be arbitrarily relocatable within the 3D ambient space, wherein the first controller device is enabled to be attached to or at least partially contained in the first arbitrary physical object at an arbitrary location, and an arbitrary orientation, relative to the first arbitrary physical object in the 3D ambient space, and the first controller device is enabled to be arbitrarily located and arbitrarily oriented in the 3D ambient space that is movable in the 3D real-world space.

28. The computer-implemented method of claim 25, further comprising:
   wherein the receiving the first control data, via the communication module of the display appliance, from the first controller device, wherein the first control data is further comprising a virtual object identifier; and
   wherein the generating one or more video frames, on the display appliance, comprising the first virtual object, wherein the first virtual object is further based at least in part on the virtual object identifier received from the first controller device.

29. The computer-implemented method of claim 25, wherein: the first arbitrary physical object is an unlimited type of physical object in the 3D ambient space.

* * * * *